United States Patent
Pun et al.

(10) Patent No.: US 12,509,661 B2
(45) Date of Patent: Dec. 30, 2025

(54) COMPOSITIONS AND METHODS RELATED TO APTAMER-BASED REVERSIBLE CELL SELECTION

(71) Applicants: UNIVERSITY OF WASHINGTON, Seattle, WA (US); SEATTLE CHILDREN'S HOSPITAL, Seattle, WA (US)

(72) Inventors: Suzie H. Pun, Seattle, WA (US); Michael Jensen, Seattle, WA (US); Nataly Kacherovsky, Seattle, WA (US); Ian Cardle, Seattle, WA (US)

(73) Assignees: UNIVERSITY OF WASHINGTON; SEATTLE CHILDREN'S HOSPITAL

( * ) Notice: Subject to any disclaimer, the term of this patent is extended or adjusted under 35 U.S.C. 154(b) by 1359 days.

(21) Appl. No.: 17/260,111

(22) PCT Filed: Jul. 16, 2019

(86) PCT No.: PCT/US2019/042063
§ 371 (c)(1),
(2) Date: Jan. 13, 2021

(87) PCT Pub. No.: WO2020/018578
PCT Pub. Date: Jan. 23, 2020

(65) Prior Publication Data
US 2021/0269772 A1    Sep. 2, 2021

Related U.S. Application Data

(60) Provisional application No. 62/779,946, filed on Dec. 14, 2018, provisional application No. 62/699,438, filed on Jul. 17, 2018.

(51) Int. Cl.
C12N 5/0783    (2010.01)
A61K 40/11    (2025.01)
(Continued)

(52) U.S. Cl.
CPC ............ *C12N 5/0636* (2013.01); *A61K 40/11* (2025.01); *A61K 40/31* (2025.01);
(Continued)

(58) Field of Classification Search
CPC ........................ C12N 15/1048; C12N 2310/16
See application file for complete search history.

(56) References Cited

U.S. PATENT DOCUMENTS

2009/0111127 A1    4/2009  Chan-Hui et al.
2009/0117549 A1    5/2009  Tan et al.
(Continued)

FOREIGN PATENT DOCUMENTS

WO      2011060557 A1    5/2011
WO      WO-2015166049 A1 *  11/2015   ............. C07K 16/28
WO      2015188839 A2    12/2015

OTHER PUBLICATIONS

Belov et al. Immunophenotyping of Leukemias Using a Cluster of Differentiation Antibody Microarray. Cancer Res. Jun. 1, 2001;61(11):4483-9. (Year: 2001).*

(Continued)

*Primary Examiner* — Marcia S Noble
*Assistant Examiner* — Briana N Ebbinghaus
(74) *Attorney, Agent, or Firm* — NIXON PEABODY LLP; Mark J. Fitzgerald; Alissa R. Young

(57) ABSTRACT

Described herein is a reversible aptamer selection technology for production-scale isolation of label-free cells (e.g., CD8+ T cells). Provided herein are methods for isolating a cell of interest from a biological sample by contacting the biological sample with an aptamer that specifically binds a cell surface marker specific for the cell of interest; separating the aptamer-bound cells from cells not bound to the (Continued)

aptamer; and recovering a cell of interest by disrupting binding of the aptamer to the cell surface marker.

15 Claims, 60 Drawing Sheets

Specification includes a Sequence Listing.

(51) Int. Cl.
    *A61K 40/31*     (2025.01)
    *A61K 40/42*     (2025.01)
    *C12N 13/00*     (2006.01)
    *C12N 15/10*     (2006.01)
    *C12N 15/115*    (2010.01)

(52) U.S. Cl.
    CPC ........ *A61K 40/4211* (2025.01); *C12N 5/0638* (2013.01); *C12N 13/00* (2013.01); *C12N 15/1048* (2013.01); *C12N 15/115* (2013.01); *A61K 2239/48* (2023.05); *C12N 2310/16* (2013.01)

(56) References Cited

U.S. PATENT DOCUMENTS

| | | |
|---|---|---|
| 2010/0254901 A1 | 10/2010 | Smith |
| 2015/0024411 A1 | 1/2015 | Stadler |
| 2016/0009761 A1 | 1/2016 | Siret et al. |
| 2016/0091489 A1* | 3/2016 | Fan .................. G01N 33/54386 435/7.2 |
| 2016/0169864 A1 | 6/2016 | Grinstaff et al. |
| 2016/0291023 A1 | 10/2016 | Fan et al. |
| 2016/0319361 A1* | 11/2016 | Spetzler ............... C12Q 1/6886 |
| 2017/0183619 A1 | 6/2017 | Coelho et al. |
| 2018/0155725 A1 | 6/2018 | Zichi et al. |

OTHER PUBLICATIONS

Sun et al. A rapid and simple method for efficient capture and accurate discrimination of circulating tumor cells using aptamer conjugated magnetic beads and surface-enhanced Raman scattering imaging. Anal Bioanal Chem. Nov. 2015;407(29):8883-92. (Year: 2015).*
Pezzi et al.Integration of Magnetic Bead-Based Cell Selection into Complex Isolations. ACS Omega. Apr. 30, 2018;3(4 ):3908-3917. Epub Apr. 6, 2018.(Year: 2018).*
Campbell et al. Total lymphocyte CD8 expression is not a reliable marker of cytotoxic T-cell populations in human peripheral blood following an acute bout of high-intensity exercise. Brain Behav Immun. Mar. 2008;22(3):375-80. Epub Oct. 18, 2007. (Year: 2007).*
Aljaz et al. "Biomanufacturing for clinically advanced cell therapies." Nature Biomedical Engineering 2(6): 362-376 (2018).
Alam et al. "FASTAptamer: a bioinformatic toolkit for high-throughput sequence analysis of combinatorial selections." Molecular Therapy-Nucleic Acids 4: e230 pp. 1-10 (2015).
Aronovich et al. "The Sleeping Beauty transposon system: a non-viral vector for gene therapy." Human Molecular Genetics 20(R1): R14-R20 (2011).
Bailey et al. "Meme Suite: tools for motif discovery and searching." Nucleic Acids Research 37(Suppl_2): W202-W208 (2009).
Bergen et al. "Gold nanoparticles as a versatile platform for optimizing physicochemical parameters for targeted drug delivery." Macromolecular Bioscience 6(7): 506-516 (2006).
Bray, "Large-scale manufacture of peptide therapeutics by chemical synthesis." Nature Reviews Drug Discovery 2(7):587-593 (2003).
Brentjens et al. "CD19-targeted T cells rapidly induce molecular remissions in adults with chemotherapy-refractory acute lymphoblastic leukemia." Science Translational Medicine 5(177): 177ra38-177ra38 (2013).

Brentjens et al. "Eradication of systemic B-cell tumors by genetically targeted human T lymphocytes co-stimulated by CD80 and interleukin-15." Nature Medicine 9(3): 279-286 (2003).
Buckler et al. "Rise of Cell-Based Immunotherapy: Personalized Medicine Takes Next Step Forward." Genetic Engineering & Biotechnology News 33(5): 12-13 (2013).
Bunka et al. "Aptamers come of age—at last." Nature Reviews Microbiology 4(8): 588-596 (2006).
Caroli et al. "APTANI: a computational tool to select aptamers through sequence-structure motif analysis of HT-SELEX data." Bioinformatics 32(2): 161-164 (2016).
Chen et al. "Aptamer-mediated efficient capture and release of T lymphocytes on nanostructured surfaces." Advanced Materials 23(38): 4376-4380 (2011).
Chu et al. "Cathepsin B-sensitive polymers for compartment-specific degradation and nucleic acid release." Journal of Controlled Release 157(3): 445-454 (2012).
Cieslewicz et al. "Targeted delivery of proapoptotic peptides to tumor-associated macrophages improves survival." Proceedings of the National Academy of Sciences 110(40): 15919-15924 (2013).
Dahotre et al. "Individually addressable and dynamic DNA gates for multiplexed cell sorting." Proceedings of the National Academy of Sciences 115(17): 4357-4362 (2018).
Daniels et al. "A tenascin-C aptamer identified by tumor cell SELEX: systematic evolution of ligands by exponential enrichment." Proceedings of the National Academy of Sciences 100(26): 15416-15421 (2003).
Davila et al. "Efficacy and toxicity management of 19-28z CAR T cell therapy in B cell acute lymphoblastic leukemia." Science Translational Medicine 6(224): 224ra25-224ra25 (2014).
Dunn et al. "Analysis of aptamer discovery and technology." Nature Reviews Chemistry 1(10): 1-16 (2017).
Ellington et al. "In vitro selection of RNA molecules that bind specific ligands." Nature 346(6267): 818-822 (1990).
Eyquem et al. "Targeting a CAR to the TRAC locus with CRISPR/Cas9 enhances tumour rejection." Nature 543 (7643): 113-117 (2017).
Fischer et al. "Identification and optimization of DNA aptamer binding regions using DNA microarrays." Protein Microarray for Disease Analysis. Humana Press: 57-66 (2011).
Gardner et al. "Intent-to-treat leukemia remission by CD19 CAR T cells of defined formulation and dose in children and young adults." Blood, The Journal of the American Society of Hematology 129(25): 3322-3331 (2017).
Gawande et al. "Selection of DNA aptamers with two modified bases." Proceedings of the National Academy of Sciences 114(11): 2898-2903 (2017).
Hale et al. "Engineering HIV-resistant, anti-HIV chimeric antigen receptor T cells." Molecular Therapy 25(3): 570-579 (2017).
Heczey et al. "Invariant NKT cells with chimeric antigen receptor provide a novel platform for safe and effective cancer immunotherapy," Blood, The Journal of the American Society of Hematology 124(18): 2824-2833 (2014).
Hernandez et al. "Aptamers overview: selection, features and applications." Current Topics in Medicinal Chemistry 15(12): 1066-1081 (2015).
Ivics et al. "Molecular reconstruction of Sleeping Beauty, a Tc1-like transposon from fish, and its transposition in human cells." Cell 91(4): 501-510 (1997).
Johnson et al. "HPMA-oligolysine copolymers for gene delivery: optimization of peptide length and polymer molecular weight." Journal of Controlled Release 155(2): 303-311 (2011).
Kacherovsky et al. "Combination of Sleeping Beauty transposition and chemically induced dimerization selection for robust production of engineered cells." Nucleic Acids Research 40(11): e85-e85 (2012).
Kacherovsky et al. "Multiplexed gene transfer to a human T-cell line by combining Sleeping Beauty transposon system with methotrexate selection." Biotechnology and Bioengineering 112(7): 1429-1436 (2015).

(56) References Cited

OTHER PUBLICATIONS

Kalos et al. "T cells with chimeric antigen receptors have potent antitumor effects and can establish memory in patients with advanced leukemia." Science Translational Medicine 3(95): 95ra73 pp. 1-21 (2011).
Kedzierski et al. "Synthetic antibodies: the emerging field of aptamers." Bioprocess. J 11: 46-49 (2012).
Knabel et al. "Reversible MHC multimer staining for functional isolation of T-cell populations and effective adoptive transfer." Nature Medicine 8(6): 631-637 (2002).
Kochenderfer et al. "B-cell depletion and remissions of malignancy along with cytokine-associated toxicity in a clinical trial of anti-CD19 chimeric-antigen-receptor-transduced T cells." Blood, The Journal of the American Society of Hematology 119(12): 2709-2720 (2012).
Labib et al. "Aptamer and antisense-mediated two-dimensional isolation of specific cancer cell subpopulations." Journal of the American Chemical Society 136(8): 2476-2479 (2016).
Lee et al. "T cells expressing CD19 chimeric antigen receptors for acute lymphoblastic leukaemia in children and young adults: a phase 1 dose-escalation trial." The Lancet 385(9967): 517-528 (2015).
Li et al. "Endonuclease-responsive aptamer-functionalized hydrogel coating for sequential catch and release of cancer cells." Biomaterials 34(2): 460-469 (2013).
Madugula et al. "A ternary complex comprising transportin1, Rab8 and the ciliary targeting signal directs proteins to ciliary membranes." Journal of Cell Science 129(20): 3922-3934 (2016).
Mirzaei et al. "Chimeric antigen receptors T cell therapy in solid tumor: challenges and clinical applications." Frontiers in Immunology 8: 1850 pp. 1-13 (2017).
Ng et al. "Bio-mimetic surface engineering of plasmid-loaded nanoparticles for active intracellular trafficking by actin comet-tail motility." Biomaterials 30(5): 951-958 (2009).
Ni et al. "Chemical modifications of nucleic acid aptamers for therapeutic purposes." International Journal of Molecular Sciences 18(8): 1683 pp. 1-21 (2017).
Nozari et al. "Aptamers for CD antigens: from cell profiling to activity modulation." Molecular Therapy-Nucleic Acids 6: 29-44 (2017).
Ogasawara et al. "Screening of DNA aptamer against mouse prion protein by competitive selection." Prion 1(4): 248-254 (2007).
Park et al. "Determination of nanoparticle vehicle unpackaging by MR imaging of a T2 magnetic relaxation switch." Biomaterials 29(6): 724-732 (2008).
Park et al. "Treating cancer with genetically engineered T cells." Trends in Biotechnology 29(11): 550-557 (2011).
Pelloquin et al. "Human B lymphocytes immortalization by epstein-barr virus in the presence of cyclosporin a." In Vitro Cellular & Developmental Biology 22(12): 689-694 (1986).
Probst et al. "Rapid multitarget immunomagnetic separation through programmable DNA linker displacement." Journal of the American Chemical Society 133(43): 17126-17129 (2011).
Robertson et al. "Selection in vitro of an RNA enzyme that specifically cleaves single-stranded DNA." Nature 344(6265): 467-468 (1990).
Rosenberg et al. "Cell transfer immunotherapy for metastatic solid cancer—what clinicians need to know." Nature Reviews Clinical Oncology 8(10): 577-585 (2011).
Ruella et al. "Induction of resistance to chimeric antigen receptor T cell therapy by transduction of a single leukemic B cell." Nature Medicine 24(10): 1499-1503 (2018).
Sabatino et al. "Generation of clinical-grade CD19-specific CAR-modified CD8+ memory stem cells for the treatment of human B-cell malignancies." Blood, The Journal of the American Society of Hematology 128(4): 519-528 (2016).
Schellinger et al. "Block copolymers containing a hydrophobic domain of membrane-lytic peptides form micellar structures and are effective gene delivery agents." ACS Macro Letters 2(8): 725-730 (2013).
Schellinger et al. "Melittin-grafted HPMA-oligolysine based copolymers for gene delivery." Biomaterials 34(9): 2318-2326 (2013).
Schmitt et al. "Adoptive transfer and selective reconstitution of streptamer-selected cytomegalovirus-specific CD8+ T cells leads to virus clearance in patients after allogeneic peripheral blood stem cell transplantation." Transfusion 51(3): 591-599 (2011).
Scholler et al. "Decade-long safety and function of retroviral-modified chimeric antigen receptor T cells." Science Translational Medicine 4(132): 132ra53-132ra53 (2012).
Seelig et al. "Enzyme-free nucleic acid logic circuits." Science 314(5805): 1585-1588 (2006).
Sefah et al. "Development of DNA aptamers using Cell-SELEX." Nature Protocols 5(6): 1169-1185 (2010).
Sellers et al. "Poly (lactic-co-glycolic) acid microspheres encapsulated in Pluronic F-127 prolong hirudin delivery and improve functional recovery from a demyelination lesion." Biomaterials 35(31): 8895-8902 (2014).
Shangguan et al. "Aptamers evolved from live cells as effective molecular probes for cancer study." Proceedings of the National Academy of Sciences 103(32): 11838-11843 (2006).
Sommermeyer et al. "Chimeric antigen receptor-modified T cells derived from defined CD8+ and CD4+ subsets confer superior antitumor reactivity in vivo." Leukemia 30(2): 492-500 (2016).
Song et al. "Selection of DNA aptamers against epithelial cell adhesion molecule for cancer cell imaging and circulating tumor cell capture." Analytical Chemistry 85(8): 4141-4149 (2013).
Stemberger et al. "Novel serial positive enrichment technology enables clinical multiparameter cell sorting." PloS One 7(4): e35798 pp. 1-11 (2012).
Sun et al. "Chitosan nanofibers for specific capture and nondestructive release of CTCs assisted by pCBMA brushes." Small 12(36): 5090-5097 (2016).
Terakura et al. "Generation of CD19-chimeric antigen receptor modified CD8+ T cells derived from virus-specific central memory T cells." Blood, The Journal of the American Society of Hematology 119(1): 72-82 (2012).
Till et al. "Adoptive immunotherapy for indolent non-Hodgkin lymphoma and mantle cell lymphoma using genetically modified autologous CD20-specific T cells." Blood, The Journal of the American Society of Hematology 112(6): 2261-2271 (2008).
Tsai et al. "Regional astrocyte allocation regulates CNS synaptogenesis and repair." Science 337(6092): 358-362 (2012).
Tuerk et al. "Systematic evolution of ligands by exponential enrichment: RNA ligands to bacteriophage T4 DNA polymerase." Science 249(4968): 505-510 (1990).
Turtle et al. "CD19 CAR-T cells of defined CD4+: CD8+ composition in adult B cell ALL patients." The Journal of Clinical Investigation 126(6): 2123-2138 (2016).
Uchimura et al. "Totally synthetic polymer with lectin-like function: Induction of killer cells by the copolymer of 3-acrylamidophenylboronic acid with N, N-dimethylacrylamide." Biotechnology and Bioengineering 72(3): 307-314 (2001).
Voss et al. "Mutagenesis of a flexible loop in streptavidin leads to higher affinity for the Strep-tag II peptide and improved performance in recombinant protein purification." Protein Engineering 10(8): 975-982 (1997).
Wan et al. "Capture, isolation and release of cancer cells with aptamer-functionalized glass bead array." Lab on a Chip 12(22): 4693-4701 (2012).
Wang et al. "A new nucleic acid-based agent inhibits cytotoxic T lymphocyte-mediated immune disorders." Journal of Allergy and Clinical Immunology 132(3): 713-722 (2013).
Wang et al. "Clinical manufacturing of CAR T cells: foundation of a promising therapy." Molecular Therapy-Oncolytics 3: 16015 pp. 1-7 (2016).
Wang et al. "Optimizing adoptive polyclonal T cell immunotherapy of lymphomas, using a chimeric T cell receptor possessing CD28 and CD137 costimulatory domains." Human Gene Therapy 18(8): 712-725 (2007).
Wang et al. "Phenotypic and functional attributes of lentivirus modified CD19-specific human CD8+ central memory T cells manufactured at Clinical Scale." Journal of Immunotherapy (Hagerstown, Md.: 1997) 35(9): 689-701 (2012).

(56) References Cited

OTHER PUBLICATIONS

Wei et al. "Dual responsive, stabilized nanoparticles for efficient in vivo plasmid delivery." Angewandte Chemie Int Ed Engl. 52(20): 5377-5381 (2013).

Wei et al. "Neuron-targeted copolymers with sheddable shielding blocks synthesized using a reducible, RAFT-ATRP double-head agent." Journal of the American Chemical Society 134(40): 16554-16557 (2012).

Xu et al. "Aptamer-based microfluidic device for enrichment, sorting, and detection of multiple cancer cells." Analytical Chemistry 81(17): 7436-7442 (2009).

Yoon et al. "Isolation of foreign material-free endothelial progenitor cells using CD31 aptamer and therapeutic application for ischemic injury." PloS One 10(7): e0131785 pp. 1-19 (2015).

Yurke et al. "A DNA-fuelled molecular machine made of DNA." Nature 406(6796): 605-608 (2000).

Yurke et al. "Using DNA to power nanostructures." Genetic Programming and Evolvable Machines 4(2): 111-122 (2003).

Zadeh et al. "NUPACK: analysis and design of nucleic acid systems." Journal of Computational Chemistry 32(1): 170-173 (2011).

Zhang et al. "Control of DNA strand displacement kinetics using toehold exchange." Journal of the American Chemical Society 131(47): 17303-17314 (2009).

Zhang et al. "Dynamic DNA nanotechnology using strand-displacement reactions." Nature Chemistry 3(2): 103-113 (2011).

Zhang et al. "Programmable hydrogels for controlled cell catch and release using hybridized aptamers and complementary sequences." Journal of the American Chemical Society 134(38): 15716-15719 (2012).

Zhao et al. "Structural design of engineered costimulation determines tumor rejection kinetics and persistence of CAR T cells." Cancer Cell 28(4): 415-428 (2015).

Zhou et al. "Aptamers as targeted therapeutics: current potential and challenges." Nature Reviews Drug Discovery 16(3): 181-202 (2017).

Zhu et al. "Specific capture and temperature-mediated release of cells in an aptamer-based microfluidic device." Lab on a Chip 12(18): 3504-3513 (2012).

Zumrut et al. "Ligand-guided selection of aptamers against T-cell Receptor-cluster of differentiation 3 (TCR-CD3) expressed on Jurkat. E6 cells." Analytical Biochemistry 512: 1-7 (2016).

\* cited by examiner

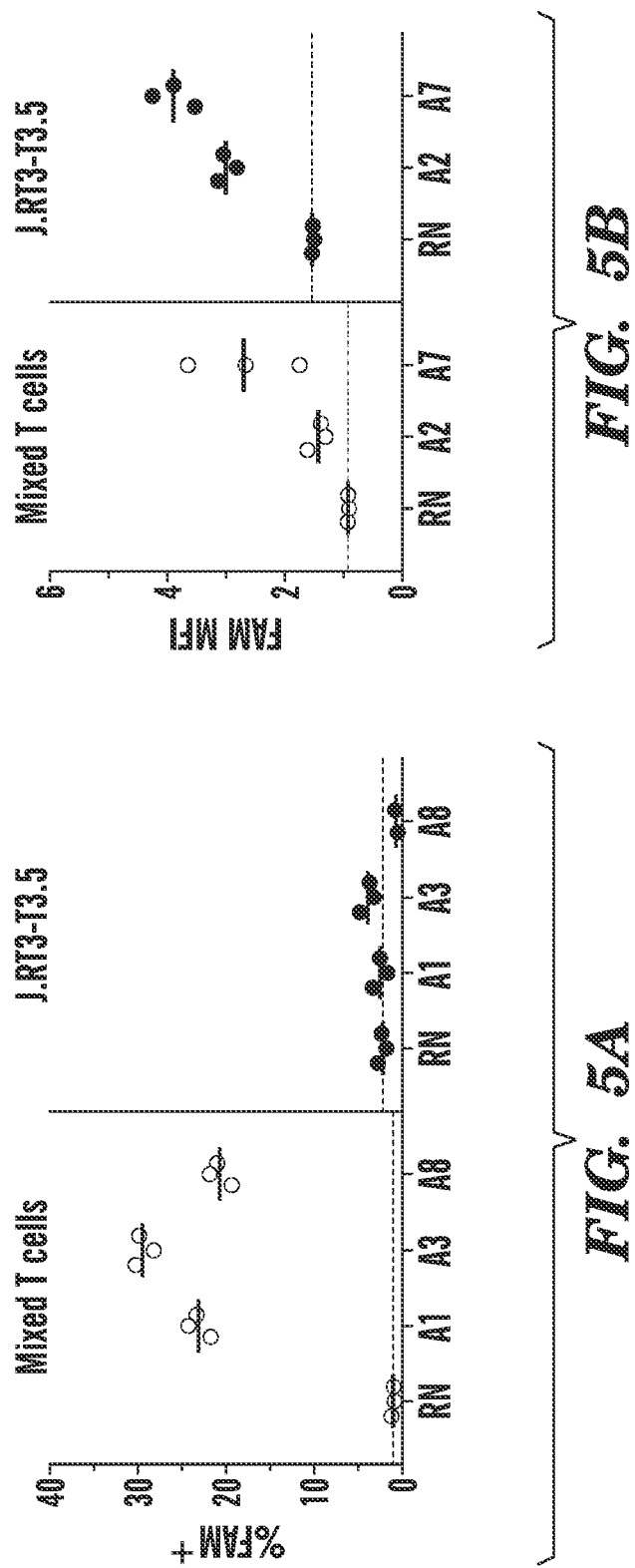

| Cell Type | % of PBMCs | % RN+ of Cell Type (FAM) | MFI of RN+ Cells (FAM) | % A3t+ of Cell Type (FAM) | MFI of A3t+ Cells (FAM) |
|---|---|---|---|---|---|
| CD3+CD56- T Cells | 44.7 (±1.3) | 2.2 (±0.7) | 565 (±139) | 34.6 (±3.6) | 2166 (±138) |
| CD3+CD56+ NKT Cells | 3.0 (±1.3) | 2.0 (±0.6) | 493 (±111) | 69.2 (±25.5) | 2595 (±775) |
| CD3-CD56+ NK Cells | 11.1 (±3.8) | 1.5 (±0.3) | 375 (±80) | 18.4 (±12.3) | 422 (±116) |
| CD3-CD56-CD14+ Monocytes | 21.5 (±8.2) | 7.5 (±0.9) | 752 (±283) | 3.6 (±0.3) | 407 (±105) |
| CD3-CD56-CD19+ B Cells | 11.6 (±9.3) | 0.0 (±0.0) | 213 (±54) | 0.0 (±0.0) | 132 (±42) |
| Sum | 91.9 (±1.3) | | | | |

FIG. 12B

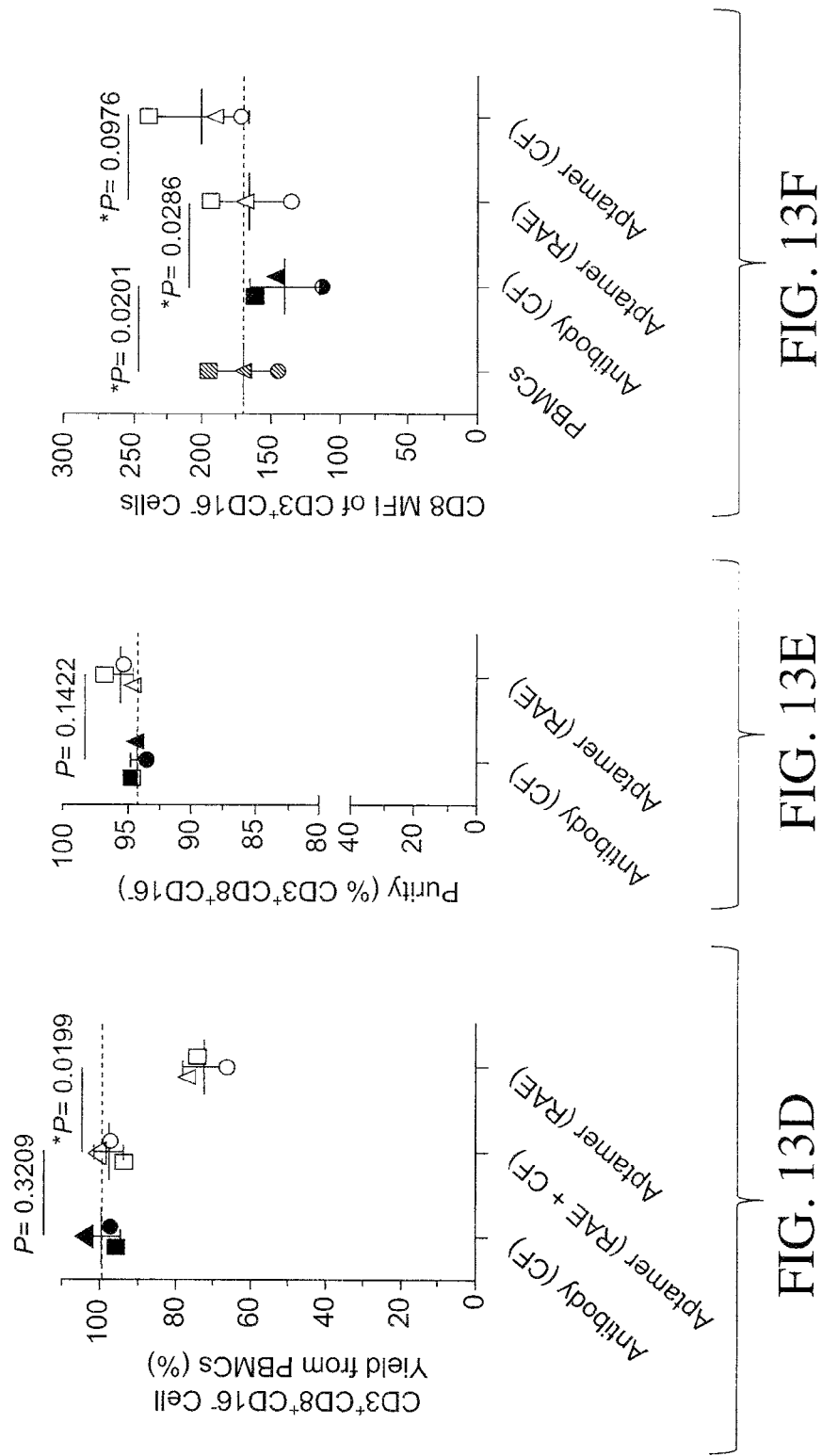

A1 40bp reversal agent: <u>ACTAAGCCACCGTGTCCA</u> TTTCAAGCTGCATCACGTAGTG
A3 42bp reversal agent: <u>ACTAAGCCACCGTGTCCA</u> CCTCTGTCAGAGACAATTTCAAGC
A8 37bp reversal agent: <u>ACTAAGCCACCGTGTCCA</u> AAACTGTGGACGCGTCCC Optimization of reversal agent lenth for A3 aptamer with stabilized stem:

- 20bp: ACTAAGACACAGTGTCCACC
- 35bp: ACTAAGACACAGTGTCCACCTCTGTCAGAGACAAT
- 50bp: ACTAAGACACAGTGTCCACCTCTGTCAGAGACAATTTCAAGCTTGTTCAC
- 65bp: ACTAAGACACAGTGTCCACCTCTGTCAGAGACAATTTCAAGCTTGTTCAC GTGTACTTCTACACC
- 85bp: ACTAAGACACAGTGTCCACCTCTGTCAGAGACAATTTCAAGCTTGTTCAC GTGTACTTCTACACCTCTGTTGCTGCGTCACTGTG

- 25bp: ACTAAGACACAGTGTCCACCTCTGT
- 30bp: ACTAAGACACAGTGTCCACCTCTGTCAGAG
- 35bp: ACTAAGACACAGTGTCCACCTCTGTCAGAGACAAT
- 40bp: ACTAAGACACAGTGTCCACCTCTGTCAGAGACAATTTCAA
- 45bp: ACTAAGACACAGTGTCCACCTCTGTCAGAGACAATTTCAAGCTTG
- 50bp: ACTAAGACACAGTGTCCACCTCTGTCAGAGACAATTTCAAGCTTGTTCAC

FIG. 24B

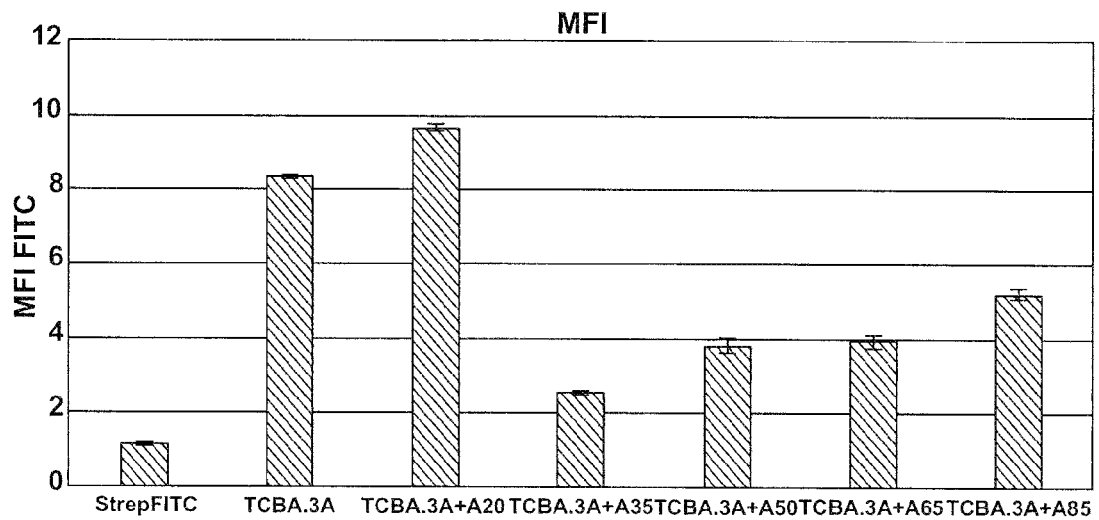
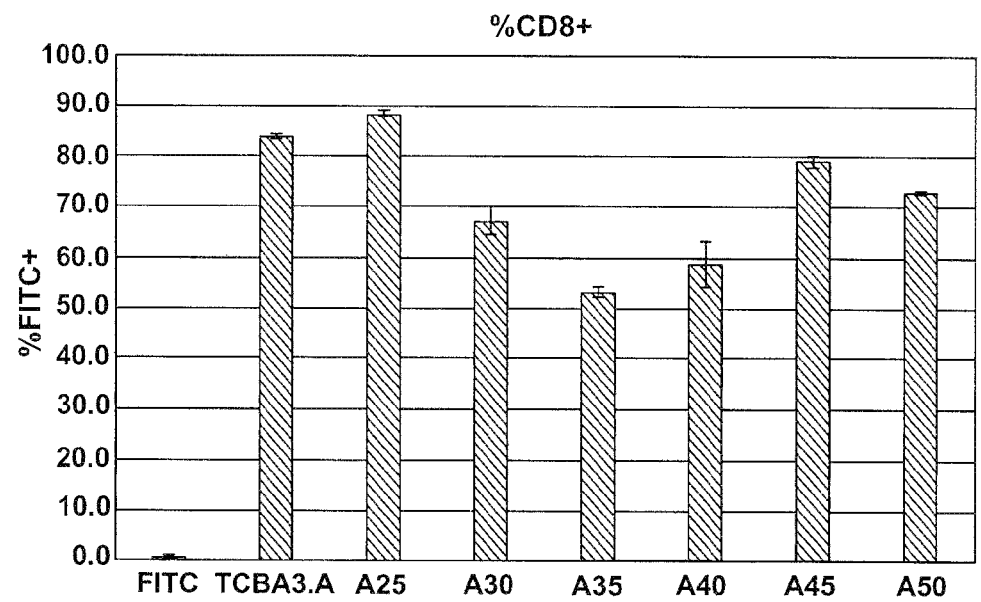
FIG. 24B (continued)

Theoretical truncated A3t aptamers with varying amounts of guanine's for improved strand displacement Original A3t (88bp):
CCAGAGTTGACGCAGCAACAGAGGTTGTAGAAGTACACGTGAAGTACACGTGAACAAGCTTGAAATTGTCTCTGACAGAGGTTGTAGAAGTACACGTGAACACGGGTGGCTTTTTAGT Truncated A3t (67bp):
CACCAACAGAGGTGTAGAAGTACACGTGAACAAGCTTGAAATTGTCTCTGACAGAGGTGCTTTTAGT Truncated A3t with 4G Toehold (67bp):
CACCAACAGAGGTGTAGAAGTACACGTGAACAAGCTTGAAATTGTCTCTGACAGAGGTGAAGGAAGG Truncated A3t with 6G Toehold (67bp):
CACCAACAGAGGTGTAGAAGTACACGTGAACAAGCTTGAAATTGTCTCTGACAGAGGTGGAGGGAGG Original A3t Reversal Agent (30bp):
ACTAAAAGCCACCCGTGTCCACCTCTGTCAGAGACAA Truncated A3t Reversal Agent (28bp):
ACTAAAAGCACCTCTGTCAGAGACAA Truncated A3t with 4G Toehold Reversal Agent (28bp):
CCTTCCTTCACCTCTGTCAGAGACAA Truncated A3t with 6G Toehold Reversal Agent (28bp):
CCTTCCCTCCACCTCTGTCAGAGACA Bold = deleted from original
Outline = changed from original
Underline = toehold region or complementary to toehold region

FIG. 26

Antidote: 81-55 ACTAAGCCACCGTGTCCATTTCAAGCT dG = -19.37 CD3CD28A1
Secondary structure predection

```
                        SEQUENCE LISTING

<160> NUMBER OF SEQ ID NOS: 124

<210> SEQ ID NO 1
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 1
atccagagtg acgcagcacg cagcacccgt ggtagtgtat cagggagaca ctacgtgatg    60
cagcttgaaa tggacacggt ggcttagt                                      88

<210> SEQ ID NO 2
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 2
atccagagtg acgcagcacg cagcaaggtg gctgtgggcg gatggtgggc tcgcgtgggc    60
ggccacctga tggacacggt ggcttagt                                      88

<210> SEQ ID NO 3
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 3
atccagagtg acgcagcaac agaggtgtag aagtacacgt gaacaagctt gaaattgtct    60
```
ctgacagagg tggacacggt ggcttagt                                      88

<210> SEQ ID NO 4
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 4
atccagagtg acgcagcatt aggaggtggg ctcgcgtgca ccaatccatg gtcggcggga   60
attttaaggg tggacacggt ggcttagt                                      88

<210> SEQ ID NO 5
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 5
atccagagtg acgcagcagc tcgatcgtat agccgtgacg cagcttgaaa tgggatcgcg   60
tccacagttt tggacacggt ggcttagt                                      88

<210> SEQ ID NO 6
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 6
ccagagtgac gcagcaacag aggtgtagaa gtacacgtga acaagcttga aattgtctct   60
gacagaggtg gacacggtgg cttttagt                                      88

<210> SEQ ID NO 7
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 7
actaaaagcc accgtgtcca cctctgtcag agacaa                             36

<210> SEQ ID NO 8
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 8
actaagccac cgtgtccatt tcaagct                                       27

<210> SEQ ID NO 9
<211> LENGTH: 88
<212> TYPE: DNA
<213> ORGANISM: Artificial Sequence
<220> FEATURE:

```
<223> OTHER INFORMATION: Description of Artificial Sequence: Synthetic
      oligonucleotide

<400> SEQUENCE: 9
atccagagtg acgcagcacg cagcacccgt ggtagtgtat cagggagaca ctacgtgatg    60
cagcttgaaa tggacacggt ggcttagt                                       88

<210> SEQ ID NO 10
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 10
taggtctcac tgcgtcgtgc gtcgtgggca ccatcacata gtccctctgt gatgcactac    60
gtcgaacttt acctgtgcca ccgaatca                                       88

<210> SEQ ID NO 11
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 11
taggtctcac tgcgtcgttg tctccacatc ttcatgtgca cttgttcgaa ctttaacaga    60
gactgtctcc acctgtgcca ccgaatca                                       88

<210> SEQ ID NO 12
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 12
taggtctcac tgcgtcgtaa tcctccaccc gagcgcacgt ggttaggtac cagccgccct    60
taaaattccc acctgtgcca ccgaatca                                       88

<210> SEQ ID NO 13
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 13
taggtctcac tgcgtcgtcg agctagcata tcggcactgc gtcgaacttt accctagcgc    60
aggtgtcaaa acctgtgcca ccgaatca                                       88

<210> SEQ ID NO 14
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 14
```

```
ggtctcactg cgtcgttgtc tccacatctt catgtgcact tgttcgaact ttaacagaga    60
ctgtctccac ctgtgccacc gaaaatca                                       88

<210> SEQ ID NO 15
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 15
tgattttcgg tggcacaggt ggagacagtc tctgtt                              36

<210> SEQ ID NO 16
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 16
tgattcggtg gcacaggtaa agttcga                                        27

<210> SEQ ID NO 17
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 17
tgattcggtg gcacaggtaa agttcgacgt agtgcatcac agagggacta tgtgatggtg    60
cccacgacgc acgacgcagt gagaccta                                       88

<210> SEQ ID NO 18
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 18
tgattcggtg gcacaggtag tccaccggcg ggtgcgctcg ggtggtaggc gggtgtcggt    60
ggaacgacgc acgacgcagt gagaccta                                       88

<210> SEQ ID NO 19
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 19
tgattcggtg gcacaggtgg agacagtctc tgttaaagtt cgaacaagtg cacatgaaga    60
tgtggagaca acgacgcagt gagaccta                                       88

<210> SEQ ID NO 20
<211> LENGTH: 88
```

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 20
tgattcggtg gcacaggtgg gaattttaag ggcggctggt acctaaccac gtgcgctcgg      60
gtggaggatt acgacgcagt gagaccta                                        88

<210> SEQ ID NO 21
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 21
tgattcggtg gcacaggtaa agttcgacgt agtgcatcac agagggacta tgtgatggtg      60
cccacgacgc acgacgcagt gagaccta                                        88

<210> SEQ ID NO 22
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 22
tgattttcgg tggcacaggt ggagacagtc tctgttaaag ttcgaacaag tgcacatgaa      60
gatgtggaga caacgacgca gtgagacc                                        88

<210> SEQ ID NO 23
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 23
aacagagact gtctccacct gtgccaccga aaatca                               36

<210> SEQ ID NO 24
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 24
tcgaacttta cctgtgccac cgaatca                                         27

<210> SEQ ID NO 25
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 25
```

```
actaagccac cgtgtccatt tcaagctgca tcacgtagtg tctccctgat acactaccac    60
gggtgctgcg tgctgcgtca ctctggat                                       88
```

<210> SEQ ID NO 26
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 26

```
actaagccac cgtgtccatc aggtggccgc ccacgcgagc ccaccatccg cccacagcca    60
ccttgctgcg tgctgcgtca ctctggat                                       88
```

<210> SEQ ID NO 27
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 27

```
actaagccac cgtgtccacc tctgtcagag acaatttcaa gcttgttcac gtgtacttct    60
acacctctgt tgctgcgtca ctctggat                                       88
```

<210> SEQ ID NO 28
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 28

```
actaagccac cgtgtccacc cttaaaattc ccgccgacca tggattggtg cacgcgagcc    60
cacctcctaa tgctgcgtca ctctggat                                       88
```

<210> SEQ ID NO 29
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 29

```
actaagccac cgtgtccatt tcaagctgca tcacgtagtg tctccctgat acactaccac    60
gggtgctgcg tgctgcgtca ctctggat                                       88
```

<210> SEQ ID NO 30
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 30

```
actaaaagcc accgtgtcca cctctgtcag agacaatttc aagcttgttc acgtgtactt    60
ctacacctct gttgctgcgt cactctgg                                       88
```

<210> SEQ ID NO 31
<211> LENGTH: 36
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 31
ttgtctctga cagaggtgga cacggtggct tttagt                                 36

<210> SEQ ID NO 32
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 32
agcttgaaat ggacacggtg gcttagt                                           27

<210> SEQ ID NO 33
<211> LENGTH: 82
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 33
atccagagtg acgcagcacg cagcacccgt ggtagtgtat cagggagaca ctacgtgatg       60
cagcttgaaa tggacacggt gg                                                82

<210> SEQ ID NO 34
<211> LENGTH: 82
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 34
atccagagtg acgcagcacg cagcaaggtg gctgtgggcg gatggtgggc tcgcgtgggc       60
ggccacctga tggacacggt gg                                                82

<210> SEQ ID NO 35
<211> LENGTH: 80
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 35
ccagagtgac gcagcaacag aggtgtagaa gtacacgtga acaagcttga aattgtctct       60
gacagaggtg gacacggtgg                                                   80

<210> SEQ ID NO 36
<211> LENGTH: 82
<212> TYPE: DNA
<213> ORGANISM: Artificial Sequence
<220> FEATURE:
<223> OTHER INFORMATION: Description of Artificial Sequence: Synthetic
      oligonucleotide

```
<400> SEQUENCE: 36
atccagagtg acgcagcatt aggaggtggg ctcgcgtgca ccaatccatg gtcggcggga      60
attttaaggg tggacacggt gg                                               82

<210> SEQ ID NO 37
<211> LENGTH: 83
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 37
atccagagtg acgcagcagc tcgatcgtat agccgtgacg cagcttgaaa tgggatcgcg      60
tccacagttt tggacacggt ggc                                              83

<210> SEQ ID NO 38
<211> LENGTH: 80
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 38
ccagagtgac gcagcaacag aggtgtagaa gtacacgtga acaagcttga aattgtctct      60
gacagaggtg gacacggtgg                                                  80

<210> SEQ ID NO 39
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 39
atccagagtg acgcagcacg cagcacccgt ggtagtgtat cagggagaca ctacgtgatg      60
cagcttgaaa tggacacggt ggcttttagt                                       90

<210> SEQ ID NO 40
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 40
atccagagtg acgcagcacg cagcaaggtg gctgtgggcg gatggtgggc tcgcgtgggc      60
ggccacctga tggacacggt ggcttttagt                                       90

<210> SEQ ID NO 41
<211> LENGTH: 90
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 41
atccagagtg acgcagcatt aggaggtggg ctcgcgtgca ccaatccatg gtcggcggga      60
```

```
atttttaaggg tggacacggt ggctttttagt                                     90

<210> SEQ ID NO 42
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 42
atccagagtg acgcagcagc tcgatcgtat agccgtgacg cagcttgaaa tgggatcgcg      60
tccacagttt tggacacggt ggcttagt                                         88

<210> SEQ ID NO 43
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 43
atccagagtg accgtcgtgc gtcgtgggca ccatcacata gtccctctgt gatggtgatg      60
cagcttgaaa tggacacggt ggcttagt                                         88

<210> SEQ ID NO 44
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 44
atccagagtg accgtcgtgc gtcgttccac cgacacccgc ctaccacccg agcggtgggc      60
ggccacctga tggacacggt ggcttagt                                         88

<210> SEQ ID NO 45
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 45
atccagagtg accgtcgttg tctccacatc ttcatgtgca cttgttcgaa cttttttgtct    60 ctgacagagg tggacacggt ggcttagt                                         88

<210> SEQ ID NO 46
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 46
atccagagtg accgtcgtaa tcctccaccc gagcgcacgt ggttaggtac cagcgcggga      60 atttttaaggg tggacacggt ggcttagt                                        88
```

<210> SEQ ID NO 47
<211> LENGTH: 88
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 47
taggtctcac tgcgtcgtcg agctagcata tcggcactgc gtcgaacttt accctagcgc    60
aggtgtcaaa acctgtgcca ccgaatca                                       88

<210> SEQ ID NO 48
<211> LENGTH: 88
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 48
ccagagtgac cgtcgttgtc tccacatctt catgtgcact tgttcgaact ttttgtctct    60
gacagaggtg gacacggtgg cttttagt                                       88

<210> SEQ ID NO 49
<211> LENGTH: 40
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 49
actaagccac cgtgtccatt tcaagctgca tcacgtagtg                          40

<210> SEQ ID NO 50
<211> LENGTH: 42
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 50
actaagccac cgtgtccacc tctgtcagag acaatttcaa gc                       42

<210> SEQ ID NO 51
<211> LENGTH: 37
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 51
actaagccac cgtgtccaaa actgtggacg cgatccc                             37

<210> SEQ ID NO 52
<211> LENGTH: 85
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 52

```
cacagtgacg cagcaacaga ggtgtagaag tacacgtgaa caagcttgaa attgtctctg    60
acagaggtgg acactgtgtc ttagt                                         85
```

<210> SEQ ID NO 53
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 53

```
actaagacac agtgtccacc                                               20
```

<210> SEQ ID NO 54
<211> LENGTH: 35
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 54

```
actaagacac agtgtccacc tctgtcagag acaat                              35
```

<210> SEQ ID NO 55
<211> LENGTH: 50
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 55

```
actaagacac agtgtccacc tctgtcagag acaatttcaa gcttgttcac               50
```

<210> SEQ ID NO 56
<211> LENGTH: 65
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 56

```
actaagacac agtgtccacc tctgtcagag acaatttcaa gcttgttcac gtgtacttct    60
acacc                                                               65
```

<210> SEQ ID NO 57
<211> LENGTH: 85
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 57

```
actaagacac agtgtccacc tctgtcagag acaatttcaa gcttgttcac gtgtacttct    60
acacctctgt tgctgcgtca ctgtg                                         85
```

<210> SEQ ID NO 58
<211> LENGTH: 25
<212> TYPE: DNA
<213> ORGANISM: Artificial Sequence
<220> FEATURE:

<223> OTHER INFORMATION: Description of Artificial Sequence: Synthetic
      oligonucleotide

<400> SEQUENCE: 58
actaagacac agtgtccacc tctgt                                           25

<210> SEQ ID NO 59
<211> LENGTH: 30
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 59
actaagacac agtgtccacc tctgtcagag                                      30

<210> SEQ ID NO 60
<211> LENGTH: 35
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 60
actaagacac agtgtccacc tctgtcagag acaat                                35

<210> SEQ ID NO 61
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 61
actaagacac agtgtccacc tctgtcagag acaatttcaa                           40

<210> SEQ ID NO 62
<211> LENGTH: 45
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 62
actaagacac agtgtccacc tctgtcagag acaatttcaa gcttg                     45

<210> SEQ ID NO 63
<211> LENGTH: 50
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 63
actaagacac agtgtccacc tctgtcagag acaatttcaa gcttgttcac                50

<210> SEQ ID NO 64
<211> LENGTH: 81
<212> TYPE: DNA
<213> ORGANISM: Artificial Sequence
<220> FEATURE:
<223> OTHER INFORMATION: Description of Artificial Sequence: Synthetic -continued oligonucleotide

<400> SEQUENCE: 64
ccagagtgac gcagcacccg tggtagtgta tcagggagac actacgtgat gcagcttgaa    60
atggacacgg tggcttttag t                                              81

<210> SEQ ID NO 65
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 65
ccagagtgac gcagcaacag aggtgtagaa gtacacgtga acaagcttga aattgtctct    60
gacagaggtg gacacggtgg aaggaagg                                       88

<210> SEQ ID NO 66
<211> LENGTH: 88
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 66
ccagagtgac gcagcaacag aggtgtagaa gtacacgtga acaagcttga aattgtctct    60
gacagaggtg gacacggtgg gagggagg                                       88

<210> SEQ ID NO 67
<211> LENGTH: 45
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 67
ccaccaccgt acaattcgct ttcttttttc attacctact ctggc                    45

<210> SEQ ID NO 68
<211> LENGTH: 45
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 68
ccaccagtca aatttcatcg tcactttatt tcattcgcac tctgg                    45

<210> SEQ ID NO 69
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 69
tccccgacct tttctttctc tttcgca                                        27

<210> SEQ ID NO 70

<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 70
ccacgcacca tctatttcct ttttcgcc                                    28

<210> SEQ ID NO 71
<211> LENGTH: 40
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 71
ccaccacacc ttcatcttac ttcatttcta tcgcgcttca                       40

<210> SEQ ID NO 72
<211> LENGTH: 27
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 72
ccatcccaac tcgttattct cgctcca                                     27

<210> SEQ ID NO 73
<211> LENGTH: 29
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 73
ccaccccgct atttcatctt tctcgctcc                                   29

<210> SEQ ID NO 74
<211> LENGTH: 39
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 74
ccaccacttt accttttat tttgtctact ctcggtaca                         39

<210> SEQ ID NO 75
<211> LENGTH: 44
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 75
ccaccagcga ttcatttcaa catcttctac tttttatccc tccc                  44

<210> SEQ ID NO 76
<211> LENGTH: 31

```
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 76
tccacccgaa tcttgttatc cttccttcgc c                                      31

<210> SEQ ID NO 77
<211> LENGTH: 28
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 77
ccaccacgtt tattctttcg ctccctcc                                          28

<210> SEQ ID NO 78
<211> LENGTH: 59
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 78
aatgatacgg cgaccaccga gatctacacc gaggagatac cactaagcca ccgtgtcca        59

<210> SEQ ID NO 79
<211> LENGTH: 61
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 79
caagcagaag acggcatacg agatgcaatt cgacagaccg tcgatccaga gtgacgcagc       60
a                                                                       61

<210> SEQ ID NO 80
<211> LENGTH: 61
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 80
caagcagaag acggcatacg agatcaagag gtacagaccg tcgatccaga gtgacgcagc       60
a                                                                       61

<210> SEQ ID NO 81
<211> LENGTH: 61
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 81
caagcagaag acggcatacg agattcgatt aaacagaccg tcgatccaga gtgacgcagc       60
```

```
<210> SEQ ID NO 82
<211> LENGTH: 61
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 82
caagcagaag acggcatacg agatgaatgg acacagaccg tcgatccaga gtgacgcagc    60
a                                                                   61

<210> SEQ ID NO 83
<211> LENGTH: 61
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 83
caagcagaag acggcatacg agatagaatc agacagaccg tcgatccaga gtgacgcagc    60
a                                                                   61

<210> SEQ ID NO 84
<211> LENGTH: 61
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 84
caagcagaag acggcatacg agataactgc aacagaccg tcgatccaga gtgacgcagc     60
a                                                                   61

<210> SEQ ID NO 85
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 85
cgcagcaccc gtggtagtgt atcagggaga cactacgtga tgcagcttga aa            52

<210> SEQ ID NO 86
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 86
cgcagcaagg tggctgtggg cggatggtgg gctcgcgtgg gcggccacct ga            52

<210> SEQ ID NO 87
<211> LENGTH: 52
<212> TYPE: DNA
<213> ORGANISM: Artificial Sequence
<220> FEATURE:
```

<223> OTHER INFORMATION: Description of Artificial Sequence: Synthetic
      oligonucleotide

<400> SEQUENCE: 87
acagaggtgt agaagtacac gtgaacaagc ttgaaattgt ctctgacaga gg        52

<210> SEQ ID NO 88
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 88
cgcagcaccc gtggtagtgt atcatggaga cactacgtga tgcagcttga aa        52

<210> SEQ ID NO 89
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 89
cgcagcaccc gtggtagtgt atcagggata cactacgtga tgcagcttga aa        52

<210> SEQ ID NO 90
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 90
cgcagcaccc gtggtagtgt atcagagaga cactacgtga tgcagcttga aa        52

<210> SEQ ID NO 91
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 91
ttaggaggtg ggctcgcgtg caccaatcca tggtcggcgg gaattttaag gg        52

<210> SEQ ID NO 92
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 92
gctcgatcgt atagccgtga cgcagcttga aatgggatcg cgtccacagt tt        52

<210> SEQ ID NO 93
<211> LENGTH: 52
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 93
cgcagcgccc gtggtagtgt atcagggaga cactacgtga tgcagcttga aa        52

<210> SEQ ID NO 94
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 94
cggccgaacc tccacccttc cgcagcgtag gcagactcgg atcatgataa tc        52

<210> SEQ ID NO 95
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 95
cgcagcagcc gtggtagtgt atcagggaga cactacgtga tgcagcttga aa        52

<210> SEQ ID NO 96
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 96
cgcagcaacc gtggtagtgt atcagggaga cactacgtga tgcagcttga aa        52

<210> SEQ ID NO 97
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 97
cgcagcaccc gtggtagtgt atcggggaga cactacgtga tgcagcttga aa        52

<210> SEQ ID NO 98
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 98
cgcagcaacg ttatcccctt tacggggtcc tagagccccg tgagtgctca cg        52

<210> SEQ ID NO 99
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 99
cgcagctccc gtggtagtgt atcagggaga cactacgtga tgcagcttga aa            52

<210> SEQ ID NO 100
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 100
cgcatcaccc gtggtagtgt atcagggaga cactacgtga tgcagcttga aa            52

<210> SEQ ID NO 101
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 101
cgcagcaccc gtggtagtgt atcagtgaga cactacgtga tgcagcttga aa            52

<210> SEQ ID NO 102
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 102
cgcagccccc gtggtagtgt atcagggaga cactacgtga tgcagcttga aa            52

<210> SEQ ID NO 103
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 103
acgcagcacc cgtggtagtg tatcaggaga cactacgtga tgcagcttga aa            52

<210> SEQ ID NO 104
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 104
cgcagcaccc gtggtagtgt atcagggaga cactacgtga tgcagcttaa aa            52

<210> SEQ ID NO 105
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

```
<400> SEQUENCE: 105
atccagagtg acgcagca                                              18

<210> SEQ ID NO 106
<211> LENGTH: 18
<212> TYPE: DNA
<213> ORGANISM: Artificial Sequence
<220> FEATURE:
<223> OTHER INFORMATION: Description of Artificial Sequence: Synthetic
      primer

<400> SEQUENCE: 106
actaagccac cgtgtcca                                              18

<210> SEQ ID NO 107
<211> LENGTH: 25
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 107
cgaggaggua augaauuaaa gaaga                                      25

<210> SEQ ID NO 108
<211> LENGTH: 27
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 108
ucuucuuuaa uucauuaccu ccucgag                                    27

<210> SEQ ID NO 109
<211> LENGTH: 25
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 109
cuugcuuaag guaugguaca agcaa                                      25

<210> SEQ ID NO 110
<211> LENGTH: 27
<212> TYPE: RNA
<213> ORGANISM: Artificial Sequence
<220> FEATURE:
<223> OTHER INFORMATION: Description of Artificial Sequence: Synthetic
      oligonucleotide

<400> SEQUENCE: 110
uugcuuguac cauaccuuaa gcaagga                                    27

<210> SEQ ID NO 111
<211> LENGTH: 29
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 111
```

```
ctacagcttg ctatgctccc cttggggta                                    29

<210> SEQ ID NO 112
<211> LENGTH: 67
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 112
caccaacaga ggtgtagaag tacacgtgaa caagcttgaa attgtctctg acagaggtgc   60
ttttagt                                                            67

<210> SEQ ID NO 113
<211> LENGTH: 67
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 113
caccaacaga ggtgtagaag tacacgtgaa caagcttgaa attgtctctg acagaggtga   60
aggaagg                                                            67

<210> SEQ ID NO 114
<211> LENGTH: 67
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 114
caccaacaga ggtgtagaag tacacgtgaa caagcttgaa attgtctctg acagaggtgg   60
agggagg                                                            67

<210> SEQ ID NO 115
<211> LENGTH: 26
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 115
actaaaagca cctctgtcag agacaa                                       26

<210> SEQ ID NO 116
<211> LENGTH: 26
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 116
ccttccttca cctctgtcag agacaa                                       26

<210> SEQ ID NO 117
<211> LENGTH: 26
<212> TYPE: DNA
<213> ORGANISM: Artificial Sequence
```

```
<220> FEATURE:
<223> OTHER INFORMATION: Description of Artificial Sequence: Synthetic
      oligonucleotide

<400> SEQUENCE: 117
cctccctcca cctctgtcag agacaa                                        26

<210> SEQ ID NO 118
<211> LENGTH: 81
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 118
atccagagtg acgcagcacc cgtggtagtg tatcagggag acactacgtg atgcagcttg   60
aaatggacac ggtggcttag t                                            81

<210> SEQ ID NO 119
<211> LENGTH: 20
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 119
agtgtatcag ggagacacta                                               20

<210> SEQ ID NO 120
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 120
cgcagcaccc gtggtagtgt atcagggaga cactacgtga tgcagcttga aa           52

<210> SEQ ID NO 121
<211> LENGTH: 29
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 121
ggtagtgtat cagggagaca ctacgtgat                                     29

<210> SEQ ID NO 122
<211> LENGTH: 16
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 122
cgtgasmagc ttgaaa                                                   16

<210> SEQ ID NO 123
<211> LENGTH: 51
<212> TYPE: DNA
```

-continued

```
<213> ORGANISM: Artificial Sequence
<220> FEATURE:
<223> OTHER INFORMATION: Description of Artificial Sequence: Synthetic
      oligonucleotide

<400> SEQUENCE: 123
cgcakcamsk kskmkkkggk bkkmkkrkgk kskssykksk sygrsyrssw g          51

<210> SEQ ID NO 124
<211> LENGTH: 52
<212> TYPE: DNA
<213> ORGANISM: Artificial Sequence
<220> FEATURE:
<223> OTHER INFORMATION: Description of Artificial Sequence: Synthetic
      oligonucleotide

<400> SEQUENCE: 124
cgcagcaccc gtggtagtgt atcagggaga cactacgtga tgcagcttga aa         52
```

COMPOSITIONS AND METHODS RELATED TO APTAMER-BASED REVERSIBLE CELL SELECTION

CROSS-REFERENCE TO RELATED APPLICATIONS

This application is a 35 U.S.C. § 371 National Phase Entry Application of International Application No. PCT/US2019/042063, filed Jul. 16, 2019, which designates the U.S., and which claims benefit under 35 U.S.C. § 119 (e) of U.S. Provisional Application No. 62/699,438 filed Jul. 17, 2018, and U.S. Provisional Application No. 62/779,946 filed Dec. 14, 2018, the contents of each of which are incorporated herein by reference in their entirety.

SEQUENCE LISTING

The instant application contains a Sequence Listing which has been submitted electronically in ASCII format and is hereby incorporated by reference in its entirety. Said ASCII copy, created on Apr. 21, 2025, is named 034186-092710USPX_SL.txt and is 33,956 bytes in size.

FIELD OF THE INVENTION

The present disclosure relates to the isolation of cells.

BACKGROUND

The clinical impact of cell therapies is being rapidly realized with two recent FDA approvals for chimeric antigen receptor (CAR) T cell therapies treating acute lymphoblastic leukemia (ALL) and diffuse large B-cell lymphoma as well as many promising trials in the clinical pipeline. In addition to cancer, CAR T cells have also been generated for other cell therapies such as anti-HIV therapy. Currently procedures for cell therapy applications (e.g. CAR T cell therapy, dendritic cell vaccines, etc.) can include harvesting and isolating target cells (e.g., specific subsets of T cells, monocytes, etc.) and manipulating them (e.g., stimulating them and/or genetically modifying them), before reintroducing them or their progeny back into patients. Label-free protein-based isolation technologies have been developed to isolate specific cell subsets (e.g., T cells) but remaining challenges with these methods include low cell yield and high costs due to the number of successive positive selections required.

SUMMARY OF THE INVENTION

Described herein is a reversible aptamer selection technology for production-scale isolation of label-free cells (e.g., CD8+ T cells).

In one aspect, among others, described herein is a method for isolating a cell of interest from a biological sample comprising a plurality of cell types, with the method comprising: (i) contacting the biological sample with an aptamer that specifically binds a cell surface marker that is specific for the cell of interest under conditions that permit forming aptamer-bound cells, (ii) separating the aptamer-bound cells from cells not bound to the aptamer; and (iii) recovering a cell of interest by disrupting binding of the aptamer to the cell surface marker, whereby a cell of interest is isolated from the biological sample.

In one embodiment, the cell of interest is viable.

In another embodiment, the cell of interest is a leukocyte, lymphocyte, monocyte, T cell, or CD3+ cell, a CD4+ cell, or a CD8+ cell.

In another embodiment, the aptamer comprises a label.

In another embodiment, the step of separating aptamer-bound cells from cells not bound to the aptamer comprises the use of a first solid support or a phase-changing agent.

In another embodiment, the aptamer is (i) conjugated or immobilized to a first solid support, and/or (ii) labeled with a first member of an affinity pair.

In another embodiment, separating step (ii) comprises either (i) removing from the biological sample aptamer-bound cells bound to the first solid support via the aptamer, or (ii) adding a second solid support bearing a second member of the affinity pair, to permit physical association of the aptamer to the second solid support via the interaction of the first and second members of the affinity pair, and removing from the biological sample aptamer-bound cells.

In another embodiment, the aptamer is conjugated to a phase-changing agent.

In another embodiment, contacting step (i) is performed under conditions in which the phase-changing agent is in the solution phase and the separating step comprises (ii) inducing the phase-changing agent to precipitate from solution, whereby aptamer-bound cells are removed from the biological sample.

In another embodiment, the first and/or second solid support comprises a magnetoresponsive bead.

In another embodiment, the first and/or second solid support comprises a polymer, metal, ceramic, glass, hydrogel, or resin.

In another embodiment, the separating step comprises subjecting the sample to a magnetic field, whereby magnetoresponsive beads or solid support comprising aptamer-bound cells are separated from the biological sample.

In another embodiment, the reversal agent comprises a polyanion, a small molecule, or an oligonucleotide or oligonucleotide mimic comprising a sequence sufficiently complementary to a sequence of the aptamer to hybridize to the aptamer and thereby disrupt binding of the aptamer to the cell surface marker.

In another embodiment, the aptamer-bound cells comprise cells double-positive for a selected pair of markers including the marker bound by the aptamer.

In another embodiment, an isolated fraction of cells comprises cells that are double-positive for a selected pair of markers including the marker bound by the aptamer.

In another aspect, described herein is a method of isolating a plurality of cell fractions from a biological sample the method comprising, (i) contacting a biological sample with a plurality of aptamers that specifically binds cell surface markers specific for a plurality of different cells of interest, under conditions that permit forming aptamer-bound cells; (ii) separating a population of aptamer-bound cells from non-aptamer-bound cells; (iii) sequentially adding to the aptamer-bound cells separated in step (ii) a plurality of reversal agents that disrupt binding of one or more of the plurality of aptamers to one or more of the plurality of cell surface markers, whereby sequentially added reversal agents elutes different cell fractions from the population of cells separated in step (ii), thereby isolating a plurality of different cell fractions from a biological sample.

In one embodiment, the plurality of reversal agents comprises a polyanion, a small molecule, an oligonucleotide or oligonucleotide mimic comprising a sequence sufficiently complementary to a sequence of an aptamer of the plurality of aptamers to hybridize to the aptamer and thereby disrupt binding of the aptamer to its cell surface marker, or a combination thereof.

In another embodiment, the plurality of aptamers is bound to one or more solid supports or phase-changing agents.

In another embodiment, the solid support comprises a magnetoresponsive bead.

In another embodiment, the solid support comprises a polymer, metal, ceramic, glass, hydrogel, or resin.

In another embodiment, the separating step comprises subjecting the sample to a magnetic field, whereby the magnetoresponsive bead or solid support comprising cell populations bound to the plurality of different aptamers are separated from the sample.

In some embodiments, cell populations bound to the plurality of different aptamers are separated from the biological sample by subjecting the sample to a magnetic field.

In one embodiment, the aptamer-bound cells are a leukocyte, lymphocyte, T cell, or a CD3, CD8 and/or a CD4 expressing cell.

In another aspect, described herein is a method of isolating, from a biological sample, a cell fraction enriched for cells that are double-positive for a pair of target cell markers, the method comprising: (i) contacting a biological sample with a first aptamer that specifically binds a first target cell surface marker, under conditions that permit forming aptamer-bound cells; (ii) separating a population of aptamer-bound cells from non-aptamer-bound cells; (iii) contacting the population of aptamer-bound cells separated in step (ii) with a first reversal agent that disrupts binding of the first aptamer to the cells separated in step (ii), thereby isolating a population of cells positive for the first target cell surface marker; (iv) contacting the population isolated in step (iii) with a second aptamer that specifically binds a second target cell surface marker, under conditions that permit forming aptamer-bound cells; (v) separating a population of aptamer-bound cells formed in step (iv) from non-aptamer-bound cells; and (vi) contacting the population of aptamer-bound cells separated in step (v) with a second reversal agent that disrupts binding of the second aptamer to the cells separated in step (v), thereby isolating a population of cells positive for the first and second target cell surface markers.

Other approaches can be used to isolate double-positive cells. For example, an approach that uses simultaneous addition of aptamers to isolate CD3+CD8+ cells could use three aptamers, that bind CD3, CD4, and CD8. After binding cells and putting them onto a column, one would first elute with a CD8 reversal agent to strip off CD3-negative/CD8$^{lo}$ monocytes/NK cells. Then one would add a CD3 reversal agent to strip off CD3+CD8+ double positive cells from the column. The CD4 aptamer is included to keep CD4 T cells on the column, as the CD3 aptamer would also bind them in PBMCs. If one wanted to just use CD3 and CD8 aptamers, it would best be done sequentially as discussed above. Alternatively, one could use spatially separated resins in a column with two aptamers: one for CD4 and the other for CD3. The top layer would have, for example, resin with the CD4 aptamer, capturing CD4+ cells. The bottom layer would have, for example, resin with the CD3 aptamer, capturing CD3+CD4− cells (which are effectively CD3+CD8+ double-positive cells). Then one would add a CD3 reversal agent to elute off the CD3+CD8+ double positive cells.

Isolation of CD3+CD4+ double positive cells is also possible. There are a lot of CD4$^{lo}$ monocytes in PBMCs, so it would be important to isolate CD3+CD4+ double positive cells to capture CD4 T cells only. One approach is to use a CD3 and CD8 aptamer simultaneously. In this approach, one would elute with a CD3 reversal agent first to get CD3+CD4+ double positive T cells off of the column (the CD8 aptamer keeps CD8 T cells on the column). Next, one would elute with a CD8 reversal agent to remove CD8 positive T cells. Other alternatives with just a CD4 aptamer are to titrate down the amount of CD4 aptamer used such that only CD4 high expressors bind, which are only T cells. Or, one can serially add different concentrations of CD4 reversal agent (first at a low concentration to remove CD4 low monocytes and then at a high concentration to remove CD4 high expressors). Careful column design and choices of reversal agent(s) (both concentration and timing of addition) can permit the efficient isolation of double positive cells.

In one embodiment, the reversal agents comprise a small molecule, a polyanion, an oligonucleotide or oligonucleotide mimic comprising a sequence sufficiently complementary to a sequence of a respective aptamer to hybridize to the aptamer and thereby disrupt binding of the aptamer to the cell surface marker, or a combination thereof.

In another embodiment, the first and/or second aptamer is immobilized or conjugated to one or more solid supports or phase-changing agents.

In another embodiment, the solid support comprises a magnetoresponsive bead, a polymer, metal, ceramic, glass, hydrogel, or resin.

In another embodiment, the solid support comprises a magnetoresponsive bead and wherein cell populations bound to the first and/or second aptamers are separated by subjecting the cell populations to a magnetic field.

In one embodiment, the aptamer-bound cells comprise leukocytes, lymphocytes, T cells, CD3+ T cells, CD8+ T cells, CD4+ T cells, CD3+CD4+ T cells, or CD3+CD8+ T cells.

In another aspect, described herein is a method of separating cells of interest in a biological sample on the basis of degree of expression of a cell surface marker, the method comprising: (i) contacting the biological sample with aptamers that specifically bind cell surface markers that are specific for the cells of interest under conditions that permit forming aptamer-bound cells; (ii) separating the aptamer-bound cells from cells not bound to the aptamer; and; (iii) contacting the aptamer-bound cells separated in step (ii), either step-wise or as a gradient, with increasing concentrations of a reversal agent that disrupts binding of the aptamer to the cell surface marker; whereby the cells of interest in the biological sample are separated on the basis of the degree of expression of the cell surface marker, such that cells in the sample with lower marker expression (marker$^{lo}$) are eluted from the aptamer at lower concentrations of reversal agent and cells in the population with higher marker expression (marker$^{hi}$) are eluted at higher concentrations of reversal agent.

In one embodiment, the reversal agent comprises a polyanion, a small molecule, an oligonucleotide or oligonucleotide mimic comprising a sequence sufficiently complementary to a sequence of the aptamer to hybridize to the aptamer and thereby disrupt binding of the aptamer to the cell surface marker, or a combination thereof.

In another aspect, described herein is a method of separating cells of interest in a biological sample on the basis of degree of expression of a cell surface marker, the method comprising: (i) contacting the biological sample with an aptamer that specifically binds a cell surface marker that is specific for the cells of interest under conditions that permit forming aptamer-bound cells; (ii) separating aptamer-bound cells from cells not bound to the aptamer; and (iii) contacting the aptamer-bound cells separated in step (ii), sequentially with a plurality of reversal agents differing in kinetics of displacement or aptamer affinity and reversal agents added in the order of increasing relative kinetics of displacement or relative aptamer affinity, whereby the cells of interest in the biological sample are separated on the basis of the degree of expression of the cell surface marker, such that cells in the sample with lower marker expression (marker$^{lo}$) are eluted from the aptamer by a reversal agent with slower relative kinetics of displacement or lower relative aptamer affinity, and cells in the population with higher marker expression (marker$^{hi}$) are eluted by a reversal agent with faster relative kinetics of displacement or higher relative aptamer affinity.

In one embodiment, the reversal agents comprise a polyanion, a small molecule, an oligonucleotide or oligonucleotide mimic comprising a sequence sufficiently complementary to a sequence of the aptamer to hybridize to the aptamer and thereby disrupt binding of the aptamer to the cell surface marker, or a combination thereof.

In another embodiment, the cell of interest is a leukocyte, lymphocyte, T cell, or CD3, CD8 and/or CD4 expressing cell.

In another embodiment, the aptamer is bound to one or more solid supports or phase-changing agents.

In another embodiment, the solid supports or phase-changing agents comprise magnetoresponsive beads.

In another embodiment, the solid supports comprise a polymer, metal, ceramic, glass, hydrogel, or resin.

In another embodiment, the separating step comprises subjecting the sample to a magnetic field, whereby the magnetoresponsive beads or solid support comprising cell populations bound to the plurality of different aptamers are separated from the biological sample.

In another aspect, described herein is a nucleic acid molecule comprising the sequence of SEQ ID NO: 1-6, 10-14, 17-22, 27-30, 33-48, or 52-66 that selectively binds to human CD8 polypeptide.

In one embodiment, the nucleic acid molecule comprises a compensatory change at a nucleotide pair selected from the group consisting of: nucleotides 3 and 75, 4 and 74, 5 and 73, 6 and 72, 7 and 71, 8 and 70, 9 and 69, 10 and 68, 13 and 54, 14 and 53, 15 and 52, 16 and 51, 17 and 50, 18 and 49, 19 and 48, 25 and 47, 26 and 46, 27 and 45, 28 and 44, 29 and 43, 30 and 42, 31 and 41, 32 and 40, 33 and 39 or 34 and 38; wherein the nucleic acid molecule retains selective binding to CD8 polypeptide relative to the nucleic acid molecule of SEQ ID NO: 1.

In another embodiment, the nucleic acid molecule comprises a compensatory change at two or more nucleotide pairs selected from the group consisting of: nucleotides 3 and 75, 4 and 74, 5 and 73, 6 and 72, 7 and 71, 8 and 70, 9 and 69, 10 and 68, 13 and 54, 14 and 53, 15 and 52, 16 and 51, 17 and 50, 18 and 49, 19 and 48, 25 and 47, 26 and 46, 27 and 45, 28 and 44, 29 and 43, 30 and 42, 31 and 41, 32 and 40, 33 and 39 or 34 and 38; wherein the nucleic acid molecule retains selective binding to CD8 polypeptide relative to the nucleic acid molecule of SEQ ID NO: 3.

In another embodiment, the nucleic acid molecule is a DNA molecule, an RNA molecule, or a PNA molecule.

In another embodiment, the nucleic acid molecule comprises a modified nucleoside.

Any modified nucleoside that maintains the capacity of the aptamer to bind its target can be incorporated, e.g., to enhance or modify the stability in vivo, or to stabilize, or destabilize the secondary structure of the aptamer.

In another embodiment, the nucleosides or modified nucleoside of an aptamer can be selected, for example, from those in Table 1.

In another embodiment, the solid support comprises a nucleic acid molecule of any one or more of the aptamer nucleic acids as described herein.

In another embodiment, the solid support is a magnetoresponsive bead.

In another embodiment, the solid support comprises a polymer, metal, ceramic, glass, hydrogel, or resin.

In another embodiment, the solid support is bound via the nucleic acid molecule to a CD8+ T cell.

In another embodiment, the nucleic acid also comprises a label.

In another embodiment, the nucleic acid has a biotin label and/or a fluorescent label.

In another aspect, described herein is a composition comprising a CD8+ human T cell bound to a nucleic acid as described herein.

In one embodiment, an aptamer nucleic acid described herein, is hybridized to a reversal agent comprising a nucleic acid comprising a sequence complementary to at least eight contiguous nucleotides of the aptamer.

In another aspect, described herein is a reversal agent that comprises a nucleic acid molecule comprising at least eight contiguous nucleotides complementary to an aptamer, as described herein, wherein the reversal agent inhibits binding of the any one of the CD8 binding aptamers described herein, respectively, to a human CD8 polypeptide.

In one aspect, described herein is a method of isolating a CD8+ T cell from a biological sample, with the method comprising contacting a biological sample comprising human CD8+ T cells with an aptamer as described herein that binds CD8 or a solid support comprising such an aptamer, wherein the contacting permits selective binding of CD8+ T cells to the aptamer.

In one embodiment, the biological sample comprises whole blood, buffy coat, or isolated mononuclear cells.

In another embodiment, the method comprises, after contacting the biological sample with an aptamer or a solid support comprising an aptamer, the step of contacting the sample with a reversal agent comprising a nucleic acid molecule comprising a sequence of at least eight contiguous nucleotides complementary to the aptamer, wherein the reversal agent inhibits binding of the nucleic acid to a human CD8 polypeptide, thereby permitting release of the CD8+ T cell.

In one embodiment, the sample is contacted with a solid support comprising an aptamer as described herein that binds CD8, and the sample is further subjected to a magnetic field, thereby permitting separation of CD8+ T cells bound to the solid support from other cells in the sample.

In one aspect, described herein is a method of preparing a population of a target cell type or class of cells of interest from a biological sample, with the method comprising (i) contacting the biological sample with an aptamer that specifically binds a cell surface marker that is specific for the target cells or class of cells of interest under conditions that permit forming aptamer-bound cells, (ii) separating aptamer-bound cells from cells not bound to the aptamer, (iii) recovering population of cells of interest by disrupting binding of the aptamer to its binding target. In one embodiment, the further step of (iv) modifying the recovered cells of interest, is performed.

In one embodiment, the modification comprises a genetic modification or treatment to activate or stimulate the cell.

In one embodiment, the cell is a T cell, B cell, monocyte, dendritic cell, or natural killer cell.

In one aspect, described herein is a method of selecting aptamer sequences that bind a specific cell type or class of cells of interest with the method comprising (i) incubating the type or class of cell of interest with a single-stranded DNA library comprising randomized sequences of a given length from 20 to 85 nucleotides, (ii) isolating single-stranded DNA bound to the cells of interest, (iii) incubating isolated single-stranded DNA sequences from step ii with a mixture of cell types including the cell of interest, (iv) isolating of the cell of interest from the incubation of step iii with an antibody and antibody-specific support column, (v) extracting bound single stranded DNA from cells isolated in step iv, (vi) PCR amplifying bound single stranded DNA sequences from step v (vii) incubating single stranded DNA sequences from step vi with a cell type lacking the surface receptors of interest, (viii) separating the un-bound single stranded-DNA from the cells in step vii, (ix) PCR amplifying un-bound single stranded DNA sequences from step viii, (x) repeating steps iii-ix at least two times, and (xi) sequencing the single stranded DNA remaining.

In one embodiment, the cell of interest is a leukocyte, lymphocyte, T cell, or a CD8+ T cell, or a CD3+ T cell, or a CD2+ T cell, or a CD4+ T cell, or a CD28+ T cell, or a B cell, or monocyte, or dendritic cell, or stem cell (e.g., hematopoietic stem cell).

In one embodiment, the cell of interest comprises a combination of two or more cell surface markers as described herein.

In another embodiment, the method described herein is used for large-scale selection of cell populations of interest.

In another aspect, described herein is method of treating a disease or disorder comprising administering a composition of cells isolated by the methods described herein or their progeny where the composition of cells reduces at least one symptom of the disease by at least 10%.

In one embodiment the disease or disorder is cancer, autoimmune disease, or HIV infection.

In another aspect, described herein is a composition of cells that have been isolated by the methods described herein.

In another aspect, described herein is a composition of cell fractions that have been isolated by the methods described herein.

In another aspect, described herein is a composition of cells that have been separated by the methods described herein.

In another aspect, described herein is a composition of CD8+ T cells that have been isolated by the methods described herein.

In another aspect, described herein is a composition of cells prepared by the methods described herein.

In another aspect, described herein is a composition of cells that specifically bind the aptamer selected by the methods described herein.

BRIEF DESCRIPTION OF THE DRAWINGS

FIG. 2A shows the flow cytometry histograms of aptamer pool binding to positive selection mixed T cells and negative selection J.RT3-T3.5 cells after consecutive rounds of SELEX. FIG. 2B represents corresponding percentages of cells that stained positive with the aptamer pools from the different rounds. Individual data points represent technical replicates with the horizontal bar representing the mean.

FIG. 5A-5B represents the binding of selected individual aptamers from the top 10 Round 5 sequences to T cells and J.RT3-T3.5 cells. FIG. 5A shows the flow cytometry analysis of the percentage of mixed T cells and J.RT3-T3.5 cells that stained positive with a random (RN) aptamer and A1, A3, and A8 aptamers (named according to Round 5 rank). Individual data points represent technical replicates. FIG. 5B shows the flow cytometry analysis of the median fluorescence intensity (MFI) of RN, A2, and A7 aptamer binding to mixed T cells and J.RT3-T3.5 cells. Individual data points represent technical replicates (n=3) with the horizontal bar representing the mean.

FIG. 6A shows flow cytometry plots of 50 nM random (RN), A1, A3, and A8 aptamer binding to CD4+ and CD8+ T cells in a mixed T cell population. FIG. 6B shows flow cytometry analysis of CD8a antibody (CD8a Ab) and 10 nM RN, A1, A3, and A8 aptamer binding to 3-day activated CD8+ T cells 24 hours after the cells were nucleofected with non-specific (NS) siRNA or CD8 siRNA duplexes. Histograms are representative of 3 independent experiments with technical triplicates. Chart indicates binding to CD8 siRNA-treated cells relative to NS siRNA treated controls. Data are mean±s.d., n=3, *P<0.05 and **P<0.01 (one-way ANOVA with Bonferroni correction). FIG. 6C shows flow cytometry analysis of CD8a Ab and 10 nM RN, A1, A3, and A8 aptamer binding to CD8-Jurkat cells 24 hours after the cells were nucleofected with a CD8a plasmid with a GFP reporter. Plots are representative of 3 biological replicates with technical triplicates. Chart indicates percentage of GFP+Jurkats that were also positive for antibody or aptamer binding. Data are mean±s.d., n=3, *P<0.05, *P<0.001, and P<0.0001 (paired one-way ANOVA with Dunnett's test). FIG. 6D shows BLI measured association and dissociation kinetics of serially diluted CD8a protein binding to immobilized A1, A3, and A8 aptamers. The association phase is illustrated from 0 to 1200 seconds, whereas dissociation is shown from 1200-1800 seconds. $K_D$'s were calculated by performing a global fit of the kinetic data at the different concentrations of CD8a protein to a 1:1 binding model. Data are mean±s.d., n=3-4. FIG. 6E** shows flow cytometry binding curves of A1, A3, and A8 aptamers to CD8+ T cells, normalized to 200 nM of A8 binding. Curves represent a non-linear regression assuming one site total binding of three independent experiments with technical triplicates. $K_D$ were calculated by averaging the individual regressions values of the independent experiments. Data are mean±s.d., n=3.

FIG. 7A shows flow cytometry plots show CD8a Ab and 50 nM RN, A1, A3, and A8 binding to CD3+CD8+ murine (mu) spleen T cells. Plots are representative of 3 biological replicates. FIG. 7B shows similar plots for aptamer binding to CD3+CD8+ rhesus (rh) PBMCs.

FIG. 8A shows flow cytometry histograms of 10 nanomolar (nM) A1, A3, & A8 binding to CD8+ T cells in the presence of 0 to 40 nM of control CD3e antibody or competitive CD8a antibody. Histograms are representative of one biological replicate. FIG. 8B shows corresponding MFIs of aptamer binding. Data are n=1 biological replicate.

FIG. 10A represents the predicted minimum free energy (MFE) secondary structure of an altered A3 aptamer using UNPACK software (temp=4C; Na+=137 mM; Mg++=5.5 mM). The A3 aptamer was modified by removing 2 base pairs (bp) from the 5' end (as indicated by the circles) and adding 2-bp to the 3' end (as indicated by the circles), creating an A3 aptamer with a 3' 8-bp toehold (A3t). The gray line represents the 36-bp region that a complementary reversal agent (RA) was designed to anneal. FIG. 10A discloses SEQ ID NO: 6.

FIG. 10B represents the predicted MFE secondary structure of the A3t aptamer after strand displacement with the RA (temp=20C; Na+=137 mM; Mg++=5.5 mM). FIG. 10B discloses SEQ ID NOS 6-7, respectively, in order of appearance.

FIG. 11A shows flow cytometry analysis of the percentage of A3t aptamer eluted (5 nM) from CD8+ T cells at different fold excess concentrations of and incubation times and temperatures with reversal agent (RA). Elution was calculated using the MFI at the given condition and dividing it by the MFI of staining without reversal agent at a given temperature. Data are mean±s.d., n=3 technical replicates (error bars are too small to visualize). FIG. 11B shows flow cytometry histograms of A3t binding after a 10 min incubation with 100-fold excess of reversal agent at different temperatures. Histograms are representative of technical triplicates. Percent positive, or overlap, in each pane is calculated using Overton subtraction.

FIG. 12A-12B shows RN and A3t aptamer binding to different cell types within PBMCs. FIG. 12A shows flow cytometry plots show CD3, CD14, CD19, and CD56 antibody and 5 nM RN and A3t aptamer binding to PBMCs. Plots are representative of 3 biological replicates. FIG. 12B shows the corresponding statistics of RN and A3t aptamer binding to different cell types that make up approximately 92% of the PBMC population. The percentage of each cell type that stained positive with aptamer is a statistic of the parent population and not total PBMCs. MFI values were normalized by subtracting out the fluorescence value that was used to delineate aptamer negative and positive cells. Data are mean±s.d., n=3 biological replicates.

FIG. 13A-13F represents the isolation of label-free CD8+ T cells from PBMCs using a reversible, aptamer-based selection strategy. FIG. 13A shows a schematic representation of traceless selection of CD8+ T cells using the A3t aptamer. Biotinylated aptamer (5 nM) pre-loaded onto Miltenyi Anti-Biotin Microbeads was incubated with PBMCs to magnetically label CD8+ T cells. The cell suspension was applied onto an LS Column under a magnetic field, in which unlabeled cells were removed in the flow through (FT) fraction. Microbead labeled CD8+ T cells that remain on the column are incubated with 100× excess of complementary RA, and released CD8+ T cells are washed off the column in the RA elution (RAE) fraction. Remaining cells on the column are removed using a plunger column flush (CF) in the absence of the magnetic field. FIG. 13B shows the flow cytometry histograms of CD8 expression in the different fractions of standard, antibody-based Miltenyi CD8 Microbead isolation and traceless aptamer-based isolation. Histograms are representative of 3 independent experiments with technical triplicates. FIG. 13C shows the flow cytometry plots of CD3 and CD16 expression in CD8+ antibody-isolated CF and aptamer-isolated RAE cell fractions to distinguish between CD3+CD16- T cells and CD3-CD16+ monocytes and NK cells. Plots are representative of 3 independent experiments with technical triplicates. FIG. 13D-F show flow cytometry analysis of yield, purity, and CD8 MFI of CD3+CD8+CD16- T cells in different fractions of antibody- and aptamer-based isolations. Symbols represent different donors from separate isolation experiments, and all data was collected in technical triplicates. Data are mean±s.d., n=3, ns>0.05 and *P<0.05 (FIGS. 13D and 13F, paired one-way ANOVA with Tukey's test; e, two-sided paired t-test).

FIG. 14A represents gating schemes for determining the percentage of CD8+ T cells in a sample and thus the purity and yield of an isolation fraction. The percentage of CD8+ T cells was determined by using the percentage of CD8+CD3+CD16- cells of live cells, as CD8loCD3-CD16+ cells represent monocytes and NK cells. Pre-selected PBMCs are shown in this example.

FIG. 14B shows gating schemes for determining the phenotype of CD8+ T cells in either PBMCs or freshly isolated cell fractions. CD45RA and CD45RO expression was used to differentiate naive/effector (N/E) cells from central/effector memory (CM/EM) cells, respectively, and CD62L and CCR7 expression (single or double) were used together to identify N/CM cells from non-expressing E/EM cells. Cells that were CD45RA/RO double positive and not gated on were identified as transitioning cells. Pre-selected PBMCs are shown in this example.

FIG. 15A shows flow cytometry analysis of the different phenotypes of fresh CD8+ T cells in PBMCs, antibody-isolated cell fraction, and traceless aptamer-isolated cell fraction. Bar chart (top left) shows mean percentages of the phenotypes (normalized to add up to 100) of three independent experiments. Grouped chart (bottom, right) indicates corresponding individual values of the different phenotypes, with symbols representing different donors from separate isolation experiments. Data are mean±s.d., n=3, *P<0.05 and *P<0.001 (paired two-way ANOVA with Dunnett's test). FIG. 15B** shows NanoString™ differential expression analysis of 292 genes identified as being expressed above background in the nCounter® Human Immunology v2 Panel. Fold change values indicate the expression of traceless aptamer-isolated cells relative to antibody-isolated cells and are representative of three biological replicates. Data are mean±s.d., n=3 (two-sided paired t-test with Benjamini-Yekutieli correction).

FIG. 16A represents the 2nd generation CD19 CAR T cell construct with EGFRt reporter used to retrovirally transduce isolated T cells. FIG. 16B shows the flow cytometry analysis of EGFRt expression in antibody- and aptamer-isolated T cells 9-days post initial bead stimulation (S1D9) and 13-days post rapid expansion protocol (REP, S1R1D13) with irradiated CD19+ TM-LCL cells. Timeline of cell expansion is shown in FIG. 17. Chart indicates EGFRt reporter MFI at S1R1D13, with symbols as in FIG. 13D-F. Data are mean±s.d., n=3, ns>0.05 (two-sided paired t-test). FIG. 16C shows the growth of non-transduced mock T cells post bead stimulation. Symbols as in FIG. 13D-F, n=3, ns>0.05 (paired two-way ANOVA with Bonferroni correction). Curves represent a least-squares fit to the exponential growth equation. FIG. 16D shows flow cytometry analysis of Ki-67 expression in mock and CD19 CAR T cells on S1D14 immediately before REP. Individual donor values can be found in FIG. 19. Symbols as in FIG. 13D-F. Data are mean±s.d., n=3, ns>0.05 (paired two-way ANOVA with Sidak correction). FIG. 16E shows flow cytometry analysis PD1/TIM3/LAG3 expression in mock and CD19 CAR T cells on S1D14 immediately before REP. Pie charts show the mean phenotype of the cells, n=3, *P<0.05 (paired two-way ANOVA with Bonferroni correction). FIG. 16F shows flow cytometry analysis of CD62L/CD45RA expression in mock and CD19 CAR T cells on S1D14 immediately before REP and on S1R1D14 immediately before functional assays. Individual donor values can be found in FIG. 20. Pie charts show the mean phenotype of the cells, n=3, *P<0.05 (paired two-way ANOVA with Bonferroni correction). FIG. 16G-H shows the in vitro anti-tumor cytotoxicity and cytokine release of mock and CD19 CAR T cells. For FIG. 16H, symbols as in FIG. 13D-F. Data are mean±s.d., n=3, ns>0.05 (FIG. 16G, paired two-way ANOVA with Bonferroni correction;

FIG. 16H, paired two-way ANOVA with Sidak correction).

FIG. 23A shows flux of the systemic tumors. The "†" symbol represents euthanasia of individual mice. The faint curves are the tumor flux values for the individual mice (3 mice per donor per group), whereas the bold curves are the mean flux values for the respective CD19 CAR T cell treatment groups over time. FIG. 23B shows the Kaplan-Meier survival curves. Median survival time (days) of the CD19 CAR T cell treatment groups were as follows; antibody: 55; aptamer: 55. n=9 (3 mice per donor), ns>0.05 (log-rank test).

FIG. 24A-24B represents aptamer and reversal agent pairs with varying lengths and the optimization of the A3 reversal agent. FIG. 24A shows the reversal agent sequences for A1

(40 bps), A3 (42 bps), and A8 (37 bps) underscoring the homologous sequence between each reversal agent (top). Binding of the selected reversal agents and aptamers are shown (bottom). FIG. 24A discloses SEQ ID NOS 49-51, respectively, in order of appearance. FIG. 24B shows the optimization of A3 reversal agent length from 20 to 85 base pairs in length with sequences on the left and binding studies shown on the right. FIG. 24B discloses SEQ ID NOS 53-59, 54, 61-62 and 55, respectively, in order of appearance.

FIG. 25 discloses SEQ ID NOS 65-66, respectively, in order of appearance.

FIG. 26 discloses SEQ ID NOS 6, 112-114, 7 and 115-117, respectively, in order of appearance.

FIG. 28 discloses SEQ ID NO: 118.

FIG. 29 discloses SEQ ID NO: 64.

FIG. 34 discloses SEQ ID NOS 8 and 118, respectively, in order of appearance.

DETAILED DESCRIPTION

Figure 1:
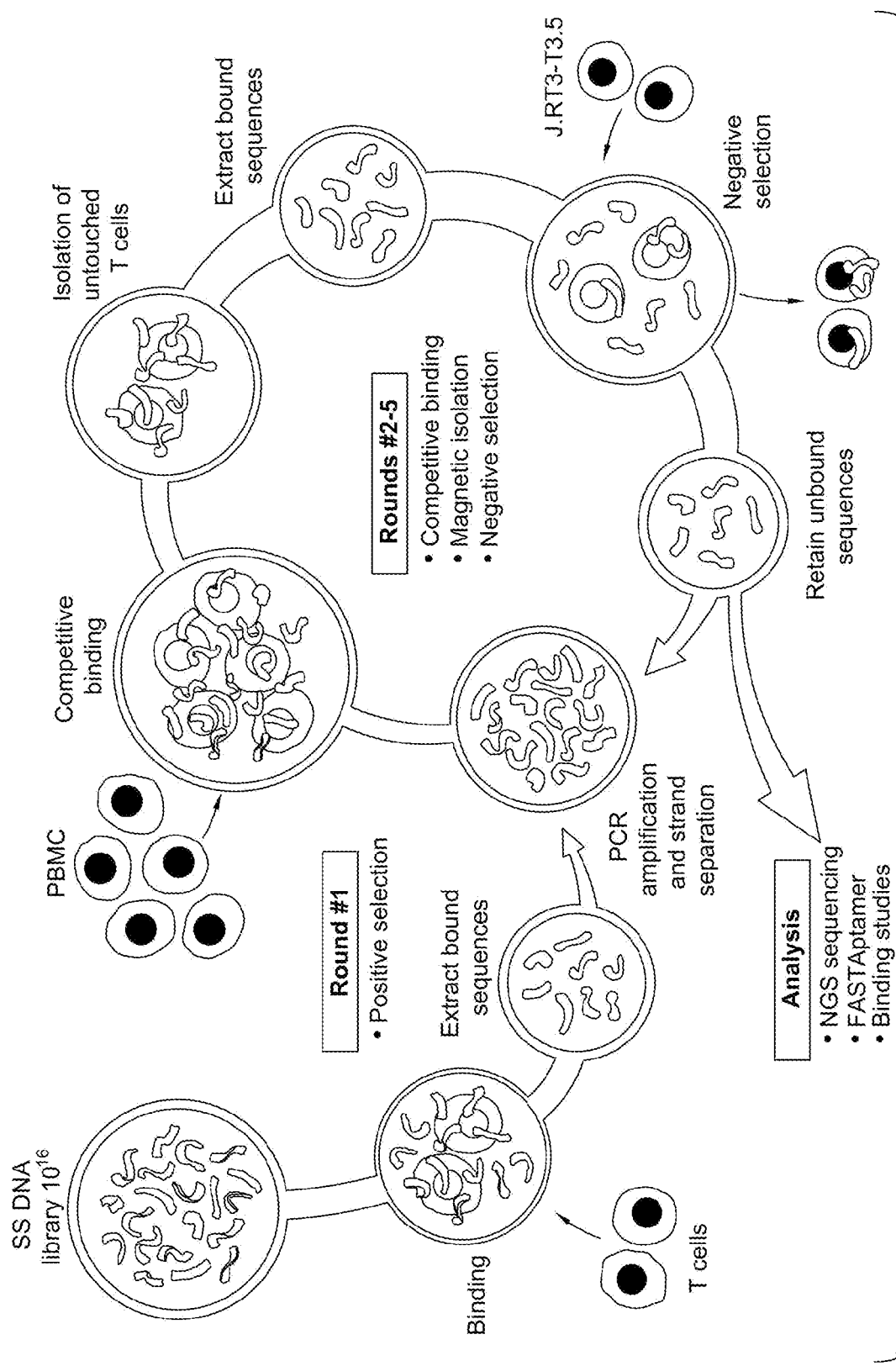
FIG. 1 is a schematic representation of competitive cell-SELEX with magnetic depletion from PBMCs. A DNA aptamer library underwent one round of positive selection against mixed T cells with low stringency followed by four rounds of consecutive competitive selection and negative selection against PBMCs and CD4loCD8-J.RT3-T3.5 cells, respectively, under increasingly stringent conditions. For competitive selection, T cells were isolated from PBMCs as a negative fraction after aptamer library exposure to enrich for T cell-specific aptamers and deplete binders to non-T cell lymphocytes, monocytes, and dendritic cells. After competitive selection, untouched T cells and bound aptamers were isolated from PMBCs by depleting non-target cells using a Pan T Cell Isolation Kit.

The compositions and methods described herein are related, in part, to the discovery that nucleic acid aptamers can selectively bind to cells of interest (including but not limited to T cells) and be reversibly removed with a complementary reversal agent to isolate a plurality of the cells of interest. Also described herein are methods and compositions comprising the selection and characterization of nucleic acid aptamers and reversal agents. Reversible aptamer-based cell selection allows for a large-scale cell isolation procedure that is robust and cost-efficient. Furthermore, aptamers such as those described herein are easily removed from the cell surface with the reversal agent, which is an important technology advance towards a fully synthetic system that can permit multiple cell selections from a single apparatus. The methods and compositions described herein can enhance the ability to isolate cells useful in their native form, or useful in methods that modify the cells for therapeutic or industrial purposes (e.g. CAR T cells and CD8 T cells, dendritic cell vaccines or other cellular therapeutics) for the treatment of cancer, HIV, or other diseases amenable to treatment with cell therapy.

The following describes considerations to facilitate the practice of the technology described herein by one of ordinary skill in the art.

Definitions

As used herein, the term "isolating a cell of interest" refers to the selective separation or enrichment of a target cell, cell type or class of cells from a sample comprising other cells, cell types of cell classes such that the cell population resulting from such separation has a high degree of cell purity as determined by specific cell markers (e.g., CD8 for a CD8 positive T cell).

While higher degrees of cell purity are preferred over lower, cell "isolation" as the term is used herein does not require 100% purity of the resulting cell population. Target cells or a population thereof will generally be considered "isolated" as the term is used herein if they comprise at least 60% of a target cell population resulting from an isolation method as described herein, and preferably at least 70%, at least 80%, at least 90% or more.

A "plurality" contains at least two members. In certain cases, a plurality may have at least 10, at least 100, at least 1000, at least 10,000, at least 100,000, or at least 1,000,000 or more members. As used herein, a "plurality of cell types" refers to a biological sample comprising cells with distinct cell surface markers or compositions thereof and/or physiological functions.

As used herein, surface markers "specific for" a target cell or cell fraction or population of interest are polypeptides or other molecules expressed on the surface of a target cell or cell fraction that are distinct to that target cell or cell fraction and thereby permit the identification and isolation of that cell or cell fraction using a method as described herein. In some embodiments, a single surface marker is sufficient to identify a target cell, e.g., CD8a identifies a CD8+ T cell. In other embodiments, two or more markers can together identify a target cell or cell population or fraction. In other embodiments, a single marker can identify a class of target cells, e.g., CD3 essentially identifies T cells as a class. In other embodiments the cell surface marker is a membrane lipid, peptide, polypeptide, or protein.

As used herein, the term "contacting a biological sample," when used in the context of an aptamer or nucleic acid as described herein, refers to addition of an aptamer to a biological sample under conditions that permit specific or selective binding of an aptamer to a target moiety or marker on the cell surface or extracellular matrix of the cell.

As used herein, the term "conditions that permit forming aptamer-bound cells" refers to incubation of cells at 4° C. for 30 minutes in a binding buffer comprising 0.1 mg/ml tRNA, 0.1 g/L $CaCl_2$, 0.2 g/L KCl, 0.2 g/L $KH_2PO_4$, 8.0 g/L NaCl, 2.1716 $Na_2HPO_4$ septahydrate, supplemented with 25 mM glucose, 5.5 mM $MgCl_2$ hexahydrate, varying amounts of bovine serum albumin (BSA), with a pH of 7.5, or to conditions that provide binding substantially equivalent to binding permitted under these conditions. In this context, substantially equivalent means±10% of the binding permitted under these conditions.

As used herein, the term "nucleic acid" includes one or more types of: polydeoxyribonucleotides (containing 2-deoxy-D-ribose), polyribonucleotides (containing D-ribose), and any other type of polynucleotide that is an N-glycoside of a purine or pyrimidine base, or modified purine or pyrimidine bases (including abasic sites). The term "nucleic acid," as used herein, also includes polymers of ribonucleosides or deoxyribonucleosides that are covalently bonded, typically by phosphodiester linkages between subunits, but in some cases by phosphorothioates, methylphosphonates, and the like. "Nucleic acids" include single- and double-stranded DNA, as well as single- and double-stranded RNA. Exemplary nucleic acids include, without limitation, gDNA; hnRNA; mRNA; rRNA, tRNA, micro RNA (miRNA), small interfering RNA (siRNA), small nucleolar RNA (snORNA), small nuclear RNA (snRNA), and small temporal RNA (stRNA), and the like, and any combination thereof.

As described herein, a "compensatory change" refers to a change in a nucleoside or nucleobase pair that maintains predicted secondary structure and/or target binding of an aptamer. Non-limiting examples of compensatory changes include changing a G:C base pair to a C:G base pair or changing an A:T base pair to a T:A base pair, e.g., in a stem-loop structure of a nucleic acid. Because of differences in the hydrogen-bonding characteristics between A:T and C:G base pairs, replacing an A:T base pair with a C:G base pair would be expected to alter the stability of the secondary structure, i.e., to increase its stability. Thus, a compensatory change described herein can further include such change. It is contemplated that a change from a C:G or G:C base pair to an A:T or T:A base pair can sometimes be tolerated without significantly affecting the secondary structure or target binding characteristics. However, this type of compensatory change should be considered in the context of the overall stem stability of the aptamer. As described herein, a compensatory change in the nucleotide sequence of an aptamer can involve, where appropriate, a modified nucleoside selected from but not limited to the nucleobases or nucleosides described in Table 1.

As used herein, the term "polypeptide" is intended to encompass a singular "polypeptide" as well as plural "polypeptides," and includes any chain or chains of two or more amino acids. Thus, as used herein, terms including, but not limited to "peptide," "dipeptide," "tripeptide," "protein," "enzyme," "amino acid chain," and "contiguous amino acid sequence" are all encompassed within the definition of a "polypeptide," and the term "polypeptide" can be used instead of, or interchangeably with, any of these terms. The term further includes polypeptides that have undergone one or more post-translational modification(s), including for example, but not limited to, glycosylation, acetylation, phosphorylation, amidation, derivatization, proteolytic cleavage, post-translation processing, or modification by inclusion of one or more non-naturally occurring amino acids. Conventional nomenclature exists in the art for polynucleotide and polypeptide structures. For example, one-letter and three-letter abbreviations are widely employed to describe amino acids: Alanine (A; Ala), Arginine (R; Arg), Asparagine (N; Asn), Aspartic Acid (D; Asp), Cysteine (C; Cys), Glutamine (Q; Gln), Glutamic Acid (E; Glu), Glycine (G; Gly), Histidine (H; His), Isoleucine (I; Ile), Leucine (L; Leu), Methionine (M; Met), Phenylalanine (F; Phe), Proline (P; Pro), Serine (S; Ser), Threonine (T; Thr), Tryptophan (W; Trp), Tyrosine (Y; Tyr), Valine (V; Val), and Lysine (K; Lys). Amino acid residues described herein are preferred to be in the "L" isomeric form. However, residues in the "D" isomeric form may be substituted for any L-amino acid residue provided the desired properties of the polypeptide are retained.

As described herein, a "solid support" is a structure upon which one or more aptamers can be displayed for contact with a target cell. A solid support provides a ready means for isolating or removing bound target cells from a mixture or suspension. A solid support can be in the form, for example, of a particle, bead, filter or sheet, resin, scaffold, matrix or column. Non-limiting classes of materials that the solid support can comprise include polymer, metal, ceramic, gels, paper, or glass. The materials can include, but are not limited to polystyrene, agarose, gelatin, iron oxide, stainless steel, polycarbonate, polydimethylsiloxane, polyethylene, acrylonitrile butadiene styrene, cyclo-olefin polymers and cyclo-olefin copolymers.

As described herein, a "phase changing agent" is an agent that is soluble in aqueous solution under one set of conditions, but induced to an insoluble, precipitating form under another set of conditions. The conditions for both soluble and insoluble forms must be compatible with maintaining the viability of target cells. Non-limiting examples of conditions that change phase include temperature, pH and salt or solute concentration. An example of a phase-changing agent includes poly(N-isopropylacrylamide) phase-changing polymers that are soluble at one temperature and then at a different temperature precipitate out from solution.

As used herein, the term "affinity pair" refers to a pair of moieties that specifically bind each other with high affinity, generally in the low micromolar to picomolar range. When one member of an affinity pair is conjugated to a first element and the other member of the pair is conjugated to a second element, the first and second elements will be brought together by the interaction of the members of the affinity pair. Non-limiting examples of affinity pairs that can be conjugated to an aptamer or solid support include ligand-receptor pairs, antibody-antigen pairs, as well as smaller pairs such as biotin-avidin, or biotin-avidin variant, such as biotin streptavidin or biotin-neutravidin, among others. As but one example, the biotin-streptavidin interaction has a $K_d$ of $10^{-14}$ to $10^{-15}$ molar.

As used herein, the term "conjugated to" encompasses association of an aptamer with a solid support, a phase-changing agent or a member of an affinity pair by covalent bonding, including but not limited to cross-linking via a cross-linking agent, or by a strong non-covalent interaction that is maintained under conditions in which the conjugate is to be used.

As used herein, the term "hybridize" refers to the phenomenon of a single-stranded nucleic acid or region thereof forming hydrogen-bonded base pair interactions with either another single stranded nucleic acid or region thereof (intermolecular hybridization) or with another single-stranded region of the same nucleic acid (intramolecular hybridization). Hybridization between a reversal agent and an aptamer permits the disruption of binding of the aptamer to a target by destabilization of the aptamer's secondary structure, allowing for reversible cell selection to occur. Hybridization is governed by the base sequences involved, with complementary nucleobases forming hydrogen bonds, and the stability of any hybrid being determined by the identity of the base pairs (e.g., G:C base pairs being stronger than A:T base pairs) and the number of contiguous base pairs, with longer stretches of complementary bases forming more stable hybrids.

As used here in, a "magnetoresponsive bead" refers to a solid support particle that can be attracted to a magnetic device or magnetic field. A magnetoresponsive bead coated with or otherwise conjugated to an aptamer can be used to separate aptamer-bound cells from a biological sample. While the term "bead" infers a spherical form, this is not a limitation of the shape of magnetoresponsive solid support that can be used to separate the aptamer-bound cells from non-aptamer bound cells. The shape can be irregular, or some variation of spherical, oval, cuboid, etc. In various embodiments, a magnetoresponsive bead can be conjugated to an aptamer covalently, e.g., via a cross-linking reaction, or, can be conjugated non-covalently, e.g., via the interaction of members of an affinity pair.

As used herein, the term "expression" refers to the process by which a polypeptide is produced based on the nucleic acid sequence of a gene. The process includes both transcription and translation.

As used herein, a "cell fraction" refers to a subset of cells in a sample population that shares a given characteristic, e.g., expression of a certain marker or set of markers. A targeted cell fraction can include more than one cell type; as but one example, where T cells are a cell fraction, that fraction can include, for example, CD4+ T cells and CD8+ T cells, among others. In some embodiments, a targeted cell fraction includes a single cell type. T cells, like other cells, can be identified by cluster of differentiation (CD) markers, or chemokine receptors (CCR). Non-limiting examples of T cell markers include CD8, CD19, CD4, CD3, CD28, CD45, CD62, CD31, CD27, or CCR-7.

As used herein, the term "specifically binds a cell surface marker" refers to the capacity of an aptamer as described herein to bind to a given target cell or cell surface marker thereupon, under conditions that maintain the viability of mammalian cells, such that the aptamer binds the given target cell surface marker to a significantly greater degree than it binds to other markers or other cells that do not express the given marker. At a minimum, an aptamer that specifically binds a cell surface marker binds that marker with a Kd of 1 micromolar or less, and binds target marker with at least 100× greater affinity than it binds an unrelated cell surface marker.

As used herein, the term "small molecule" refers to a chemical agent which can include, but is not limited to, a peptide, a peptidomimetic, an amino acid, an amino acid analog, a polynucleotide, a polynucleotide analog, an aptamer, a nucleotide, a nucleotide analog, or an organic or inorganic compound (e.g., including heterorganic and organometallic compounds) having a molecular weight less than about 10,000 grams per mole, organic or inorganic compounds having a molecular weight less than about 5,000 grams per mole, organic or inorganic compounds having a molecular weight less than about 1,000 grams per mole, organic or inorganic compounds having a molecular weight less than about 500 grams per mole, and salts, esters, and other forms of such compounds that are compatible with cell viability at a concentration of a reversal agent effective to release an aptamer from a cell surface marker on a cell.

As defined herein, "flow cytometry" refers to a technique for counting and examining microscopic particles, such as cells and chromosomes, by suspending them in a stream of fluid and passing them through an electronic detection apparatus. Flow cytometry allows simultaneous multiparametric analysis of the physical and/or chemical parameters of up to thousands of particles per second, such as fluorescent parameters. Modern flow cytometric instruments usually have multiple lasers and fluorescence detectors. Increasing the number of lasers and detectors allows for labeling by multiple antibodies, and can more precisely identify a target population by their phenotypic markers. Certain flow cytometric instruments can take digital images of individual cells, allowing for the analysis of fluorescent signal location within or on the surface of cells.

As used herein, the term "immunotherapy" refers to the treatment of disease via the stimulation, induction, subversion, mimicry, enhancement, augmentation or any other modulation of a subject's immune system to elicit or amplify adaptive or innate immunity (actively or passively) against cancerous or otherwise harmful proteins, cells or tissues. Immunotherapies (i.e., immunotherapeutic agents) include cancer vaccines, immunomodulators, "antibody-based immunotherapies" or monoclonal antibodies (e.g., humanized monoclonal antibodies), immunostimulants, cell-based therapies such as adoptive T-cell therapies or dendritic cell immunotherapies or dendritic cell vaccines, and viral therapies, whether designed to treat existing cancers or prevent the development of cancers or for use in the adjuvant setting to reduce likelihood of recurrence of cancer.

As used herein, the term "toehold" describes a 5-15 base pair overhang region of an aptamer that is designed to be single-stranded and complementary to a region of a reversal agent. The complementary nature of the toehold permits the reversal agent to readily hybridize to the single stranded region and facilitates the remainder of the reversal agent, which is complementary to an adjacent double-stranded region of the aptamer, to initiate strand displacement at the adjacent double-stranded region. Thus, a toehold will generally be designed or chosen to be adjacent to a region of double stranded sequence one wishes to disrupt or displace, which will generally be a stem structure in an aptamer. The toehold provides a kinetic advantage for a reversal agent to initiate hybridization and strand displacement to thereby efficiently disrupt aptamer binding to its cell surface marker target. A toehold is generally, but not necessarily, added to an aptamer once the aptamer is found to bind a desired target. As an alternative, every member of an aptamer library can, for example, have the same sequence at one end or the other that will serve as a toehold. Accordingly, internal regions of the aptamer that are not base paired under structure prediction can act as toehold sequences. A toehold can include, for example, a relatively high GC content to provide an improvement in strand displacement rate constant for hybridization to its complement relative to a sequence with lower GC content.

As used herein the term "comprising" or "comprises" is used in reference to compositions, methods, and respective component(s) thereof, that are essential to the claimed technology, yet open to the inclusion of unspecified elements, whether essential or not.

As used herein the term "consisting essentially of" refers to those elements required for a given embodiment. The term permits the presence of additional elements that do not materially affect the basic and novel or functional characteristic(s) of that embodiment of the invention.

The term "consisting of" refers to compositions, methods, and respective components thereof as described herein, which are exclusive of any element not recited in that description of the embodiment.

As used in this specification and the appended claims, the singular forms "a," "an," and "the" include plural references unless the context clearly dictates otherwise. Thus for example, references to "the method" includes one or more methods, and/or steps of the type described herein and/or which will become apparent to those persons skilled in the art upon reading this disclosure and so forth.

Nucleic Acid Aptamer Compositions

Nucleic acid aptamers, single-stranded oligonucleotides capable of binding target molecules, are an attractive alternative to antibodies for cell selection. Aptamers can possess binding affinities comparable to or even higher than antibodies. Importantly, aptamers are produced synthetically as well-defined, low variability products with long storage stability. Aptamers can be discovered through a library selection method known as systematic evolution of ligands by exponential enrichment (SELEX), and further optimized for chemical stability. With their favorable attributes, the application field for aptamers has escalated in the last quarter century to encompass areas including sensing, purification, diagnostics, drug delivery and therapeutics.

Nucleic acid aptamers include RNA, DNA, and/or synthetic nucleic acid analogs (e.g., PNA) capable of specifically binding target molecules. Aptamers are an attractive alternative to antibodies for cell selection because of their high level of specificity and affinity for cell surface markers. Synthetic aptamers were first developed in the 1990s by the Szostak and Gold groups, and it was discovered that aptamers can possess binding affinities comparable to or even higher than antibodies.

Provided herein are methods and compositions for generating functional nucleic acid aptamers for cell selection. The composition of the nucleic acid aptamer can include but is not limited to the nucleobases described in Table 1 (below) and can comprise one or more combinations of backbone or nucleobase structure characteristic of DNA, RNA, or synthetic nucleic acid analogs such as PNAs or BNAs.

TABLE 1

| Nucleosides and Nucleobases |
|---|
| Adenosine (A) |
| Thymine (T) |
| Guanosine (G) |
| 5-Methyluridine (U) |
| Uridine (U) |
| Cytidine (C) |
| Deoxyadenosine (dA) |
| Deoxyguanosine (dG) |
| Thymidine (dT) |

TABLE 1-continued

| Nucleosides and Nucleobases |
|---|
| Deoxyuridine (dU) |
| Deoxycytidine (dC) |
| Hypoxanthine-adenine (I-A) |
| Hypoxanthine-cytosine (I-C) |
| Hypoxanthine-uracil (I-U) |
| Guanine-uracil (G-U) |
| N-(2-aminoethyl)-glycine-purine |
| N-(2-aminoethyl)-glycine-adenosine (PNA-A) |
| N-(2-aminoethyl)-glycine-guanosine (PNA-G) |
| N-(2-aminoethyl)-glycine-thymine (PNA-T) |
| N-(2-aminoethyl)-glycine-uridine (PNA-U) |
| N-(2-aminoethyl)-glycine-cytidine (PNA-C) |
| Xanthine |
| Theobromine |
| Isoguanine |
| 5-hydroxymethyl cytosine |
| hypoxanthine, |
| 2-aminoadenine |
| 6-methyl-adenine |
| 6-methyl-guanine |
| 2-propyl-adenine |
| 2-propyl-guanine |
| 2-thiouracil |
| 2-thiothymine |
| 2-thiocytosine |
| 5-halouracil |
| 5-halocytosine |
| 5-propynyl uracil |
| 5-propynyl cytosine |
| 6-azo uracil |
| 6-azo cytosine |
| 6-azo thymine |
| 5-uracil (pseudouracil) |
| 4-thiouracil |
| 8-halo adenine |
| 8-halo guanosine |
| 8-amino adenine |
| 8-amino guanosine |
| 8-thiol adenine |
| 8-thiol guanosine |
| 8-thioalkyl adenine |
| 8-thioalkyl guanosine |
| 8-hydroxyl adenine |
| 8-hydroxyl guanosine |
| 2',4'-BNANC[NBn] |
| 2',4'-BNANC[NMe] |
| 2',4'-BNANC[NH] |
| 2',4'-BNA-1-isoquinolone |
| 2',4'-ENA |
| 2',4'-BNA-2-pridone |
| 3'-amino-2',4'-BNA |

Aptamers generally consist of relatively short oligonucleotides that typically range from 20 to 80 nucleotides in length, for example, at least 20 nucleotides, at least 30 nucleotides, at least 40 nucleotides, at least 50 nucleotides, at least 60 nucleotides, at least 70 nucleotides, at least 80 nucleotides or more. An aptamer can be attached to a longer sequence, e.g., at one end or the other of the aptamer, although appended sequences that affect the secondary structure of the aptamer can affect aptamer function.

The functional activity of an aptamer, i.e., binding to a given target molecule, involves interactions between moieties or elements in the aptamer with moieties or elements on the target molecule. The interactions can include, for example, hydrophobic/hydrophilic interactions, charge or electrostatic interactions, hydrogen bonding, etc., and the specific interactions of a given aptamer with a given target are determined by the sequence of the aptamer and the secondary and tertiary structure assumed by that sequence under binding conditions. Thus, the occurrence of intramolecular base pairing in the aptamer is a primary factor in aptamer structure and therefore aptamer function. Intramolecular base pairing can result, for example, in double stranded stem structures, stem-loop structures, and exposure of various elements of the aptamer that can participate in binding interactions with a target molecule. Where the secondary structure of an aptamer is defined by its sequence, including the presence of intramolecular base pairs between regions of complementary sequence that fold the molecule into a functional shape, it should be understood that changes in aptamer sequence occurring in a stem structure or that introduce new options for intramolecular base pairing can disrupt the conformation of the molecule and thereby its function. That said, when a change of one nucleotide in a base-paired stem structure is accompanied by a compensatory change in the complementary nucleotide that maintains the ability to base pair, the structure, and thereby the function of the aptamer can be maintained. That is, some aptamers can tolerate some degree of sequence change and still retain binding activity. Furthermore, a truncated or partial sequence of an aptamer as described herein can also retain binding activity provided that the truncation does not alter intramolecular base-pairing necessary for the secondary structure of the aptamer. In particular, it is contemplated that removal of some sequence from the 5' or 3' end of an aptamer described herein can result in an aptamer molecule that retains binding activity. Indeed, some changes can improve binding activity. This, of course, is one basis for an iterative selection approach used to identify aptamers that bind a given target and do so with high affinity. The Examples herein provide working demonstration of the selection of aptamers that specifically bind given targets.

As described herein, an aptamer can additionally or alternatively comprise nucleobase (often referred to in the art simply as "base") modifications or substitutions. Such substitutions can modify stability of the aptamer or reversal agent, e.g., by reducing susceptibility to enzymatic or chemical degradation, or can modify (increase or decrease) intra- or inter-molecular interactions, including but not limited to base-pairing interactions. Aptamer and reversal agent nucleobases include the purine bases adenine (A) and guanine (G), and the pyrimidine bases thymine (T), cytosine (C), and uracil (U) or modified or related forms thereof. Modified nucleobases include, as non-limiting examples, other synthetic and natural nucleobases, such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, 7-deazaguanine and 7-deazaadenine and 3-deazaguanine and 3-deazaadenine, among others. The base pairing behavior and preferences of these nucleobases are known in the art.

Synthetic oligonucleotides comprising an aptamer can include but are not limited to peptide nucleic acid (PNA), bridged nucleic acid (BNA), morpholinos, locked nucleic acids (LNA), glycol nucleic acids (GNA), threose nucleic acids (TNA), or any other xeno nucleic acid (XNA) described in the art.

One such oligonucleotide, an oligonucleotide mimetic, that has been shown to have excellent hybridization properties, is referred to as a peptide nucleic acid (PNA). In PNA compounds, the sugar-backbone of an oligonucleotide is replaced with an amide-containing backbone, in particular an aminoethylglycine backbone. The nucleobases are retained and are bound directly or indirectly to atoms of the amide portion of the backbone.

Nucleic Acid Aptamer Secondary Structure and Cell Targeting

The aptamers described herein have the ability to fold into 2-dimensional (2D) and 3-dimensional (3D) structures that interact with specific targets. Aptamers generally bind to specific targets through non-covalent interactions with a target cell surface marker, including but not limited to electrostatic interactions, hydrophobic interactions, and/or their complementary shapes.

It will be understood by one of skill in the art that the aptamer 2-D and 3-D structures can be predicted by any of several methods to define properties such as equilibrium probability and stability. The NUPACK web application can be used to generate predicted secondary structures of aptamer sequences.[44] Additional non-limiting examples of aptamer structure prediction methods include in silico models such as UNPACK, APTANI, 3D-DART, ModeRNA, or Unified Nucleic Acid Folding and hybridization package (UNAFold), or any other oligonucleotide structure prediction in silico model known in the art.

Different structure prediction models can produce different predicted structures, and even the same model can produce different predicted structures if different baseline parameter are used, e.g., temperature, ionic strength, etc.

It is contemplated that the reverse, complement, reverse complement, or truncated sequences of the aptamers described in the Examples can be used for isolation of cells, as it is contemplated that these sequences would maintain the secondary structure of the aptamer. These sequences are described, for example, in SEQ ID NOs: 9-63. Furthermore, an aptamer library can include a 45 nucleotide library that can permit the selection of additional aptamers, such as that of SEQ ID NO: 64. Additional modifications can include, for example, the addition of a toehold sequence to the aptamer—examples including toeholds with differing numbers of guanines are provided in SEQ ID NO: 65-66.

For any given secondary structure prediction model, the maintenance or improvement in aptamer binding to its target when a modification, e.g., a compensatory or non-compensatory change is made on the basis of predicted structure should be tested experimentally.

A target for the aptamer may or may not be known prior to the cell selection method described herein. Known surface receptors for cells of interest can be used to target specific fractions of cells. Examples of other cell-specific aptamer sequences (e.g., specific for CD4+ cells) are described in SEQ IN NO 67-77.

Other cells types beyond lymphocytes and leukocytes can also be targeted with nucleic acid aptamers using the methods described herein. It is contemplated that the cell surface targets for the aptamers can comprise but are not limited to a membrane lipid, peptide, polypeptide, or cellular or extracellular matrix protein. It is further contemplated herein that aptamers and reversal agents can be used as described herein to isolate other components of a biological sample that include surface exposed markers, (e.g., exosomes, vesicles, etc).

In one embodiment, the membrane lipid is a phospholipid, sphingolipid, sterol, glycolipid, fatty acid, or phosphoglyceride.

In addition to known cell surface markers, cell surface markers can be genetically modified for cell selection of specific mutations or variants of a cell of interest within a population or mixture of cells. The aptamers described herein can be used to target genetically modified cells as detailed in EXAMPLE 1.

In one embodiment an aptamer targets a cell surface receptor or antigen. Non-limiting examples of a cell surface marker for a T cell include T cell receptors (TCRs), cluster of differentiation (CD) antigen markers, or chemokine receptors (CCR). Non limiting examples of cell surface markers for B cells include cluster of differentiation (CD) markers (e.g. 19 or 20), and major histocompatibility complex (MHC) molecules.

In one embodiment, the cell surface marker comprises a cluster of differentiation antigen, e.g., CD2, CD3, CD4, CD5, CD7, CD8, CD9, CD10, CD11, CD13, CD15, CD16, CD18, CD19, CD20, CD21, CD22, CD23, CD24, CD25, CD27, CD28, CD31, CD33, CD34, CD36, CD37, CD38, CD 40, CD41, CD42, CD44, CD45, CD45RA, CD45RO, CD52, CD54, CD56, CD57, CD60, CD61, CD62L, CD64, CD71, CD79, CD80, CD83, CD90, CD95, CD103, CD117, CD122, CD127, CD133, CD134, CD 137, CD138 or CD152, CD154, CD272, CD276, and CD278, among others.

In some embodiments, the cell surface marker is an immune checkpoint regulator. Examples of such cell surface markers include, but are not limited to, CTLA4, Programmed Death 1 (PD-1), adenosine A2A receptors, VTCN1, Killer-cell Immunoglobulin-like Receptor (KIR), T-cell Immunoglobulin domain and Mucin domain 3 (TIM-3), T Cell Immunoreceptor with Ig and ITIM domains (TIGIT), and V-domain Ig suppressor of T cell activation (VISTA), among others.

In one embodiment, the cell surface marker comprises a G protein-coupled receptor (GPCR), also known as a seven transmembrane receptor or 7TM receptor. For example, the receptor may comprise a muscarinic acetylcholine receptor, an adenosine receptor, an adrenergic receptor, a GABA-B receptor, an angiotensin receptor, a cannabinoid receptor, a cholecystokinin receptor, a dopamine receptor, a glucagon receptor, a histamine receptor, an olfactory receptor, a opioid receptor, a rhodopsin receptor, a secretin receptor, a serotonin receptor or a somatostatin receptor.

In one embodiment, the cell surface marker is a growth factor receptor, such as a member of the ErbB or epidermal growth factor receptor (EGFR) family, e.g., EGFR (ErbB1), HER2 (ErbB2), HER3 (ErbB3), and HER4 (ErbB4).

In one embodiment, the cell surface markers include but are not limited to a tyrosine kinase receptor, such as an erythropoietin receptor, an insulin receptor, a hormone receptor or a cytokine receptor. Preferred tyrosine kinases include fibroblast growth factor (FGF) receptors, platelet-derived growth factor (PDGF) receptors, nerve growth factor (NGF) receptors, brain-derived neurotrophic factor (BDNF) receptors, and neurotrophin-3 (NT-3) receptors, and neurotrophin-4 (NT-4) receptors. The receptor may comprise a guanylyl cyclase receptor such as GC-A & GC-B, a receptor for atrial-natriuretic peptide (ANP) and other natriuretic peptides or GC-C, a guanylin receptor.

In one embodiment, the cell surface marker is an ion channel (e.g., Nav1.7), transporter (e.g., CFTR), integrin, talin, vinculin, alpha-actinin, or filamin.

In one embodiment, the cell surface marker is correlated with a disease, preferably a human or animal disease. For example, the marker can be associated with cancer, for example breast or ovarian cancer. Suitable cancer cell markers can include a receptor or CD antigen mentioned above, or further cancer-cell specific markers such as CA-125 (MUC-16) or CA19-9. A large number of tumor antigens are known in the art.

A cell can be designated "positive" or "high," "dim" or "low," or "negative" for any of the cell-surface markers described herein, and such designations can useful for the practice of the assays and cell isolation methods described herein. A cell is considered "positive" for a cell-surface marker if it expresses the marker on its cell-surface in amounts sufficient to be detected using methods known to those of skill in the art, such as contacting a cell with an antibody or aptamer that binds specifically to that marker, and subsequently performing flow cytometric analysis of such a contacted cell to determine whether the antibody is bound the cell. It is to be understood that while a cell may express messenger RNA for a cell-surface marker, in order to be considered positive for the assays and methods described herein, the cell must express it on its surface. A cell is considered "dim" or "low" for a cell-surface marker if it expresses the marker on its cell-surface in amounts sufficient to be detected using methods known to those of skill in the art, such as contacting a cell with an antibody that binds specifically to that marker, and subsequently performing flow cytometric analysis of such a contacted cell to determine whether the antibody is bound the cell, but there exists another distinct population of cells that expresses the marker at a higher level, giving rise to at least two populations that are distinguishable when analyzed using, for example, flow cytometry. Similarly, a cell is considered "negative" for a cell-surface marker if it does not express the marker on its cell-surface in amounts sufficient to be detected using methods known to those of skill in the art, such as contacting a cell with an antibody that binds specifically to that marker and subsequently performing flow cytometric analysis of such a contacted cell to determine whether the antibody is bound the cell.

Nucleic Acid Aptamer Synthesis and Modifications

Aptamers as described herein can be chemically synthesized using, as a non-limiting example, a nucleoside phosphoramidite approach. Furthermore, aptamers can be isolated from a biological sample by DNA or RNA extraction methods. These methods include but are not limited to column purification, ethanol precipitation, phenol-chloroform extraction, or acid guanidinium thiocyanate-phenol chloroform extraction (AGPC).

Following extraction or synthesis, the aptamers described herein can be characterized by liquid chromatography, mass spectrometry, next generation sequencing, polymerase chain reaction (PCR), gel electrophoresis, or any other method of identifying nucleoside sequences, secondary structures, chemical composition, expression, thermodynamics, binding, or function. Aptamers identified by cell-SELEX can further be characterized by aptamer cell binding assays, flow cytometry, or in vivo function as described in the EXAMPLES.

The aptamers described herein can also be modified or conjugated to a solid support or phase-changing agent for cell selection and cell processing. Non-limiting examples of conjugation methods include chemical, thermodynamic, or structural modifications to the aptamer that allows for separation of the aptamer-bound cells from the aptamer unbound cells or biological sample.

In certain embodiments, the aptamers as described herein can be labeled. Non limiting examples of labels can include, for example, fluorophores, and or members of an affinity pair. Non-limiting examples of affinity pairs that can be conjugated to the aptamer include, for example, biotin:

avidin, biotin: streptavidin. biotin: neutravidin (or other variants of avidin that bind biotin).

Solid Supports

In certain embodiments, aptamers are bound directly or indirectly to a solid support.

Aptamer-bound solid supports described herein can exist in the form of a platform, column, filter or sheet, dish, a microfluidic capture device, capillary tube, electrochemical responsive platform, scaffold, cartridge, resin, matrix, bead, or another solid support known in the art.

In some embodiments, the solid support comprises materials that include but are not limited to a polymer, metal, ceramic, gels, paper, or glass. The materials of the solid support can further comprise, as non-limiting examples, polystyrene, agarose, gelatin, alginate, iron oxide, stainless steel, gold nanobeads or particles, copper, silver chloride, polycarbonate, polydimethylsiloxane, polyethylene, acrylonitrile butadiene styrene, cyclo-olefin polymers or cyclo-olefin copolymers, or Sepharose™ resin.

The aptamer-bound solid support can further comprise a magnetoresponsive element such as a magnetoresponsive bead. In some embodiments, the magnetoresponsive element or bead is in the form of a sphere, cube, rectangle, cylinder, cone, or any other shape described in the art. Aptamer bound to magnetoresponsive beads provides a simple method of separating aptamer-bound cells from non-bound cells by permitting a suspension of the cells to interact with the aptamer-conjugated beads, and then subjecting the sample to a magnetic field. The beads, with aptamer-bound cells, are attracted to the magnetic source, permitting the removal of non-bound cells, e.g., via pipette. Beads with bound cells can be washed and subjected to the magnetic field again to increase the relative purity of the isolated cell fraction.

In some embodiments, the magnetoresponsive element comprises magnetite, iron (III) oxide, samarium-cobalt, terfenol-D, or any other magnetic element described in the art.

In some embodiments the solid support is in contact with an extracellular matrix protein or composition. Non-limiting examples include fibronectin, collagen, laminin, poly-L-lysine, Matrigel™, vitronectin, tenascin, fibrillin, brevican, elastin, or other extracellular matrix protein or composition known in the art.

In alternative embodiments, a phase-changing agent can be used in place of a solid support. Phase change agents can change phase or precipitate under a given set of conditions and can thereby facilitate the separation of aptamer-bound from aptamer-unbound cells.

In some embodiments, a phase-changing agent can be bound to the aptamer. For example, the phase-changing agent can be soluble in aqueous solution under one set of conditions, but induced to an insoluble, precipitating form under another set of conditions. Further exemplary conditions that can induce a phase change include temperature, pH, salt or solute concentration, light (e.g., ultraviolet or fluorescent), or mechanical forces. For example, poly(N-isopropylacrylamide) is a phase-changing polymer that is soluble at one temperature and then at a different temperature precipitates out from solution. It is also contemplated that a phase changing agent can act in a similar manner to riboflavin that is activated by ultraviolet light.

The solid support bound to the aptamer can also contain a label. In some embodiments, the label is a heterologous protein. In some embodiments, the heterologous protein is a tag, such as a fluorescent protein. Such proteins can facilitate tracking and/or visualization of the aptamers. Examples of fluorescent proteins include, but are not limited to, green fluorescent protein (GFP) from the jellyfish *Aequorea victoria*; mutant versions of GFP that fluoresce different colors (such as BFP, blue fluorescent protein; YFP, yellow fluorescent protein; and CFP, cyan fluorescent protein); dsRed fluorescent protein (dsRed2FP); eqFP611, a red fluorescent protein isolated from Entacmaea quadricolor; AmCyan1, a cyan fluorescent protein isolated from Anemonia majano, and originally named amFP486; Azami Green, a bright fluorescent protein isolated from Galaxeidae; ZSGREEN™, a fluorescent protein isolated from Zoanthus; or any other fluorescent protein or element described in the art.

Nucleic Acid Aptamer SELEX Library Selection

Aptamers can be discovered through a library selection method known as SELEX (systematic evolution of ligands by exponential enrichment) and further optimized for chemical stability. With their favorable attributes, the application field for aptamers has escalated in the last quarter century to encompass areas including sensing, purification, diagnostics, drug delivery and therapeutics.

For developing membrane protein aptamers against particular diseases using traditional protein-SELEX, prior knowledge of protein targets is necessary. However, because of post-translational modifications or the lack thereof, membrane proteins expressed in prokaryotic or some eukaryotic systems often cannot fold into the correct 3D structure that is formed under physiologic conditions. This causes the low solubility and low yield of membrane proteins expressed by in vitro expression systems, which limit their application.

Cell-SELEX overcomes the difficulties in obtaining purified recombinant membrane proteins. In cell-SELEX, aptamers are developed against molecules on the cell surface without requirement for prior knowledge of the molecular targets. Therefore, protein purification is also not necessary prior to the selection.

The following describes an embodiment of an aptamer cell SELEX approach that provides strong results. Parameters subject to variation are noted throughout. The main steps of cell-SELEX are similar to traditional SELEX, which includes incubation, partitioning, and amplification steps. A protocol for cell-SELEX was modified from Sefah et al. and the schematic is highlighted in FIG. 1 according to methods described herein as detailed in EXAMPLE 1.

The ssDNA library used in the cell SELEX process described herein can be purified by high performance liquid chromatography (HPLC). While other lengths of aptamer can be selected for, in one embodiment, the ssDNA library can include a 52-base pair (bp) random sequence flanked by two 18-bp constant regions. In some embodiments, the ssDNA random sequence of a library to identify aptamers as described herein can comprise 20 base pairs or more, 25 base pairs or more, 30 base pairs or more, 35 base pairs or more, 40 base pairs or more, 45 base pairs or more, 50 base pairs or more, 55 base pairs or more, 60 base pairs or more, 65 base pairs or more, 70 base pairs or more, 75 base pairs or more, 80 base pairs or more, 85 base pairs or more, 90 base pairs or more, 95 base pairs or more, or 100 base pairs or more and beyond. Examples of aptamers selected from a 45 base pair library—are also described herein.

In some embodiments, the ssDNA library can be an RNA library. Thus, both variable sizes and different nucleic acids can produce useful aptamer results for cell selection.

It is also contemplated that the 18 bp constant regions of a cell-SELEX ssDNA or RNA library as described herein can comprise 5 bp or more, 10 bp or more, 20 bp or more, 30 bp or more, 40 bp or more, 50 bp or more and beyond.

Primers for library amplification between SELEX rounds, with Integrated DNA Technologies (IDT) modification codes, can be, for example: forward 5'-/56-FAM/ATCCAGAGTGACGCAGCA-3' (SEQ ID NO: 105) and reverse 5'-/5BiosG/ACTAAGCCACCGTGTCCA-3' (SEQ ID NO: 106). Other primer sequences can also be generated and used without undue experimentation. Examples of individually synthesized ssDNA aptamers are listed in Table 5.

The IDT code FAM is defined as a fluorescent dye attachment for oligonucleotides that is compatible with most fluorescence detection equipment. It becomes protonated and has decreased fluorescence below pH 7; it is typically used in the pH range 7.5-8.5. FAM can be attached to the 5' or 3' ends of oligonucleotides. The IDT code 5BiosG is defined as a biotin attachment.

In some embodiments, the aptamer is conjugated to another label or protein as described herein.

Exemplary conditions for aptamer selection by cell-SELEX are highlighted in Table 2.

Non-stringent positive selection can be conducted for Round 1, in which the known cells of interest (that can include T cells), depleted of dead cells, are, for example, incubated with 40 nanomolar ssDNA library (~$10^{16}$ individual sequences) for 1 h at 4° C. This processing step is defined as positive cell-SELEX or Round 1 of the cell selection method. Molar amounts or concentration of library, time and temperature can be varied by one of ordinary skill in the art.

In Round 1 of positive cell-SELEX, the cells of interest can be from any biological sample that includes but is not limited to stem cells, cancer cells, leukocytes, lymphocytes, T cells, or CD8 expressing cells, natural killer cells, dendritic cells, CD8+ T cells, CD3+ T cells, CD2+ T cells, CD4+ T cells, or a CD28+ T cells, or any other type of T cells, such as memory T cells, cytotoxic killer T cells, helper T cells, effector T cells, regulatory T cells ($T_{regs}$), regulatory B cells ($B_{regs}$), B-1 cells, memory B cells, plasma cells, lymphoplasmacytoid cells, marginal zone B cells, follicular B cells, or any other type of blood cell.

Provided that cells of a solid tissue can be dissociated, e.g., via collagenase or other enzymatic or physical treatment, cells of interest can be from any other organ or system including the brain, heart, skin, bones, lungs, gastrointestinal tract, liver, skeletal muscle, nervous system, circulatory system, pancreas, reproductive organs, eye, ear, endocrine system, or any other biological sample known in the art.

The biological sample in Round 1 can be from human or any other animal species of interest. The biological sample can include a combination of cells, including a combination of any of the cell types described herein.

In some embodiments, the number of cells used for Round 1 of positive selection include $1\times10^3$ cells or more, $1\times10^4$ cells or more, $1\times10^5$ cells or more, $1\times10^6$ cells or more, $1\times10^7$ cells or more, $1\times10^8$ cells or more, $1\times10^9$ cells or more, $1\times10^{10}$ cells or more, $1\times10^{11}$ cells or more, $1\times10^{12}$ cells or more or beyond.

While various parameters such as temperature, ionic strength, etc. can affect aptamer binding properties, it should be kept in mind that the aptamers must bind under conditions that maintain cell viability. The temperature, ionic strength, etc. should only be varied in the ranges tolerated by viable cells or cells that can be thawed and become viable following cell selection.

For cell-SELEX Rounds 2 to 5, enriched and amplified ssDNA pools generated from the previous round can be incubated with a mixture of cells from a biological sample of interest (e.g., peripheral blood mononuclear cells also known as PBMCs) depleted of dead cells, a processing step termed 'competitive selection.' While 5 Rounds of cell-SELEX are described in EXAMPLE 2, generally two rounds or more can be beneficial, e.g., three rounds, four rounds, five rounds or more.

In some embodiments, the biological sample comprises whole blood, buffy coat, or isolated mononuclear cells.

In some embodiments, the biological sample can comprise cells from a tissue including but not limited to muscle, smooth muscle (e.g., vascular smooth muscle, bronchioles, etc.), cardiac muscle, bone marrow, cartilage, gastrointestinal organs, eye, ear, reproductive organs, kidney, pancreas, liver, skin, or any other organ known in the art.

After, for example, three washes, the desired cell subset and bound ssDNA sequences can be enriched using a commercially available cell isolation kit or antibody extraction method. The cells of interest (e.g., T cells) can be lysed by boiling, and ssDNA sequences can be extracted in the clarified supernatant.

The ssDNA pool can be incubated with, for example, $1\times10^6$ negative selection cells without the surface marker of interest (e.g., CD3 CD8-J.RT3-T3.5 cells) at 4° C. as a form of negative selection in each round, and unbound ssDNA sequences can be PCR amplified and used in the next round. To increase the stringency of selection and minimize non-specific binders, the amounts of ssDNA, PBMCs, and BSA used and the time of incubation can be decreased over the rounds.

In some embodiments, the number of negative selection cells lacking the cell surface marker of interest can be to $1\times10^3$ or more, $1\times10^4$ or more, $1\times10^5$ or more, $1\times10^6$ or more, $1\times10^7$ or more, $1\times10^8$ or more, $1\times10^9$ or more, $1\times10^{10}$ or more and beyond.

In some embodiments, the incubation time for subsequent rounds of negative cell-SELEX can include 5 minutes or more, 10 minutes or more, 20 minutes or more, 30 minutes or more, 60 minutes or more, 90 minutes or more, or 120 minutes or more.

Between rounds, the remaining ssDNA sequences can be amplified by PCR using, for example, 0.02 U/microliter (µL) Phusion High Fidelity DNA Polymerase (NEB), 1× Phusion GC Buffer, 500 nM of both forward and reverse primers described herein, and 200 µM dNTPs (10 seconds at 98° C., 30 seconds at 56° C., 30 seconds at 72° C.). Small 100 microliter (µL) analytical PCR reactions using 10 microliter (µL) of ssDNA and 2% agarose gel electrophoresis can be carried out before large 2 milliliter (mL) preparative PCR reactions using 200 microliter (µL) of ssDNA, to determine the optimum cycle number before large, non-specific amplicons appeared. FAM-labeled ssDNA for use in both subsequent rounds of SELEX and in flow cytometry round binding assays are generated with High Capacity Neutravidin Agarose Resin, 1 Molar (M) NaOH, and desalting illustra NAP-5 Columns (GE). The amount of ssDNA can be quantified by, for example, NanoDrop 2000c spectrophotometry (Thermo Scientific) and concentrated by, for example, Savant ISS110 SpeedVac drying (Thermo Scientific). The methods described herein can be modified to include different concentrations of PCR reagents.

The wash buffer formulation used in all SELEX rounds and in binding assays can be 0.22 micrometer (µm)-filtered 500 milliliter (mL) phosphate buffer solution with calcium and magnesium (Corning) supplemented with 2.25 grams of glucose for a final concentration of 25 millimolar (mM) and 2.5 mL of 1 Molar (M) magnesium chloride ($MgCl_2$) for a final concentration of 5.5 millimolar (mM) $MgCl_2$. The binding buffer formulation can be the same as wash buffer, but further supplemented with 0.1 milligrams per milliliter (mg/mL) yeast tRNA (Invitrogen) and bovine serum albumin (BSA, Miltenyi, varying for SELEX and 1% for binding assays) after filtration. Labeled ssDNA pools or individual aptamers can be reconstituted to, e.g., 1 micromolar (µM) in wash buffer before folding by denaturation at 95° C. for 5 min and snap-cooling on ice. Folded ssDNA pools or individual aptamers are then diluted in binding buffer before incubating with cells in SELEX rounds or binding assays.

In addition to the cell-SELEX method described herein, it is contemplated that the selection of aptamers can also be performed with other approaches, e.g., the high fidelity (Hi-Fi) SELEX method described by Ouellet et al., Biotechnol Bioeng (2015), among others.

Next generation sequencing along with other methods of aptamer oligonucleotide identification can be used.

The starting naive library and ssDNA pools from each SELEX round can be PCR amplified with barcoded primers, e.g., listed in Table 2 after sequencing using a MiSeq Reagent Kit v2 (300 cycles) and MiSeq System (Illumina) according to the manufacturer's instructions. Exported FASTA files can be analyzed with FASTAptamer software. Specifically, FASTAptamer-Count can be used to determine rank and reads per million (RPM) for each sequence, where after FASTAptamer-Compare can then be used to conduct a pairwise comparison of the RPM of sequences between adjacent rounds and thus calculate fold enrichment (Table 4). The top 100 sequences from competitive cell-SELEX Rounds 2-4 can be further analyzed by both FigTree software (tree.bio.ed.ac.uk/software/figtree/) for phylogenetic tree generation and MEME Suite software for motif prediction. Additional rounds of competitive cell-SELEX can be used if necessary to isolate aptamers that permit isolation of the desired cell product.

Reversal Agents for Reversible Cell Selection

Reversal agents include molecules that disrupt the structure of an aptamer and thereby cause release of cells or molecules bound by the aptamer, or molecules that bind with the aptamer thereby reducing cell-binding affinity. In some embodiments, a reversal agent is specific for one or a limited number of aptamers that share a given sequence motif or structure, while in other embodiments, a reversal agent disrupts aptamer structure non-specifically, such that one reversal agent can be used for any of a number of different aptamers. Such non-specific reversal agents include, but are not limited to, for example, polyanions such as dextran sulfate, heparin sulfate, phytic acid, or polyphosphates. In other embodiments, the aptamer of interest may be fused with a small-molecule binding aptamer so that the reversal agent can comprise a small molecule that binds to and affects the folded structure of an aptamer, thereby causing release of bound target molecules or cells. In another example, reversal agents may be chelators that bind essential ions that promote the secondary structure of the aptamer. A small molecule reversal agent can be non-specific or specific, depending upon how it interacts with the aptamer. For example, small molecules that can be used include but are not limited to ATP, ampicillin, tetracycline, dopamine and sulforhodamine B. Further examples of small molecules that bind to aptamers are described in McKeague and DeRosa, *J Nucleic Acids*. Vol. 2012, Article ID No. 748913 (2102), which is incorporated herein by reference in its entirety.

In other embodiments, a reversal agent can comprise an oligonucleotide or oligonucleotide mimic (PNA, LNA, BNA, etc.) that includes sequence complementary to a portion of an aptamer that forms a double-stranded stem structure. The hybridization of the oligonucleotide reversal agent to its complement in the aptamer disrupts the structure of the aptamer and causes release of the aptamer's target molecule. An oligonucleotide reversal agent can also include sequence complementary to a non-double stranded region of an aptamer. One such oligonucleotide reversal agent configuration includes a sequence element complementary to a single-stranded portion of a target aptamer and a sequence element complementary to an adjacent double-stranded portion of the target aptamer. In this configuration, the oligonucleotide reversal agent can efficiently initiate hybridization to the single-stranded portion of the aptamer, and then strand-displace the adjacent double-stranded portion of the aptamer to promote release of the aptamer from its target.

Small molecule reversal agents can be selected from, for example, a library of small molecules, which can include, for example, amino acids, oligopeptides, polypeptides, proteins, or fragments of peptides or proteins; nucleic acids (e.g., antisense; DNA; RNA; or peptide nucleic acids, PNA); carbohydrates or polysaccharides, or an organic or inorganic compound (e.g., including heterorganic and organometallic compounds). Each member of the library can be singular or can be a part of a mixture (e.g., a compressed library). The library can contain purified compounds or can be "dirty" (i.e., containing a significant quantity of impurities). Commercially available libraries can be obtained, for example, from Affymetrix, ArQule, Neose Technologies, Sarco, Ciddco, Oxford Asymmetry, Maybridge, Aldrich, Panlabs, Pharmacopoeia, Sigma, or Tripose, among others.

The use of reversal agents permits a reversible, tag-less cell selection. An advantage of the release of aptamer-bound cells in this manner is that the isolated cells will have relatively little aptamer bound to them. This is in contrast to the use of antibodies to isolate cells, in which it is difficult to get the antibodies to dissociate from the cells after the cells are isolated. Depending upon how cells are incubated with aptamer, e.g., whether the aptamers are initially bound to a solid support or are first incubated in solution then pulled down via an affinity pair, and how cells are incubated with reversal agent (e.g., reversal agent concentration, timing, etc.) the amounts of aptamer remaining bound to isolated cells after reversal can be, for example, 50% or less, 40% or less, 30% or less, 20% or less, 10% or less, or even 5% or less of the aptamer used for binding.

As described herein, an oligonucleotide reversal agent can additionally or alternatively comprise nucleobase (often referred to in the art simply as "base") modifications or substitutions. As used herein, aptamer and reversal agent nucleobases include the purine bases adenine (A) and guanine (G), and the pyrimidine bases thymine (T), cytosine (C), and uracil (U). Modified nucleobases include other synthetic and natural nucleobases, such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, 7-deazaguanine and 7-deazaadenine and 3-deazaguanine and 3-deazaadenine.

Synthetic oligonucleotides of a reversal agent can include but are not limited to peptide nucleic acid (PNA), bridged nucleic acids (BNA), morpholinos, locked nucleic acids (LNA), glycol nucleic acids (GNA), threose nucleic acids (TNA), or any other xeno nucleic acid (XNA) described in the art.

Oligonucleotide reversal agents can be synthesized by the same methods used for the synthesis of nucleic acid aptamers as described herein.

Oligonucleotide reversal agents generally consist of short oligonucleotide strands that typically range from 8 to 50 nucleobases in length, but can be as long as the target aptamer or longer. In some embodiments, oligonucleotide reversal agents can comprise polynucleotide lengths of 8 or more, 10 or more, 20 or more, 30 or more, 40 or more, 50 or more, 60 or more, 70 or more, 80 or more, 90 or more, 100 or more and beyond.

Reversal agent selection can include designing complementary oligonucleotide sequences to the 3' end of an aptamer (also see Table 5 in EXAMPLE 1), or to any region of the aptamer known or predicted to participate in intramolecular base pairing.

In some embodiments, binding of the cells of interest with 5 nM aptamer can be carried out with secondary fluorescent streptavidin labeling. Labeled cells can be incubated with varying fold-excess (over the amount of aptamer used) in, e.g., 200 microliters (μL) of reversal agent in wash buffer with 1% (weight/volume) BSA for different times and temperatures. Cells can be washed twice with wash buffer and 1% (weight/volume) BSA to remove eluted aptamers, followed by fixation, and/or flow cytometry analysis.

In some embodiments, the concentration of reversal agent added to the mixture of cells is 1 nanomolar or more, 10 nanomolar or more, 100 nanomolar or more, 1 micromolar or more, 10 micromolar or more, 100 micromolar or more, 1 millimolar or more and beyond. The reversal agent can be from 0.1-fold to 100-fold excess of the aptamer concentration.

In some embodiments, a toehold region of an aptamer can facilitate reversal agent hybridization that disrupts the secondary structure of the chosen aptamer. The toehold region can be at the end of the aptamer or internally within the aptamer at a single stranded region, depending on the predicted secondary structure.

Characterization of Aptamer Cell Binding

Nucleic acid aptamers identified by the cell-SELEX method described herein, or by another method as known in the art can be characterized by a number of approaches including but not limited to aptamer binding assays, next generation sequencing, gene profiling, functional assays such as cytotoxicity assays, cytokine release assays, and in vivo delivery of, for example, native or modified cells isolated through use of the aptamers to an animal or human model. The above methods can serve as quality control of the compositions and method of cell selection described herein.

To characterize aptamer binding to target cells or cells of interest, an in vitro binding assay can be performed, for example, as follows. A population comprising, e.g., $2 \times 10^5$ or more cells of interest (e.g., T cells) is incubated with folded FAM-labeled ssDNA pools or FAM/biotin-labeled individual aptamers for 30 minutes at 4° C. in binding buffer as described herein, and at various concentrations of aptamer.

In some embodiments, the aptamers are labeled with biotin, avidin, streptavidin, agarose, or neutravidin.

In some embodiments the aptamers are labeled with a fluorophore. Non-limiting examples of fluorophores include fluorescein, rhodamine, Oregon green, eosin, Texas red, cyanins, e.g., Cy5.5, among others.

Following incubation, e.g., in a total volume of 100 μl, cells are washed twice in, e.g., 200 μL of wash buffer supplemented with 1% (weight/volume) BSA to remove excess aptamer. If the aptamers used were biotinylated, cells can undergo a second incubation with 100 μL fluorescently-labeled streptavidin or neutravidin secondary label for 20 min at 4° C. in wash buffer with 1% BSA before again washing twice. Stained cells are fixed, e.g., in 200 μL wash buffer with 1% BSA (weight/volume) and 0.1% (weight/volume) paraformaldehyde (PFA) before analyzing via flow cytometry.

At a minimum, an aptamer that specifically binds a given target cell or cell surface marker binds a cell expressing that marker with at least 100× greater affinity than the binding of the aptamer to a cell that does not express that marker, and preferably with at least 200× greater affinity, at least 300× greater affinity, at least 500× greater affinity, at least 600× greater affinity, at least 700× greater affinity, at least 800× greater affinity, at least 900× greater affinity, at least 1,000× greater affinity or more.

Affinity can be expressed in terms of dissociation constant, or Kd. An aptamer that selectively binds a cell surface marker will generally bind with a Kd below 1 micromolar (1 μM). Aptamers have been described that bind their targets with Kds in the picomolar (pM) range. However, aptamers useful for cell selection can bind in the range of 1 μM to 10 pM, 1 μM to 100 pM, 1 μM to 200 pM, 1 μM to 300 pM, 1 μM to 400 pM, 1 μM to 500 pM, 1 μM to 600 pM, 1 μM to 700 pM, 1 μM to 800 pM, 1 μM to 900 pM, 1 μM to 1 nM, 1 μM to 10 nM, 1 μM to 50 nM, 1 μM to 100 nM, 1 μM to 150 nM 1 μM to 200 nM, 1 μM to 250 nM, 1 μM to 300 nM, 1 μM to 350 nM, 1 μM to 400 nM, 1 μM to 450 nM, 1 μM to 500 nM, 1 μM to 550 nM, 1 μM to 600 nM, 1 μM to 650 nM, 1 μM to 700 nM, 1 μM to 750 nM, 1 μM to 800 nM, 1 μM to 850 nM, 1 μM to 900 nM, 1 μM to 950 nM, less than 500 nM to 10 pM, less than 450 nM to 10 pM, less than 400 nM to 10 pM, less than 350 nM to 10 pM, less than 300 nM to 10 pM, less than 250 nM to 10 pM, less than 200 nM to 10 pM, less than 150 nM to 10 pM, less than 100 nM to 10 pM, less than 50 nM to 10 pM, less than 100 nM to 900 pM, less than 100 nM to 800 pM, less than 100 nM to 700 pM, less than 100 nM to 600 pM, less than 100 nM to 500 pM, less than 100 nM to 400 pM, less than 100 nM to 300 pM, less than 100 nM to 200 pM, less than 100 nM to 100 pM, less than 100 nM to 50 pM, or less than 100 nM to 10 pM.

Various methods are known in the art for determining Kd for an aptamer's binding to its target. Jing & Bowser, Anal. Chim. Acta 686:9-18, which is incorporated herein by reference, reviews various approaches. The Examples described herein provide a flow cytometry-based assay; see, e.g., Example 1, and FIG. 6D and the description of FIG. 6D.

Cell Selection Quality Control and Traceless Cell Selection Methods Using Cell-Selected Aptamer Pools Flow cytometry analysis along with other methods for cellular identification can be used to evaluate aptamer/cell interactions and the ability to select target cells using a given aptamer or combination of aptamers. OneComp eBeads (Invitrogen) can be used to prepare single-color controls for compensation, if needed. Stained biological samples can be analyzed, for example, using a MACSQuant Analyzer 10 (Miltenyi), Attune NxT (Invitrogen), or BD LSRFortessa (BD Biosciences) flow cytometer.

Traceless cell selection methods using cell-SELEX aptamer pools are described herein and demonstrated in the Examples. In one approach, for each competitive cell-SELEX biological sample (e.g. PBMCs), two 100 microliter (μL) aliquots of anti-biotin magnetoresponsive microbeads (Miltenyi) are each diluted to 500 microliters (μL) in binding buffer with 5 nM aptamer specific for the cell or cell marker, e.g., CD8, and incubated for 15 min at 4° C. under gentle rotation.

In some embodiments, the microbead can be substituted by another solid support, e.g., as described herein.

In some embodiments, the amount of aptamers incubated with cells for cell selection is 1 picomole (pM) or more, 1 nanomole (nM) or more, 1 micromole (μM) or more.

The presence of tRNA or another non-specific nucleic acid in the binding buffer can be useful during the cell selection step, as the tRNA or other non-specific nucleic acid can help to block non-specific binding of the aptamer or, when present, an oligonucleotide reversal agent.

In some embodiments, then, the binding buffer can comprise, for example, 0.1 mg/ml tRNA, 0.1 g/L $CaCl_2$), 0.2 g/L KCl, 0.2 g/L $KH_2PO_4$, 8.0 g/L NaCl, 2.1716 $Na_2HPO_4$ septahydrate, supplemented with 25 mM glucose, 5.5 mM $MgCl_2$ hexahydrate, varying amounts of bovine serum albumin (BSA), with a pH of 7.5.

For cell selection, aptamer-labeled or conjugated bead suspensions are added, for example, to $200 \times 10^6$ freshly-isolated cells (e.g., PBMCs), and allowed to incubate for 15 min at 4° C. under gentle rotation. The length of incubation time, temperature, and number of cells can be varied by the ordinarily skilled artisan. While various parameters such as temperature, ionic strength, etc. can affect aptamer binding properties, it should be kept in mind that the aptamers must bind under conditions that maintain cell viability. The temperature, ionic strength, etc. should only be varied in the ranges tolerated by viable cells or cells that can be thawed and become viable following cell selection.

In some embodiments, the biological sample can comprise whole blood, buffy coat, or isolated mononuclear cells.

Magnetic separation can be performed using, e.g., the Miltenyi MACS cell separation system (e.g., QUADRO-MACS™). Bound cells are washed with 10 milliliters (mL) autoMACS buffer with 0.5% (weight/volume) BSA to remove excess beads, resuspended in autoMACS buffer with 0.5% (weight/volume) BSA, and applied to LS Columns on a magnetic separator per the manufacturer's instructions.

A flow through (FT) fraction can be isolated that includes the flow through from the initial application of cells and, e.g., three subsequent 3 mL column washes.

A 5 milliliter (mL) column flush (CF) can be used to remove CD8 Microbead-labeled cells from the column when removed from the magnet. 1 mL of 500 nanomolar (nM) reversal agent (100-fold excess) in autoMACS buffer with 0.5% (weight/volume) BSA and 5 millimolar (mM) magnesium chloride ($MgCl_2$) can be applied to the column on the magnet, such that aptamer-bound cells captured by the magnet are released into suspension from the aptamer-functionalized beads.

The concentration of reversal agent can vary, depending upon the nature of the agent (e.g., small molecule vs. oligonucleotide) and its binding kinetics with the aptamer.

Approximately 600-700 microliters (μL) of the reversal agent solution can be passed through the column before it is plugged with a M/F Luer Lock Plug (Smiths Medical) for a 10-minute incubation at room temperature or any conditions that permit the use of a functional reversal agent. Upon removal of the plug, the column can be washed three times with 3 milliliters (mL) autoMACS buffer with 0.5% (weight/volume) BSA and 5 millimolar (mM) ethylenediaminetetraacetic acid (EDTA), which constitutes the reversal agent elution (RAE) fraction.

The reversal agent eluted cells can be immediately spun down and re-suspended in fresh buffer to remove any remaining reversal agent. Remaining cells on the column can be removed with a column flush as described herein.

Uses for Cells Selected on the Basis of Aptamer Binding

Large scale preparation or manufacturing of specific cell types is becoming increasingly useful for cellular-based therapies. Non-limiting examples of cell therapies include stem cell therapy using any of a number of cell progenitor types (e.g., treatment of spinal cord injuries, myocardial infarction, etc.), immunotherapy for the treatment of cancer, and allogenic cell therapy for diabetes, among others. The methods and compositions described herein provide an efficient approach for the isolation of specific target cell types that is readily scaled up for the large-scale isolation of cells for these and other uses.

It is also contemplated that the methods described herein can be used to improve stem cell differentiation by isolating cells with aptamers that are specific for cell surface markers that represent a given stage of cellular development for a particular cell type of interest. Therefore, the cell isolation methods described herein can serve as a quality control step for stem cell therapies.

In some embodiments, cells selected as described herein can be used in their natural form for therapeutic treatment of diseases or to relieve symptoms of disease. Thus, the aptamer selected cells can be useful in treating animals, including mammals, including humans for a disease or disorder treatable with such cells. In other embodiments, the cells are manipulated and/or expanded prior to introduction to a patient. The cells can be autologous to the patient, allogeneic, or even xenogenic. Manipulations can include, as non-limiting examples, further cell sorting, stimulation with antigen, induction of differentiation, and/or genetic modification. Manipulated cells can be, but are not necessarily expanded prior to administration.

In one embodiment, the cellular therapy is useful for the treatment of cancer, or for the treatment of infection, e.g., with a virus, including, but not limited to human immunodeficiency virus (HIV).

Currently, the generation and administration of autologous CAR T cell cancer therapy involves harvesting and genetically manipulating T cells before reintroducing the engineered cells back to patients.

Chimeric Antigen Receptors (CARs) are recombinant proteins that allow T cells modified to express them to recognize a specific protein (antigen) on tumor cells. T cells engineered to express a CAR, referred to as CAR T cells, are expanded in the laboratory and then infused into the patient. After the infusion, the T cells multiply in the patient's body and, with guidance from their engineered receptor, recognize and kill cancer cells that display the antigen on their surfaces.

The first step in the process, cell harvesting, requires high purity isolation of desired cell populations. For example, it is known in the art that CAR T cells with defined 1:1 CD4+ to CD8+ cell populations are more potent than either pure (CD4+ or CD8+ only) and unselected populations in animal models of leukemia and are also very effective in human clinical trials for ALL.

T cells are typically isolated from peripheral blood mononuclear cells (PBMCs) collected by leukapheresis. The main methods for clinical-scale T cell isolation include (i) immunodepletion of undesired cells followed by selection of T cell populations using antibody-conjugated magnetic beads (e.g., CliniMACS) and (ii) "traceless" selection using Streptamer technology, which is based on fragment antigen-binding (Fab) constructs immobilized on magnetic beads. The first method results in a final cell population that is still associated with antibody coated magnetic beads, and can have low yield and purity of target cells. The Streptamer method partially avoids this outcome through Fabs fused with a peptide tag that bind reversibly to magnetic beads coated with engineered streptavidin. The Fabs can be released from the beads by competition with high affinity D-biotin, and therefore must be engineered with relatively low receptor binding affinity so that they dissociate rapidly from the cell once released in the monovalent form. While the extent of Fab internalization into the cells is unclear after release from the solid support, Fabs engineered with relatively low receptor binding are not significantly retained on the cell surface. However, this method still has poor yield of target cells, with an average 50% cell loss at each selection step. Furthermore, both of the aforementioned methods are associated with significant cost due to the use of biologically-produced antibodies or Fabs.

The clinical impact of T cell therapies is being rapidly realized with two recent FDA approvals for CAR T cell therapies treating acute lymphoblastic leukemia (ALL) and diffuse large B-cell lymphoma, as well as many promising results in clinical trials.

Examples of cancer that can be treated using cells prepared using the methods and compositions described herein include, but are not limited to, carcinoma, lymphoma, blastoma, sarcoma, and leukemia. More particular examples of such cancers include, but are not limited to, basal cell carcinoma, biliary tract cancer; bladder cancer; bone cancer; brain and CNS cancer; breast cancer; cancer of the peritoneum; cervical cancer; cholangiocarcinoma; choriocarcinoma; colon and rectal cancer; connective tissue cancer; cancer of the digestive system; endometrial cancer; esophageal cancer; eye cancer; cancer of the head and neck; gastric cancer (including gastrointestinal cancer); glioblastoma; hepatic carcinoma; hepatoma; intra-epithelial neoplasm; kidney or renal cancer; larynx cancer; leukemia; liver cancer; lung cancer (e.g., small-cell lung cancer, non-small cell lung cancer, adenocarcinoma of the lung, and squamous carcinoma of the lung); lymphoma including Hodgkin's and non-Hodgkin's lymphoma; melanoma; myeloma; neuroblastoma; oral cavity cancer (e.g., lip, tongue, mouth, and pharynx); ovarian cancer; pancreatic cancer; prostate cancer; retinoblastoma; rhabdomyosarcoma; rectal cancer; cancer of the respiratory system; salivary gland carcinoma; sarcoma; skin cancer; squamous cell cancer; stomach cancer; teratocarcinoma; testicular cancer; thyroid cancer; uterine or endometrial cancer; cancer of the urinary system; vulval cancer; as well as other carcinomas and sarcomas; as well as B-cell lymphoma (including low grade/follicular non-Hodgkin's lymphoma (NHL); small lymphocytic (SL) NHL; intermediate grade/follicular NHL; intermediate grade diffuse NHL; high grade immunoblastic NHL; high grade lymphoblastic NHL; high grade small non-cleaved cell NHL; bulky disease NHL; mantle cell lymphoma; AIDS-related lymphoma; and Waldenstrom's Macroglobulinemia); chronic lymphocytic leukemia (CLL); acute lymphoblastic leukemia (ALL); Hairy cell leukemia; chronic myeloblastic leukemia; and post-transplant lymphoproliferative disorder (PTLD), as well as abnormal vascular proliferation associated with phacomatoses, edema (such as that associated with brain tumors), tumors of primitive origins and Meigs' syndrome.

The generation of CAR-T cells that target CD19 tumor antigen is described in the Examples herein, and a number of methods are known in the art. Autologous or allogeneic T cells for generating CAR-T cells specific for this and essentially any other antigen can be isolated using any aptamer or combination thereof that specifically binds a marker on a desired subset of T cells, and the methods and compositions described herein. An array of different chimeric antigen receptor constructs, comprising, for example, various combinations of intracellular domains, are known in the art, and any of them, or any subsequently arising variation of then can be introduced to cells isolated according to the methods described herein. Introduction can be through, e.g., viral vectors, plasmids, naked DNA or any other approach that permits the introduction of nucleic acids to a cell. Not only can CAR-T cells be prepared using the aptamer-based methods described herein to isolate the starting T cells, but an aptamer-based cell selection method can also be applied to the selection of T cells that successfully express the CAR on their surface, e.g., through use of an aptamer selected for specific binding to a determinant on the extracellular domain of the CAR itself, or on a surrogate marker, e.g., EGFR, expressed on the CAR construct.

The methods and compositions described herein can also be used for aptamer-based selection of CAR macrophages. CAR macrophages have been described in the art to target solid tumor cells for phagocytosis (see Morrissey et al. eLife. 2018; Alvey et al. Journal of Leukocyte Biology. 2017; Lim et al, Cell 1995). Surface markers to isolate macrophages for CAR macrophage preparation include but are not limited to Megf10, Bail, MerTK, and CD47. Macrophages successfully transformed to CAR macrophages can also be selected from a culture through aptamer binding to the CAR itself or to a surrogate marker, e.g., EGFR, expressed on the CAR construct. The ability to target a surrogate cell surface marker encoded by a modifying construct with an aptamer that binds that marker finds use in any of a wide range of other cell modification and isolation applications.

In addition to cancer, CAR T cells have also been generated as potential anti-HIV therapies. Recent studies by Hale et al., 2017 have shown that T cells utilizing CARs based on single-chain variable fragments (scFvs) derived from high-affinity broadly neutralizing antibodies (bNAbs) and containing second-generation co-stimulatory domains, in parallel with genetic protection from HIV can disrupt CCR5, and effectively target HIV-infected cells.

Another cell-based cancer therapeutic approach includes the use of dendritic cells primed to introduce antigen to T cells and thereby provoke an anti-tumor immune response. So-called dendritic cell vaccines are prepared by differentiating monocytes to dendritic cells in vitro and stimulating the dendritic cells with either a specific tumor antigen, or a preparation derived from the patient's tumor, before reintroducing the activated, antigen-presenting dendritic cells to the patient. Markers for monocytes capable of being differentiated to dendritic cells are known and can be targeted with aptamers according to the methods described herein to provide autologous cells for dendritic cell vaccine preparations.

In some embodiments, cells isolated using aptamers according to the methods described herein can also be modified using CRISPR/Cas9, RNAi, transfection, or any other type of genetic modification known in the art. Aptamer-based cell isolation can also be used to isolate cells successfully transformed with an exogenous construct, using either an aptamer that binds the product of the construct or that binds a surrogate cell surface marker encoded on the same construct.

In some embodiments, the selected cells are stem cells or progenitor cells. Non-limiting examples of such cells include hematopoietic stem cells, mesenchymal stem cells, neural stem cells, cardiac stem cells, embryonic stem cells, or any other stem cell known in the art. It is contemplated that the stem cells selected can be at any stage of their differentiation, dependent upon the choice of cell surface markers targeted by the aptamers. The aptamer-based cell isolation approaches described herein can also be applied, for example, to the isolation of induced pluripotent stem cells by binding of stem cells arising from a reprogramming regimen to aptamers specific for pluripotent stem cell markers. The markers Oct4 and Nanog are markers of pluripotency, but are intracellular proteins that will not necessarily be accessible to aptamers in viable cells. Cell surface markers of pluripotency include, for example, XXJF81%XXJF9%fsi%HI>1%fr tsl%tymjwx3

Therapeutic uses of stem cells include uses in the treatment of heart disease (e.g., myocardial infarction), diabetes, traumatic brain injury, neurodegenerative diseases (e.g., Parkinson's disease, amyotrophic lateral sclerosis (ALS), spinal cord injury, vascular diseases, blood diseases (e.g. aplastic anemia), visual impairment, and infertility, among others. The aptamer-based cell isolation methods described herein can be used to both isolate stem cells, e.g., on the basis of stem cell marker expression, as well as to isolate differentiation products of the stem cells, e.g., on the basis of reversible aptamer binding to differentiation-specific markers on the cell type of interest when the preparation of stem cell-derived cells or tissues is desired. Thus, it is also contemplated that the selected cells can also be used for regeneration, supplementation or replacement of cells or tissues, including but not limited to the generation of bone, muscle, ligaments, tendons, nerves, or skin to repair wounds.

Administration of Cell-Based Therapeutics

In some aspects, the methods provided herein comprise delivering a plurality of aptamer-selected cells or their progeny or differentiation product cells to a host tissue. As described herein, cells isolated or selected by aptamers according to the methods described herein can be incorporated into pharmaceutical compositions suitable for administration to a subject, e.g., for in vivo delivery to tissues, or organs of the subject.

The dosage ranges for the composition comprising a cell of interest includes amounts large enough to produce the desired effect, e.g., expression of the desired gene product (e.g., an antibody), or treatment of a disease, e.g., cancer. The dosage should not be so large as to cause unacceptable adverse side effects. Generally, the dosage will vary with the particular characteristics of cell of interest, and with the age, condition, and sex of the patient. The dosage can be determined by one of skill in the art and, unlike traditional cell therapies, can also be adjusted by the individual physician in the event of any complication.

In some embodiments, the cells of interest are delivered for a repeated or limited amount of time. In some embodiments, the doses are given once a day, or multiple times a day. The duration of treatment depends upon the subject's clinical progress and responsiveness to therapy.

Compositions comprising the aptamer-selected cells of interest can be delivered to target cells or tissues by surgical implantation, intravenous administration, intra-arterial administration, intraperitoneal administration, limb perfusion, (optionally, isolated limb perfusion of a leg and/or arm; see, e.g., Arruda et al., (2005) Blood 105:3458-3464), and/or direct intramuscular injection. Administration to a muscle (e.g. the diaphragm) can be by any suitable method including intravenous administration, intra-arterial administration, and/or intra-peritoneal administration.

In some embodiments, one or more additional compounds can also be included with the cells of interest to alleviate symptoms of a disease or to otherwise assist or support the function of the administered cells.

In some embodiments, the additional compound can be a therapeutic agent. The therapeutic agent can be selected from any class suitable for the therapeutic objective. In other words, the therapeutic agent can be selected according to the treatment objective and biological action desired. Furthermore, the active ingredients of the therapeutic agent can be mixed with optional pharmaceutical additives such as excipients or carriers which are pharmaceutically acceptable and compatible with the active ingredient.

The cells of interest being delivered as a therapeutic agent can further comprise a targeting moiety for the tissue of interest. For example, the targeting moiety can comprise a receptor molecule, including receptors that naturally recognize a specific desired molecule of a target cell. Such receptor molecules include receptors that have been modified to increase their specificity of interaction with a target molecule, receptors that have been modified to interact with a desired target molecule not naturally recognized by the receptor, and fragments of such receptors (see, e.g., Skerra, 2000, J. Molecular Recognition, 13:167-187). In other embodiments, the targeting moiety can comprise a ligand molecule, including, for example, ligands which naturally recognize a specific desired receptor on a target cell. Such ligand molecules include ligands that have been modified to increase their specificity of interaction with a target receptor, ligands that have been modified to interact with a desired receptor not naturally recognized by the ligand, and fragments of such ligands.

In other embodiments, the targeting moiety can comprise an aptamer that has not been used in the initial cell selection as described herein.

It is understood that the preceding detailed description and the following examples are illustrative only and are not to be taken as limitations upon the scope of the invention. Various changes and modifications to the disclosed embodiments, which will be apparent to those of skill in the art, may be made without departing from the spirit and scope of the present invention. Further, all patents, patent applications, and publications identified are expressly incorporated herein by reference for the purpose of describing and disclosing, for example, the methodologies described in such publications that might be used in connection with the present invention. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents are based on the information available to the applicants and do not constitute any admission as to the correctness of the dates or contents of these documents.

Some embodiments of the methods and compositions described herein can be defined according to any of the following numbered paragraphs:

1. A method for isolating a cell of interest from a biological sample comprising a plurality of cell types, the method comprising:
 a. contacting the biological sample with an aptamer that specifically binds a cell surface marker that is specific for the cell of interest under conditions that permit forming aptamer-bound cells;
b. separating the aptamer-bound cells from cells not bound to the aptamer; and
c. recovering the cell of interest by disrupting binding of the aptamer to the cell surface marker, whereby the cell of interest is isolated from the biological sample.

2. The method of paragraph 1, wherein the cell of interest is viable.

3. The method of paragraph 1 or paragraph 2, wherein the cell of interest is a leukocyte.

4. The method of any one of paragraphs 1-3, wherein the cell of interest is a lymphocyte or a monocyte.

5. The method of any one of paragraphs 1-4, wherein the cell of interest is a T cell.

6. The method of any one of paragraphs 1-5, wherein the cell of interest is a CD3+ cell, a CD4+ cell, a CD8+ cell.

7. The method of any one of paragraphs 1-6, wherein the aptamer comprises a label.

8. The method of any one of paragraphs 1-7, wherein separating step (b) comprises the use of a first solid support or a phase-changing agent.

9. The method of any one of paragraphs 1-8, wherein the aptamer is (i) conjugated or immobilized to a first solid support, and/or (ii) labeled with a first member of an affinity pair.

10. The method of paragraph 9, wherein the separating step (b) comprises either (i) removing from the biological sample aptamer-bound cells bound to the first solid support via the aptamer, or (ii) adding a second solid support bearing a second member of the affinity pair, to permit physical association of the aptamer to the second solid support via the interaction of the first and second members of the affinity pair, and removing from the biological sample aptamer-bound cells.

11. The method of paragraph 9 or paragraph 10, wherein the aptamer is conjugated to a phase-changing agent.

12. The method of any one of paragraphs 9-11, wherein the contacting step (a) is performed under conditions in which the phase-changing agent is in the solution phase and wherein the separating step comprises (b) inducing the phase-changing agent to precipitate from solution, whereby aptamer-bound cells are removed from the biological sample.

13. The method of any one of paragraphs 8-12 wherein the first and/or second solid support comprises a magnetoresponsive bead.

14. The method of any one of paragraphs 8-12, wherein the first and/or second solid support comprises a polymer, metal, ceramic, glass, hydrogel, or resin.

15. The method of paragraph 13, wherein the separating step comprises subjecting the sample to a magnetic field, whereby solid support comprising aptamer-bound cells is separated from the biological sample.

16. The method of any one of paragraphs 1-15, wherein the reversal agent comprises a polyanion, a small molecule, or an oligonucleotide or oligonucleotide mimic comprising a sequence sufficiently complementary to a sequence of the aptamer to hybridize to the aptamer and thereby disrupt binding of the aptamer to the cell surface marker.

17. The method of any one of paragraphs 1-16, wherein the aptamer-bound cells comprise cells double-positive for a selected pair of markers including the marker bound by the aptamer.

18. The method of any one of paragraphs 1-17, wherein an isolated fraction of cells comprises cells that are double-positive for a selected pair of markers including the marker bound by the aptamer.

19. A method of isolating a plurality of cell fractions from a biological sample, the method comprising:
a. contacting a biological sample with a plurality of aptamers that specifically binds cell surface markers specific for a plurality of different cells of interest, under conditions that permit forming aptamer-bound cells
b. separating a population of aptamer-bound cells from non-aptamer-bound cells
c. sequentially adding to the aptamer-bound cells separated in step (b) a plurality of reversal agents that disrupt binding of one or more of the plurality of aptamers to one or more of the plurality of cell surface markers, whereby each sequentially added reversal agents elutes different cell fractions from the population of cells separated in step (b), thereby isolating a plurality of different cell fractions from a biological sample.

20. The method of paragraph 19, wherein the plurality of reversal agents comprises a polyanion, a small molecule, an oligonucleotide or oligonucleotide mimic comprising a sequence sufficiently complementary to a sequence of an aptamer of the plurality of aptamers to hybridize to the aptamer and thereby disrupt binding of the aptamer to its cell surface marker, or a combination thereof.

21. The method of paragraph 19 or 20, wherein the plurality of aptamers are bound to one or more solid supports or phase-changing agents.

22. The method of paragraph 21, wherein the solid support comprises a magnetoresponsive bead.

23. The method of paragraph 21 or 22, wherein the solid support comprises a polymer, metal, ceramic, glass, hydrogel, or resin.

24. The method of any of paragraphs 21-23, wherein the solid support comprising cell populations bound to the plurality of different aptamers are separated from the biological sample by subjecting the sample to a magnetic field.

25. The method of any one of paragraphs 19-24, wherein the aptamer-bound cells are leukocytes.

26. The method of any one of paragraphs 19-25, wherein the aptamer-bound cells are lymphocytes.

27. The method of any one of paragraphs 19-26, wherein the aptamer-bound cells are T cells.

28. The method of any one of paragraphs 19-27, wherein the aptamer-bound cells express CD3, CD8 and/or CD4.

29. A method of isolating, from a biological sample, a cell fraction enriched for cells that are double-positive for a pair of target cell markers, the method comprising:
a. contacting a biological sample with a first aptamer that specifically binds a first target cell surface marker, under conditions that permit forming aptamer-bound cells;
b. separating a population of aptamer-bound cells from non-aptamer-bound cells;
c. contacting the population of aptamer-bound cells separated in step (b) with a first reversal agent that disrupts binding of the first aptamer to the cells separated in step (b), thereby isolating a population of cells positive for the first target cell surface marker;
d. contacting the population isolated in step (c) with a second aptamer that specifically binds a second target cell surface marker, under conditions that permit forming aptamer-bound cells;

e. separating a population of aptamer-bound cells formed in step (d) from non-aptamer-bound cells; and
f. contacting the population of aptamer-bound cells separated in step (e) with a second reversal agent that disrupts binding of the second aptamer to the cells separated in step (e), thereby isolating a population of cells positive for the first and second target cell surface markers.

30. The method of paragraph 29, wherein the reversal agents comprise a small molecule, a polyanion, an oligonucleotide or oligonucleotide mimic comprising a sequence sufficiently complementary to a sequence of a respective aptamer to hybridize to the aptamer and thereby disrupt binding of the aptamer to the cell surface marker, or a combination thereof.

31. The method of paragraph 29 or paragraph 30, wherein the first and/or second aptamer is immobilized or conjugated to one or more solid supports or phase-changing agents.

32. The method of paragraph 31, wherein the solid support comprises a magnetoresponsive bead, a polymer, metal, ceramic, glass, hydrogel, or resin.

33. The method of paragraph 31 or paragraph 32, wherein the solid support comprises a magnetoresponsive bead and wherein cell populations bound to the first and/or second aptamers are separated by subjecting the cell populations to a magnetic field.

34. The method of any one of paragraphs 29-33, wherein the aptamer-bound cells comprise lymphocytes.

35. The method of any one of paragraphs 29-34, wherein the aptamer-bound cells comprise T cells.

36. The method of any one of paragraphs 29-35, wherein the cells isolated in step (f) comprise CD3+ T cells, CD8+ T cells, CD4+ T cells, CD3+CD4+ T cells, or CD3+CD8+ T cells.

37. A method of separating cells of interest in a biological sample on the basis of degree of expression of a cell surface marker, the method comprising:
   a. contacting the biological sample with aptamers that specifically bind cell surface markers that are specific for the cells of interest under conditions that permit forming aptamer-bound cells;
   b. separating the aptamer-bound cells from cells not bound to the aptamer; and
   c. contacting the aptamer-bound cells separated in step (b), either step-wise or as a gradient, with increasing concentrations of a reversal agent that disrupts binding of the aptamer to the cell surface marker;
   whereby the cells of interest in the biological sample are separated on the basis of the degree of expression of the cell surface marker, such that cells in the sample with lower marker expression (marker$^{lo}$) are eluted from the aptamer at lower concentrations of reversal agent and cells in the population with higher marker expression (marker$^{hi}$) are eluted at higher concentrations of reversal agent.

38. The method of paragraph 37, wherein the reversal agent comprises a polyanion, a small molecule, an oligonucleotide or oligonucleotide mimic comprising a sequence sufficiently complementary to a sequence of the aptamer to hybridize to the aptamer and thereby disrupt binding of the aptamer to the cell surface marker, or a combination thereof.

39. A method of separating cells of interest in a biological sample on the basis of degree of expression of a cell surface marker, the method comprising:
   a. contacting the biological sample with an aptamer that specifically binds a cell surface marker that is specific for the cells of interest under conditions that permit forming aptamer-bound cells;
   b. separating aptamer-bound cells from cells not bound to the aptamer; and
   c. contacting the aptamer-bound cells separated in step (b), sequentially with a plurality of reversal agents differing in kinetics of displacement or aptamer affinity and reversal agents added in the order of increasing relative kinetics of displacement or relative aptamer affinity,
   whereby the cells of interest in the biological sample are separated on the basis of the degree of expression of the cell surface marker, such that cells in the sample with lower marker expression (marker$^{lo}$) are eluted from the aptamer by a reversal agent with slower relative kinetics of displacement or lower relative aptamer affinity, and cells in the population with higher marker expression (marker$^{hi}$) are eluted by a reversal agent with faster relative kinetics of displacement or higher relative aptamer affinity.

40. The method of paragraph 39, wherein the reversal agents comprise a polyanion, a small molecule, an oligonucleotide or oligonucleotide mimic comprising a sequence sufficiently complementary to a sequence of the aptamer to hybridize to the aptamer and thereby disrupt binding of the aptamer to the cell surface marker, or a combination thereof.

41. The method of any one of paragraphs 37-40, wherein the cells of interest are leukocytes.

42. The method of any one of paragraphs 37-41, wherein the cells of interest are lymphocytes.

43. The method of any one of paragraphs 37-42, wherein the cells of interest are T cells.

44. The method of any one of paragraphs 37-43, wherein the cells of interest are CD8 expressing cells.

45. The method of any one of paragraphs 37-44, wherein the aptamer is bound to one or more solid supports or phase-changing agents.

46. The method of paragraph 45, wherein the one or more solid supports or phase-changing agents comprise magnetoresponsive beads.

47. The method of paragraph 45 or 46, wherein the one or more solid supports comprise a polymer, metal, ceramic, glass, hydrogel, or resin.

48. The method of any one of paragraphs 45-47, wherein the separating step (b) comprises subjecting the sample to a magnetic field, whereby the solid support comprising cell populations bound to the plurality of different aptamers are separated from the biological sample.

49. A nucleic acid molecule comprising the sequence of any one of SEQ ID NOs: 1-6, 10-14, 17-22, 27-30, 33-48, or 52-77, wherein the nucleic acid molecule selectively binds to human CD8 polypeptide.

50. The nucleic acid molecule of paragraph 49 comprising a compensatory change at a nucleotide pair selected from the group consisting of: nucleotides 3 and 75, 4 and 74, 5 and 73, 6 and 72, 7 and 71, 8 and 70, 9 and 69, 10 and 68, 13 and 54, 14 and 53, 15 and 52, 16 and 51, 17 and 50, 18 and 49, 19 and 48, 25 and 47, 26 and 46, 27 and 45, 28 and 44, 29 and 43, 30 and 42, 31 and 41, 32 and 40, 33 and 39 or 34 and 38; wherein the nucleic acid molecule retains selective binding to CD8 polypeptide relative to the nucleic acid molecule of SEQ ID NO: 1.

51. The nucleic acid molecule of paragraph 49 comprising a compensatory change at two or more nucleotide pairs selected from the group consisting of: nucleotides 3 and 75, 4 and 74, 5 and 73, 6 and 72, 7 and 71, 8 and 70, 9 and 69, 10 and 68, 13 and 54, 14 and 53, 15 and 52, 16 and 51, 17 and 50, 18 and 49, 19 and 48, 25 and 47, 26 and 46, 27 and 45, 28 and 44, 29 and 43, 30 and 42, 31 and 41, 32 and 40, 33 and 39 or 34 and 38; wherein the nucleic acid molecule retains selective binding to CD8 polypeptide relative to the nucleic acid molecule of SEQ ID NO: 3.

52. The nucleic acid molecule of paragraph 49, wherein the nucleic acid molecule is a DNA molecule, an RNA molecule, or a PNA molecule.

53. The nucleic acid molecule of any one of paragraphs 49-52, comprising a modified nucleoside 54. The nucleic acid molecule of paragraph 53, wherein the modified nucleoside is selected from Table 1.

55. A solid support comprising a nucleic acid molecule of any one of paragraphs 49-54.

56. The solid support of paragraph 55, which is a magnetoresponsive bead.

57. The solid support of paragraph 56, wherein the solid support comprises a polymer, metal, ceramic, glass, hydrogel, or resin.

58. The solid support of any one of paragraphs 55-57, that is bound via the nucleic acid molecule to a CD8+ T cell.

59. The nucleic acid of any one of paragraphs 49-54, comprising a label.

60. The nucleic acid of paragraph 59, wherein the label is selected from a biotin label and a fluorescent label.

61. A composition comprising a CD8+ human T cell bound to a nucleic acid of any one of paragraphs 49-54.

62. A nucleic acid of any one of paragraphs 49-54, hybridized to a reversal agent comprising a nucleic acid comprising a sequence complementary to at least eight contiguous nucleotides of the nucleic acid of any one of paragraphs 49-54, respectively.

63. A reversal agent comprising a nucleic acid molecule comprising a sequence comprising at least eight contiguous nucleotides complementary to a nucleic acid of any one of paragraphs 49-54, wherein the reversal agent inhibits binding of the nucleic acid of any one of paragraphs 49-54, respectively, to a human CD8 polypeptide.

64. The reversal agent of paragraph 63, wherein the nucleic acid molecule comprises a sequence comprising at least eight contiguous nucleotides complementary to a nucleic acid of any one of paragraphs 49-54.

65. A method of isolating a CD8+ T cell from a biological sample, the method comprising contacting a biological sample comprising human CD8+ T cells with a nucleic acid of any one of paragraphs 49-54, or with a solid support of any one of paragraphs 55-57, wherein the contacting permits selective binding of CD8+ T cells to the nucleic acid.

66. The method of paragraph 65, wherein the biological sample comprises whole blood, buffy coat, or isolated mononuclear cells.

67. The method of paragraph 65, further comprising, after contacting the biological sample with a nucleic acid of any one of paragraphs 49-54 or a solid support of any one of paragraphs 55-57, the step of contacting the sample with a reversal agent comprising a nucleic acid molecule comprising a sequence of at least eight contiguous nucleotides complementary to the nucleic acid of any one of paragraphs 49-54, wherein the reversal agent inhibits binding of the nucleic acid of any one of paragraphs 49-54 to a human CD8 polypeptide, thereby permitting release of the CD8+ T cell.

68. The method of paragraph 67, wherein the sample is contacted with a solid support of any one of paragraphs 55-57, and wherein the sample is further subjected to a magnetic field, thereby permitting separation of CD8+ T cells bound to the solid support from other cells in the sample.

69. A method of preparing a population of a target cell type or class of cells of interest from a biological sample, the method comprising:
   a. contacting the biological sample with an aptamer that specifically binds a cell surface marker that is specific for the target cells or class of cells of interest under conditions that permit forming aptamer-bound cells;
   b. separating aptamer-bound cells from cells not bound to the aptamer; and
   c. recovering the population of cells of interest by disrupting binding of the aptamer to the cells of interest.

70. A method of selecting aptamer sequences that bind a specific cell type or class of cells of interest with the method comprising:
   i. Incubating the type or class of cell of interest with a single-stranded DNA library comprising randomized sequences of a given length from 20 to 85 nucleotides;
   ii. Isolating single-stranded DNA bound to the cells of interest;
   iii. Incubating isolated single-stranded DNA sequences from step ii with a mixture of cell types including the type or class of cell of interest;
   iv. Isolating of the type or class of cell of interest from the incubation of step iii with an antibody and antibody-specific support column;
   v. Extracting bound single stranded DNA from cells isolated in step iv;
   vi. PCR amplifying bound single stranded DNA sequences from step v;
   vii. Incubating single stranded DNA sequences from step vi with a cell type lacking the surface receptors of interest;
   viii. Separating the un-bound single stranded-DNA from the cells in step vii;
   ix. PCR amplifying un-bound single stranded DNA sequences from step viii;
   x. Repeating steps iii-ix at least two times; and
   xi. Sequencing of single stranded DNA remaining.

71. The method of paragraph 70, wherein the type or class of cells of interest are leukocytes.

72. The method of paragraph 70 or 71, wherein the type or class of cells of interest are lymphocytes.

73. The method of any one of paragraphs 70-72, wherein the type or class of cells of interest are CD2+ T cells, CD3+ T cells, CD4+ T cells, CD8+ T cells or CD28+ T cells.

74. The method of any one of paragraphs 70-72, wherein the type or class of cells of interest expresses a combination of two or more cell surface markers in paragraph 73.

75. The method of any one of paragraphs 70-72, wherein the type or class of cells of interest are hematopoietic stem cells.

76. The method of any one of paragraphs 1, 19, 29, 37, 39, 69 or 70, wherein the method is used for large-scale selection of cell populations of interest or wherein a plurality of cells of interest are isolated.

77. A method of treating a disease or disorder comprising administering a composition of cells isolated by the method of paragraphs 1, 16, 25, 26, 55, or 56, wherein the composition of cells reduces at least one symptom of the disease by at least 10%.

78. The method of paragraph 77, wherein the disease or disorder is cancer.

79. The method of paragraph 77, wherein the disease or disorder is an immune disease.

80. The method of paragraph 77, wherein the disease or disorder is HIV infection.

81. A composition of cells that have been isolated by the method of any one of paragraphs 1-18.

82. A composition of cell fractions that have been isolated by the method of any one of paragraphs 19-28.

83. A composition of cell fractions that have been isolated by the method of any one of paragraphs 29-36.

84. A composition of cells that have been separated by the method of any one of paragraphs 37-38.

85. A composition of cells that have been separated by the method of any one of paragraphs 39-48.

86. A composition of CD8+ T cells that have been isolated by the method of any one of paragraph 65-68.

87. A composition of cells prepared by the method of paragraph 69.

88. A composition of cells that specifically bind the aptamer selected by the method of paragraph 70.

EXAMPLES

The following provides non-limiting Examples demonstrating and supporting the technology as described herein.

The methods and compositions described herein detail several high affinity DNA aptamers for CD8 were identified using a modified cell SELEX procedure and validated binding characteristics of selected aptamers. The aptamers isolate CD8+ T cells from peripheral blood mononuclear cells (PBMCs) with efficiencies comparable to standard methods. Second, a method was developed to reverse aptamer binding using a complementary oligonucleotide sequence to disrupt aptamer folding and show that CD8+ cells can be released from aptamer-immobilized supports with high yield and purity using this approach. Finally, CAR T cells were generated and fully characterized from reversible aptamer selection approach and standard antibody-based CD8 Microbeads. CAR T cells isolated using traceless aptamer selection were phenotypically similar to those isolated using antibodies and exhibited nearly identical effector functions, both in vitro and in vivo. This aptamer-based selection approach therefore enables high efficiency, label-free selection of T cells for potential clinical-scale cell therapy applications. With future aptamer development, this technique can be readily expanded for serial or parallel selection of multiple T cell populations.

Example 1: Identification of T Cell-Binding Aptamers

The clinical impact of T cell therapies is being rapidly realized with two recent FDA approvals for chimeric antigen receptor (CAR) T cell therapies treating acute lymphoblastic leukemia (ALL) and diffuse large B-cell lymphoma (Novartis's Kymriah and Gilead-Kite's Yescarta, respectively), as well as many promising results in clinical trials.[1-4] In addition to cancer, CAR T cells have also been generated as potential anti-HIV therapies.[5,6] Currently, the generation and administration of autologous CAR T cell therapy involves harvesting and genetically manipulating T cells before reintroducing the engineered cells back to patients. The first step in the process, cell harvesting, requires high purity isolation of desired cell populations. For example, Turtle and coworkers have demonstrated that CAR T cells with defined 1:1 CD4+ to CD8+ cell populations are more potent than either pure (CD4+ or CD8+ only) and unselected populations in animal models of leukemia and are also very effective in human clinical trials for ALL.[7,8]

T cells for CAR T cell manufacturing are typically isolated from peripheral blood mononuclear cells (PBMCs) collected by leukapheresis. One method reported for use in clinical-scale T cell isolation is to sequentially isolate CD8+ and CD4+ T cells from the apheresis product by immunomagnetic positive enrichment (e.g., CliniMACS).[9] This approach can benefit from high purity and yield but may suffer from (i) high costs associated with biologically-produced antibodies, (ii) potential safety concerns stemming from a final cell population that may be still associated with antibody-coated magnetic beads, and (iii) low-throughput due to requiring multiple selection apparatuses in sequence.[10] Furthermore, the magnetic beads retained on the cells may prevent downstream selection of cell subsets that can be beneficial for therapy. While clinical selection strategies that immunodeplete undesired cell populations allow for untouched cell isolation and downstream positive selection of specific cell subsets, they also (i) introduce more costs by relying on a large panel of antibodies for depletion, (ii) reduce the yield by half as the apheresis product has to be split to obtain separate subsets of both CD4+ and CD8+ T cells, and (iii) can have low purity of target cells.[11,12]

Streptamer-based cell selection technology has been reported that avoids some of these undesirable outcomes through fragment antigen-binding (Fab) constructs fused with a peptide tag that bind reversibly to magnetic beads coated with engineered streptavidin.[13-15] The Fabs can be released from the beads by competition with high-affinity D-biotin, and therefore must be engineered with relatively low receptor binding affinity so that they dissociate rapidly from the cell once released in the monovalent form.[14-17] While the extent of Fab internalization into the cells is unclear after release from the solid support, Fabs engineered with relatively low receptor binding are not significantly retained on the cell surface.[16] However, this method is still costly due to relying on biologically-produced engineered streptavidin and modified Fabs. Additionally, all the aforementioned approaches have low throughput and high supply requirements for CD4+ and CD8+ T cell isolation, relying on multiple selection apparatuses either in sequence or in parallel. Thus, despite technological advances in cell selection, an approach that comprehensively has low cost, traceless selection, and high throughput while maintaining reasonable yield and purity has remained elusive.

Nucleic acid aptamers, single-stranded oligonucleotides capable of binding target molecules, are an attractive alternative to antibodies and Fabs for cell selection. First developed in the 1990s by the Szostak, Gold, and Joyce groups,[18-20] aptamers can possess binding affinities comparable to or even higher than antibodies. Importantly, aptamers are produced synthetically as well-defined, low variability products with long storage stability, making them inexpensive and easy to manufacture.[21-23] Aptamers are commonly discovered through a library selection method known as SELEX (systematic evolution of ligands by exponential enrichment) and can be further optimized for chemical stability. With their favorable attributes, the application field for aptamers has escalated in the last quarter century to encompass areas including sensing, purification, diagnostics, drug delivery and therapeutics.[24]

Described herein is a reversible aptamer selection technology for isolation of label-free CD8+ T cells. Three main facets of the work are presented. First, several high-affinity DNA aptamers specific for CD8 were identified using a modified cell-SELEX procedure and validated binding characteristics of selected aptamers. Magnetic-activated cell sorting (MACS) was compared with one of the aptamers to the antibody-based CD8 microbead system that is used clinically and found that the aptamer isolates CD8+ T cells from PBMCs with efficiencies comparable to the standard method. Second, a method was developed to reverse aptamer binding using a complementary oligonucleotide reversal agent to disrupt aptamer folding and show that CD8+ cells can be released from aptamer-immobilized supports with high yield and purity using this approach. Finally, CAR T cells were generated and fully characterized from both the reversible aptamer selection approach described herein and standard, antibody-based selection. CAR T cells isolated using traceless aptamer selection were phenotypically similar to those isolated using antibodies and exhibited nearly identical effector functions, both in vitro and in vivo. This aptamer-based selection approach therefore enables high efficiency, label-free, and inexpensive selection of T cells for potential clinical-scale cell therapy applications. With future discovery of other T cell-specific aptamers, such as a CD4 aptamer, this technique could be readily expanded for high-throughput, serial selection of multiple T cell populations from a single apparatus using a panel of aptamers and corresponding reversal agents.

Identification of T Cell-Binding Aptamers by Cell SELEX Incorporating Competitive and Counter Selection.

Cell isolation applications depend on the discovery and use of specific aptamers. Initial efforts to identify T cell-specific aptamers using either traditional protein-SELEX with recombinant proteins or cell-SELEX with engineered cell lines were unsuccessful and yielded aptamers with poor specificity, it was hypothesized that both native display of receptors on cell surfaces afforded by cell-SELEX and increased stringency of selection provided by competitive selection were necessary to discover a T cell-specific aptamer. The Tan group's cell-SELEX protocol was modified to include both competitive selection (selection in the presence of relevant undesired cells) and counter selection (depletion of aptamers binding undesired targets) (FIG. 1). After a first round of positive selection against T cells using a single-stranded DNA library with 52 base pair random region ($10^{16}$ variants), the selected aptamer pool underwent multiple rounds of competitive counter selection. Each round included competitive selection of T cell binding aptamers by incubation of aptamer pools with peripheral blood mononuclear cells (PBMCs) followed by untouched T cell isolation and extraction of bound aptamers. Collected aptamers were then subjected to counter selection by incubation with J.RT3-T3.5, a $CD3^-CD4^{lo}CD8^-$ human T cell leukemia line, to remove aptamers binding other T cell-expressing surface proteins. Selection stringency in each of five selection rounds was increased as summarized in Table 2 (below).

TABLE 2

Experimental conditions of T Cell SELEX over increasingly stringent rounds.

| SELEX Round | Positive Selection | Magnetic Separation | Negative Selection | Aptamer Pool (μM) | BSA (%) | Time (min) |
|---|---|---|---|---|---|---|
| 1 | 40e6 T Cells | None | None | 14 | 0.1 | 60 |
| 2 | 10e6 PBMCs | Depletion | 10e6 JRT.3-T3.5 Cells | 0.5 | 0.5 | 60 |
| 3 | 5e6 PBMCs | Depletion | 10e6 JRT.3-T3.5 Cells | 0.5 | 0.5 | 60 |
| 4 | 5e6 PBMCs | Depletion | 10e6 JRT.3-T3.5 Cells | 0.5 | 1 | 30 |
| 5 | 2e6 PBMC's | Depletion | 10e6 JRT.3-T3.5 Cells | 0.25 | 1 | 30 |

Figures 2A, 2B:
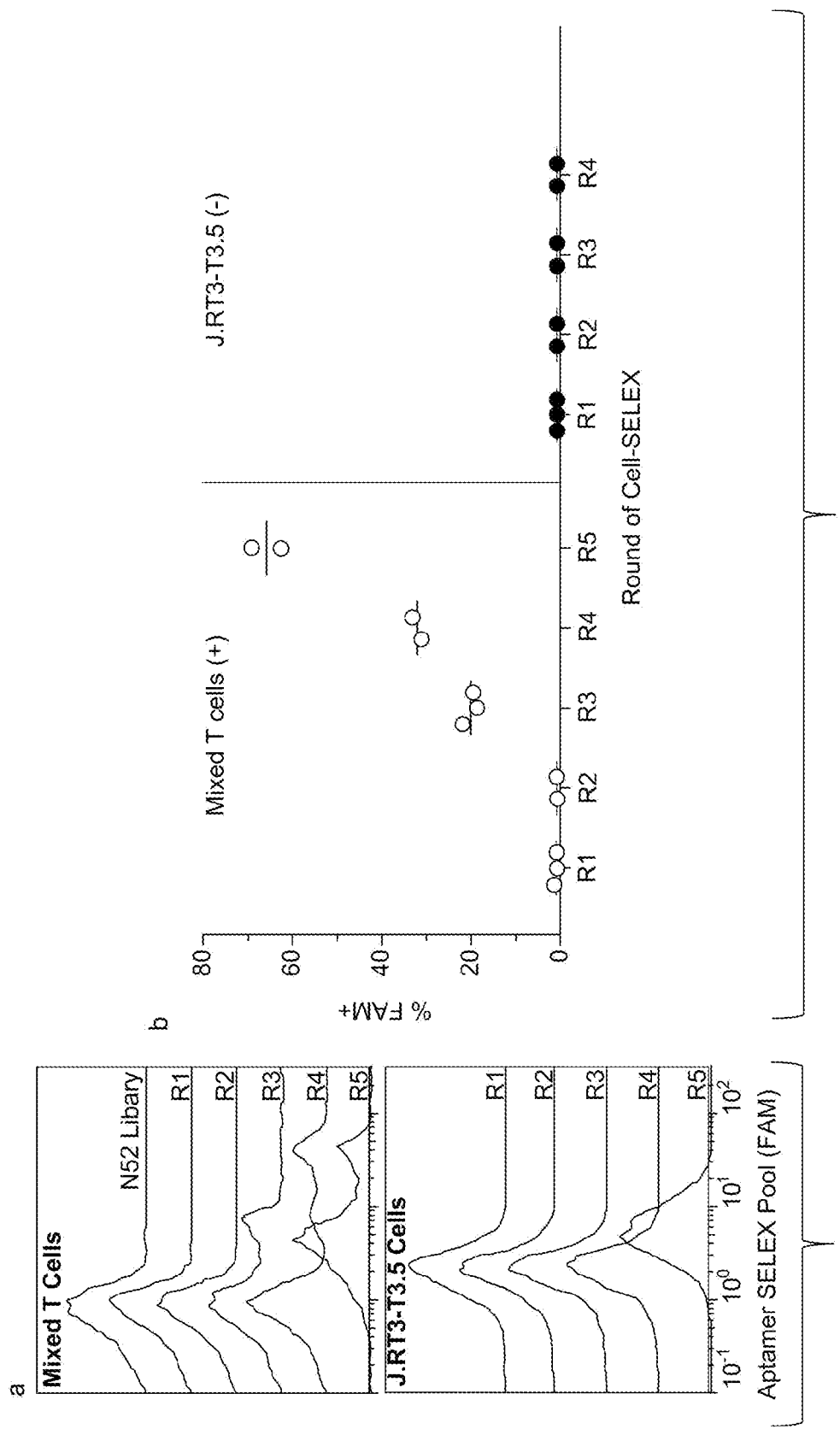
FIG. 2A-2B represents the binding of aptamer pools from different rounds of T cell SELEX to T cells and J.RT3-T3.5 cells.

The cell selection progress was monitored by flow cytometry (FIG. 2). Binding to a subset of T cells was observed by round 3 and increased through round 5. Selection was halted after five rounds due to nonspecific binding to counter selection cells observed in round 5.

Aptamer pools from each round of selection as well as the original aptamer library were identified by next generation sequencing (NGS) using primers detailed in Table 3 (below) and analyzed using FASTAptamer. The primers in Table 3 can also be found in SEQ ID NOs: 78-84.

TABLE 3

Primers used for next generation sequencing of naive library (NL) and T cell SELEX rounds 1-5.

| Primer Name | SELEX Round | Sequence | Barcode |
|---|---|---|---|
| Aptamer_F | NL, 1-5 | AATGATACGGCGACCACCGAGATCTACACCG AGGAGATACCACTAAGCCACCGTGTCCA (SEQ ID NO: 78) | |
| Aptamer_R_77 | NL | CAAGCAGAAGACGGCATACGAGATGCAATTC GACAGACCGTCGATCCAGAGTGACGCAGCA (SEQ ID NO: 79) | CGAATTGC |
| Aptamer_R 78 | 1 | CAAGCAGAAGACGGCATACGAGATCAAGAG GTACAGACCGTCGATCCAGAGTGACGCAGCA (SEQ ID NO: 80) | ACCTCTTG |
| Aptamer_R_79 | 2 | CAAGCAGAAGACGGCATACGAGATTCGATTA AACAGACCGTCGATCCAGAGTGACGCAGCA (SEQ ID NO: 81) | TTAATCGA |

TABLE 3-continued

Primers used for next generation sequencing of naive library (NL) and T cell SELEX rounds 1-5.

| Primer Name | SELEX Round | Sequence | Barcode |
|---|---|---|---|
| Aptamer_R_80 | 3 | CAAGCAGAAGACGGCATACGAGATGAATGG ACACAGACCGTCGATCCAGAGTGACGCAGCA (SEQ ID NO: 82) | GTCCATTC |
| Aptamer_R_81 | 4 | CAAGCAGAAGACGGCATACGAGATAGAATC AGACAGACCGTCGATCCAGAGTGACGCAGCA (SEQ ID NO: 83) | CTGATTCT |
| Aptamer_R_82 | 5 | CAAGCAGAAGACGGCATACGAGATAACTGC CAACAGACCGTCGATCCAGAGTGACGCAGCA (SEQ ID NO: 84) | TGGCAGTT |

Figure 3:
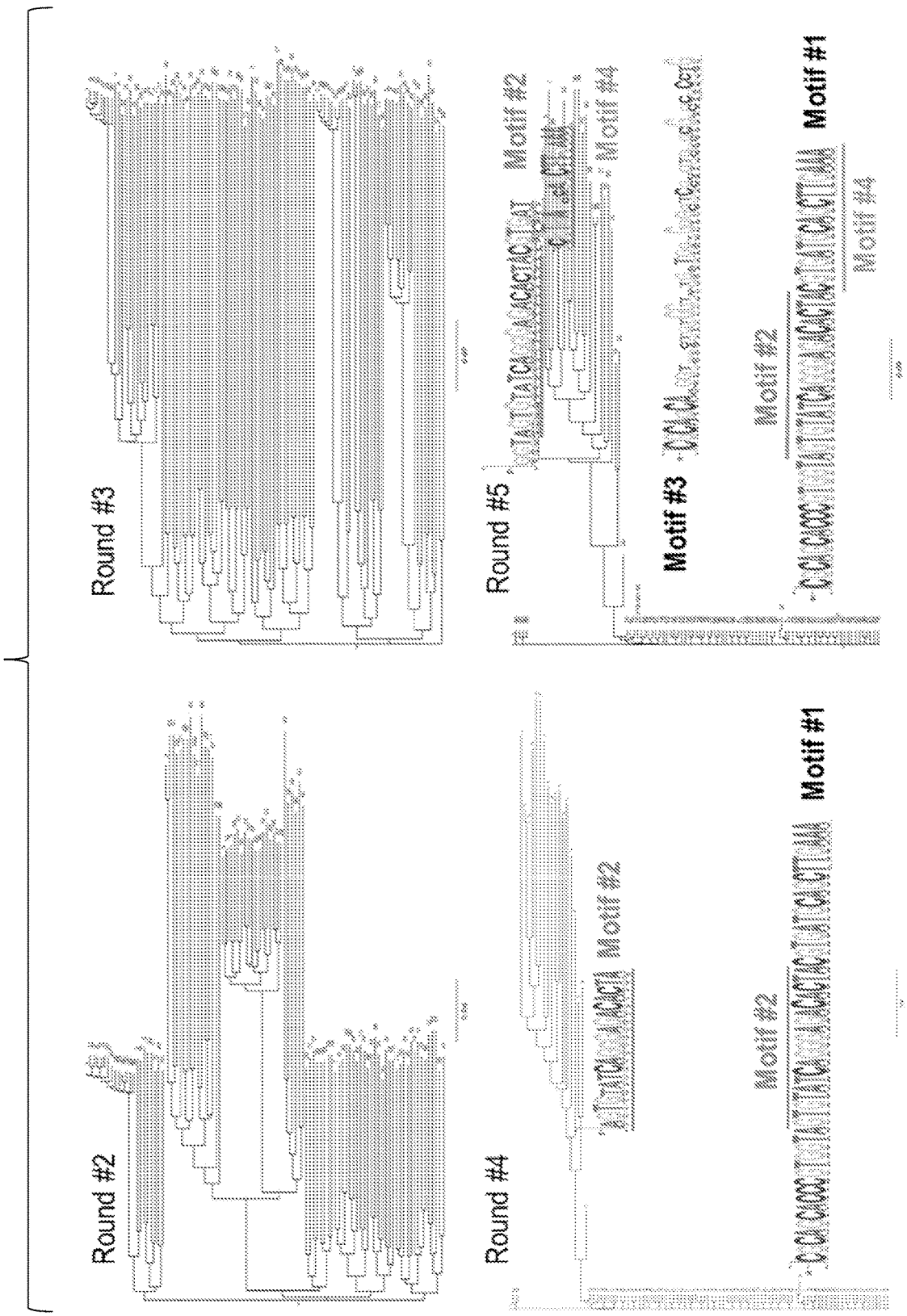
FIG. 3 represents the phylogenetic trees of top 100 aptamers from consecutive rounds of T cell SELEX and emerging consensus motifs. Phylogenetic trees were generated with FigTree software (available on the world wide web at tree.bio.ed.ac.uk/software/figtree/), and binding motifs predicted using MEME analysis (available on the world wide web at MEME-suite.org). Figure discloses SEQ ID NOS 119-124, respectively, in order of columns.

Phylogenetic trees of the top 100 aptamers were generated using Figtree software and consensus motifs identified using MEME analysis[31] (FIG. 3). Aptamer sequences collapsed in Round 4 to two major branches with two overlapping motifs (Motif 1 and 2). In Round 5, a new motif, Motif 3 emerged, as well as Motif 4, which overlaps with Motif 1. Table 4 (below) shows the top 20 aptamers identified from round 5 in order of prevalence, the predicted motif, as well as the enrichment of each aptamer in successive rounds. The sequences from Table 4 can also be found in SEQ ID NOs 85-104.

TABLE 4

Enrichment of top 20 round 5 (R5) aptamer sequences between rounds of T cell SELEX.

| R5 Rank | % Representation | Motif | Sequence | Fold Enrichment R5/R4 | R4/R3 | R3/R2 | R2/R1 |
|---|---|---|---|---|---|---|---|
| 1 | 63.37 | 1 (4,2) | CGCAGCACCCGTGGTAGTG TATCAGGGAGACACTACGT GATGCAGCTTGAAA (SEQ ID NO: 85) | 1.0 | 317.6 | 73.44 | 0.8 |
| 2 | 3.05 | 3 | CGCAGCAAGGTGGCTGTG GGCGGATGGTGGGCTCGC GTGGGCGGCCACCTGA (SEQ ID NO: 86) | 178.1 | 152.8 | | |
| 3 | 1.10 | 4,2 | ACAGAGGTGTAGAAGTAC ACGTGAACAAGCTTGAAA TTGTCTCTGACAGAGG (SEQ ID NO: 87) | 4.6 | 708.5 | | |
| 4 | 0.57 | 1 | CGCAGCACCCGTGGTAGTG TATCATGGAGACACTACGT GATGCAGCTTGAAA (SEQ ID NO: 88) | 1.3 | 763.1 | | |
| 5 | 0.49 | 1 | CGCAGCACCCGTGGTAGTG TATCAGGGATACACTACGT GATGCAGCTTGAAA (SEQ ID NO: 89) | 1.7 | 873.0 | | |
| 6 | 0.37 | 1 | CGCAGCACCCGTGGTAGTG TATCAGAGAGACACTACGT GATGCAGCTTGAAA (SEQ ID NO: 90) | 1.6 | 409.1 | | |
| 7 | 0.36 | 3 | TTAGGAGGTGGGCTCGCGT GCACCAATCCATGGTCGGC GGGAATTTTAAGGG (SEQ ID NO: 91) | 116.2 | | | |

TABLE 4-continued

Enrichment of top 20 round 5 (R5) aptamer sequences between rounds of T cell SELEX.

| R5 Rank | % Representation | Motif | Sequence | Fold Enrichment | | | |
|---|---|---|---|---|---|---|---|
| | | | | R5/R4 | R4/R3 | R3/R2 | R2/R1 |
| 8 | 0.34 | 4,2 | GCTCGATCGTATAGCCGTG ACGCAGCTTGAAATGGGA TCGCGTCCACAGTTT (SEQ ID NO: 92) | 6.6 | | | |
| 9 | 0.27 | 1 | CGCAGCGCCCGTGGTAGTG TATCAGGGAGACACTACGT GATGCAGCTTGAAA (SEQ ID NO: 93) | 0.9 | 450.6 | | |
| 10 | 0.25 | 3 | CGGCCGAACCTCCACCCTT CCGCAGCGTAGGCAGACT CGGATCATGATAATC (SEQ ID NO: 94) | 1.7 | 0.7 | 0.77 | 0.7 |
| 11 | 0.18 | 1 | CGCAGCAGCCGTGGTAGT GTATCAGGGAGACACTAC GTGATGCAGCTTGAAA (SEQ ID NO: 95) | 1.3 | 254.5 | | |
| 12 | 0.17 | 1 | CGCAGCAACCGTGGTAGT GTATCAGGGAGACACTAC GTGATGCAGCTTGAAA (SEQ ID NO: 96) | 1.6 | 136.5 | | |
| 13 | 0.17 | 1 | CGCAGCACCCGTGGTAGTG TATCGGGGAGACACTACGT GATGCAGCTTGAAA (SEQ ID NO: 97) | 1.5 | 331.3 | | |
| 14 | 0.12 | 3 | CGCAGCAACGTTATCCCCT TTACGGGGTCCTAGAGCCC CGTGAGTGCTCACG (SEQ ID NO: 98) | 81.6 | | | |
| 15 | 0.11 | 1 | CGCAGCTCCCGTGGTAGTG TATCAGGGAGACACTACGT GATGCAGCTTGAAA (SEQ ID NO: 99) | 1.0 | 342.9 | | |
| 16 | 0.10 | 1 | CGCATCACCCGTGGTAGTG TATCAGGGAGACACTACGT GATGCAGCTTGAAA (SEQ ID NO: 100) | 0.8 | 535.4 | | |
| 17 | 0.09 | 1 | CGCAGCACCCGTGGTAGTG TATCAGTGAGACACTACGT GATGCAGCTTGAAA (SEQ ID NO: 101) | 0.8 | 317.0 | | |
| 18 | 0.07 | 1 | CGCAGCCCCCGTGGTAGTG TATCAGGGAGACACTACGT GATGCAGCTTGAAA (SEQ ID NO: 102) | 1.1 | 309.6 | | |
| 19 | 0.05 | 1 | ACGCAGCACCCGTGGTAGT GTATCAGGAGACACTACGT GATGCAGCTTGAAA (SEQ ID NO: 103) | 1.0 | 151.5 | | |
| 20 | 0.05 | 1 | CGCAGCACCCGTGGTAGTG TATCAGGGAGACACTACGT GATGCAGCTTAAAA (SEQ ID NO: 104) | 3.0 | | | |

*Percent representation is calculated by converting reads per million (RPM) of the sequence to a percentage whereas fold enrichment is calculated by dividing the RPM of the sequence from a round by the value of the former round.

Figure 4:
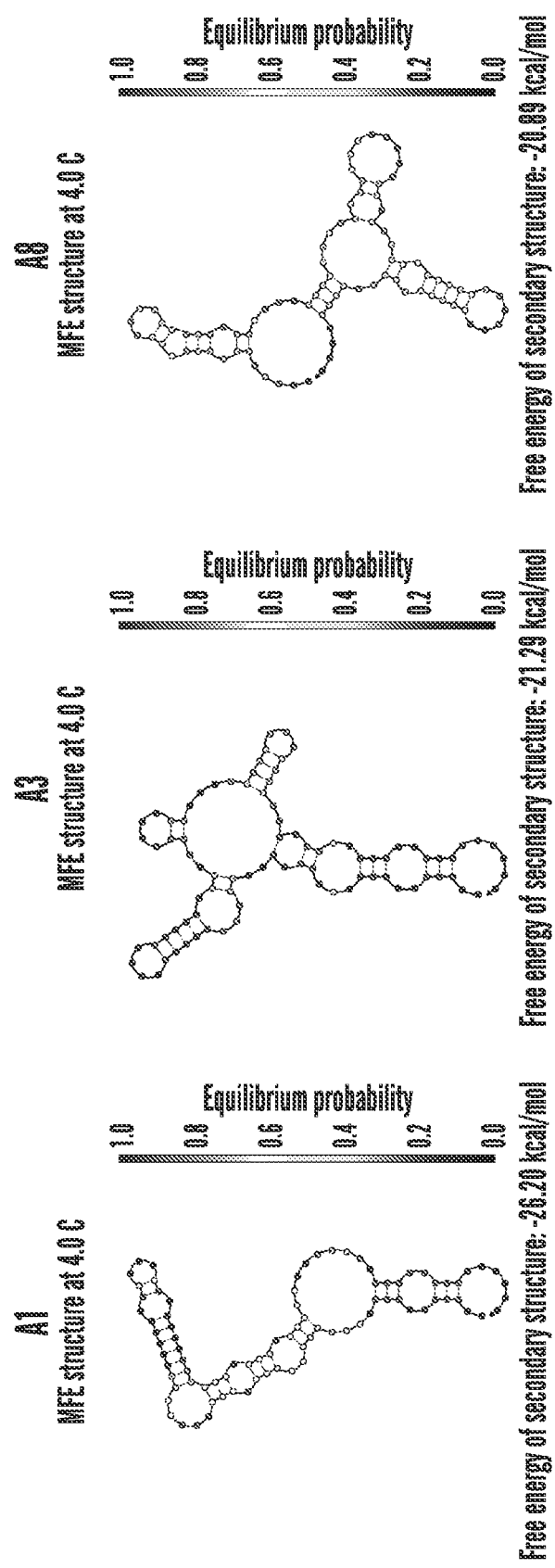
FIG. 4 shows predicted minimum free energy (MFE) secondary structures of A1, A2, A3, A7, and A8 aptamers. Aptamers are named according to their Round 5 rank. Structures were calculated using NUPACK software (temp=4C; Na+=137 mM; Mg++=5.5 mM).
Figure 4:
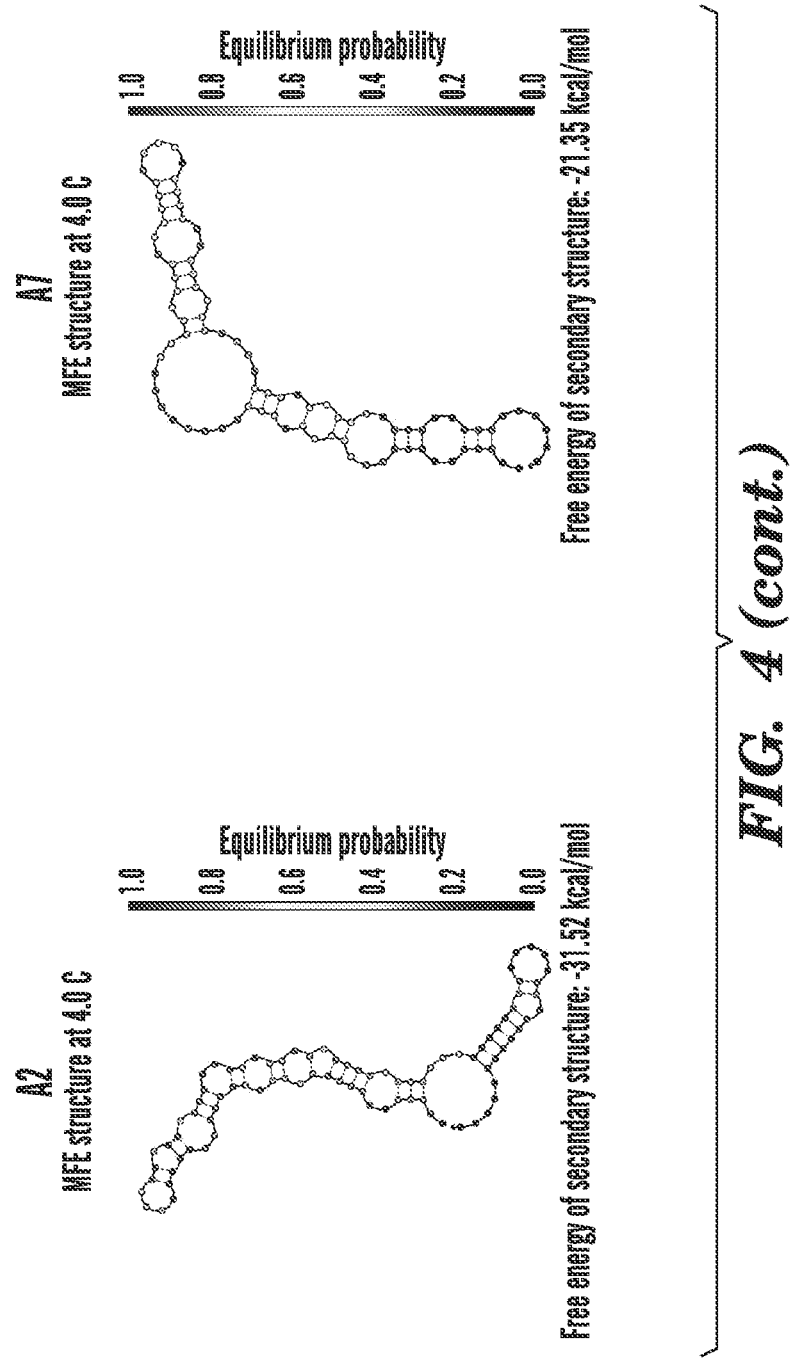

Five aptamers (named according to their rank in Table 4 and listed in Table 5 (below) were selected for binding studies with primary T cells and counter selection J.RT3-T3.5 cells based on their abundance, motif, enrichment between rounds and family representation on the phylogenetic tree, and low energy state of their secondary structure (FIG. 4). The aptamer sequences from Table 5 can be found in SEQ ID NOs: 1-7.

TABLE 5

Sequences of aptamers and reversal agent used in experiments.

| Name- SEQ ID NO | Sequence |
|---|---|
| A1- SEQ ID NO: 1 | 5'-/56-FAM/ATCCAGAGTGACGCAGCACGCAGCACCCGTGGTAGTGTATC AGGGAGACACTACGTGATG CAGCTTGAAATGGACACGGTGGCTTAGT-3' |
| A2- SEQ ID NO: 2 | 5'-/56-FAM/ATCCAGAGTGACGCAGCACGCAGCAAGGTGGCTGTGGGCGG ATGGTGGGCTCGCGTGGG CGGCCACCTGATGGACACGGTGGCTTAGT-3' |
| A3- SEQ ID NO: 3 | 5'-/56-FAM/ATCCAGAGTGACGCAGCAACAGAGGTGTAGAAGTACACGTG AACAAGCTTGAAATTGTCTC TGACAGAGGTGGACACGGTGGCTTAGT-3' |
| A7- SEQ ID NO: 4 | 5'-/56-FAM/ATCCAGAGTGACGCAGCATTAGGAGGTGGGCTCGCGTGCACC AATCCATGGTCGGCGGGA ATTTTAAGGGTGGACACGGTGGCTTAGT-3' |
| A8- SEQ ID NO: 5 | 5'-/56-FAM/ATCCAGAGTGACGCAGCAGCTCGATCGTATAGCCGTGACGCA GCTTGAAATGGGATCGCG TCCACAGTTTTGGACACGGTGGCTTAGT-3' |
| A3t- SEQ ID NO: 6 | 5'-/5BiosG//iSp18/CCAGAGTGACGCAGCAACAGAGGTGTAGAAGTACA CGTGAACAAGCTTGAAATTGTC TCTGACAGAGGTGGACACGGTGGCTTTTAGT-3' |
| RA- SEQ ID NO: 7 | ACTAAAAGCCACCGTGTCCACCTCTGTCAGAGACAA |

*Text within slashes "/" represent IDT modification codes, and underlined base pairs represent constant regions used for priming in PCR reactions.

Fluorescein-labeled aptamers A1, A3, and A8 showed specific binding to a subset of mixed T cells whereas A2 and A7 exhibited whole population binding to both T cells and J.RT3-T3.5 cells compared to a randomly chosen aptamer from the naïve library (RN) (FIG. 5). Interestingly, A2 and A7, but not A1, A3, and A8, belong to the unique Motif 3 that appeared in round 5 and showed significant enrichment (>100-fold) between rounds 4 and 5 when non-specific binding to J.RT3-T3.5 cells in the bulk aptamer pool was observed.

Characterization of T Cell-Binding Aptamers

Figure 6A:
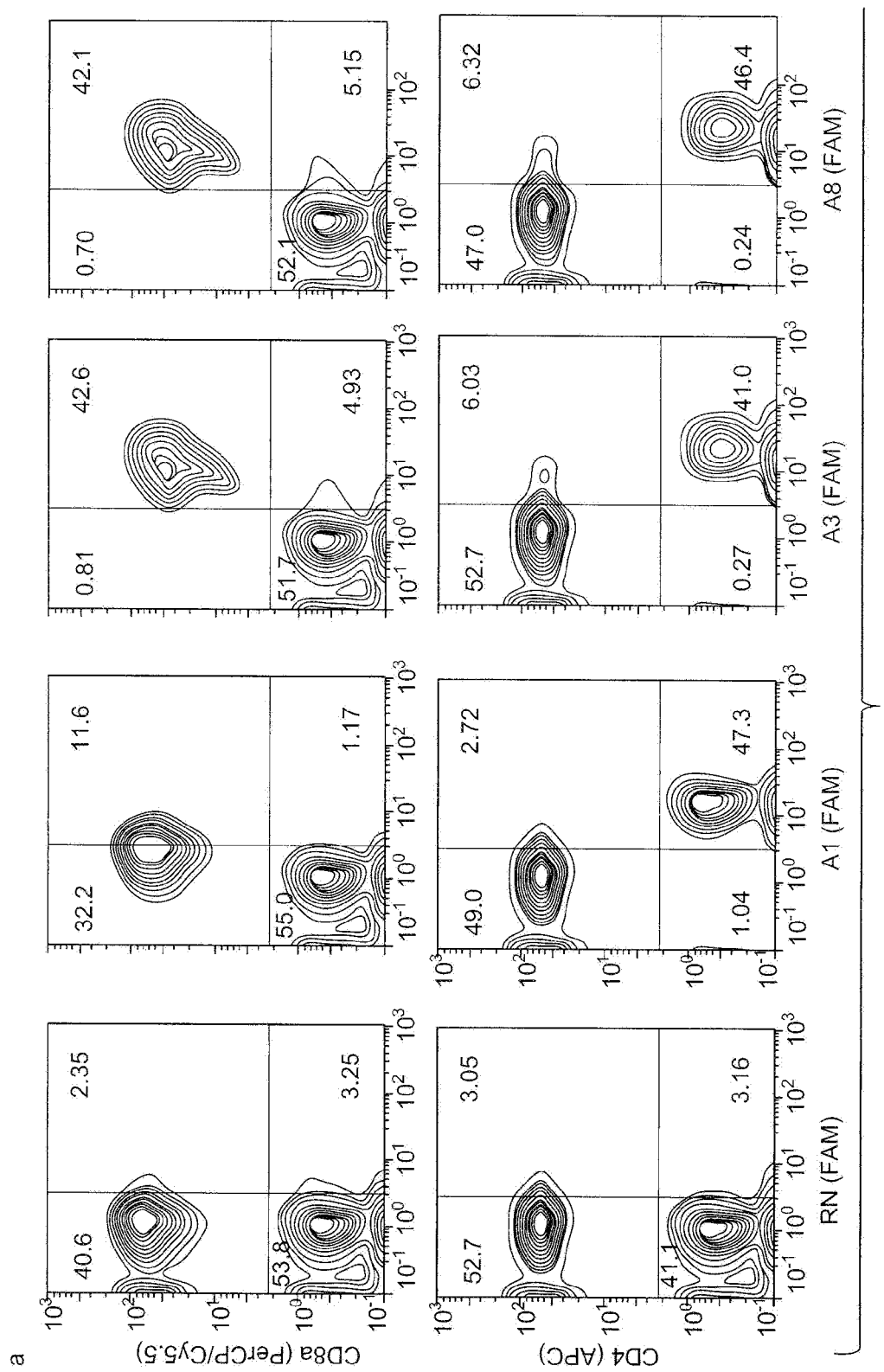
FIG. 6A-6E represents aptamers 1, 3, and 8 bind to CD8a glycoprotein.
Figure 6B:
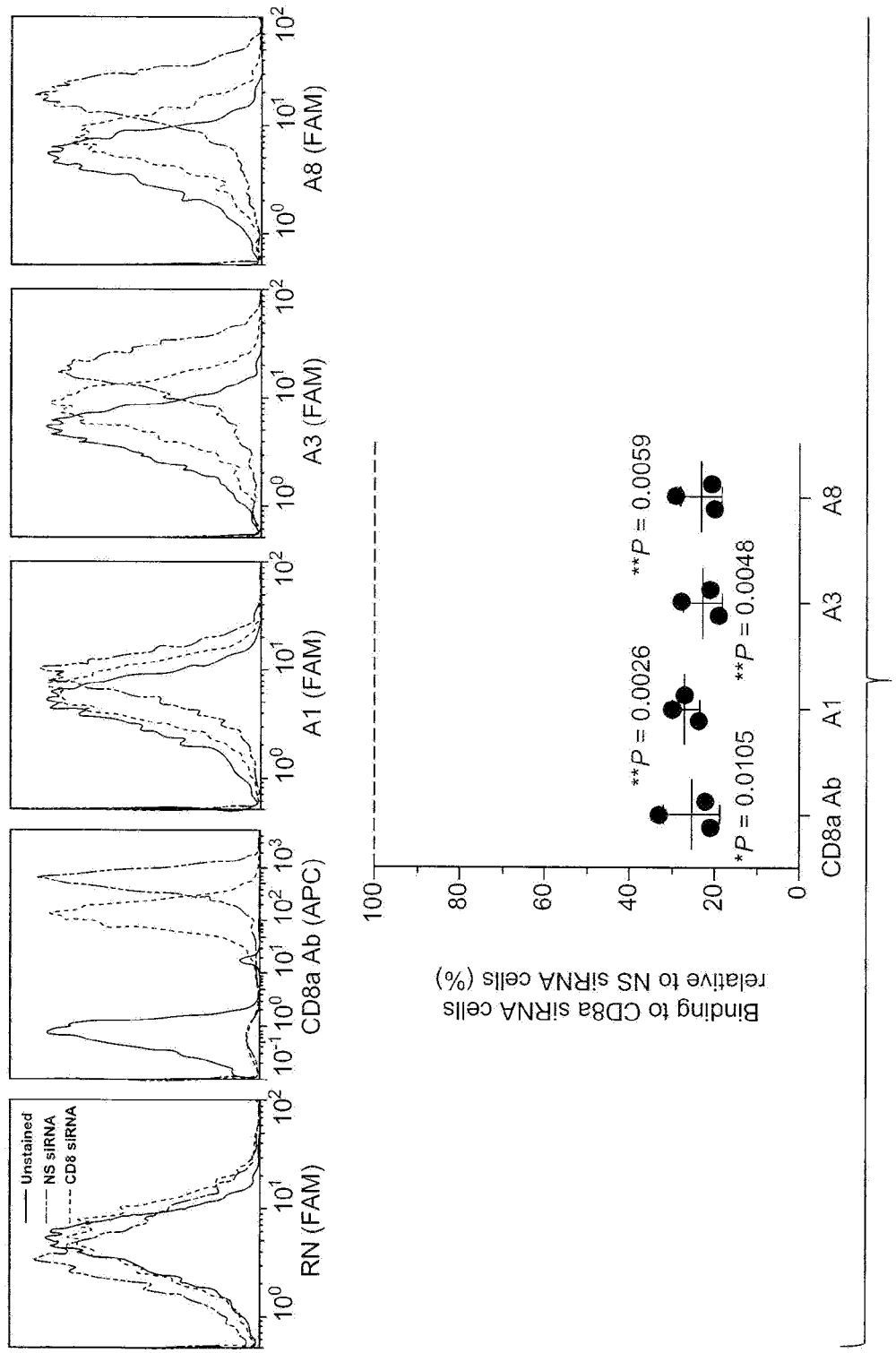
Figure 7A:
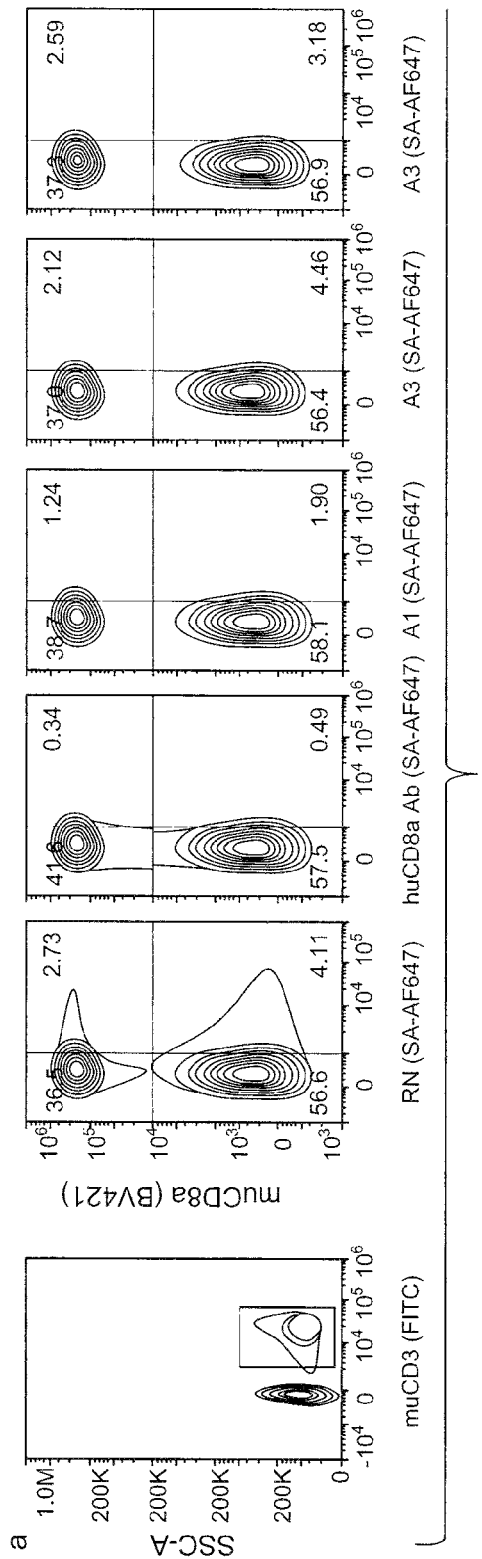
FIG. 7A-7B represents A1, A3, and A8 aptamer binding to murine spleen T cells and rhesus macaque PBMCs.
Figure 7B:
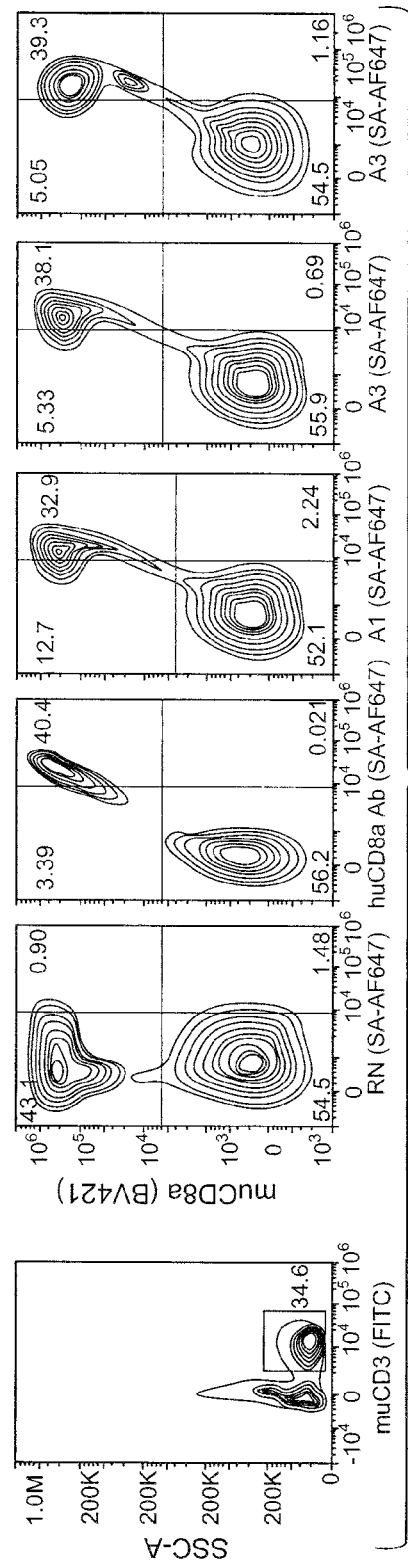
Figure 8A:
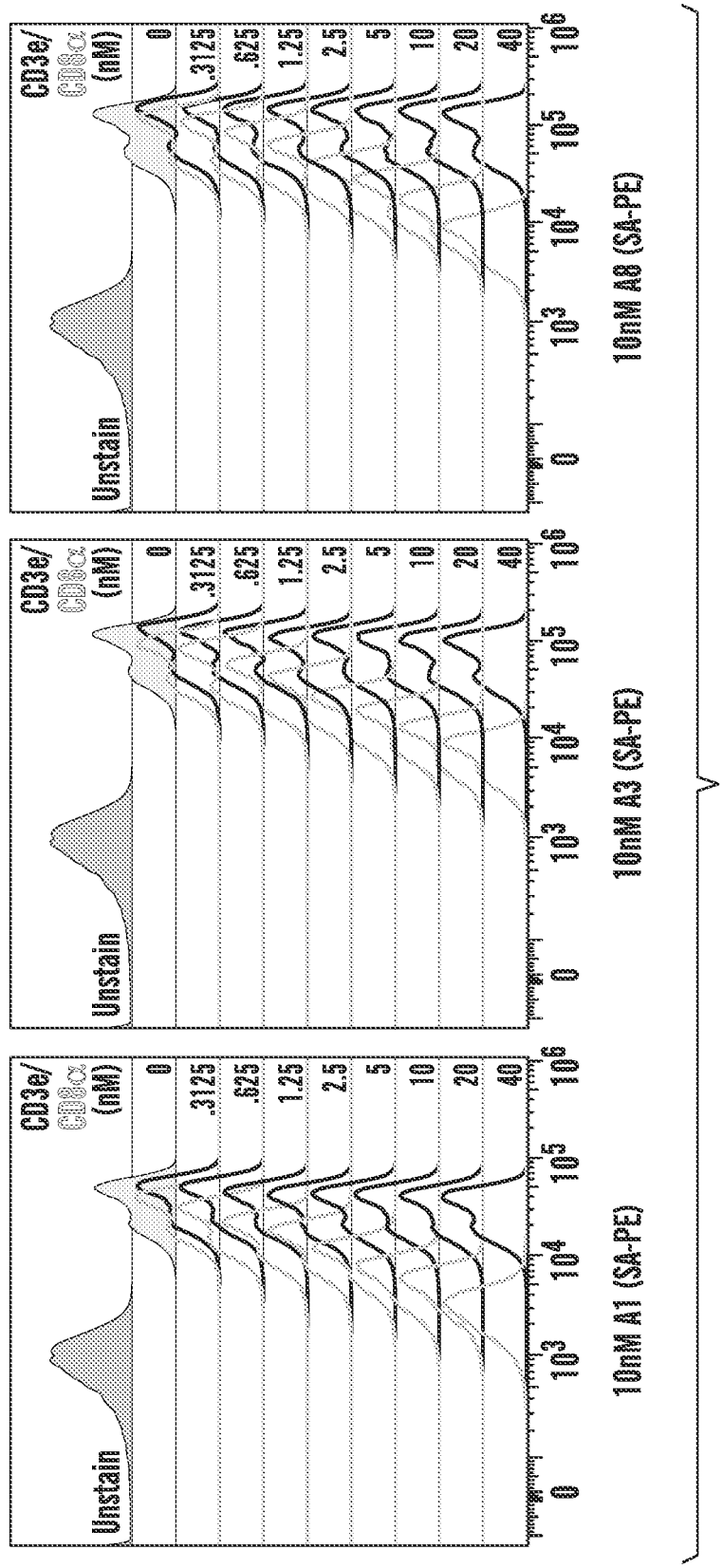
FIG. 8A-8B shows competitive binding of different CD8a antibody concentrations with fixed concentrations of A1, A3, and A8 aptamers.
Figure 8B:
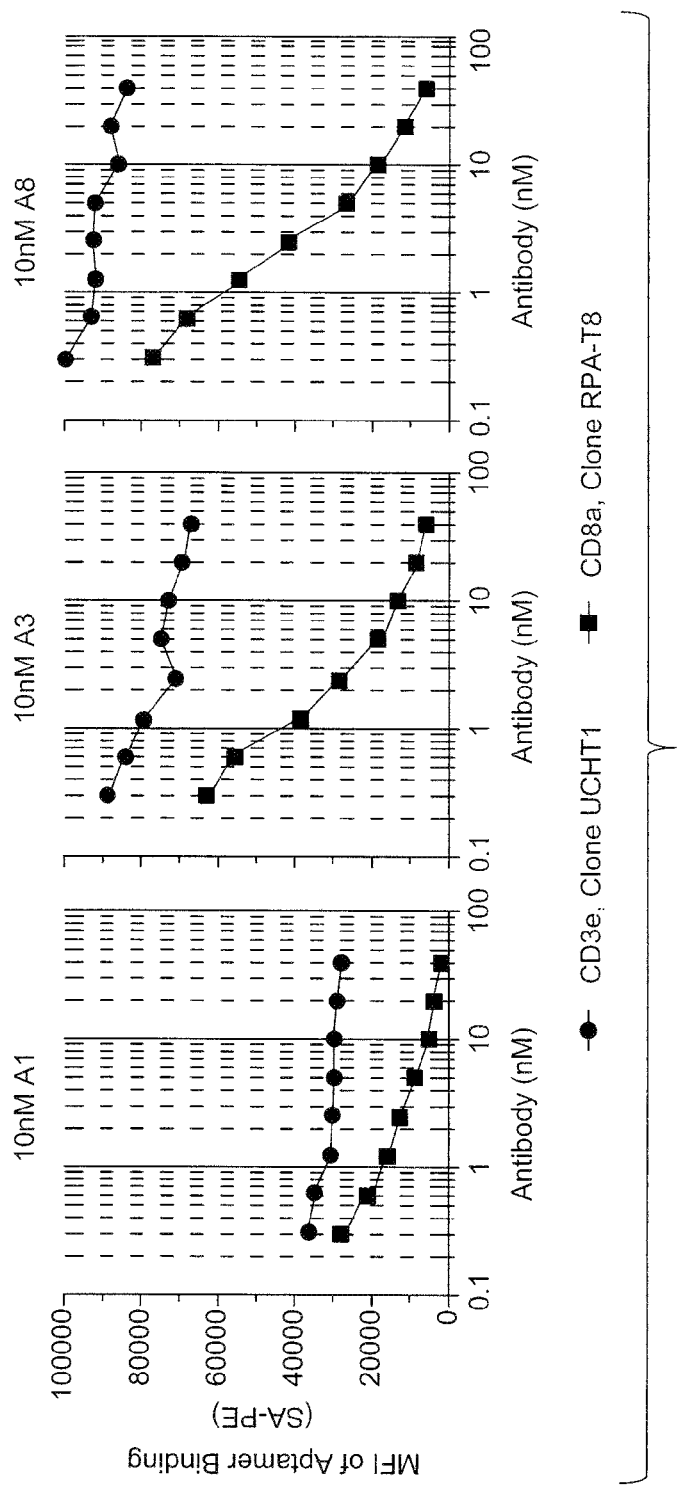

Aptamers A1, A3 and A8 likely bind the same receptor due to their overlapping motifs. Furthermore, it was suspected that the aptamers bind to CD8 since this protein is not expressed on the counter selection cell line and CD8:CD4 T cell ratios are low in healthy donor pan-T cell isolates, consistent with the 20-30% mixed T cell population binding observed (FIG. 5). Therefore, aptamer binding to mixed human T cells with CD4 and CD8 antibody labeling was analyzed and the results demonstrated that all three aptamers bind to CD8+ but not CD4+ T cells, suggesting aptamers bind to human CD8 (FIG. 6A). A similar binding study against murine splenocytes did not, however, show any binding to the T lymphocyte subset, suggesting that the aptamers, like CD8 antibodies, do not bind murine CD8 (FIG. 7A). Aptamers A1, A3, and A8, also bind to CD8+ T cells in rhesus macaque PBMCs, which is consistent with the rhesus cross-reactivity observed in many anti-human CD8 antibody clones (FIG. 7B). It was further confirmed that these aptamers bind the human CD8 alpha chain isoform (CD8a) expressed on cells by three techniques: competitive binding with a CD8- specific antibody, siRNA knockdown of CD8a in T cells, and enforced CD8a expression in CD8- cells. Increasing concentrations of an unlabeled CD8-specific antibody (clone RPA-T8), but not a CD3-specific antibody, robustly outcompeted all three aptamers for binding to CD8+ T cells during a co-incubation (FIG. 8). CD8a knockdown (75%) by siRNA (Table 6, below) in primary CD8+ T cells was confirmed by antibody staining and correlated with 73-77% reduction in binding of all three aptamers (FIG. 6B).

TABLE 6 siRNA duplexes used for CD8 knockdown.

| Name | Sequence |
|---|---|
| hs.Ri.CD8A.13.1-SEQ1 | rCrGrArGrGrArGrGrUrArArUrGrArArUrUrArArArGrArAGA (SEQ ID NO: 107) |
| hs.Ri.CD8A.13.1-SEQ2 | rUrCrUrUrCrUrUrUrArArUrUrCrArUrUrArCrCrUrCrCrUrCrGrArG (SEQ ID NO: 108) |

TABLE 6-continued siRNA duplexes used for CD8 knockdown.

| Name | Sequence |
|---|---|
| hs.Ri.CD8A.13.2-SEQ1 | rCrUrUrGrCrUrUrArArGrGrUrArUrGrGrUrArCrArArGrCAA (SEQ ID NO: 109) |
| hs.Ri.CD8A.13.2-SEQ2 | rUrUrGrCrUrUrGrUrArCrCrArUrArCrCrUrUrArArGrCrArArGrGrA (SEQ ID NO: 110) |

Figure 6C:
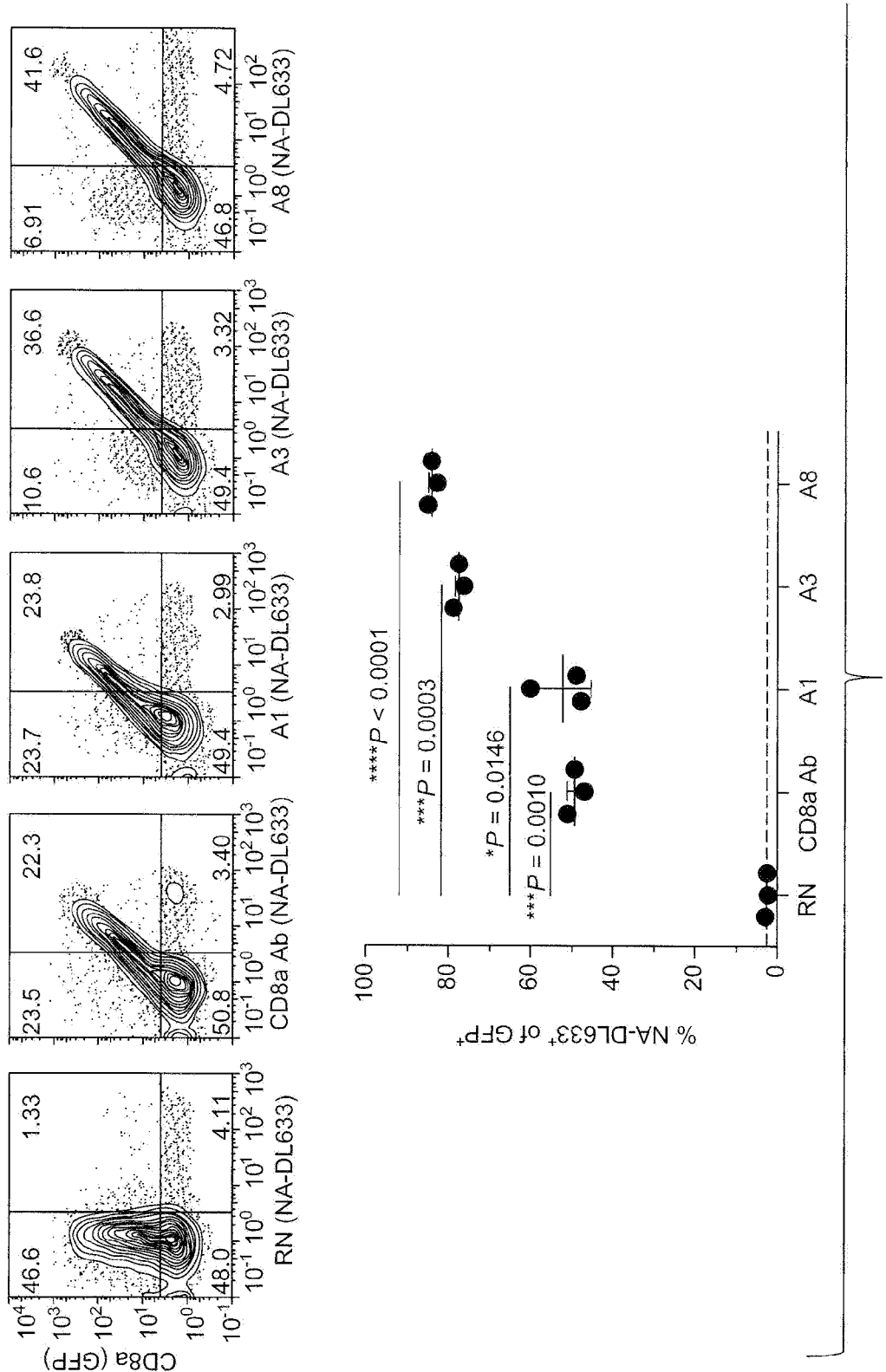
Figure 6D:
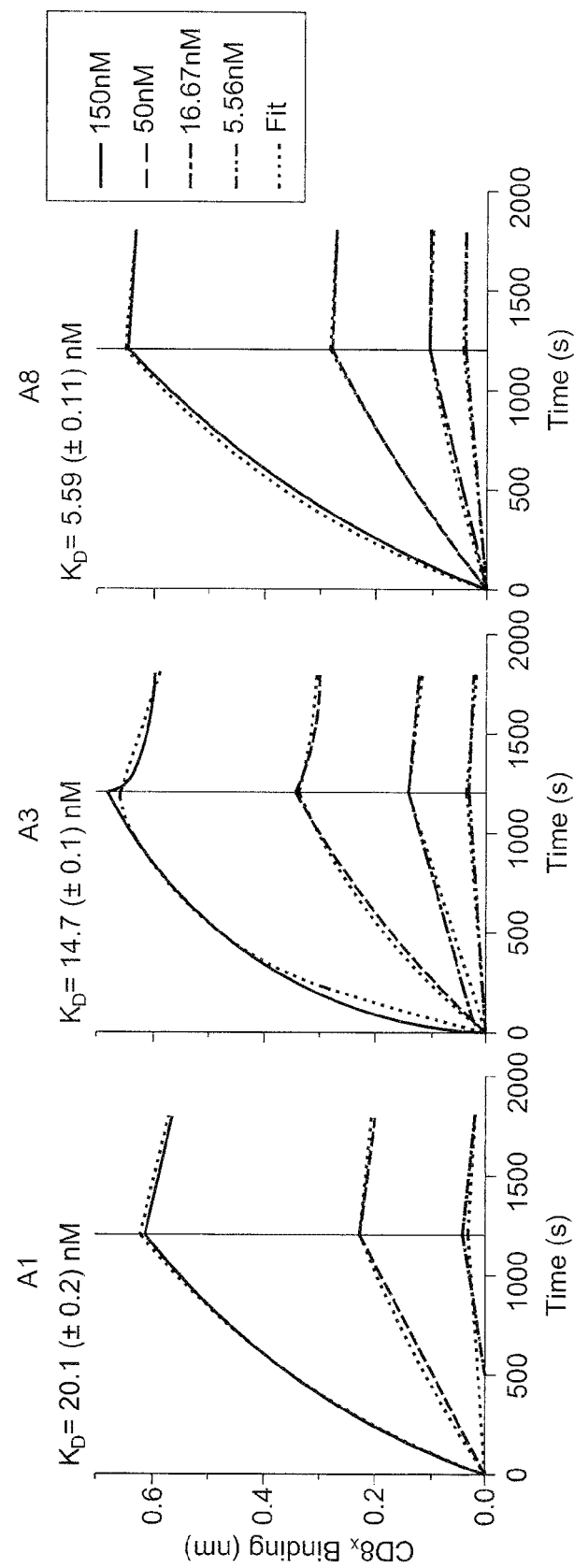
Figure 6E:
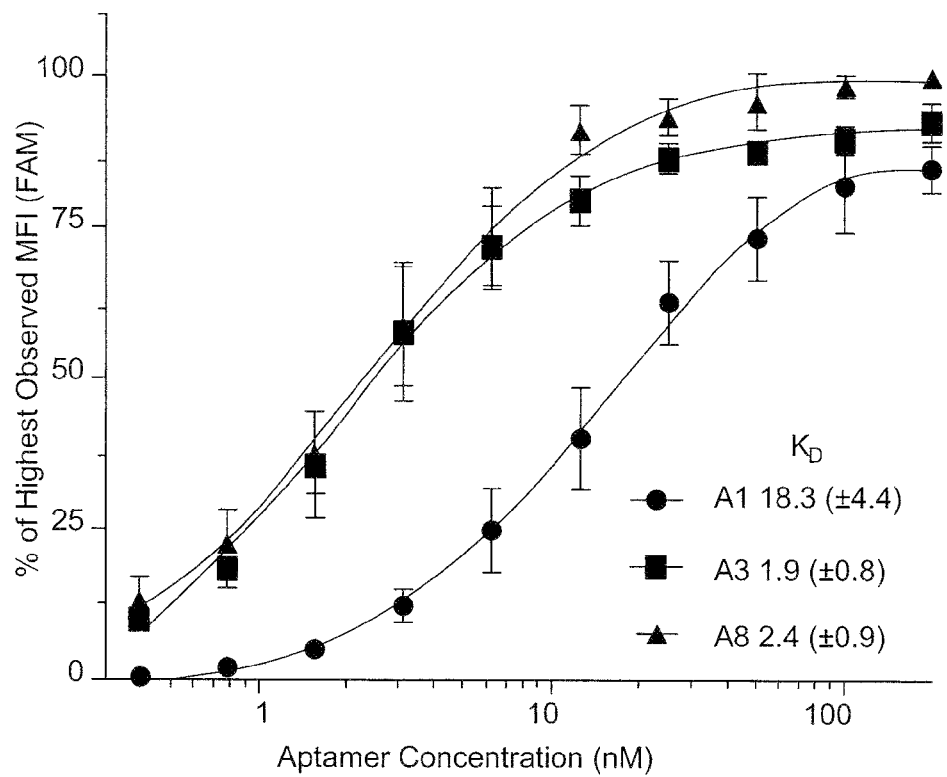

Transient expression of CD8a from a GFP reporter plasmid in CD8-Jurkat immortalized human lymphocyte cells introduced aptamer binding specifically to GFP+ cells (FIG. 6C). For validation of aptamer binding to the CD8a protein itself, the association and dissociation kinetics by bio-layer interferometry (BLI) were measured, in which a serial dilution of recombinant extracellular CD8a protein (Ser22-Asp182) was screened against aptamers immobilized onto streptavidin-coated BLI sensors. Whereas the RN aptamer negative control exhibited no detectable association with the CD8a protein (data not shown), the A1, A3, and A8 aptamers bound the protein with binding affinities ($K_D$'s) of 20.1±0.2, 14.7±0.1, and 5.59±0.11 nM, respectively (FIG. 6D and Table 7). Interestingly, the A3 aptamer had both the highest association ($K_{on}$) and dissociation ($K_{dis}$) rate constants of the three aptamers, "apparent" whereas A8 had the slowest $K_{dis}$. The $K_D$'s of aptamer binding to CD8+ T cells were also evaluated by flow cytometry, and the A1, A3, and A8 aptamers have apparent $K_D$'s of 18.3±4.6, 1.9±0.8 and 2.4±0.9 nM, respectively (FIG. 6E). The observed differences in binding affinity values determined by the two methods is expected. Mass transport limitations not present with BLI but present when staining cells in static wells will favor re-binding and thereby limit dissociation, improving the apparent $K_D$ of the faster dissociating A3 relative to the other aptamers. Furthermore, at saturating concentrations of aptamer where binding advantages stemming from high $K_{on}$'s are diminished given enough time (i.e. binding at or near steady-state), the A8 aptamer displays increased binding over A3, consistent with the large difference in $K_{off}$ between the two aptamers. Regardless, all three aptamers have high binding affinity to CD8a protein and CD8+ T cells with $K_D$ values comparable to monoclonal antibodies.

TABLE 7

Bio-layer interferometry (BLI) measured affinity and kinetics of A1, A3, and A8 aptamer binding to recombinant CD8a protein.

| Aptamer | KD (nM) | Kon (nM$^{-1}$s$^{-1}$) × 10$^{-6}$ | Kdis (s$^{-1}$) × 10$^{-4}$ | Full χ2 | Full R2 |
|---|---|---|---|---|---|
| A1 | 20.1 (±0.2) | 6.079 (±0.026) | 1.222 (±0.013) | 0.1234 | 0.9995 |
| A3 | 14.7 (±0.1) | 13.850 (±0.035) | 2.036 (±0.014) | 0.2700 | 0.9992 |
| A8 | 5.59 (±0.11) | 6.364 (±0.014) | 0.356 (±0.004) | 0.0595 | 0.9998 |

Data are mean±s.d. and were calculated by performing a global fit of the binding curve data in FIG. 6E to a 1:1 binding model. The ratio between the dissociation rate constant ($K_{dis}$) and the association rate constant ($K_{on}$) give the equilibrium dissociation constant ($K_D$). The goodness of fit was evaluated by a reduced chi-square ($\chi 2$) and a R2 value approaching 1.

Reversing Aptamer Binding with a Complementary Oligonucleotide

To achieve traceless cell isolation using an aptamer-based affinity agent, a method to reverse aptamer binding to the cell is needed in the cell recovery step. Aptamer binding can be disrupted by nuclease-mediated degradation of the aptamer, applied force, competitive binding, or denaturing the secondary structure, either through heat or complementary oligonucleotide binding. Of these aforementioned methods, complementary oligonucleotide displacement is a preferred method due to its advantages of being gentle (e.g., compared to heat or force) with high yield (e.g., compared to competitive binding) and relatively low cost (e.g., compared to nuclease degradation). Therefore, a CD8-binding aptamer was designed that could be released from cells by binding with a complementary displacement strand ("reversal agent").

Figure 9:
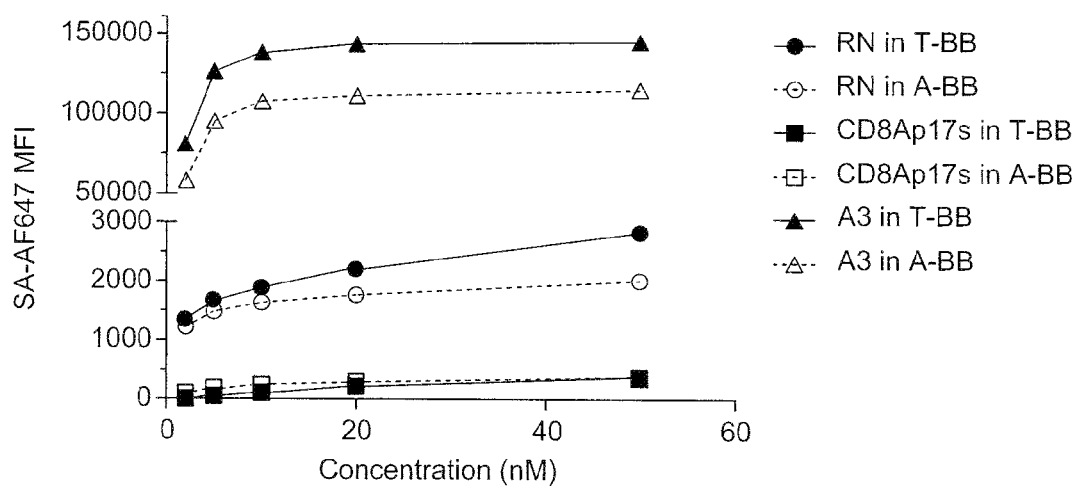
FIG. 9 represents the binding comparison of A3 aptamer and a previously reported CD8 DNA aptamer from the literature. Chart shows MFI of RN, published CD8Ap17s, and A3 binding to CD8+ T cells at a range of concentrations under the described binding conditions (T-BB) and the published aptamer's binding conditions (A-BB). Binding conditions account for the buffer used and the annealing conditions. Data are mean±s.d., n=3 technical replicates (error bars are too small to visualize).

Two major considerations in the design of the selection aptamer and reversal agent design are: first, high-affinity binding to target cells by the selection aptamer; second, rapid disruption of the aptamer secondary structure that is critical for receptor binding by the reversal agent. Accordingly, the A3 aptamer was chosen for cell selection, not only due to its low apparent $K_D$ for CD8+ T cells, but also for its high $K_{on}$ and $K_{off}$ for CD8a protein. As multivalent display of the aptamer on a selection medium would potentially mitigate passive cell dissociation since there are aptamers in cis to retain cell binding even if a few aptamers dissociate, it was contemplated that faster association kinetics would likely be more important for cell isolation. Furthermore, a high $K_{off}$ implies less stable binding, suggesting that strategies to reverse aptamer binding by complementary oligonucleotide displacement may be more successful. A reported CD8 aptamer from the literature was also tested;[41, 42] however, low binding was observed in previously described binding conditions (FIG. 9).

Figure 10A:
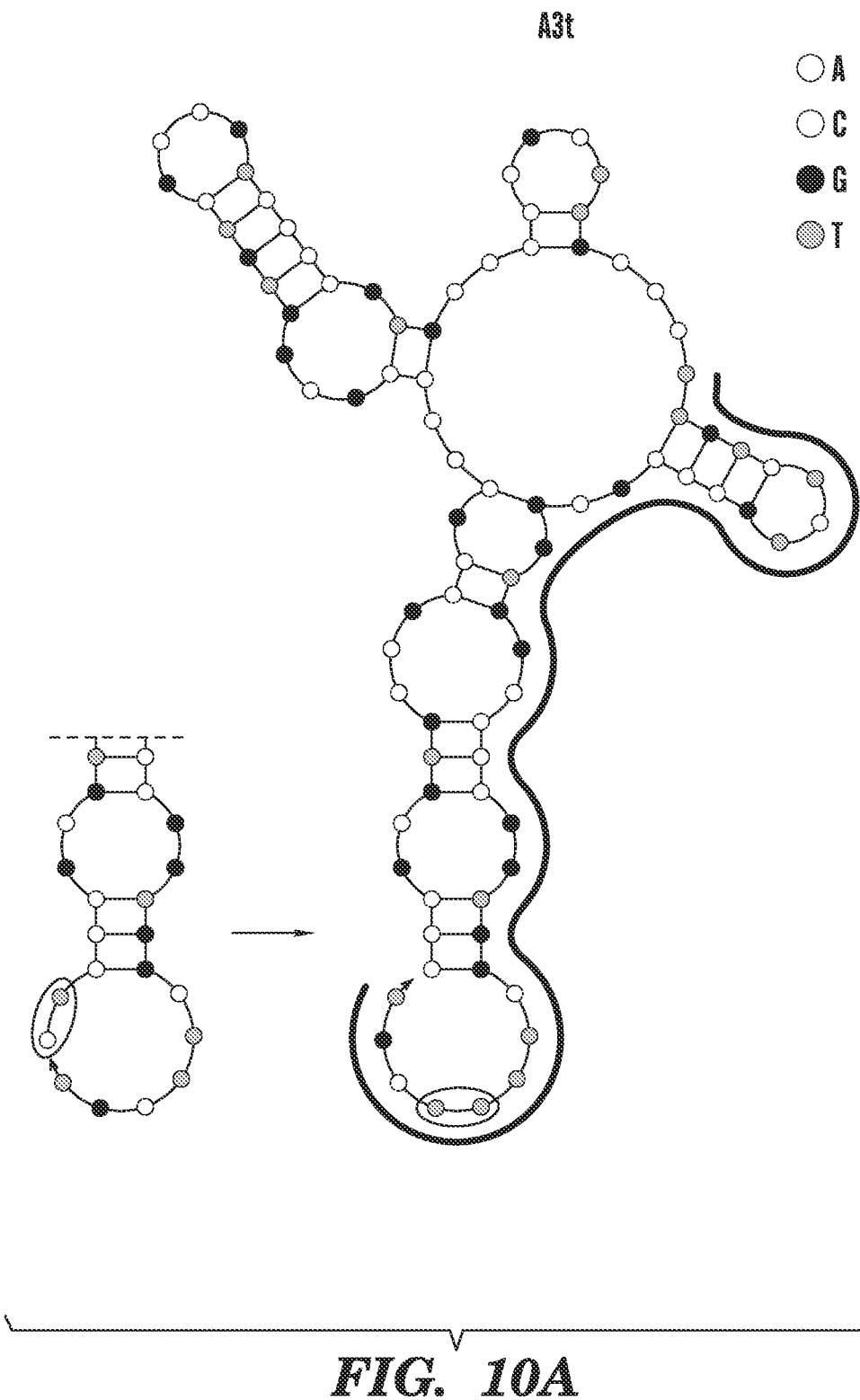
FIG. 10A-10B represents the complementary reversal agent designed to occlude binding of A3 aptamer with modified toehold.
Figure 10B:
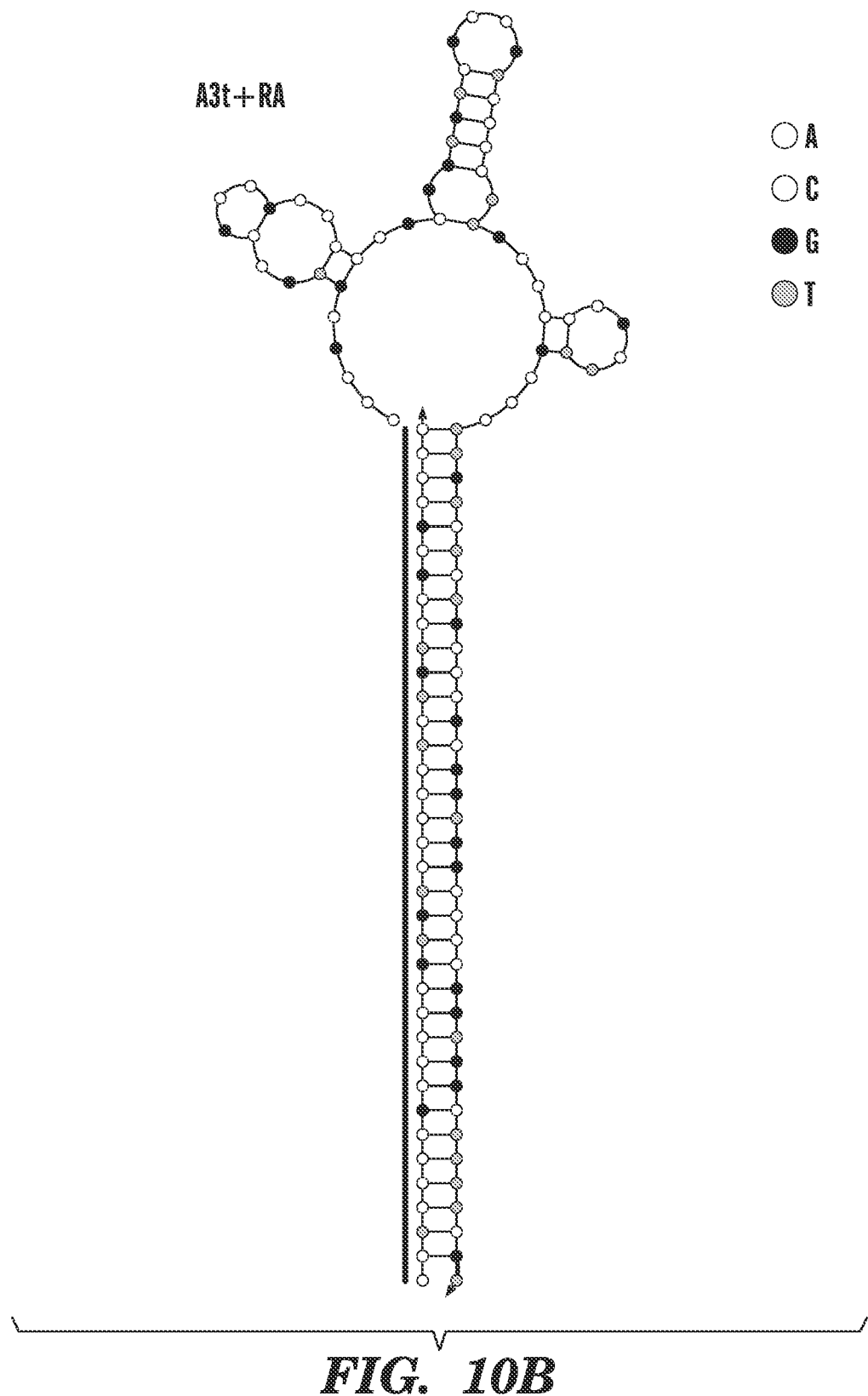

A toehold region was then extended on the 3' end of the original A3 sequence (A3t) to facilitate initiation of cell release by the complementary reversal agent (FIG. 10A and Table 5). Toeholds are single-strand sequences that allow for complementary sequence binding and supplanting of prepaired bases through a method known as strand displacement. In this case, the reversal agent would undergo strand displacement via a toehold to abrogate intrastrand base pairing in the aptamer necessary for its secondary structure. Zhang and Winfree report that the rate constant of strand displacement depends on the toehold length, varying over up to 6 orders of magnitude, with maximum rates reached with toeholds over 6 bases in length; an 8-mer toehold was therefore used in the described CD8-aptamer selection agent. The reversal agent (RA) was designed to be 36 bases in length based on the predicted change in secondary structure upon binding (FIG. 10B and Table 5).

Figure 11A:
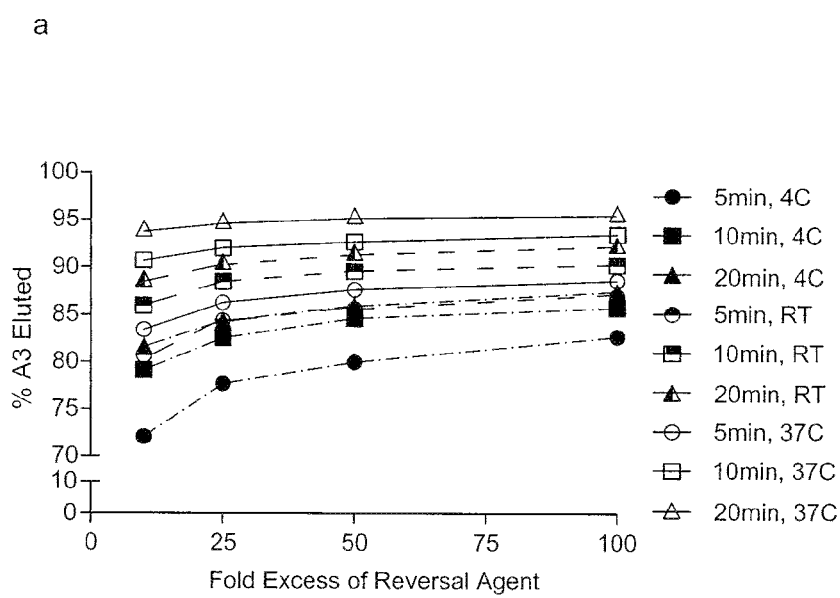
FIG. 11A-11B represents optimization of A3t aptamer elution using complementary reversal agent.
Figure 11B:
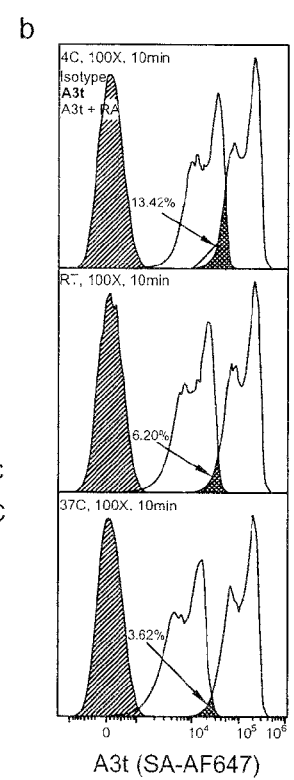

It was demonstrated that effective and rapid aptamer release from cells by the RA using a fluorescently-labeled aptamer with flow cytometry analysis. To determine the necessary conditions for release, various concentrations of RA (ranging from 25-100-fold excess), temperatures (4° C., room temperature and 37° C.) and times of incubation (5, 10, and 20 min) were evaluated (FIG. 11A-B). While >70% A3t aptamer release was observed in all conditions, 90% release could be achieved with only 10 min incubation at room temperature with 100-fold excess RA. Accordingly, these parameters were chosen for label-free isolation strategy.

An Aptamer-Based Strategy for Traceless T Cell Isolation

Figure 12A:
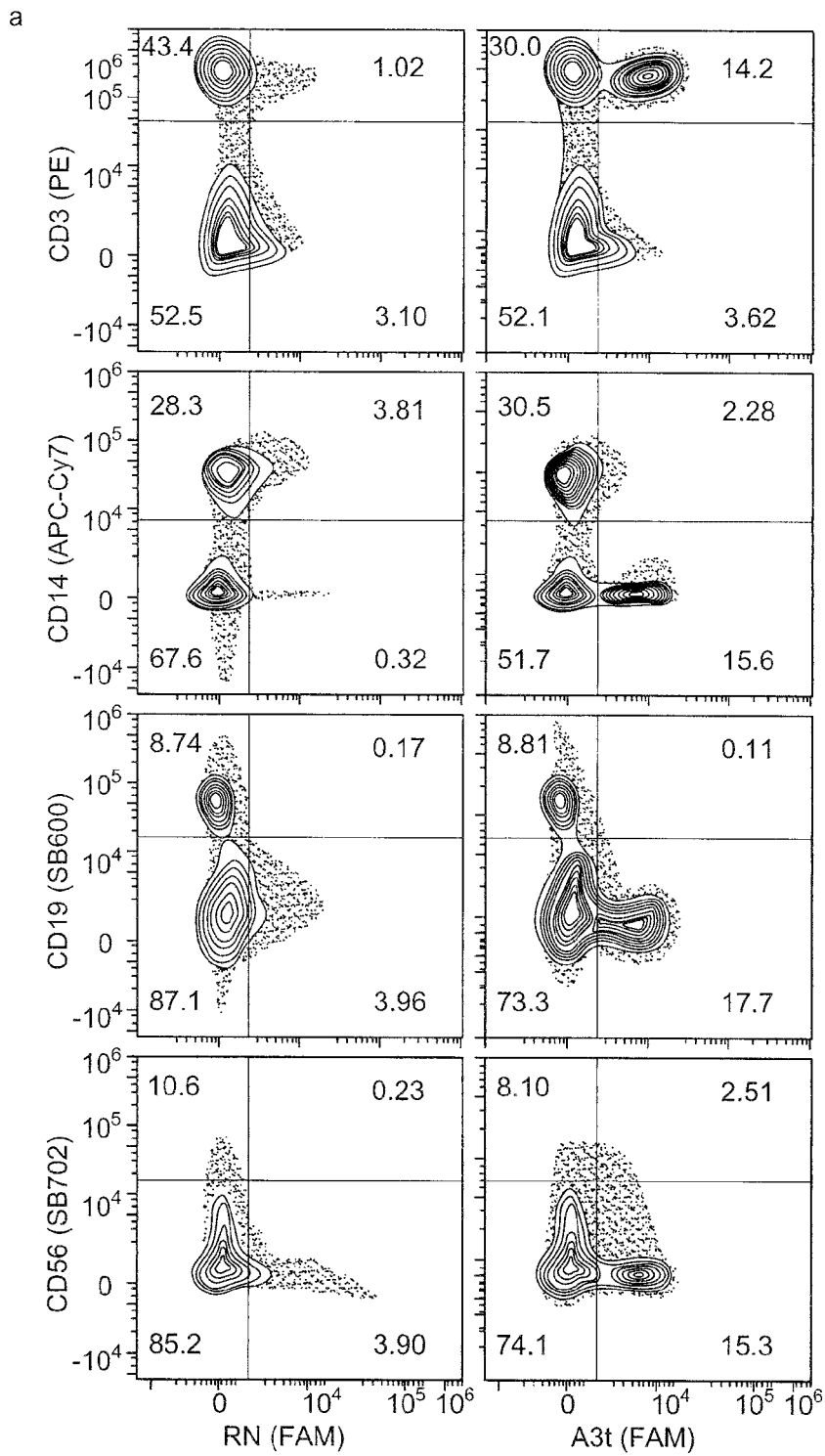

Prior to applying the A3t aptamer to a cell selection process, it was necessary to ensure that the aptamer selectively binds T cells within the context of PBMCs. At the concentration to be used for cell isolation (5 nM), minimal binding to CD3−CD56−CD14+ monocytes and CD3−CD56−CD19+ B cells was observed, and binding to these cell populations was not above the RN aptamer control (FIG. 12). Binding to B cells was especially low (close to 0%)—a desirable trait given that transduction of a single, highly competent leukemic B cell with a CAR was recently shown to induce resistance to therapy.[48] Besides CD3+CD56− T cells, the A3t aptamer also expectedly displayed substantial binding to CD3+CD56+ NKT cells and CD3−CD56+ NK cells, which are known to have subsets that express CD8. As NKT cells have been found to improve CAR T cell therapy,[49] binding to these cells was seen as beneficial. Importantly, the median fluorescent intensity (MFI) of aptamer binding on A3t-positive monocytes, B cells, and NK cells is greatly lower compared to that of A3t-positive T and NKT cells, suggesting that binding events would minimally capture the contaminant cells at this aptamer concentration.

Figure 13A:
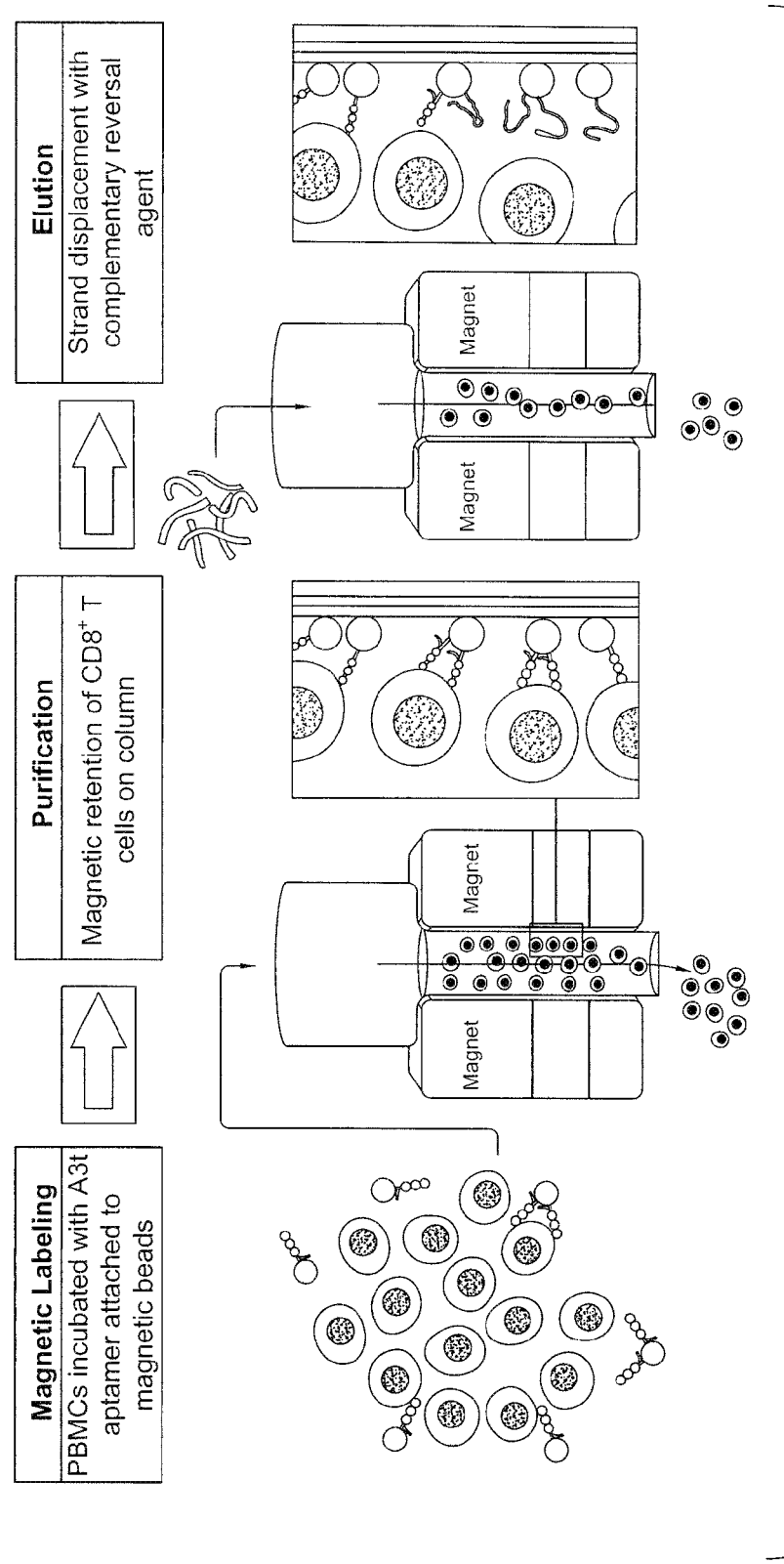
Figure 14A:
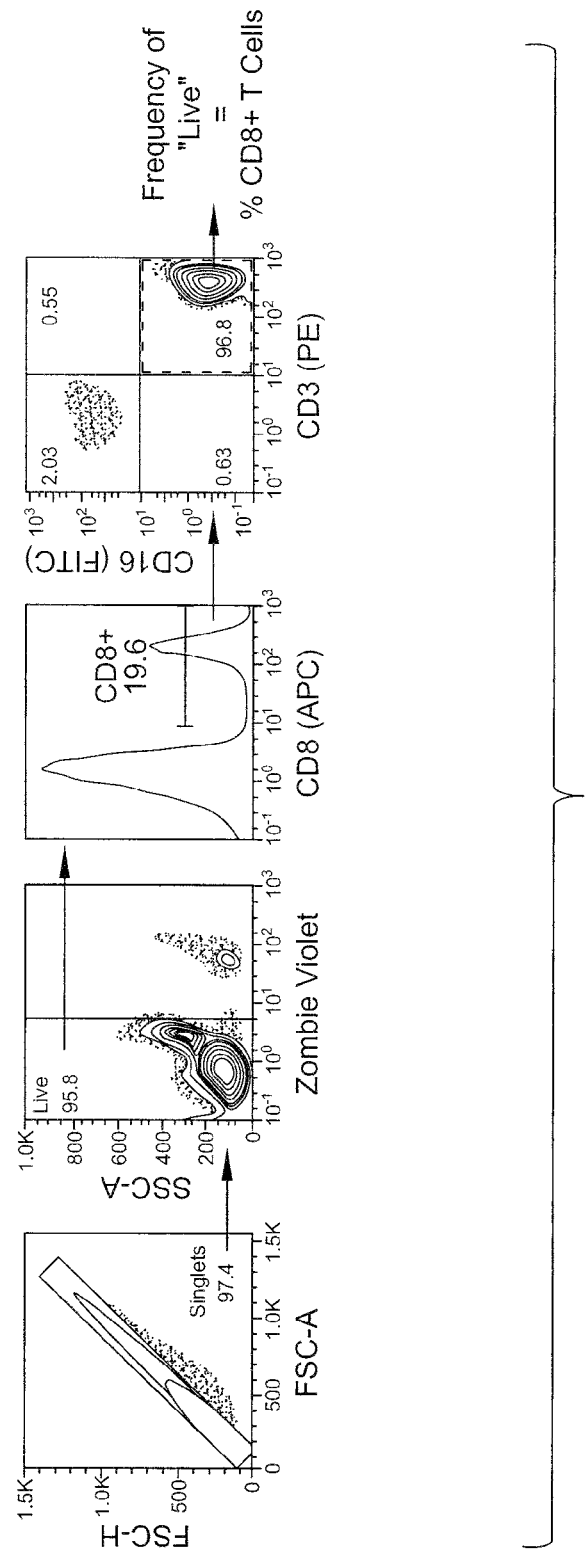
FIG. 14A-14B represents the flow cytometry gating strategies for yield, purity, and phenotype analyses.
Figure 14B:
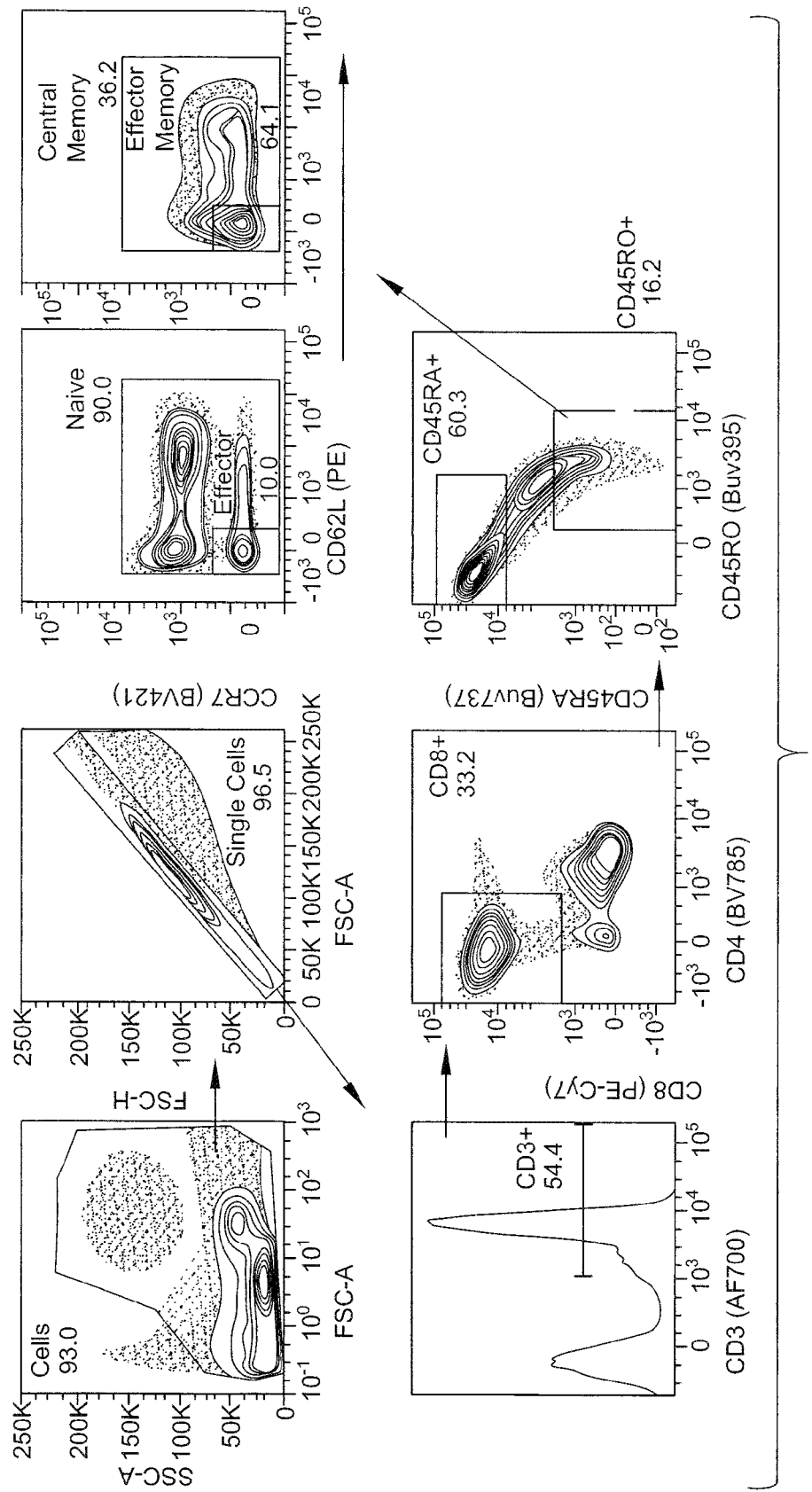

The selection aptamer A3t and its cognate RA can be used to achieve traceless T cell isolation in a completely synthetic system, whereby immobilized aptamers are used to isolate T cells followed by their release by addition of the RA that disrupts the secondary structure of the aptamer for binding (FIG. 13A). This strategy was employed by using immunomagnetic Anti-Biotin Microbeads (Miltenyi Biotec) for aptamer immobilization and compared with commercial antibody-based CD8 Microbeads (Miltenyi Biotec) for its ability to isolate CD8+ T cells with high purity and yield from three healthy donor PBMC populations, since CD8 Microbeads are currently the only selection technology approved for clinical scale CAR T manufacturing. The A3t aptamer that was biotinylated on the 3' end with a flexible 18-carbon linker to lower any bead-derived steric hindrance that would occlude aptamer binding or RA strand displacement. Aptamer was preloaded onto anti-biotin microbeads and incubated with PBMCs using a protocol identical to what is used for commercial CD8 Microbeads, except only half the recommended beads were used (10 µL per 10$^7$ cells). Functionalized PBMCs were then applied onto a column under a magnetic field and the flow through (FT) fraction was collected. Whereas antibody-isolated cells were then removed from the column using a column flush (CF), aptamer-isolated cells were exposed to 100-fold excess of RA for 10 min on the column. The column was then unplugged and washed, which constituted the reversal agent elution (RAE) fraction. Any remaining cells on the column were removed using a CF. The fractions of both isolation methods were counted and analyzed via flow cytometry (FIG. 14A-14B).

Figures 13B, 13C:
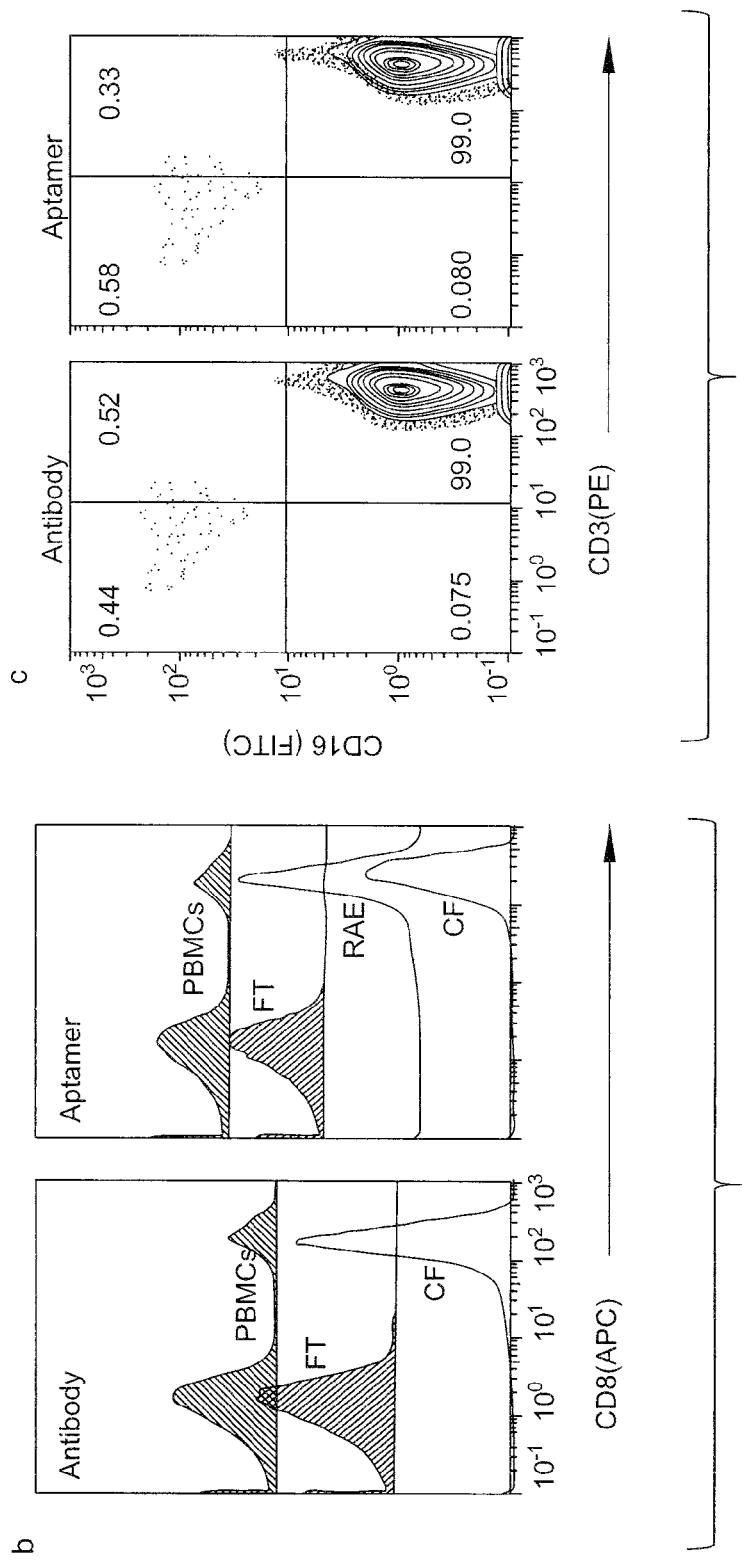

Near complete depletion of CD8+ cells was observed from the FT fraction using aptamer-loaded microbeads, comparable to the antibody-based CD8 Microbeads, and this corresponded to enrichment of CD8+ cells in the RAE and CF fractions (FIG. 13B). Further analysis of the CD8+ cells in the RAE fraction showed that these cells were predominantly CD3+ T cells (>97%), with only a small fraction of the population being CD8$^{lo}$CD16+ monocytes and NK cells (FIG. 13C). This purity analysis is conservative, as it does not account for CD3+CD16+ NKT cells. On average, the RAE and CF of aptamer-based isolation combined yielded 97.5% of the CD8+ T cells from the starting PBMC population, comparable to antibody-based isolation, and the traceless isolation alone (RAE fraction) yielded 72.3% (FIG. 13D). With inclusion of contaminating CD8− cells, the average purity of CD8+ T cells in the RAE fraction was 95.6%, illustrating that the A3t aptamer displays minimal non-specific binding to CD8− cells in PBMCs (FIG. 13E). CD8 staining of aptamer-isolated CD8+ T cells in the RAE fraction with the RPA-T8 antibody clone was comparable to that of CD8+ T cells in the starting PBMC population, whereas that of antibody-isolated CD8+ T cells was lower (FIG. 13F). Given that the antibody-based method depletes nearly the whole CD8+ T cell population (FIG. 13B and FIG. 13D), the lower CD8 staining is a result of the cell-bound CD8 Microbeads hindering the binding of the staining antibody clone used (FIG. 13F). This further emphasizes certain advantages of the traceless nature of RA strand displacement, that will allow for accurate, downstream phenotyping of capture antigens without needing to optimize the staining antibody clone. Aptamer-isolated CD8+ T cells in the CF fraction that were not stripped off in the RAE had higher CD8 expression, indicating that cells with higher CD8 expression and thus aptamer-bead labeling may be more difficult to remove from the column (FIG. 13F).

Figure 15A:
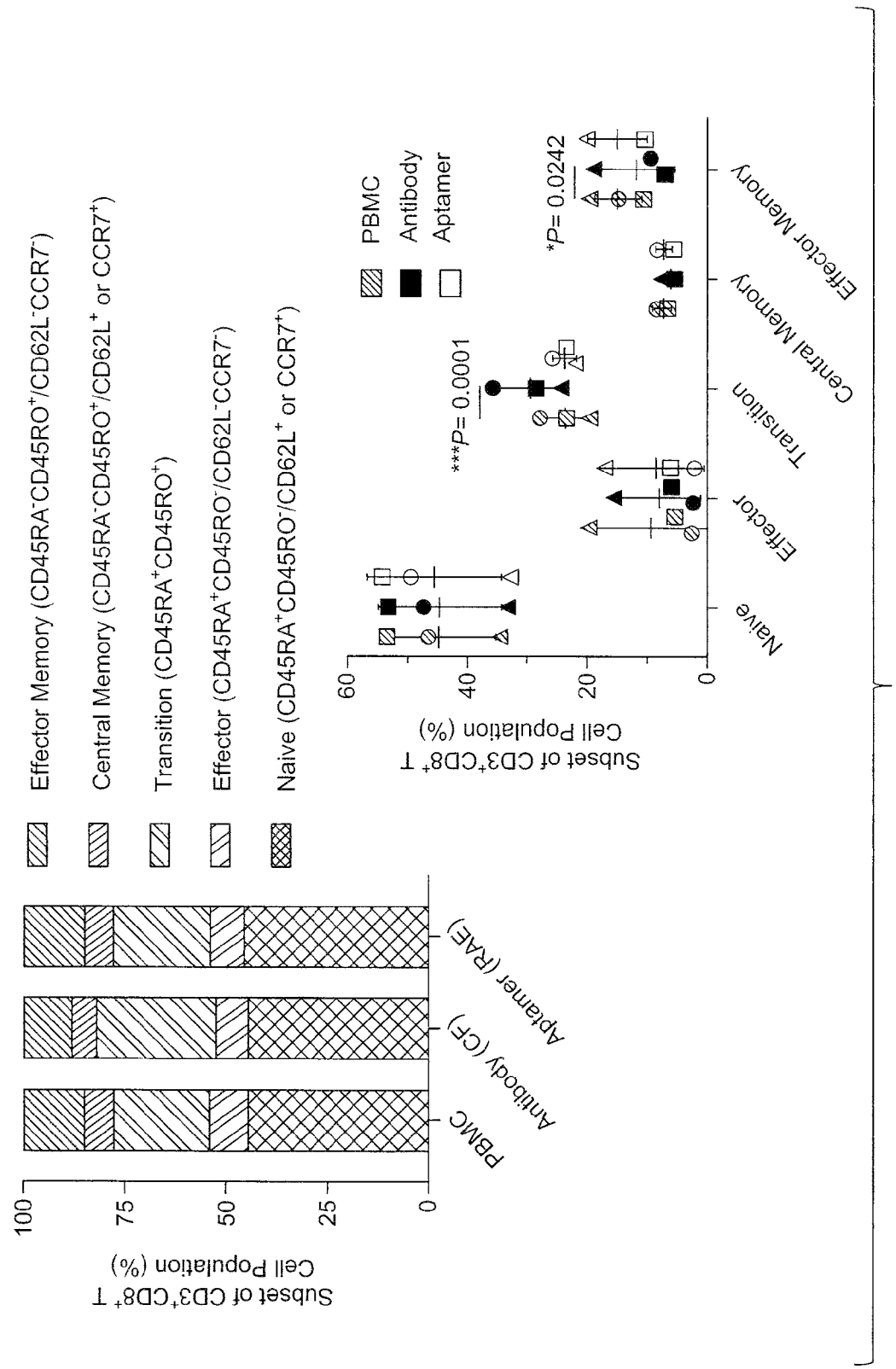
FIG. 15A-15B represents flow cytometry phenotype and NanoString™ gene expression profiling of freshly antibodyand aptamer-isolated CD8+ T cells.
Figure 15B:
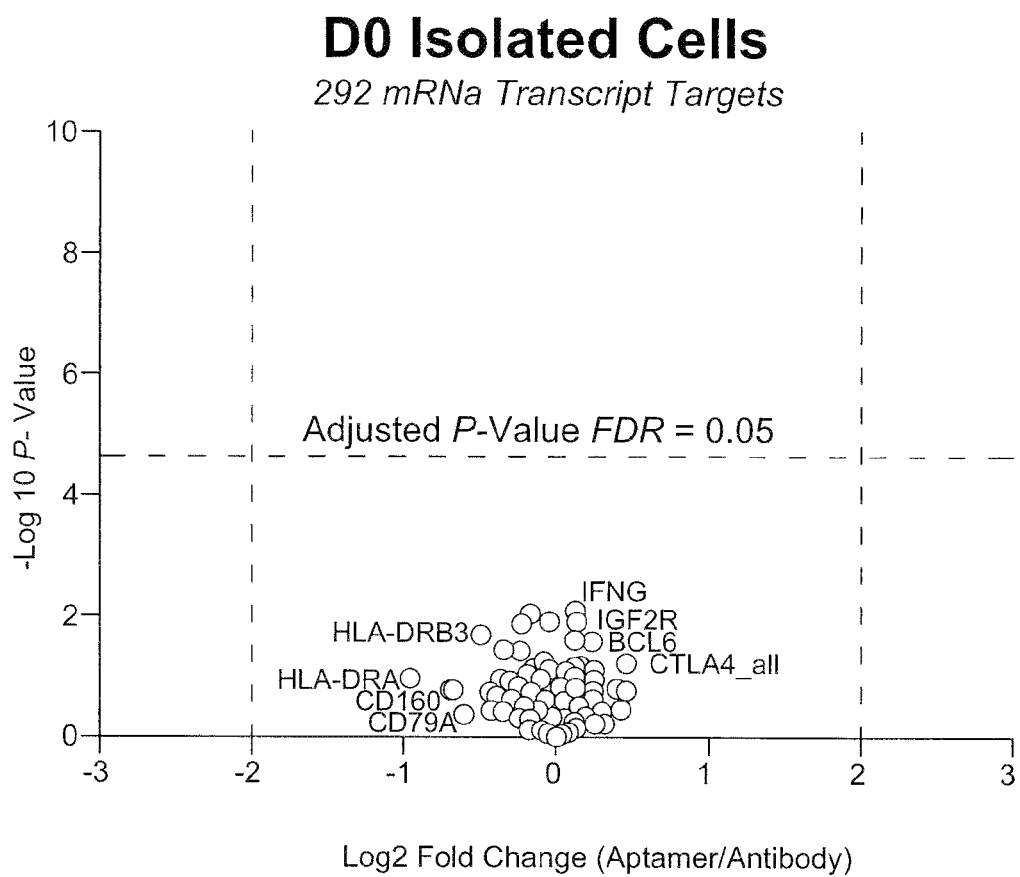

To confirm that aptamer-isolated cells are similar to antibody-isolated cells, the CD8+ T cells were compared in the RAE fraction of aptamer-based isolation to those of antibody-based isolation using flow cytometry phenotyping and NanoString™ nCounter® transcript profiling. Whereas CD8+ T cells in the aptamer-isolated RAE fraction were phenotypically identical to those in PBMCs, antibody-isolated CD8+ T cells comprised of a slightly larger percentage of cells in a transitional stage of dual CD45RA/RO expression which coincided with a small reduction in effector memory cells (FIG. 15A). Transcriptionally, however, aptamer- and antibody-isolated cells were identical, with no gene transcripts being differentially expressed largely or significantly, suggesting that there are no immediate side effects to briefly exposing the cells to high RA concentrations (FIG. 15B).

Generation of CAR T Cells from Aptamer-Based Traceless Cell Isolates

Figure 16A:
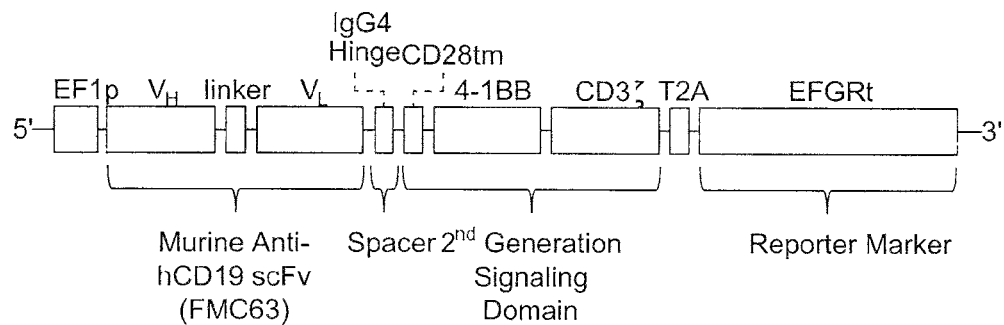
FIG. 16A-16H shows characterization of CD19 CAR T cells generated from antibody- and aptamer-isolated cells.
Figure 16B:
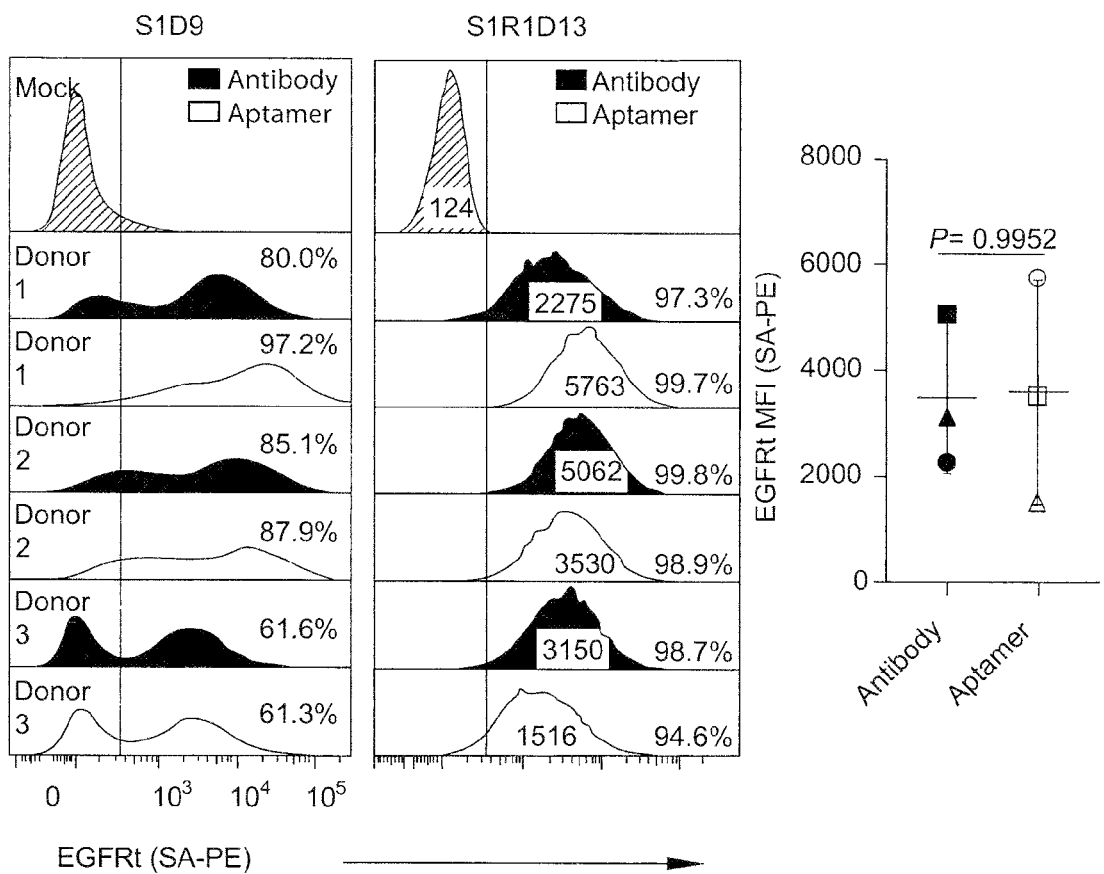
Figure 17:
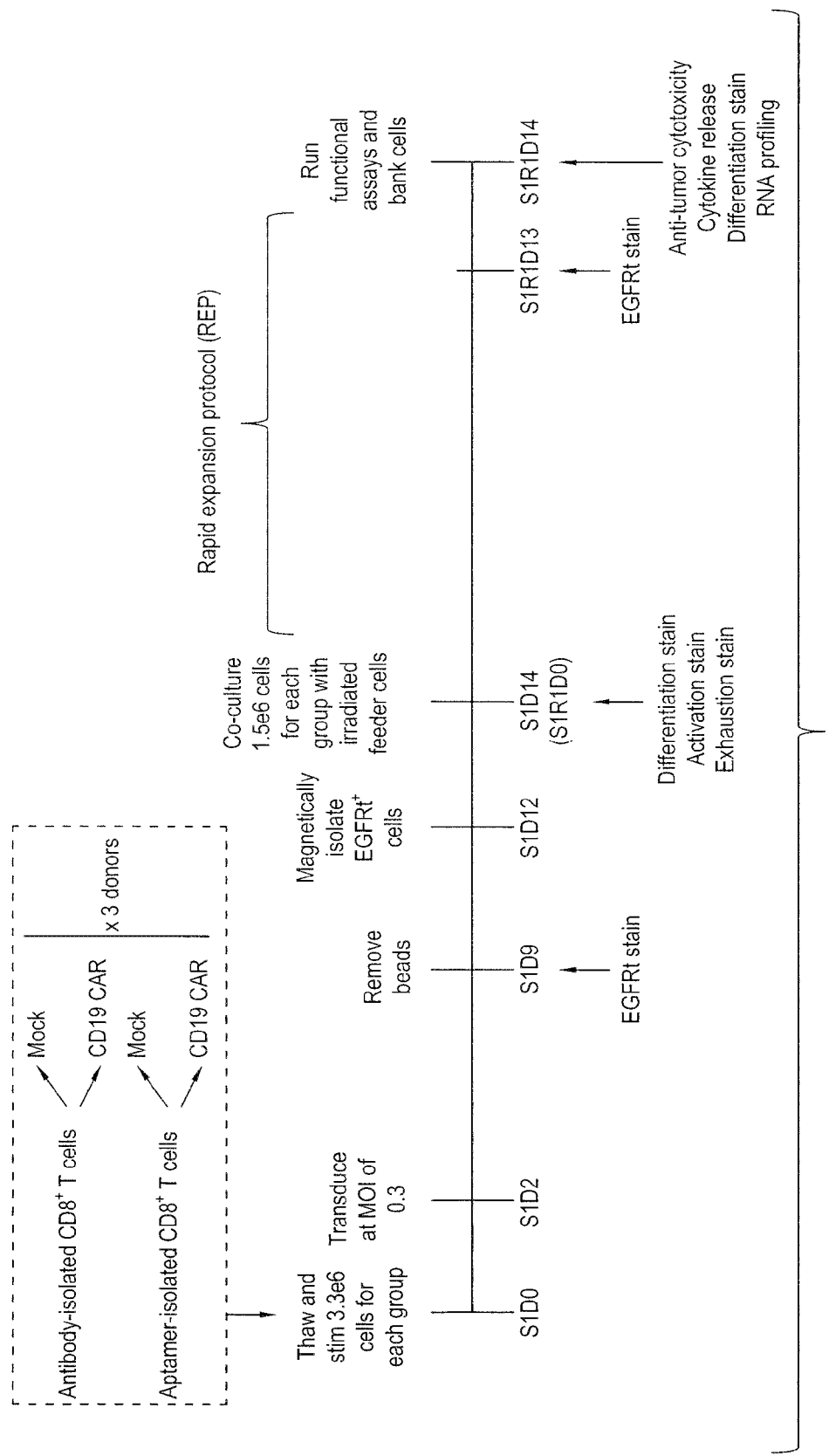
FIG. 17 represents a timeline of CAR T cell production, outgrowth, and characterization. Banked antibody-isolated and traceless aptamer-isolated CD8+ T cells from three healthy donors were thawed, split into two groups of 3.3e6 cells, and stimulated with activator beads. Stimulation-mediated outgrowth was carried out for two weeks: one of the groups was transduced retrovirally with CD19 CAR on day 2 (S1D2), cells were removed from beads and stained for EGFRt transduction reporter on day 9 (S1D9), EGFRt+ cells were magnetically enriched on day 12 (S1D12), and lastly cells were characterized for differentiation, activation/proliferation, and exhaustion on day 14 (S1D14). On S1D14, 1.5e6 cells from each sample were then placed into a two-week rapid expansion protocol (REP), in which they were co-cultured with irradiated feeder cells. On day 13 of REP (S1R1D13), enrichment of CAR+ T cells was assessed via EGFRt stain. Lastly, on day 14 of REP (S1R1D14), cells were functionally characterized using anti-tumor cytotoxicity and cytokine release assays and phenotypically characterized for differentiation and gene expression.

While few differences were observed between aptamer- and antibody-isolated cells immediately after isolation, it was necessary to confirm if this would stay true for a final CAR T cell product generated using these different isolation methods. CD8+ CAR T cells were generated from both the antibody-isolated cells and the traceless aptamer-isolated cells (RAE fraction) shown in FIG. 13D-F and fully compared their outgrowth, phenotype, gene expression, and effector function. Antibody-isolated CD4+ T cells were not included in these studies so as not to convolute any differences between the CD8+ T cells isolated from the different methods. Cells were transduced cells with the PLAT-02 lentiviral vector, that encodes a second generation CD19scFv-41BB-CD3ζ CAR (and a EGFRt surrogate transduction marker) that is used in ongoing clinical trials (FIG. 16A). CD19 CAR T cells were manufactured using a sequential 2-week stimulation bead outgrowth from days 0 (S1D0) to 14 (S1D14) and 2-week rapid expansion protocol (REP) with irradiated CD19+ feeder cells from days S1R1D0 to S1R1D14, as summarized in FIG. 17. After transduction, high EGFRt reporter expression (>60%) was observed on S1D9 without additional selection and was further increased using immunomagnetic enrichment and over the REP period to at least 94% on S1R1D13 before functional assays were ran (FIG. 16B). Transduction copy number was highly variable as indicated by EGFRt MFI, but there was no difference in the mean MFI between antibody- and aptamer-isolated cells (FIG. 16B).

Figure 16C:
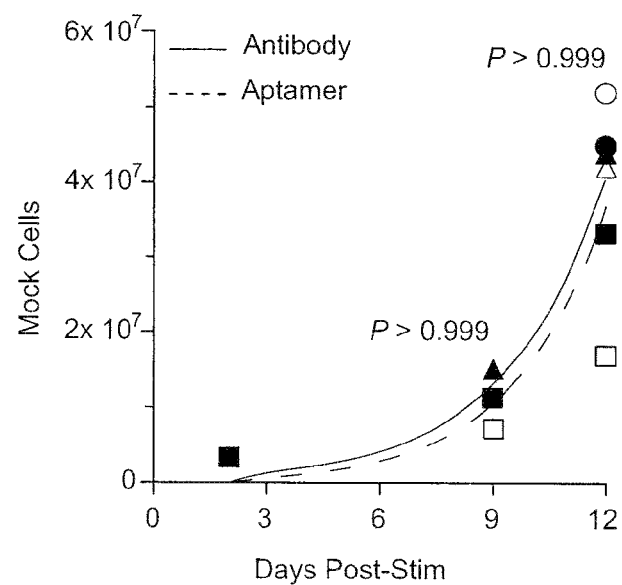
Figure 16D:
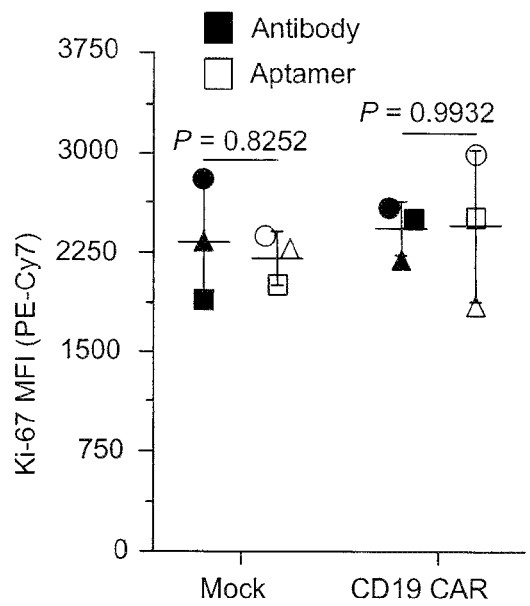
Figure 16E:
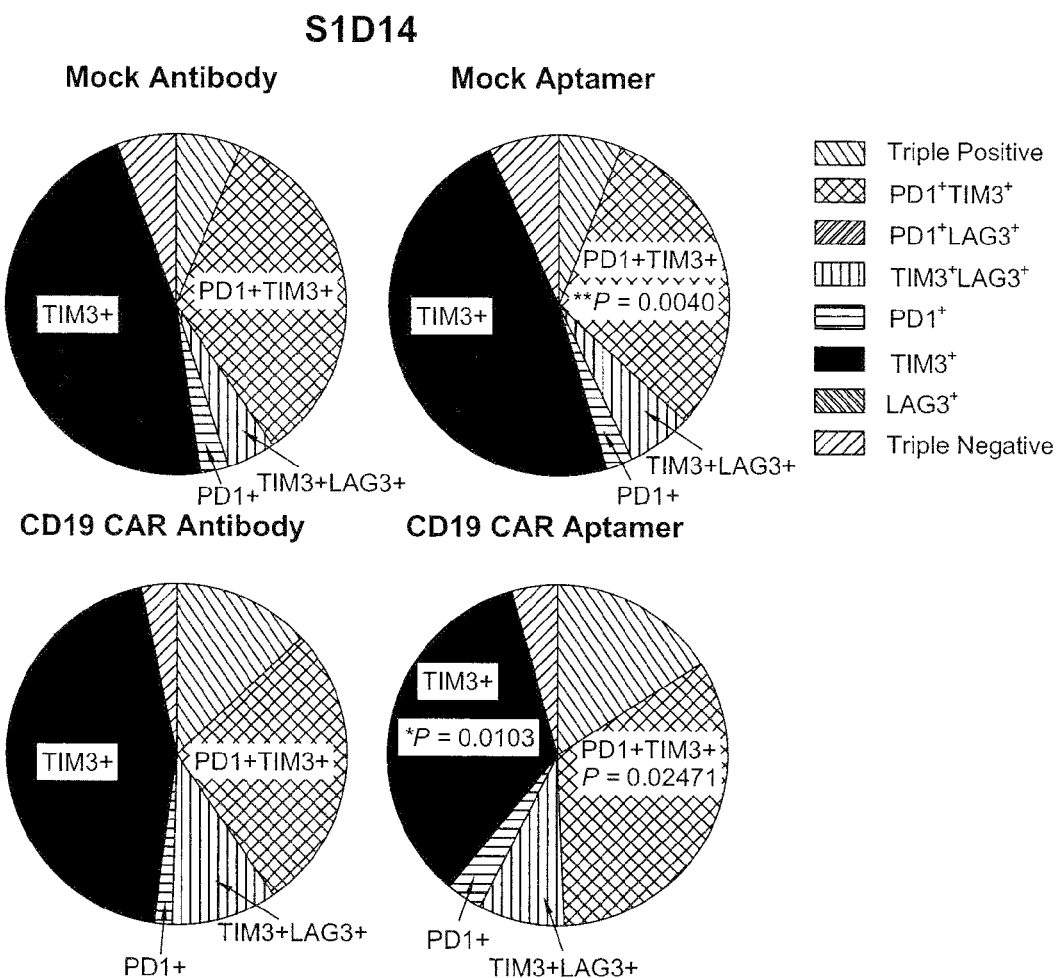
Figure 16F:
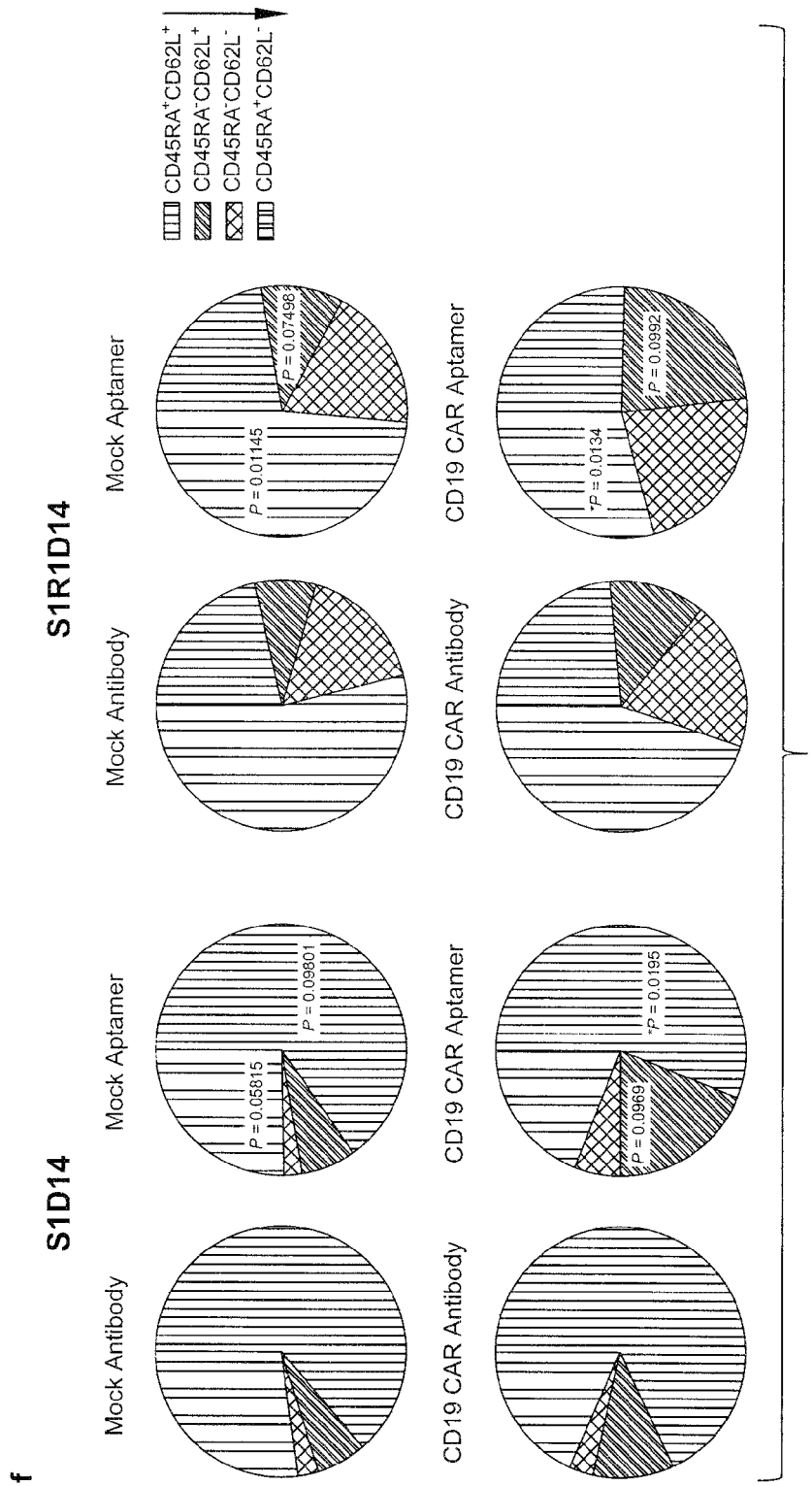
Figure 18:
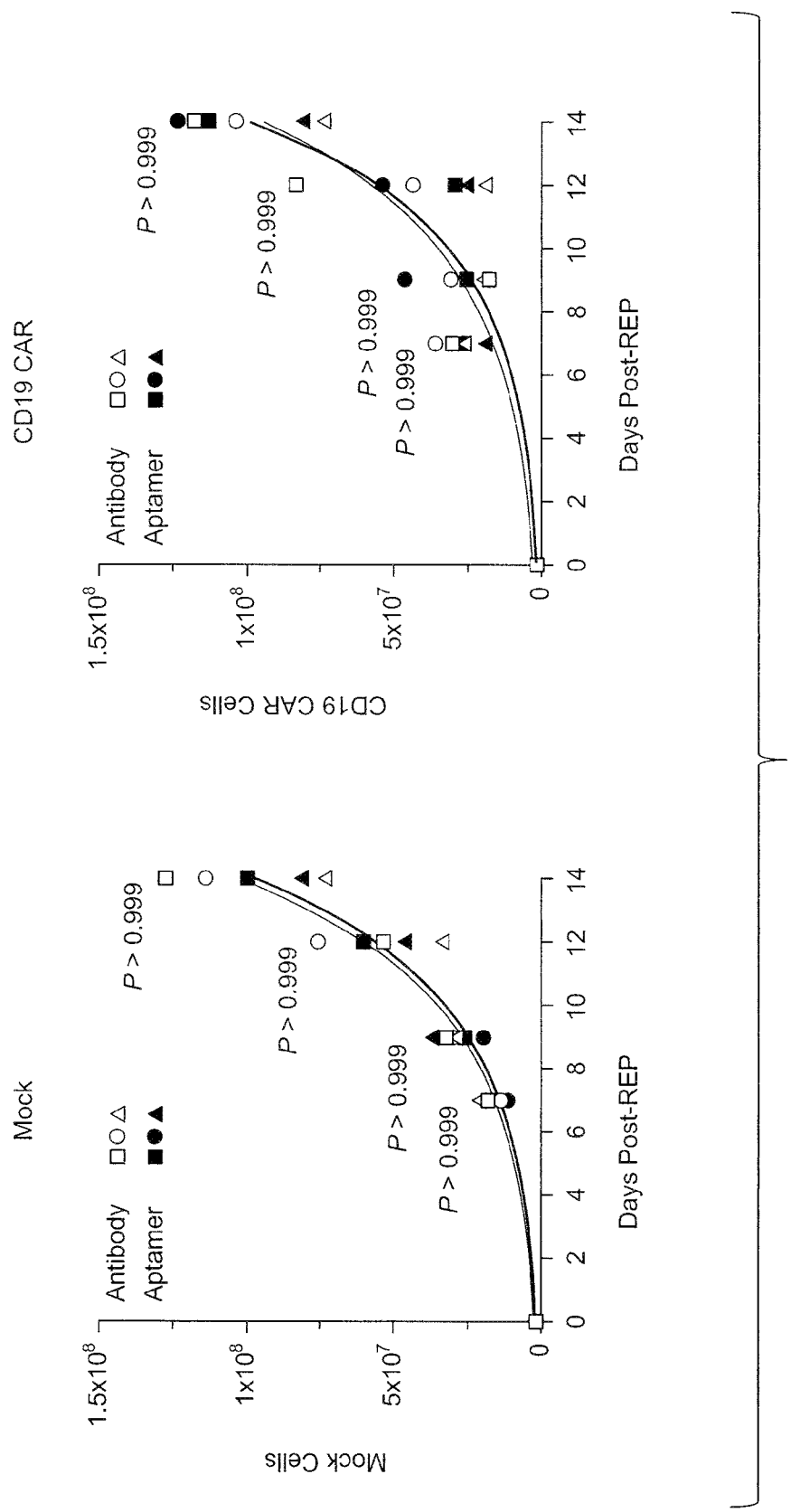
FIG. 18 shows the growth of non-transduced mock and transduced CD19 CAR T cells post-REP. Symbols as in FIG. 15A. n=3, P>0.05 (paired two-way ANOVA with Bonferroni correction). Curves represent a least-squares fit to the exponential growth equation.
Figure 19:
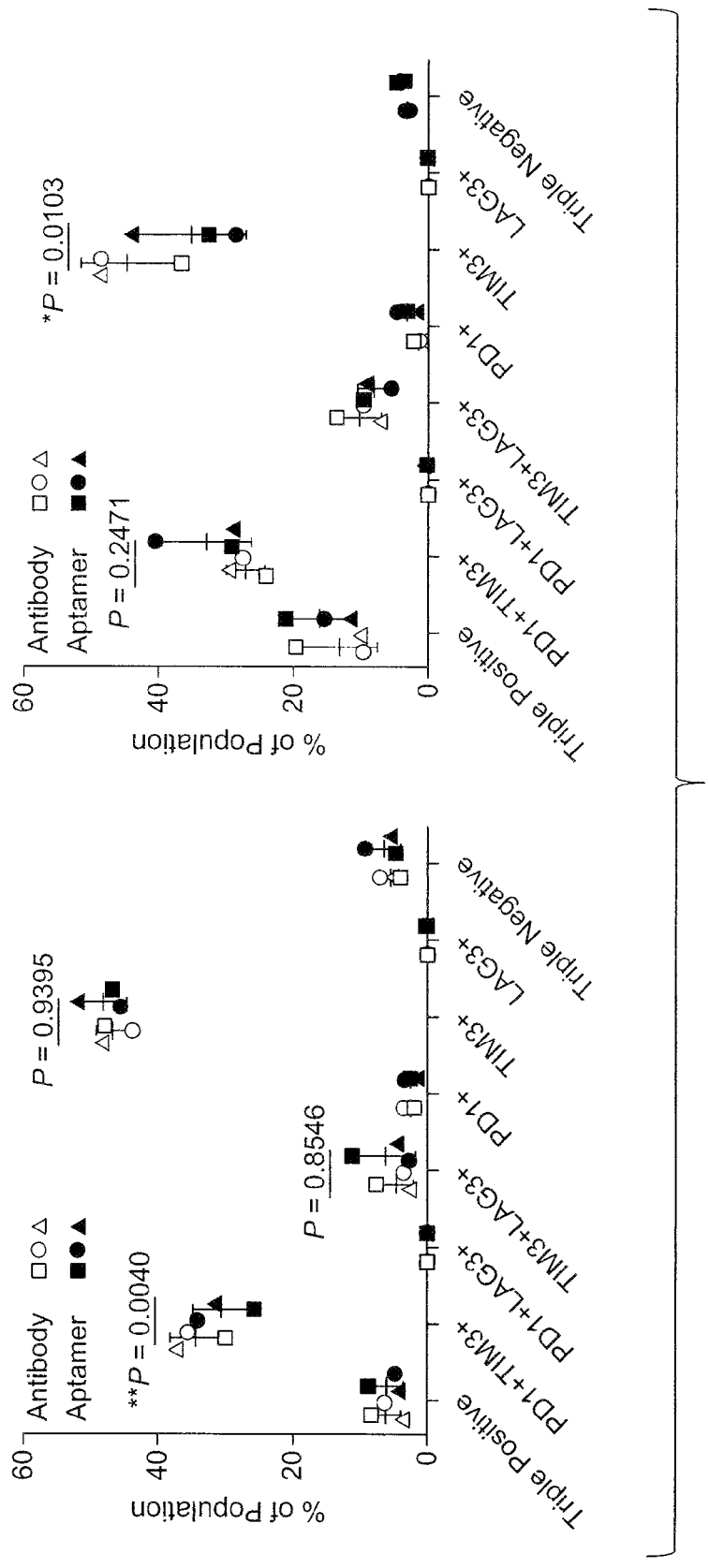
FIG. 19 shows individual values of PD1/TIM3/LAG3 expression in S1D14 antibody- and aptamer-isolated mock and CD19 CAR T cells. Data is representative of the pie charts in FIG. 16E. Symbols as in FIG. 15A. Data are mean±s.d., n=3, P>0.05, *P<0.05 and **P<0.01 (paired two-way ANOVA with Bonferroni correction). All other pair-wise comparisons between antibody- and aptamer-isolated cells have P>0.999.
Figure 20:
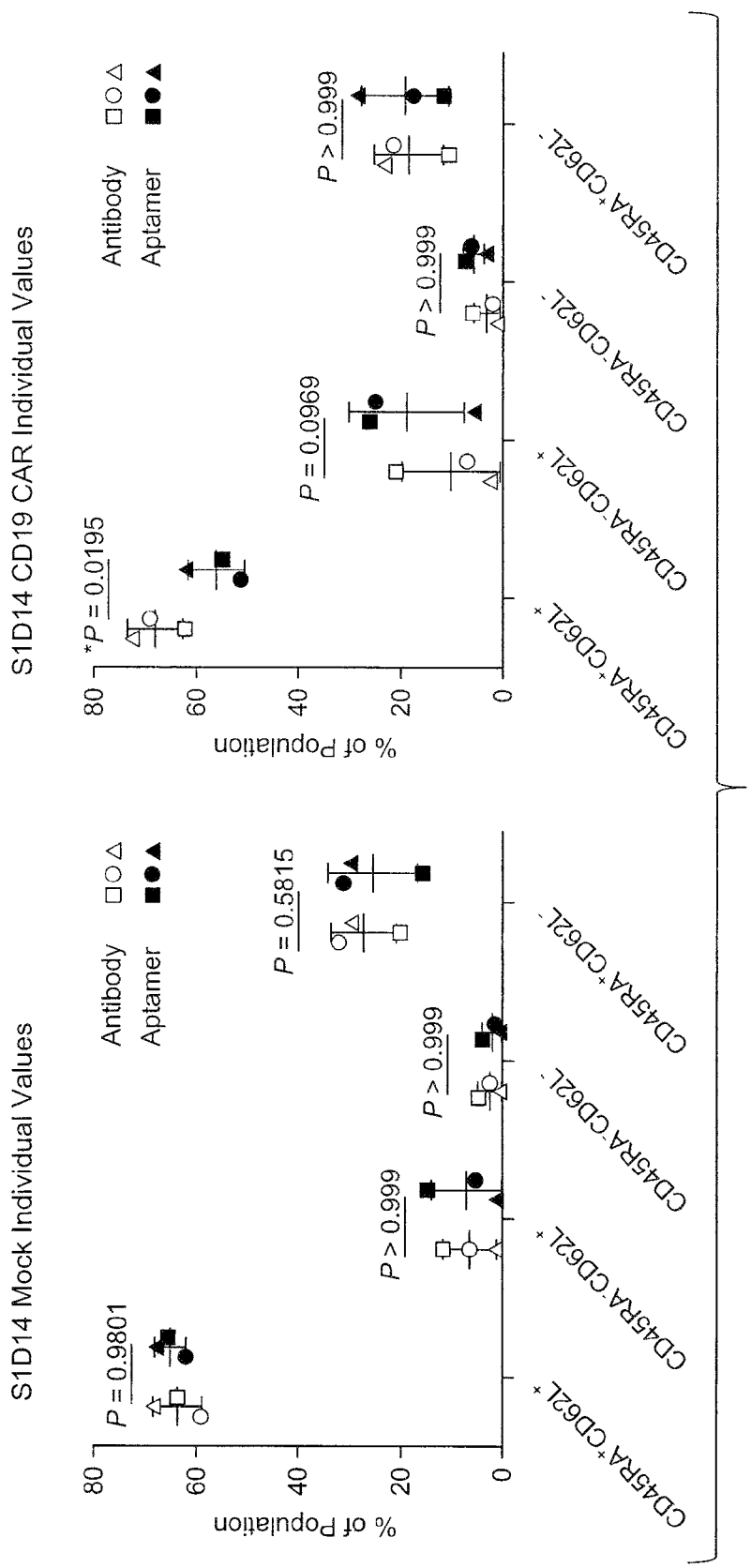
FIG. 20 shows individual values of CD62L/CD45RA expression in S1D14 and S1R1D14 antibody- and aptamer-isolated mock and CD19 CAR T cells. Data is representative of the pie charts in FIG. 16F. Symbols as in FIG. 15A. Data are mean±s.d., n=3, and P>0.05 and *P<0.05 (paired two-way ANOVA with Bonferroni correction).
Figure 20:
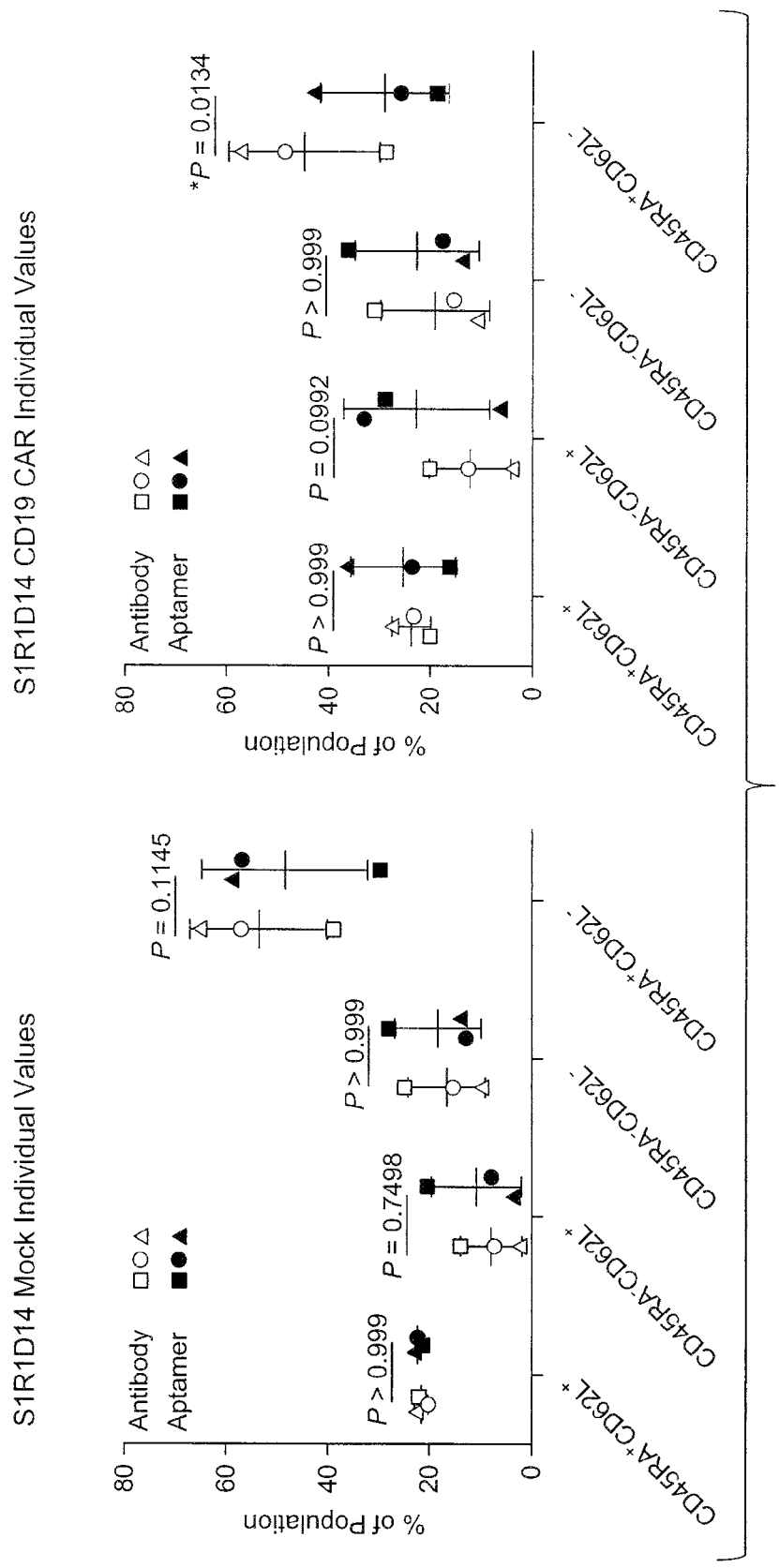
Figure 21:
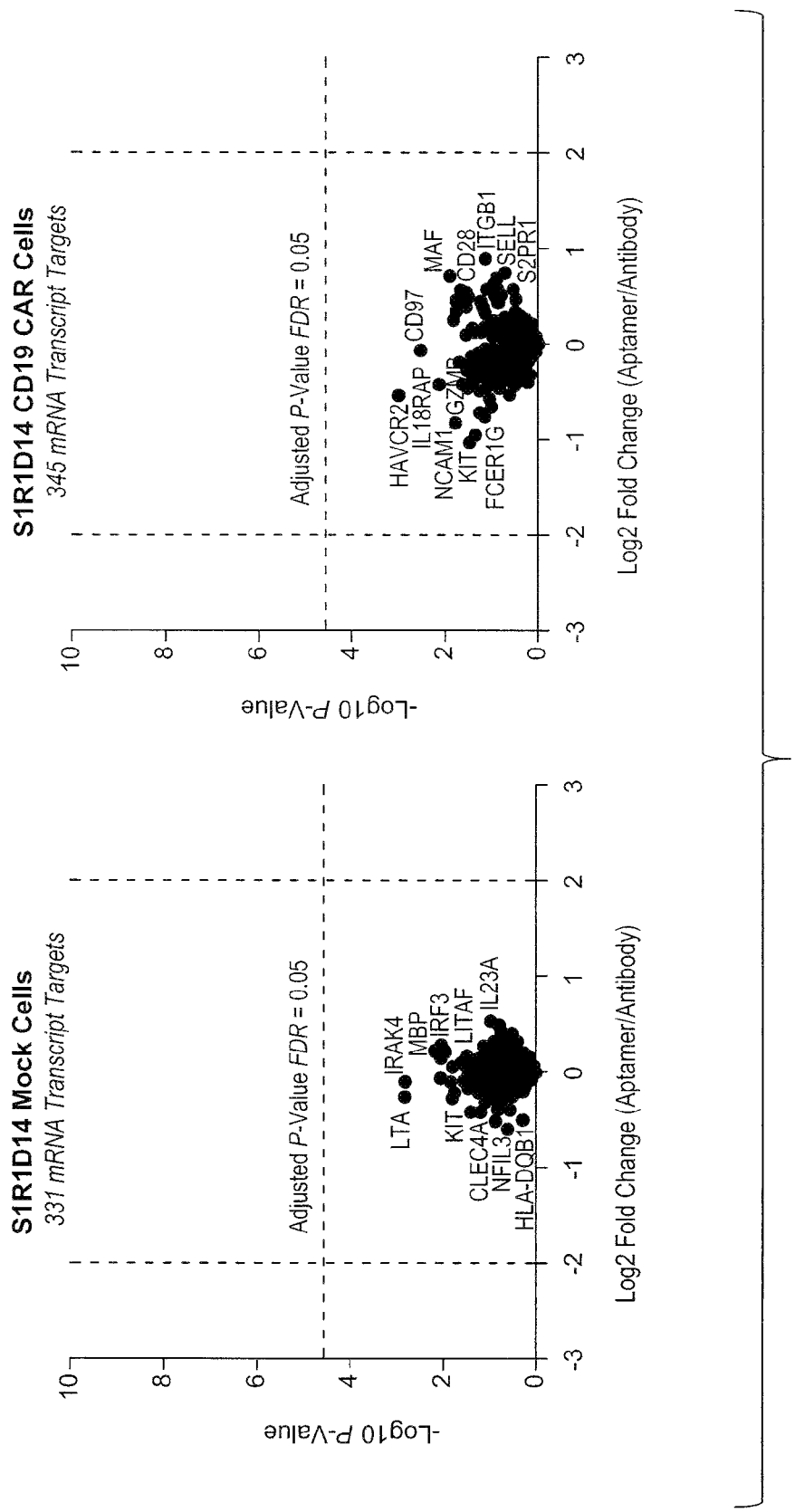
FIG. 21 shows Nanostring™ gene expression profiling of S1R1D14 antibody- and aptamer-isolated mock and CD19 CAR T cells. Differential expression analysis was conducted for 331 and 335 genes identified as being expressed above background in the nCounter Human Immunology v2 Panel for mock and CD19 CAR T cells, respectively. Fold change values indicate the expression of traceless aptamer-isolated cells relative to antibody-isolated cells and are representative of three biological replicates. Data are mean±s.d., n=3 (two-sided paired t-test with Benjamini-Yekutieli correction).

Over the two-week stim period, there were no observed differences in the outgrowth between untransduced antibody- and aptamer-isolated mock T cells (FIG. 16C). This was consistent with the similar Ki-67 expression found between both mocks and CD19 CAR T cells from the different isolation methods at the end of the two-week stimulation outgrowth (FIG. 16D), and unsurprisingly the cells grew identically over REP (FIG. 18). Staining on S1D14 for PD1, TIM3, and LAG3 co-expression, which are markers of both activation and exhaustion, revealed small differences in accumulation of these markers between cells from different isolation methods at the end of the two-week stimulation outgrowth (FIG. 16E and FIG. 19). Whereas aptamer-isolated CD19 CAR T cells saw loss of singly $TIM3^+PD1^-TIM3^-$ cells and gain of $PD1^+TIM3^+$ cells compared to antibody-isolated cells, opposite trends were seen in the mock cells between the two isolation methods, suggesting that these differences are likely artifacts of transduction and the stimulation process and not the isolation strategy. Consistent with the exhaustion/activation data, aptamer-isolated CD19 CAR T cells from the same day exhibited more differentiation than the antibody-isolated cells, as indicated by the greater proportion of $CD45RA^-CD62L^+$, but the mock cells of the two isolation methods were equivalently differentiated (FIG. 16F left, and FIG. 20). After a two-week REP process though, the aptamer-isolated CD19 CAR T cells were less terminally differentiated than the antibody-isolated cells while the mocks remained the same, again suggesting that the isolation strategy is not the principal cause of these small differences (FIG. 16F, right and FIG. 20). NanoString™ nCounter® transcript profiling of immune-associated genes further reaffirmed that these differences were miniscule, with zero genes being greatly or significantly differentially expressed between aptamer- and antibody-isolated mock and CD19 CAR T cells at the end of REP before functional testing (FIG. 21). These results reaffirm that the aptamer selections strategy did not have any durable, long-term side effects on CAR T cell fitness.

Figure 16G:
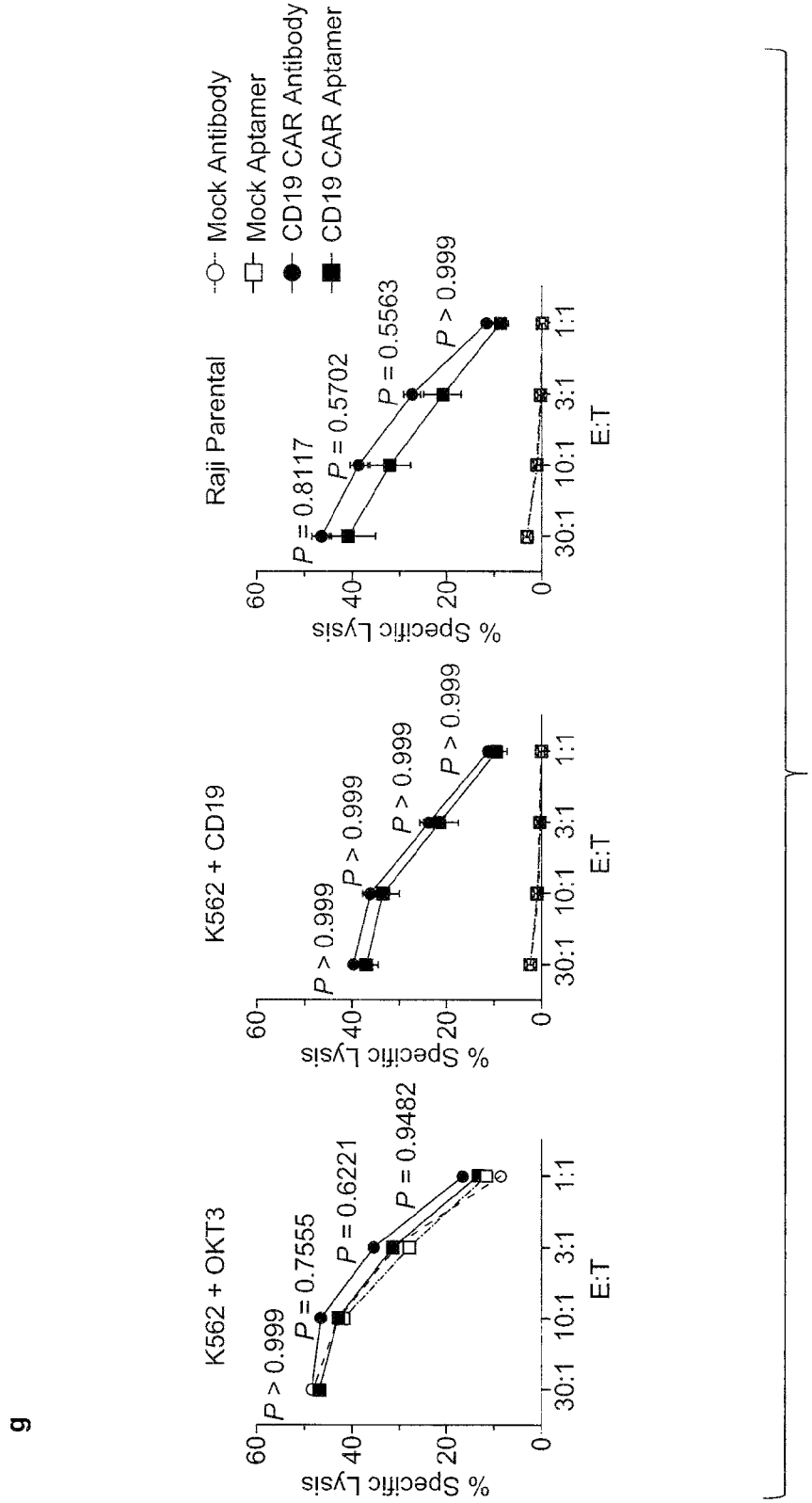
Figure 16H:
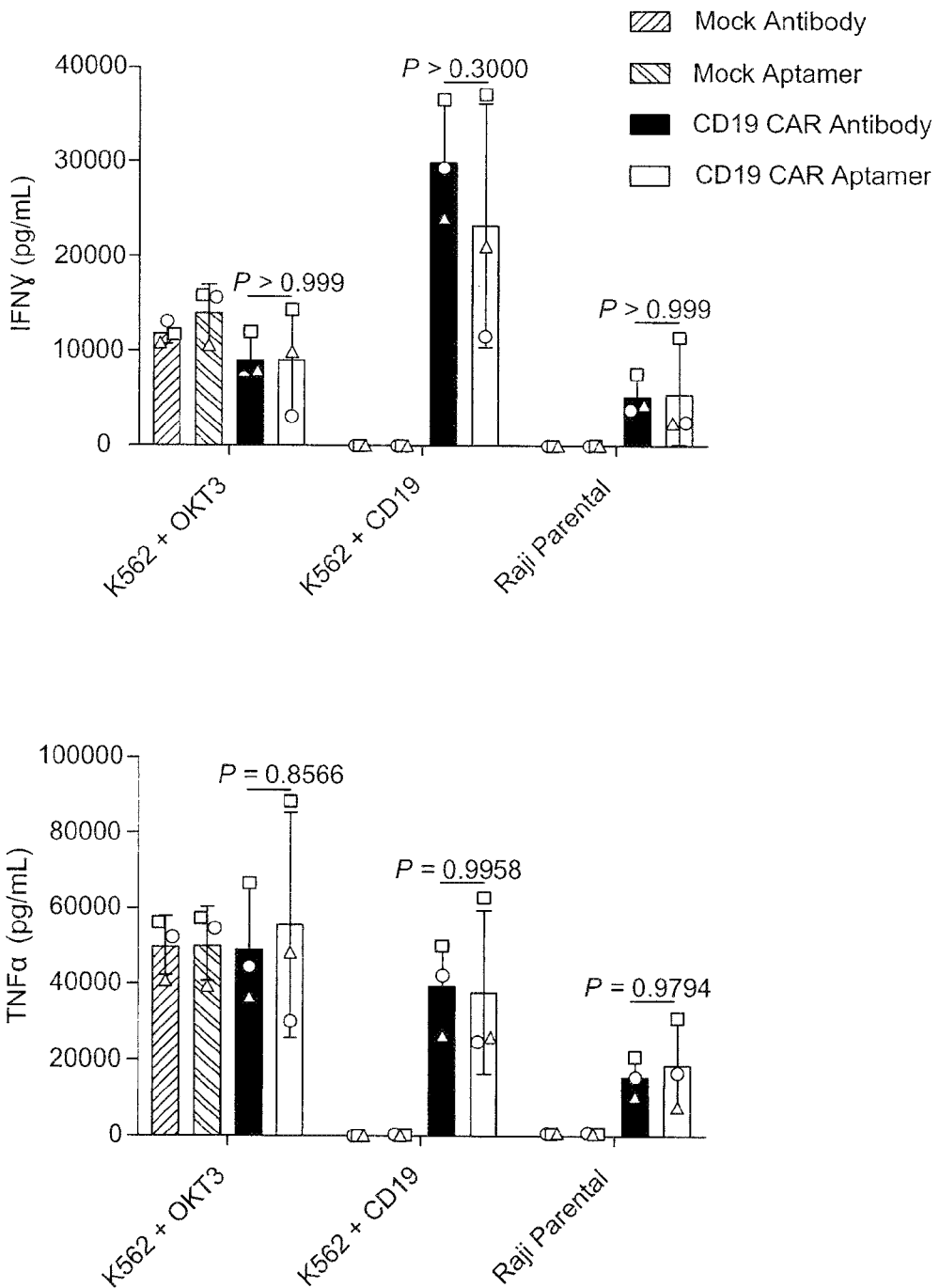
Figure 22:
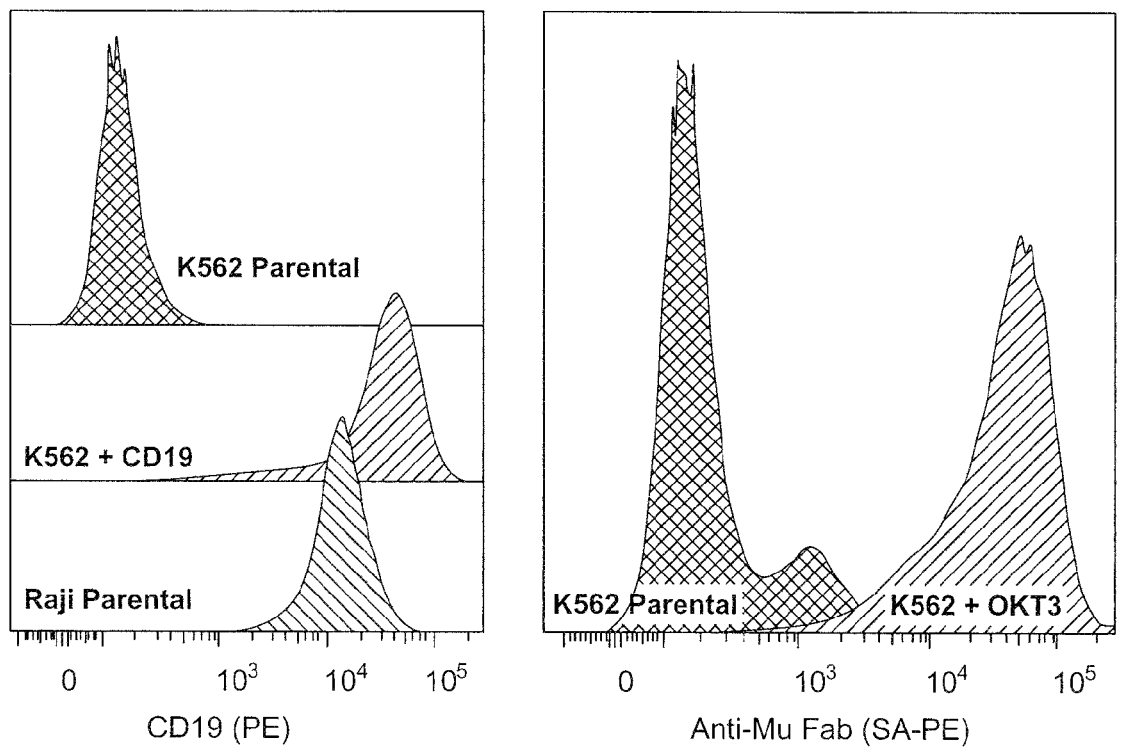
FIG. 22 represents the expression of tumor antigens on target cell lines used for T cell functional studies. Histograms (left) indicate extracellular CD19 expression in K562 parental (negative control), K562+CD19, and Raji parental cells that is targeted by the CAR. Histograms (right) indicate extracellular OKT3 Fab expression in K562 parental and K562+OKT3 (positive control) cells that is targeted by the TCR/CD3.

The anti-tumor effector function was evaluated against both myelogenous leukemia K562 cells lines that were transduced to stably express OKT3 Fab and CD19 for CD3 and CAR engagement, respectively, as well as B lymphoma Raji cells that constitutively express moderate levels of CD19 (FIG. 22). Upon tumor challenge in vitro, aptamer-isolated CD19 CAR T cells lysed all three cell types to similar extents as antibody-isolated cells and secreted identical amounts of effector cytokines TNFα and IFNγ (FIG. 16G-16H). Thus, CAR T cells derived from an aptamer-based traceless isolation strategy perform in vitro to the standard of cells derived from widely used antibody-based isolation.

Aptamer-Isolated CAR T Cell Performance in Systemic Raji Tumor Mouse Model

In vitro cytotoxicity results with CAR T cells do not always corroborate with in vivo results. Thus, despite observing little differences in the effector function of antibody- and aptamer-isolated CD8+ CAR T cells in vitro, it was important to further show that this would translate in vivo. To this end, a less stringent version of the previously described CAR T cell stress test was used, in which Raji-bearing NSG mice were treated with a non-curative dose of CD8+CD19 CAR T cells from the different isolation methods at the end of REP (S1R1D14). Mice were injected with $5 \times 10^5$ GFP-ffluc CD19+ Raji cells and treated 7 days later with $10^7$ antibody- or aptamer-isolated S1R1D14 CAR T cells, as previously described. CD8+ mock T cells from both isolation methods were included as placebo controls.

Administration of $2 \times 10^7$ CD8+ CAR T cells was previously shown to be only 50% curative long-term with this model due to lacking the CD4+ CAR T cell subset critical for therapy persistance.[52] The CD8+ CAR T cells in this study were also expanded by both a 2-week bead stimulation and 2-week REP, and thus displayed markedly more exhaustion and differentiation than 1-week or 2-week expanded CAR T cells described in other publications.[50,51] Consequently, unpublished work using only $10^7$ CD8+CD19 CAR T cells in the same model was found to be non-curative with a maximal survival of approximately 10-weeks.

Figure 23A:
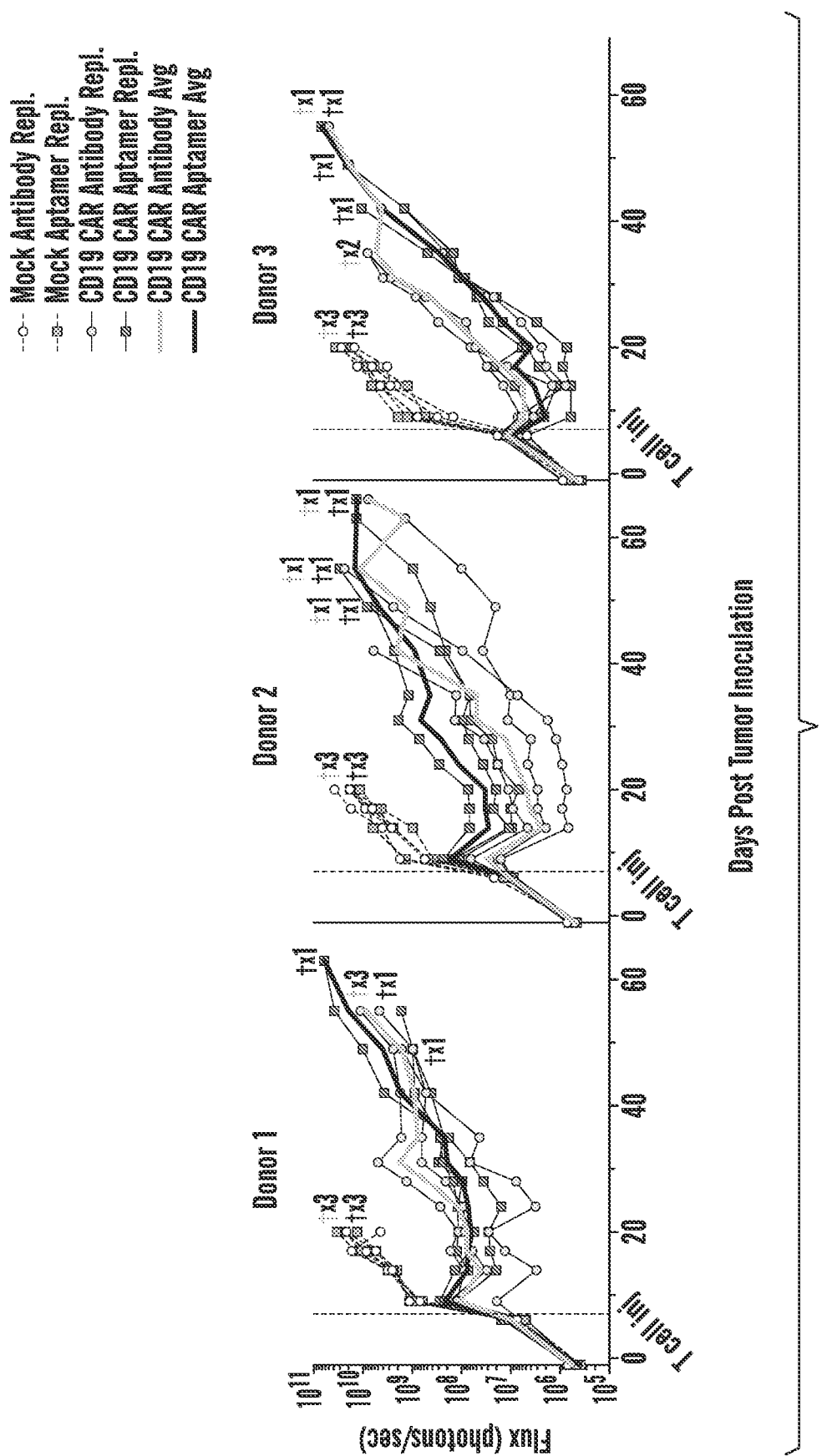
FIG. 23A-23B represents the tumor stress test with antibody- and aptamer-isolated CD8+CD19 CAR T cells. NSG mice were inoculated intravenously (i.v.) with $5\times10^5$ CD19+ Raji cells and treated 7 days later with $10^7$ CD8+ mock or CD19 CAR T cells from antibody- or aptamer-isolated donor cells.
Figure 23B:
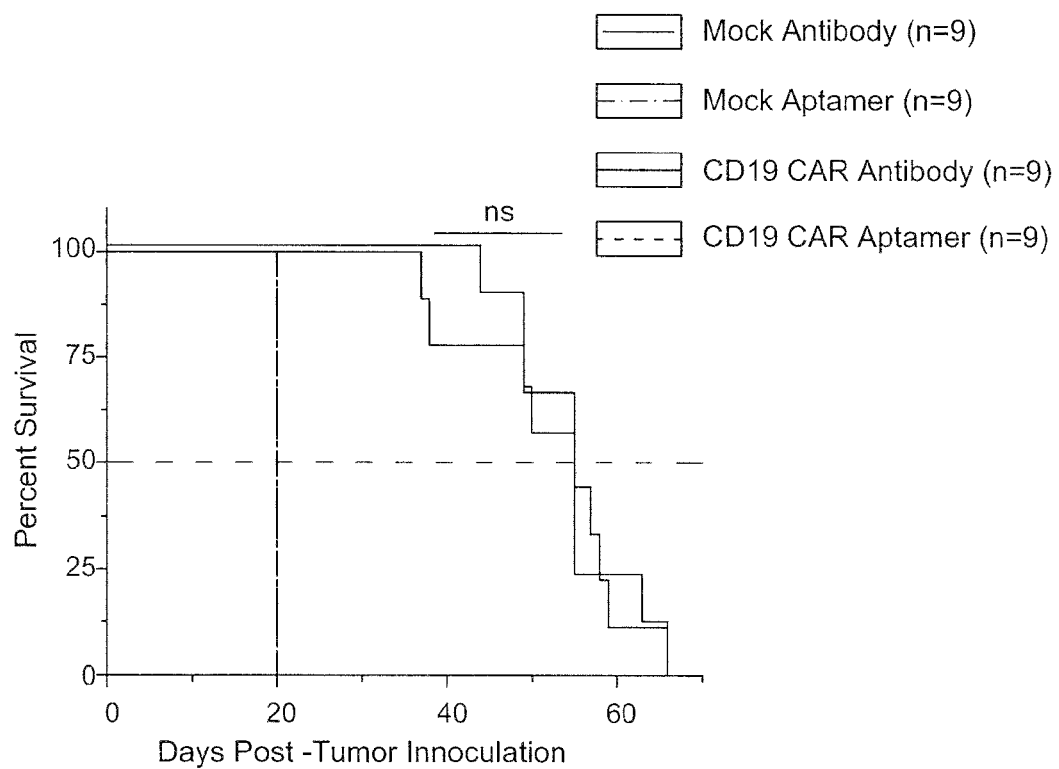

Accordingly, the T cell stress study design provided herein would be able to rigorously identify any differences in anti-tumor effector function between antibody- and aptamer-isolated CAR T cells. However, in vivo, it was continually observed that there was identical anti-tumor activity between both antibody- and aptamer-isolated CD8+ CAR T cells. Tumor regression and relapse kinetics, as measured by photon flux of the tumor, overlapped between mice that received CAR T cells derived from the different isolation methods across multiple donors (FIG. 23A). While the therapy was non-curative for both CAR T cell treatment groups, indicative of a successful stress test model, mice receiving aptamer-isolated CAR T cells exhibited similar prolonged survival compared to mice receiving antibody-isolated CAR T cells, as determined by both biological significance (median survival time) and log-rank statistical significance (FIG. 23B). These results further illustrate that traceless aptamer-based cell isolation with strand displacement is a viable replacement for antibody-based isolation in the initial production step of CAR T cell therapy, having negligible, downstream impact on the quality of the final cell product.

Summary:

A challenge with CAR T cell therapy is the time and cost associated with manufacturing a clinical product. As recent literature has shown that selection of different T cell subsets for therapy may provide improved and consistent clinical outcomes compared to undefined products starting from heterogeneous PBMCs, it is increasingly imperative that efficient and cost-effective selection approaches are developed to meet the demands of these new therapeutic compositions.[7,8] Currently, CD8+ and CD4+ T cells are selected by either (i) splitting the starting leukapheresis product and immunomagnetically depleting undesired cells for further downstream positive selections or (ii) sequentially isolating from the leukapheresis product using immunomagnetic positive selections. Both approaches are far from perfect: the former wastes a portion of the cells in the starting population by nature of splitting the cells but saves time with parallel isolations, while the latter is time consuming by using the whole population in each step. Furthermore, remaining labels on the cells prevent further selection and present regulatory barriers for clinical translation into patients. Two recent reports have used DNA-labeled antibodies followed by strand displacement to isolate multiple cell populations; however, antibodies and DNA tags remain attached to selected cells.[53, 54] The advent of Streptamer™ technology and similar avidity-reliant Fab multimerization strategies have partially mitigated these issues by enabling label-free isolation; however, these approaches still rely on expensive, biologically-produced selection agents and require two or more apparatuses in sequence to isolate pure, separate cell subsets.[16, 17] Additionally, these technologies are perishable and frequently have a sole supplier of consumables, which adds supply-chain risk to a cell therapy manufacturing process that is often time-sensitive for the patients with refractory disease.[10] DNA aptamers and complementary strand displacement with a reversal agent present a unique opportunity to improve selection of T cells for use in adoptive cell therapy. Aptamers are synthetic and thereby inexpensive to produce at large scales. Furthermore, their manufacturing can be outsourced to one of many available companies. Added with their long-shelf life, they bear minimal supply-chain risk. High-affinity DNA aptamers can be developed against multiple targets and their sequences can be further modified post-SELEX to include unique toeholds and stems for aptamer-specific strand displacement. Thus, panels of aptamers against diverse T cell antigens can be developed with corresponding unique reversal agents for sequential label-free isolation of different cell subsets off the same column. As an example, microbeads loaded with CD4 and CD8 aptamers that have unique toeholds and sequences could be added at the same time to one whole leukapheresis product, and CD4+ and CD8+ T cells could be serially eluted off one column by sequential incubations with the corresponding reversal agents. A similar outcome can be achieved using a CD3 aptamer in combination with either a CD4 or CD8 aptamer. Alternatively, one could deplete CD8+ T cells and other unwanted cell subsets using a CD8− specific aptamer and other aptamers that bind monocytes, B cells, and NK cells, respectively. Untouched CD4+ T cells could then be enriched in the flow through fraction, and CD8+ T cells could be selectively eluted from the column using a reversal agent specific to the CD8 aptamer. The key to executing these strategies is the identification of highly cell-specific aptamers.

Described herein is the discovery of high-affinity CD8a-specific aptamers and the successful application of one aptamer with a reversal agent in a traceless CD8+ T cell isolation system. With the aptamer alone, equivalent CD8+ T cell selection yield compared to a widely-used antibody-based approach. With a reversal agent for label-free elution, >70% selection yield and >95% purity of CD8+ T cells was observed. Given that a 350-450 mL apheresis product from an ALL patient will have 3-9×10$^9$ T cells, and only 200-600×10$^6$ CD8+ T cells are needed to manufacture a 1:1 CD4+:CD8+ CAR T cell therapy, the trade of lower yield for high purity, lower cost, and label-free selection with this approach has little consequence but many benefits. Importantly, based on anecdotal observations of the maximal capacity of this system at a small scale, about only $5-10 of aptamer would be needed for reliable clinical-scale isolation. CD19-directed CAR T cells manufactured from label-free, aptamer-isolated cells also exhibited identical performance as CAR T cells generated from antibody-selected cells in assays designed to measure anti-tumor effector function, showing that aptamer-based traceless cell isolation is a practical selection strategy for CAR T cell therapy.

The competitive SELEX approach provided in the Examples was particularly effective for selecting CD8-specific aptamers. SELEX strategies using untouched CD4+ primary T cells or the CD8-Jurkat T cell line may provide benefit in the identification of aptamers that bind to alternative T cell antigens like CD3 or CD4. Furthermore, the use of modified DNA libraries can expand the range of proteins amenable to high-affinity aptamer discovery using unmodified DNA libraries. For such targets, increased chemical diversity by including one or two modified base pairs in the library design may facilitate the successful partitioning of high-affinity binders.[55]

Aptamers can be readily functionalized for attachment to solid supports for affinity chromatography separation, thus resulting in a purely synthetic isolation system without the need for recombinant proteins, magnetic supports, and pre-incubation with selection agents. Cell release efficiency can be improved, by refining the strand displacement kinetics between aptamer and reversal agent through further sequence optimization (higher toehold GC content, aptamer truncation) and chemical modification of the aptamer and reversal agent (e.g., locked nucleic acids).[47, 56] Further discovery of aptamers against the T cell markers CD3 and CD4 can permit a serial selection strategy that can isolate multiple cell subsets tracelessly from a single column. With these refinements it is contemplated that, aptamer and reversal agent-based isolation approaches can be inexpensively applied in process engineering strategies to prepare engineered CD4+ and CD8+ T cells through continuous flow methods, thus increasing the accessibility of T cell immunotherapy.

Example 2: Materials and Methods

Oligonucleotides.

All oligonucleotides studied were synthesized by Integrated DNA Technologies. The ssDNA library used in the T cell SELEX process was HPLC purified and consisted of a 52-base pair (bp) random sequence flanked by two 18-bp constant regions. The primers used for library amplification between SELEX rounds, with IDT modification codes, are as follows: forward 5'-/56-FAM/ATCCAGAGTGACGCAGCA-3' (SEQ ID NO: 105) and reverse 5'-/5BiosG/ACTAAGCCACCGTGTCCA-3' (SEQ ID NO: 106). The individually synthesized ssDNA aptamers are listed in Table 5.

Antibodies and Flow Cytometry.

The following dyes, antibodies, and secondaries were used to stain cells: Zombie Violet (1:500 in 100 µL/1e6 cells, BioLegend), Zombie Yellow (1:500 in 100 µL/1e6 cells, BioLegend), APC anti-human CD4 (1:100, 300514, BioLegend), PerCP/Cy5.5 anti-human CD8a (1:100, 301031, BioLegend), APC anti-human CD8a (1:100, 301014, BioLegend), CD8-biotin (1:100, 130-098-556, Miltenyi), anti-mouse CD16/CD32 Fc block (1:100, 14-0161-86, eBioscience), BV421 anti-mouse CD8a (1:50, 100737, BioLegend), FITC anti-mouse CD3e (1:50, 100305, BioLegend), Purified anti-human CD3 (Clone UCHT1, 300402, BioLegend), Purified anti-human CD8a (CloneRPA-T8, 301002, BioLegend), Super Bright 600 anti-human CD19 (1:20, 63-0198-42, eBioscience), Super Bright 702 anti-human CD56 (1:100, 67-0566-42, eBioscience), PE anti-human CD3 (1:100, 300308, BioLegend), APC/Cy7 anti-human CD14, FITC anti-human CD16 (1:50, 302006, BioLegend), Alexa Fluor 700 anti-human CD3 (1:50, 300424, BioLegend), Brilliant Violet 785 anti-human CD4 (1:50, 317442, BioLegend), PE/Cy7 anti-human CD8a (1:200, 300914, BioLegend), BUV737 mouse anti-human CD45RA (1:25, 564442, BD Biosciences), BUV395 mouse anti-human CD45RO (1:25, 564291, BD Biosciences), PE anti-human CD62L (1:400, 304806, BioLegend), Brilliant Violet 421 anti-human CCR7 (1:25, 353208, BioLegend), Erbitux-biotin (1:500, Jensen Lab), PE-Cy7 mouse anti-Ki-67 (1:20, 561283, BD Biosciences), BUV737 mouse anti-human PD-1 (1:20, 565299, BD Biosciences), Brilliant Violet 785 anti-human TIM-3 (1:20, 345032, BioLegend), PE mouse anti-human LAG-3 (1:20, 565616, BD Biosciences), Brilliant Violet 785 anti-human CD45RA (1:160, 304140, BioLegend), NeutrAvidin Protein DyLight 633 (1:500, 22844, Invitrogen), Alexa Fluor 647 Streptavidin (1:500, 405237, BioLegend), and PE Streptavidin (1:500, 405204, BioLegend). OneComp eBeads (Invitrogen) were used to prepare single-color controls for compensation, if needed. Stained samples were analyzed with either a MACSQuant Analyzer 10 (Miltenyi), Attune NxT (Invitrogen), or BD LSRFortessa (BD Biosciences) flow cytometer.

Cell Line Culture and PBMC Isolation.

J.RT3-T3.5 and Jurkat (Clone E6-1) cell lines used for counter selection and nucleofection, respectively, were purchased from ATCC. The Epstein-Barr virus transformed lymphoblastoid cell line (TM-LCL) used in the rapid expansion protocol (REP) of T cells was made from mononuclear cells as previously described.[43] $CD19^+$ and $OKT3^+$ K562 cells used for functional assays were generated by lentivirally transducing parental K562 parental cells (ATCC) with CD19- or OKT3-expressing constructs. Raji parental cells were also purchased from ATCC. All the above cell lines were cultured in RPMI 1640 medium (Gibco) with 10% heat-inactivated FBS (Life Tech and VWR). Peripheral blood mononuclear cells (PBMCs) were isolated from Leukocyte Reduction System (LRS) cones (Bloodworks Northwest) using Ficoll-Paque density gradient centrifugation (GE). Mixed or $CD8^+$ T cells used in non-isolation experiments were a generous gift from Juno Therapeutics.

Competitive cell SELEX with T cell depletion.

A schematic of the SELEX procedure is shown in FIG. 1, and the conditions used in the individual rounds are summarized in Table 2. The SELEX protocol was adapted from Sefah et al.[23] Broadly, non-stringent positive selection was conducted for Round 1, in which 40 million thawed mixed T cells, depleted of dead cells (Miltenyi), were incubated with 40 nmol ssDNA library (~$10^{16}$ individual sequences) for 1 h at 4° C. For Rounds 2-5, enriched and amplified ssDNA pools generated from the previous round were incubated with thawed PBMCs depleted of dead cells, a process termed competitive selection. After three washes, the desired T cell subset and bound ssDNA sequences were then enriched using a Pan T Cell Isolation Kit (Miltenyi). These T cells were lysed by boiling, and ssDNA sequences were extracted in the clarified supernatant. The ssDNA pool was then incubated with $10^6$ $CD3^-CD8^-$ J.RT3-T3.5 cells at 4° C. as a form of negative selection in each round, and unbound ssDNA sequences were PCR amplified and used in the next round. To increase the stringency of selection and minimize non-specific binders, the amounts of ssDNA, PBMCs, and BSA used and the time of incubation were decreased over the rounds.

Between rounds, the remaining ssDNA sequences were amplified by PCR using 0.02 U/µL Phusion High Fidelity DNA Polymerase (NEB), 1× Phusion GC Buffer, 500 nM of both the forward and reverse primers discussed above, and 200 µM dNTPs (10 s at 98° C., 30 s at 56° C., 30 s at 72° C.). Small 100 µL analytical PCR reactions using 10 µL of ssDNA and 2% agarose gel electrophoresis were always carried out before the large 2 mL preparative PCR reactions using 200 µL of ssDNA to determine the optimum cycle number before large, non-specific amplicons appeared. FAM-labeled ssDNA for use in both subsequent rounds of SELEX and in flow cytometry round binding assays were generated with High Capacity Neutravidin Agarose Resin (Thermo Scientific), 1 M NaOH, and desalting illustra NAP-5 Columns (GE). The amount of ssDNA was quantified by NanoDrop 2000c spectrophotometry (Thermo Scientific) and concentrated by Savant ISS110 SpeedVac drying (Thermo Scientific).

The wash buffer formulation used in all SELEX rounds and in binding assays was 0.22 µm-filtered 500 mL DPBS with calcium and magnesium (Corning) supplemented with 2.25 g of glucose (25 mM final) and 2.5 mL 1 M $MgCl_2$ (5.5 mM $Mg^{++}$ final including amount in DPBS). The binding buffer formulation used was the same wash buffer further supplemented with 0.1 mg/ml yeast tRNA (Invitrogen) and BSA (Miltenyi, varying for SELEX and 1% for binding assays) after filtration. Labeled ssDNA pools or individual aptamers were reconstituted to 1 µM in wash buffer before folding by denaturation at 95° C. for 5 min and snap-cooling on ice. Folded ssDNA pools or individual aptamers were then diluted in binding buffer to the indicated concentrations before incubating with cells in SELEX rounds or binding assays.

Aptamer Binding Assays.

Cells (200,000) were incubated with 100 µL folded FAM-labeled ssDNA pools or FAM/biotin-labeled individual aptamers for 30 min at 4° C. in binding buffer at the indicated concentrations. For antibody competition and multi-color flow cytometry staining with antibodies, antibodies were added in to the primary incubation with aptamer. Cells were washed twice in 200 µL wash buffer supplemented with 1% (weight/volume) BSA to remove excess aptamer. If the aptamers used were biotinylated, cells underwent a second incubation with 100 µL fluorescently-labeled streptavidin or neutravidin secondary for 20 min at 4° C. in wash buffer with 1% (weight/volume) BSA and washed twice. Stained cells were fixed in 200 µL wash buffer with 1% (weight/volume) BSA and 0.1% PFA before analyzing via flow cytometry.

Next Generation Sequencing and Data Analysis.

The starting naive library and ssDNA pools from each SELEX round were PCR amplified with barcoded primers listed in Table 2 for sequencing using the MiSeq Reagent Kit v2 (300 cycles) and MiSeq System (Illumina) according to the manufacturer's instructions. Exported FASTA files were analyzed with FASTAptamer software.[24] Specifically, FASTAptamer-Count was first used to determine rank and reads per million (RPM) for each sequence, where after FASTAptamer-Compare was used to conduct pairwise comparison of RPM of sequences between adjacent rounds and thus calculated fold enrichment (Table 4). The top 100 sequences from Rounds 2-4 were further analyzed by both FigTree software (tree.bio.ed.ac.uk/software/figtree/) for phylogenetic tree generation and MEME Suite software for motif prediction.[26] The NUPACK web application was used to generate predicted secondary structures of aptamer sequences.[44]

siRNA Knockdown.

10e6 thawed $CD8^+$ T cells were activated with Dynabeads Human T-activator CD3/CD28 (Life Tech) at 1.5e6 cells/mL for 3 days in complete RPMI supplemented with 100 U/mL rhIL-2 (Miltenyi, NIBSC calibrated value). On day 3, 3e6 activated T cells were nucleofected with 50 µmol of both CD8a-targeting duplex siRNA (DsiRNA) 1 and 2, listed in Table 5, or 100 µmol of scrambled DsiRNA (IDT) using the Human T Cell Nucleofector Kit (Lonza) with Program T-023 according to the manufacturer's instructions. Aptamer and anti-CD8 antibody staining, as discussed in the previous section, was performed 24 h later and analyzed via flow cytometry.

Plasmid Knock-In.

CD8a-hnRNP-M-EGFP was from Addgene (plasmid #86054).[45] 2e6 CD8⁻ Jurkat cells were nucleofected (Lonza) with 2 μg of the plasmid using the Nucleofector Kit V (Lonza) with Program X-001 according to the manufacturer's instructions. The cells were analyzed 24 h later for both GFP expression and anti-CD8 antibody and aptamer binding via flow cytometry.

Murine Splenocyte Isolation and Staining.

C57BL/6×DBA/2J mice were euthanized with avertin and perfused with 20 mL PBS to limit coagulation.[46] Spleens were harvested, minced with scissors, and dissociated by sieving over a 40-μm cell strainer (Falcon). Red blood cells (RBCs) were removed by incubation with ACK Lysing Buffer (Gibco) and cells were stained with both anti-mCD3 and anti-mCD8 antibodies and aptamers.

Bio-Layer Interferometry.

BLI studies were conducted on a FortéBio Octet Red96 instrument at 25° C. with sample agitation at 1000 rpm. The sample buffer used for all steps was comprised of binding buffer with 0.01% tween-20. Streptavidin-coated biosensors were loaded with 50 nM biotinylated aptamer until all sensors (except for the reference) reached a capture threshold of 0.5 nm. After a 100 second rinse and baseline steps in buffer alone, sensors were exposed to a 1:3 dilution series of recombinant human CD8a protein (Sino Biological) ranging from 150 nM to 5.56 nM. Association with protein was monitored for 1200 sec, and dissociation was carried out for 600 second in buffer alone. Data analysis was carried out using Octet Data Analysis 9.0 software (FortéBio). Kinetic constants were calculated by conducting a global fit of the several processed association and dissociation curves from the protein dilution series to a 1:1 binding model. The quality of the fit was evaluated by the $R^2$ and $\chi^2$ values.

Comparison to Previously Reported Aptamer.

CD8Ap17s, as described by Wang et al., was synthesized with the sequence 5'-CTACAGCTTGC-TATGCTCCCCTTGGGGTA/iSp18//3Bio/-3' (SEQ ID NO: 111).[36] Binding to CD8⁺ T cells was compared to the A3t aptamer (Table 5), except CD8Ap17s binding buffer (A-BB) and folding conditions were also used in addition to the described binding buffer (T-BB) and folding conditions. For the CD8Ap17s conditions, 1 μM of each aptamer was folded by denaturation at 95° C. for 5 min and cooling to 37° C. in their wash buffer (40 mM HEPES, 150 mM NaCl, 5 mM KCl, 1 mM $MgCl_2$, 1 mM $CaCl_2$), pH 7.5). Binding was similarly carried out and analyzed as detailed above but in CD8Ap17s binding buffer, which comprised of the wash buffer supplemented with 5% FBS.

Reversal Agent Optimization.

A 36-bp reversal agent was designed complementary to the 3' end of aptamer A3t (Table 5). Binding to CD8⁺ T cells with 5 nM aptamer A3t was first carried out with secondary fluorescent streptavidin labeling, as discussed above. Labeled cells were then incubated with varying fold-excess (over the amount of aptamer used) of 200 μL reversal agent in wash buffer with 1% (weight/volume) BSA for different times and temperatures. Cells were washed twice with wash buffer 1% (weight/volume) BSA to remove eluted aptamers, fixed, and analyzed via flow cytometry.

Traceless Selection of CD8⁺ T Cells from PBMC.

For each PBMC donor, two 100 μL aliquots of Anti-Biotin Microbeads (Miltenyi) were each diluted to 500 μL in binding buffer with κ nM aptamer A3t and incubated for 15 min at 4° C. under gentle rotation. The tRNA in the binding buffer is critical during this step, as the tRNA is needed to block non-specific binding of the reversal agent for effective downstream elution of cells (data not shown). The aptamer-labeled bead suspensions were then combined, added to 200×10⁶ freshly-isolated PBMCs, and allowed to incubate for another 15 min at 4° C. under gentle rotation. In parallel, 400 μL antibody-based CD8 Microbeads (Miltenyi) were diluted to 2 mL in autoMACS Rinsing Solution (Miltenyi) supplemented with 0.5% (weight/volume) BSA, added to another 200e6 PBMCs from the same donor, and allowed to incubate for the same time, according to the manufacturer's instructions. All cells were washed with 10 mL autoMACS buffer with 0.5% (weight/volume) BSA to remove excess beads, resuspended in autoMACS buffer with 0.5% (weight/volume) BSA, and applied to LS Columns on a QuadroMACS separator (Miltenyi) per the manufacturer's instructions. As the traceless selection protocol was optimized with 100×10⁶ PBMCs (data not shown), the 200×10⁶ PBMCs labeled with aptamer-functionalized microbeads were split over two LS columns whereas the PBMCs labeled with CD8 Microbeads were run over one LS column. A flow through (FT) fraction, which includes the flow through from the initial application of cells and the three subsequent 3 mL column washes, was collected for each isolation method. Whereas a 5 mL column flush (CF) was used to remove CD8 Microbead-labeled cells from the column when removed from the magnet, 1 mL of 500 nM reversal agent (100-fold excess) in autoMACS buffer with 0.5% (weight/volume) BSA and 5 mM $MgCl_2$ was applied to the column on the magnet containing cells labeled with aptamer-functionalized microbeads. Approximately 600-700 μL of the reversal agent solution passed through the column before it was plugged with a M/F Luer Lock Plug (Smiths Medical) for a 10 min incubation at room temperature. Upon removal of the plug, the column was washed three times with 3 mL autoMACS buffer with 0.5% (weight/volume) BSA and 5 mM EDTA, which constituted the reversal agent elution (RAE) fraction. The RAE cells were immediately spun down and resuspended in fresh buffer to remove any reversal agent. Remaining cells on the column were removed with a column flush (CF) per the manufacturer's instructions.

All fractions were counted and analyzed via flow cytometry with two antibody panels: (i) a yield panel staining for CD3, CD8, and CD16 expression and (ii) a phenotype panel staining for CD3, CD4, CD8, CD45RA, CD45RO, CCR7, and CD62L expression. Furthermore, 1e6 cell pellets from both the antibody-isolated CF fraction and aptamer-isolated RAE fraction were flash frozen on dry ice and ethanol for NanoString™ nCounter® analysis. Remaining cells were banked for downstream CAR T cell production.

Cd19 CAR T Cell Manufacturing.

CD8⁺ T cells of both isolation methods from each donor were thawed and 3.3e6 cells for both mock and CD19 CAR T cell production were stimulated 1:1 with Dynabeads Human T-Activator CD3/CD28 (Invitrogen) in 4 mL complete RPMI with 50 U/μL rhIL-2 (Miltenyi) and 0.5 ng/mL rhIL-15 (Miltenyi) in a 12-well plate. After two days (SID2), cells designated for CAR T cell production were transduced with clinical-grade PLAT-02 CD19 CAR lentivirus (a gift from the City of Hope) at a multiplicity of infection (MOI) of 0.3 with 40 μg/mL protamine sulfate via spinoculation for 30 min at 800×g at 32° C. Thereafter, half or full-media exchanges were conducted every 2-3 days to replenish cytokines, and cells were moved to larger culture vessels when cell concentrations reached 1.5-2e6 cells/mL. The activator beads were removed 9-days post-stimulation, termed S1D9, and stained for EGFRt reporter expression to assess transduction efficiency. Cells were magnetically enriched 12-days post-stimulation (S1D12) for EGFRt expression using biotinylated Erbitux antibody and Anti-Biotin Microbeads (Miltenyi) according to the manufacturer's instructions. On day 14 post-stimulation (S1D14), cells were analyzed via flow cytometry with three small antibody panels: (i) an activation/proliferation panel staining for Ki-67, (ii) an exhaustion/activation panel staining for PD1, TIM3, and LAG3, and (iii) a differentiation panel staining for CD62L and CD45RA.

The 2-week stimulated T cells were further expanded using a 2-week rapid expansion protocol (REP), as previously described.[47] Briefly, 1.5e6 CD19 CAR T cells were co-incubated with 10.5e6 irradiated CD19$^+$ TM-LCL feeder cells in 25 mL complete RPMI supplemented with the aforementioned cytokine concentrations in T-25 flasks (Corning). Similarly, 1.5e6 mock T cells were co-incubated with 10e6 irradiated CD19$^+$ TM-LCL feeder cells and 50e6 irradiated donor-mismatched PBMC feeder cells in 25 mL complete RPMI supplemented with the aforementioned cytokine concentrations and 30 ng/mL OKT3 in T-25 flasks (Corning). PBMCs and TM-LCL cells were irradiated at 3500 and 8000 rads, respectively, using a Cesium source irradiator. As was done over the 2-week stimulation expansion, cytokines were replenished every 2-3 days (OKT3 was replaced only on Day 2) and cells were moved to larger culture vessels when cell concentrations reached 1.5-2e6 cells/mL. On day 13 post-REP (S1R1D13), the CD19 CAR T cells were stained for EGFRt reporter expression to assess enrichment and purity of CAR$^+$ cells after magnetic selection and REP. On day 14 post-REP (S1R1D14), cells were characterized again with the differentiation panel that stained for CD45RA and CD62L expression, and a 1e6 cell pellet of each cell lot was flash frozen for downstream NanoString™ nCounter® analysis. The remaining cells were used in functional assays or banked.

Nanostring™ nCounter® Gene Profiling.

Thawed cell pellets were resuspended in RLT lysis buffer with β-mercaptoethanol at 3,500 cells/µL, and overnight hybridization reactions with the nCounter® Immunology Panel (Human V2) Reporter CodeSet and Capture ProbeSet were ran according to the manufacturer's instructions. Samples were run on the nCounter® SPRINT Profiler® (NanoString), and mRNA counts were normalized in groups by day and cell type (D0, S1R1D14 mocks, S1R1D14 CD19 CAR) using the Advanced Analysis 2.0® software (NanoString), which selects the housekeeping genes that minimized the pairwise variation statistic. Each group has 6 samples, 3 biological replicates for antibody-based isolation and 3 biological replicates for aptamer-based isolation. Using Excel (Microsoft), mRNA probes that gave normalized counts less than 25 for more than 50% of the samples in a group (i.e. 4 or more samples) were removed from the analysis due to being mostly below background. The unadjusted P-values of the $LOG_2$ fold changes in the probe counts of aptamer-isolated cells over antibody-isolated cells were determined using a paired two-tailed t-test in Excel, and the threshold for significance was calculated using the Benjamini-Yekutieli multiple-testing correction in R software.

Anti-Tumor Cytotoxicity Assay.

K562+OKT3, K562+CD19, and Raji parental target cells were each seeded at 5e6 cells in 4 mL complete RPMI in a well of a 12-well plate, and 75 µL Cr-51 (Perkin Elmer) was added to each well with cells. Cells were harvested a day later and seeded at 5,000 cells/well in a 96-well plate at 100 µL. S1R1D14 CD8$^+$ mock and CD19 CAR effector T cells in 100 µL were added to the target cells at different effector-to-target (E:T) ratios ranging from 1:1 to 30:1. Media without cells or with 2% SDS were also added to wells with target cells as minimum and maximum lysis controls, respectively. Target and effector cell mixtures were lightly pelleted at 700 rpm for 2 min before incubating for 4 hr at 37° C. in an incubator. 50 µL of supernatant was then harvested into LUMA plates (Perkin Elmer) and allowed to dry overnight. The plates were analyzed by a TopCount NXT Microplate Scintillation and Luminescence Counter (Perkin Elmer).

Anti-Tumor Cytokine Release Assay.

K562+OKT3, K562+CD19, and Raji parental target cells were plated at 50,000 cells/well in a 96-well plate at 100 µL. S1R1D14 CD8$^+$ mock and CD19 CAR effector T cells were added to target cells at 100,000 cells/well in 100 µL and allowed to co-incubate for 24 h. Cells were then pelleted at 1200 rpm for 3 min, and 120 µL of supernatant was collected and frozen at −80° C. until ready to analyze. Thawed supernatants were diluted 1:5 or 1:20 in RPMI without FBS, and IL-2, IFNγ, and TNFα in the supernatants and a standard (Bio-Rad) were captured and fluorescently detected on magnetic beads using a 3-plex Bio-Plex custom kit with flat magnetic plates (Bio-Rad) according to the manufacturer's instructions. The beads with captured cytokines were analyzed using a Bio-Plex 200 system (Bio-Rad).

T Cell Stress Test Mouse Model.

8- to 12-week-old NOD/SCID/IL-2Rγ null (NSG) female mice (Jackson Laboratory) were inoculated with $5 \times 10^5$ GFP-ffluc Raji cells in 200 µL PBS by tail vein injection, followed by 107 S1R1D14 antibody- or aptamer-isolated CD8+ mock or CD19 CAR T cells 7 days later. The same three donors from the in vitro studies were tested, and for each of the four T cell populations evaluated, 3 mice were used per donor (for a total of 9 mice in each treatment group across all donors). For bioluminescence imaging, mice were injected subcutaneously with 150 µL D-luciferin (PerkinElmer) in PBS (4.29 mg per mouse) and unsaturated images were acquired with the Xenogen IVIS Imaging System (PerkinElmer) after 7 and 10 min using medium or small binning and an acquisition time of 30 sec to 1 min. Photon flux was analyzed using the Living Image software (PerkinElmer). This mouse study was conducted under a protocol approved by the Institutional Animal Care and Use Committee. On day 6 post-tumor inoculation, mice were arranged into groups of 3 mice each for each donor and treatment group such that the average photon flux of the pre-established systemic tumors was approximately equal across all groups. Accordingly, no randomization or blinding methods were used. Mice that developed hind-limb paralysis were euthanized by carbon dioxide. The log-rank test was performed using Prism 7.0 software (GraphPad).

Statistical Analysis.

Data are expressed as mean±s.d., and the number of biological and technical replicates is indicated in the figure caption. If only two populations were being compared, a two-tailed t-test was used for hypothesis testing; otherwise, Analysis of Variance or ANOVA was used for hypothesis testing when more than two populations were being compared. Paired hypothesis testing was often implemented to account for large donor-to-donor variability. When conducting multiple comparisons, Tukey's or Dunnett's test was used to adjust P-values when every mean was compared to every other mean or a control mean, respectively, whereas the Sidak correction was used to adjust P-values when select sets of means were compared, assuming independence. If comparisons could not be assumed to be independent from each other, Bonferroni correction was used instead of the Sidak correction to adjust P-values. The Benjamini-Yekutieli correction was used for analysis of NanoString data, as this method handles the dependence between the expression of different genes well. Differences were considered significant if P<0.05 after any adjustment. Graphing and statistical tests were performed using Prism 7.0 software (GraphPad) unless otherwise stated.

Example 3: Additional Aptamer Characterization

Figure 24A:
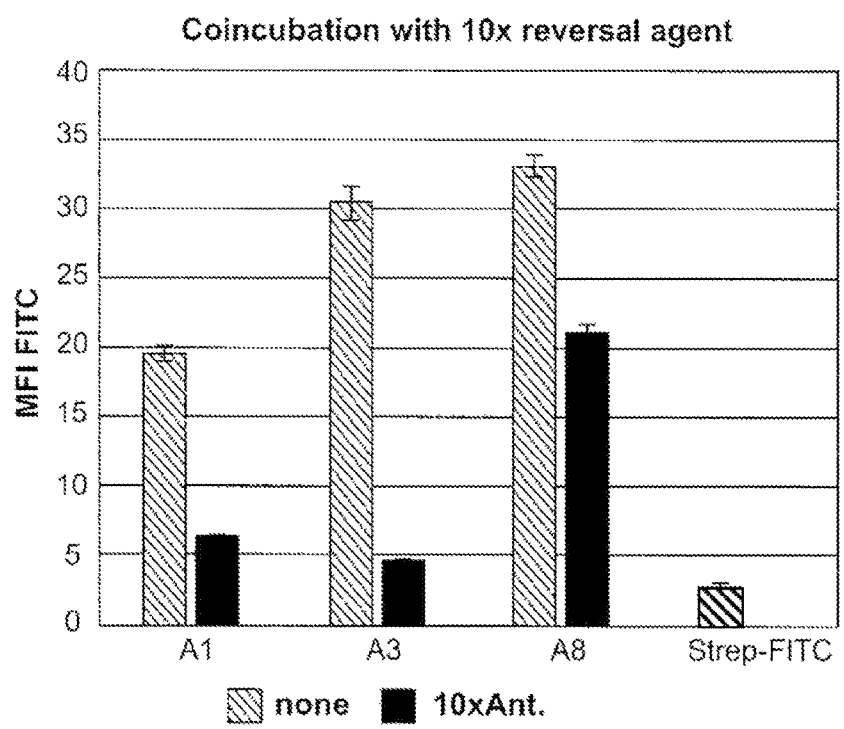
Figure 25:
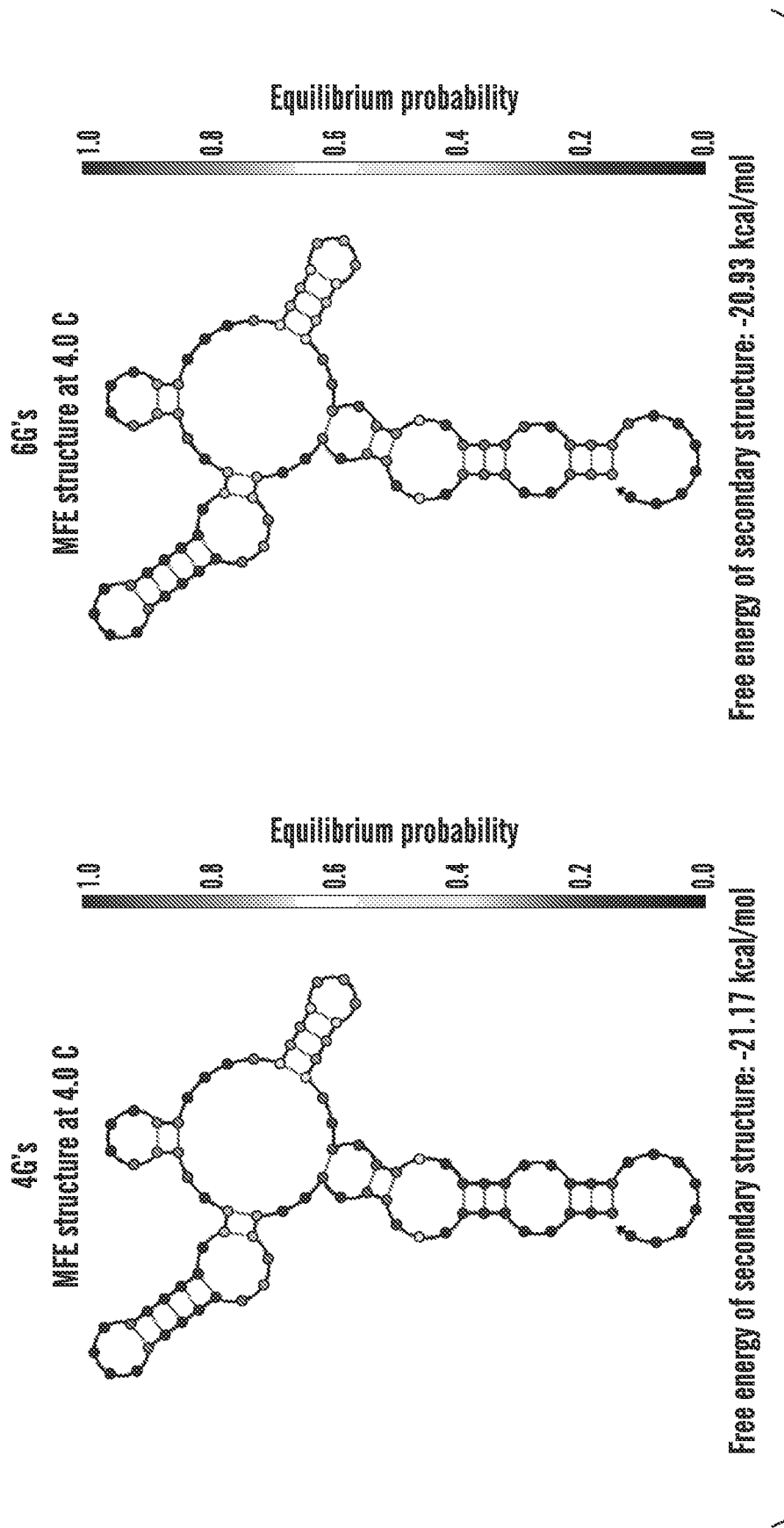
FIG. 25 shows additional A3 aptamer sequences (top) and secondary structures (bottom) with 8 bp extended toeholds that have 4 or 6 guanines (G) for improved strand displacement by the reversal agents.
Figure 26:
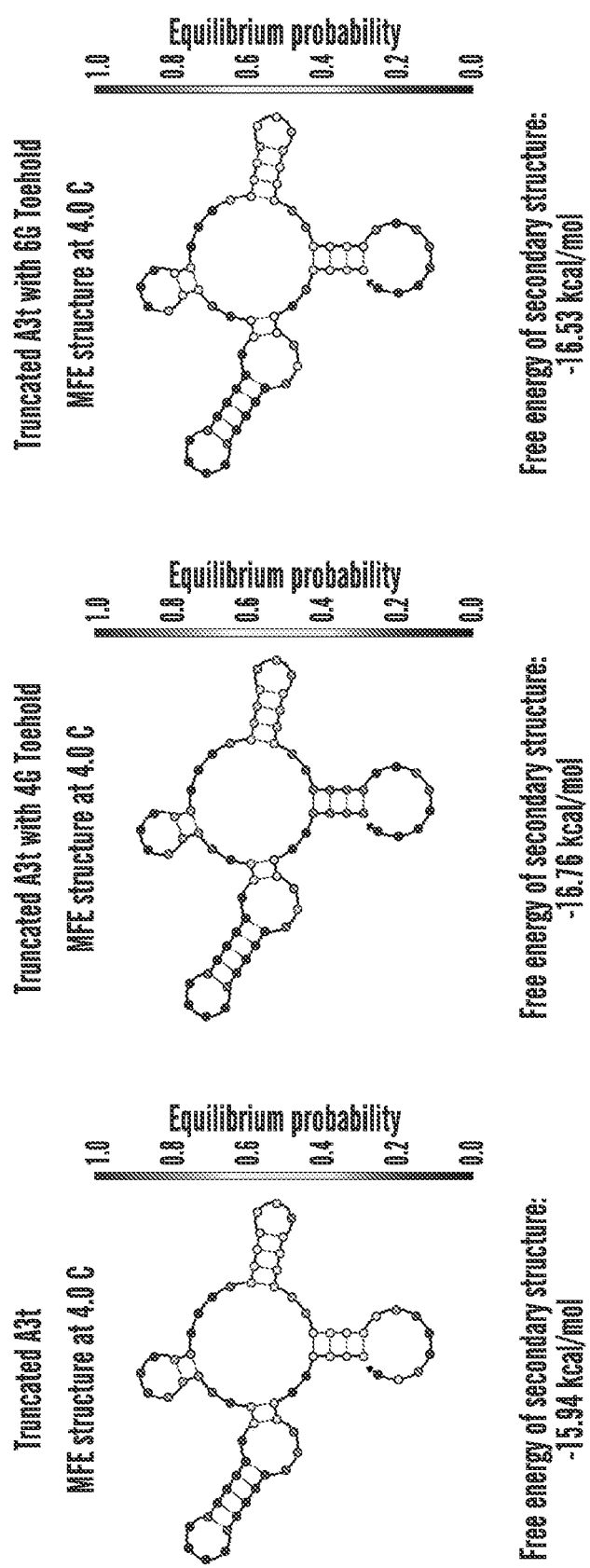
FIG. 26 shows theoretical truncated A3t aptamers with varying amounts of guanines for improved strand displacement.

Aptamers A1, A2, A3, A7, and A8 described in Example 1 can also exist in alternate secondary structures as shown in FIG. 4. Predicted aptamer reversal agents were also tested for different base pair lengths with their corresponding aptamers from FIG. 4. The 52 base pair single stranded DNA library was used to identify aptamers specific for CD8+ T cells. The reversal agents tested were 40 base pairs in length for A1 aptamers, 42 base pairs for A3 aptamers, and 37 base pairs for A8 aptamers (FIG. 24A). Co-incubation experiments with aptamers and corresponding reversal agents resulted in significant reductions in aptamer binding using protocols described in Example 2 (FIG. 24A, bottom). Furthermore, aptamer base pair length could be optimized for aptamer A3 from 20 base pair to 85 base pairs in length (FIG. 24B). Additional secondary structures were predicted for the A3 aptamer described in Example 1. Theoretical A3 aptamers are shown in FIG. 25. For Aptamer A3t, described in Example 1, several A3t aptamer secondary structure predictions are described in FIG. 26. These aptamers include a truncated A3t (FIG. 26, left structure), varying the number of guanine nucleotides within the toehold of the aptamers with 4 guanines (FIG. 26, middle structure), or 6 guanines (FIG. 26, right structure).

Example 4: TCBA.1 Aptamers

Figure 27:
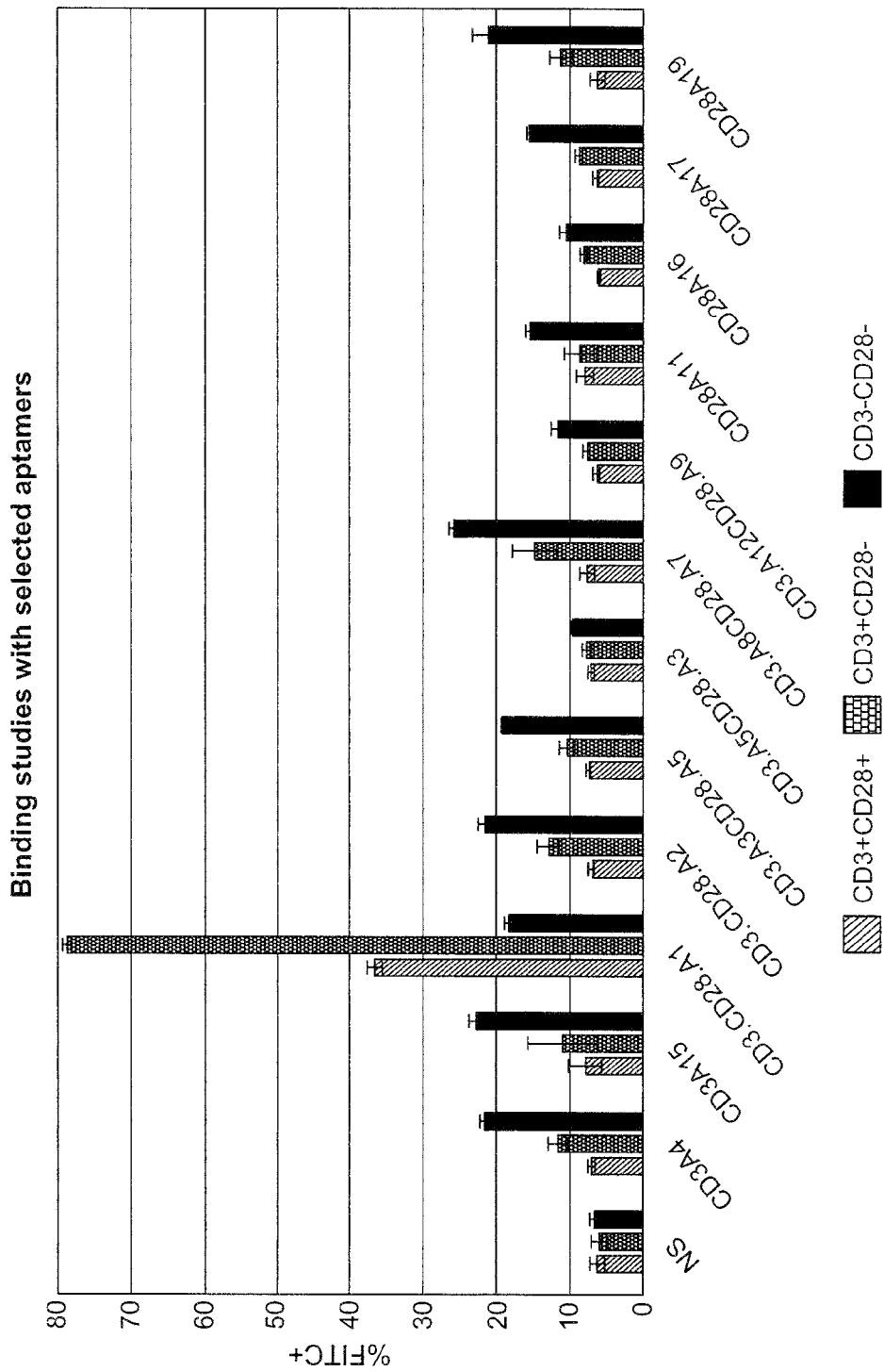
FIG. 27 shows binding studies with selected aptamers. Aptamer CD3.CD28.A1 shows preferential binding to CD3+ populations in PBMCs.
Figure 28:
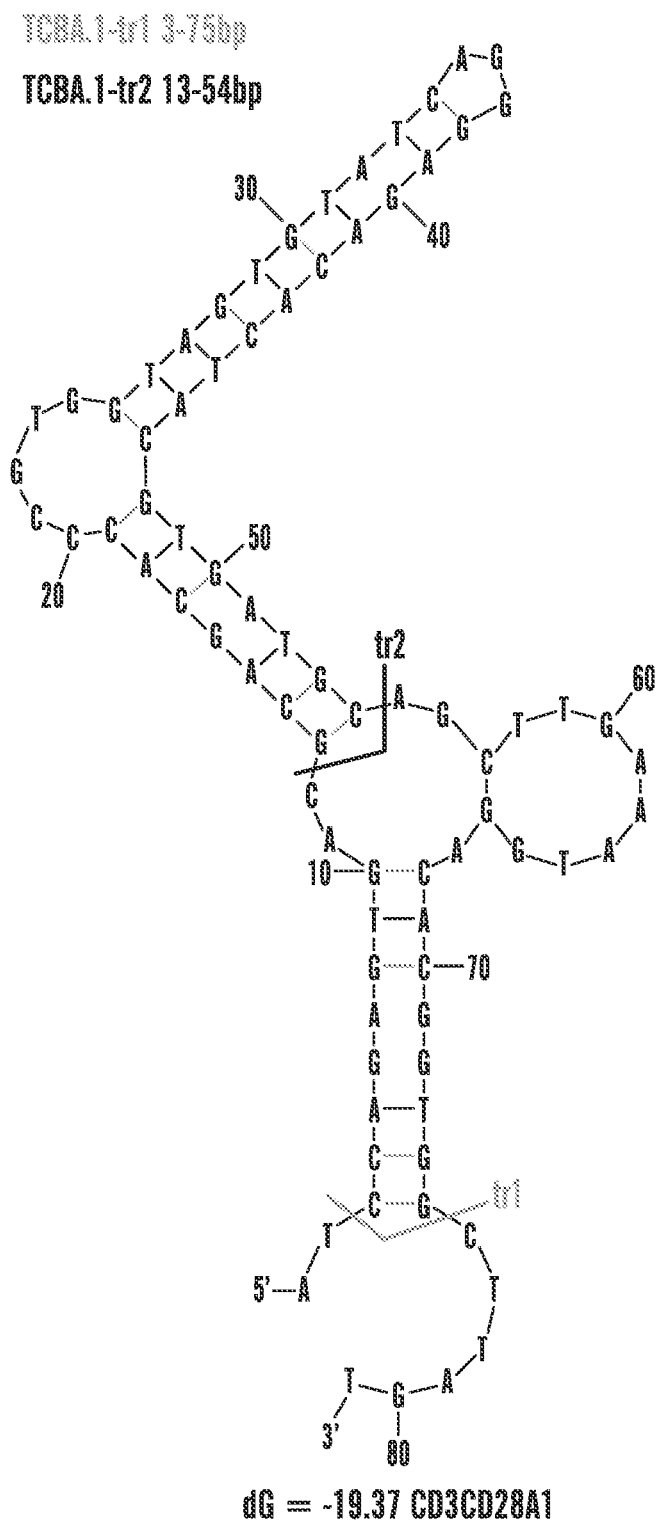
FIG. 28 shows the predicted TCBA.1 secondary structure (left) and binding constants (right). TCBA.1, TCBA.1-tr1, and TCBA.1-tr2 were incubated with PBMC at the presence of CD3 and CD28 antibodies at the range of concentrations from 0.1 to 25 nM for 30 min at 4° C. TCBA.1 has kD between 1 and 2 nM for binding to CD3+ populations in PBMC, with higher max binding for CD3+CD28−.TCBA.1-tr1 binds with lower affinity, TCBA.1-tr2 does not bind at all (data not shown). TCBA.1 does not bind H9, Jurkat, Jurkat/CD3KO and Jurkat/CD28KO cells.
Figure 28:
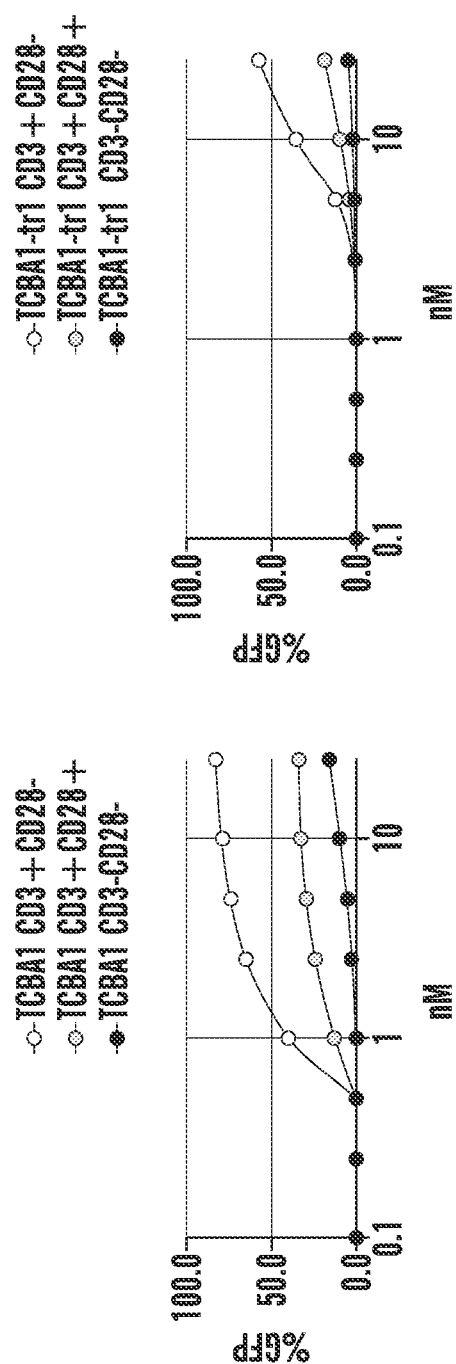

To further identify aptamers specific for T cell-specific binding, an additional SELEX with a 45 nucleotide ssDNA library was implemented against T cells and the rounds were sequenced to identify aptamers that selectively bind T cell subsets (FIG. 27). Aptamer CD3.CD28.A1 shows preferential binding to CD3+ populations in PBMCs with the highest level of binding to CD3+CD28− cells. The CD3.CD28.A1 aptamer has been renamed TCBA.1 (T-cell binding aptamer) in FIG. 28-32. The secondary structure of TCBA. 1 was predicted (FIG. 28) along with truncations of the sequence (TCBA.1-tr1, base pairs 3-75) and (TCBA.1-tr2, base pairs 13-54). The binding constants were determined by flow cytometry analysis (FIG. 28). TCBA.1 has kD between 1 and 2 nM for binding to CD3+ populations in PBMC, with higher max binding for CD3+CD28− TCBA.1-tr1 binds with lower affinity, TCBA. 1-tr2 does not bind at all (data not shown). Furthermore, TCBA.1 does not bind H9, Jurkat, Jurkat/CD3KO and Jurkat/CD28KO cells.

Figure 29:
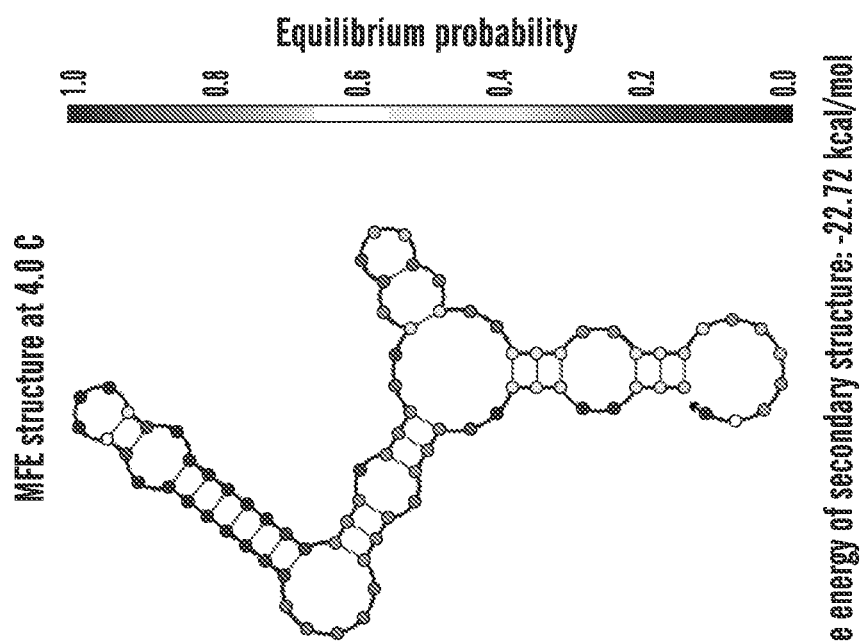
FIG. 29 shows the 81 base pair aptamer sequence of aptamer TCBA.1 and the predicted secondary structure at 4C with equilibrium probability.

In addition to a 52 base pair ssDNA library, a 45 nucleotide library can also be used to identify T cell aptamers. Aptamer TCBA.1 was further optimized using a 45 nucleotide library and SELEX strategy (FIG. 29). The predicted TCBA.1 secondary structure was determined at 4C by UNPACK available on the world wide web at unpack.org along with additional aptamers described herein.

Figure 30:
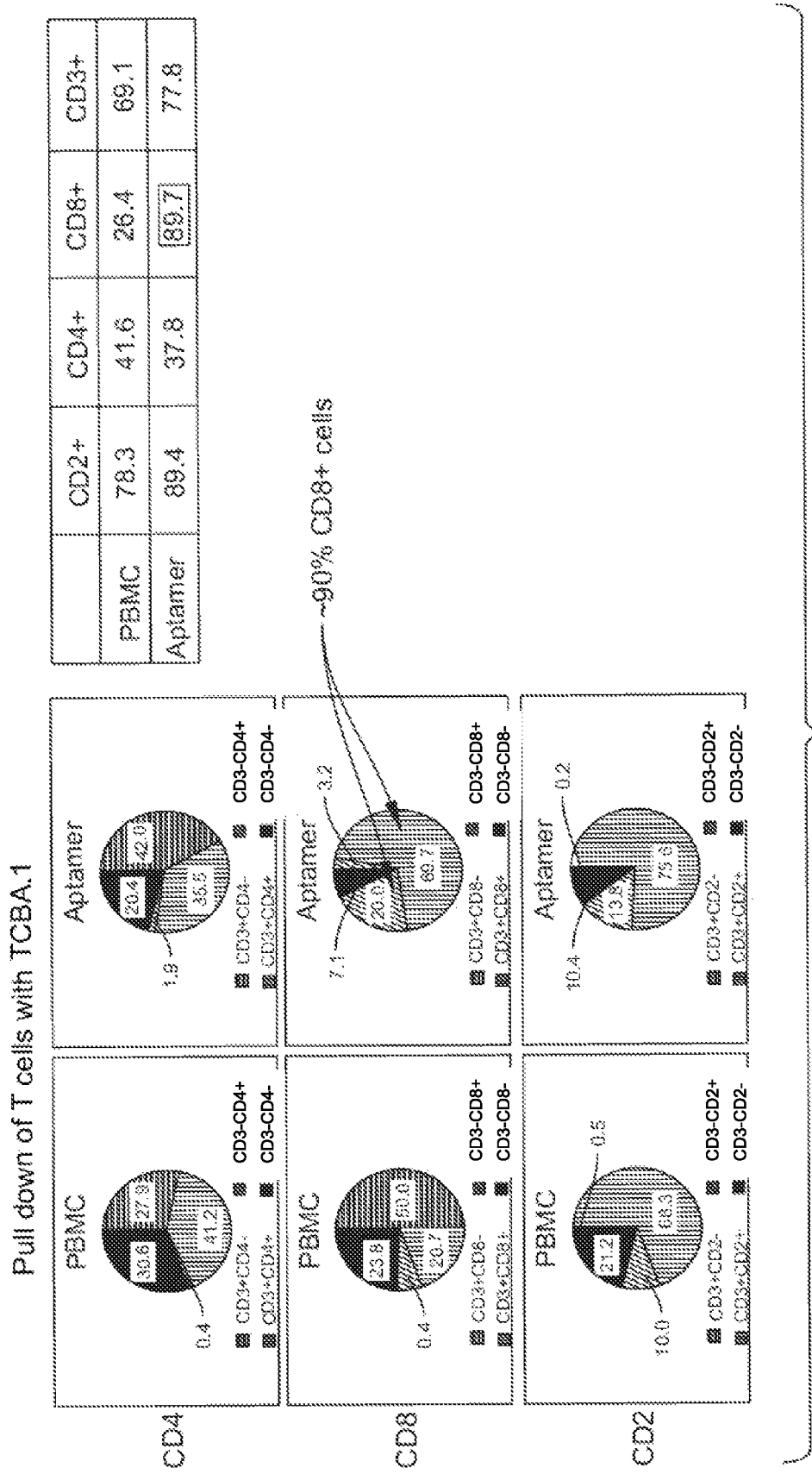
FIG. 30 shows the pulldown assay results of T cells in contact with TCBA.1. 5×10⁶ PBMC were incubated with 100 nM TCBA.1-Biotin aptamer for 30 min at 4° C., followed by addition of anti-biotin magnetic beads, washing, and application to magnetic separation column. Collected cells were analyzed for CD4, CD8, CD2 antibody staining as well as TCBA.1-FITC aptamer binding.

In order to determine the activation and selection of TCBA.1, PBMCs were incubated with 100 nM TCBA.1-biotin aptamer for 30 minutes at 4C, followed by the addition of anti-biotin magnetic beads, washing, and application to a magnetic separation column. Collected cells were analyzed for CD4, CD8, CD2, antibody staining as well as TCBA.1-FITC aptamer binding (FIG. 30). The TCBA. 1 aptamer pulls down CD8+ cells.

Figure 31:
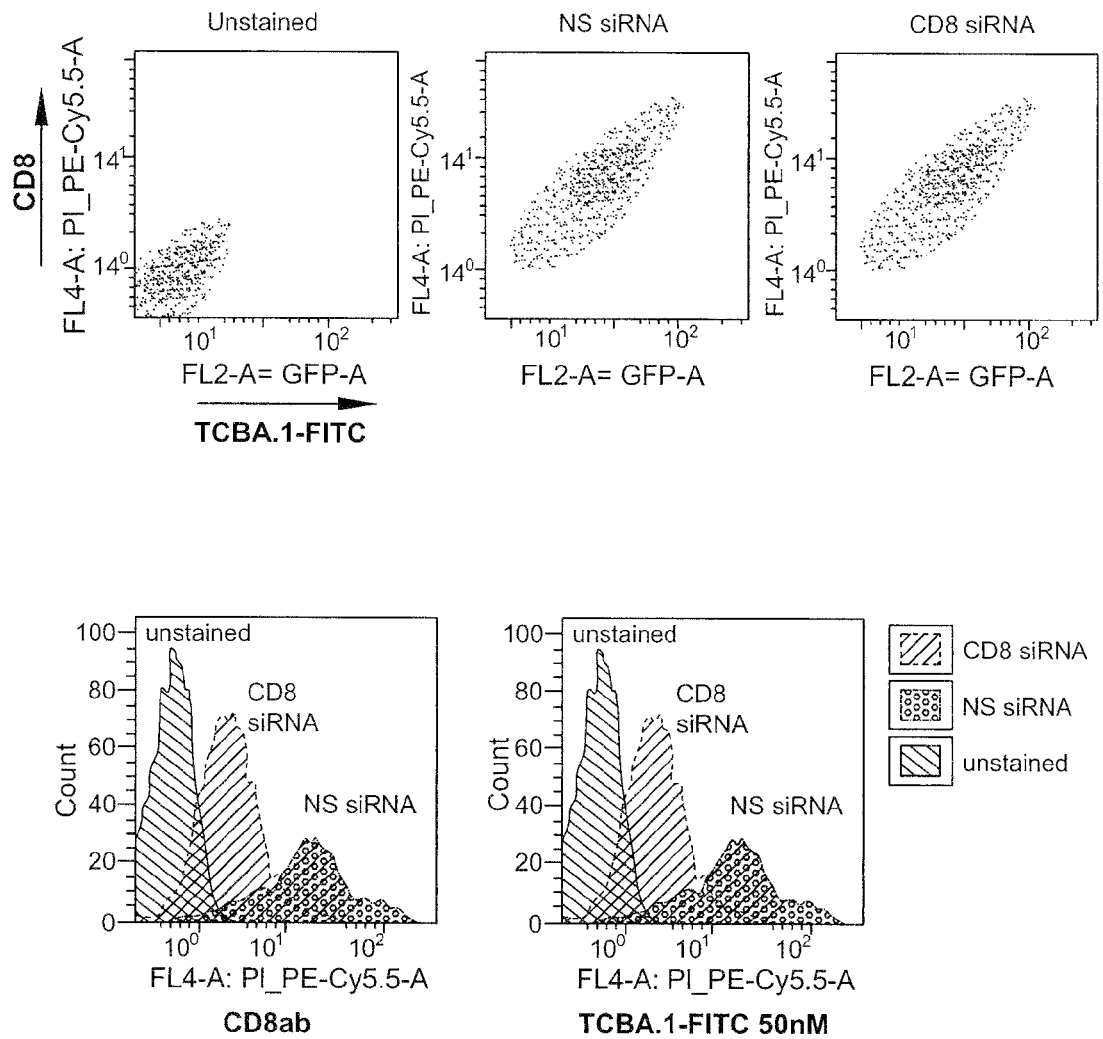
FIG. 31 shows that CD8 is a receptor for TCBA.1 binding. CD8+ T cells were activated for 3 days then nucleofected with NS or CD8 siRNA. Flow cytometry studies of anti-CD8 antibody and TCBA.1 aptamer binding were performed after 24 hours.

Based on the previous results, CD8 was evaluated as a potential receptor for TCBA.1 (FIG. 31). Flow cytometry studies of anti-CD8 antibody and TCBA. 1 aptamer binding were performed 24 hours after nucleotransfection of cells with CD8 siRNA. There was a positive correlation between 84% KD of CD8 receptor and 60.4% reduction of aptamer binding.

Figure 32:
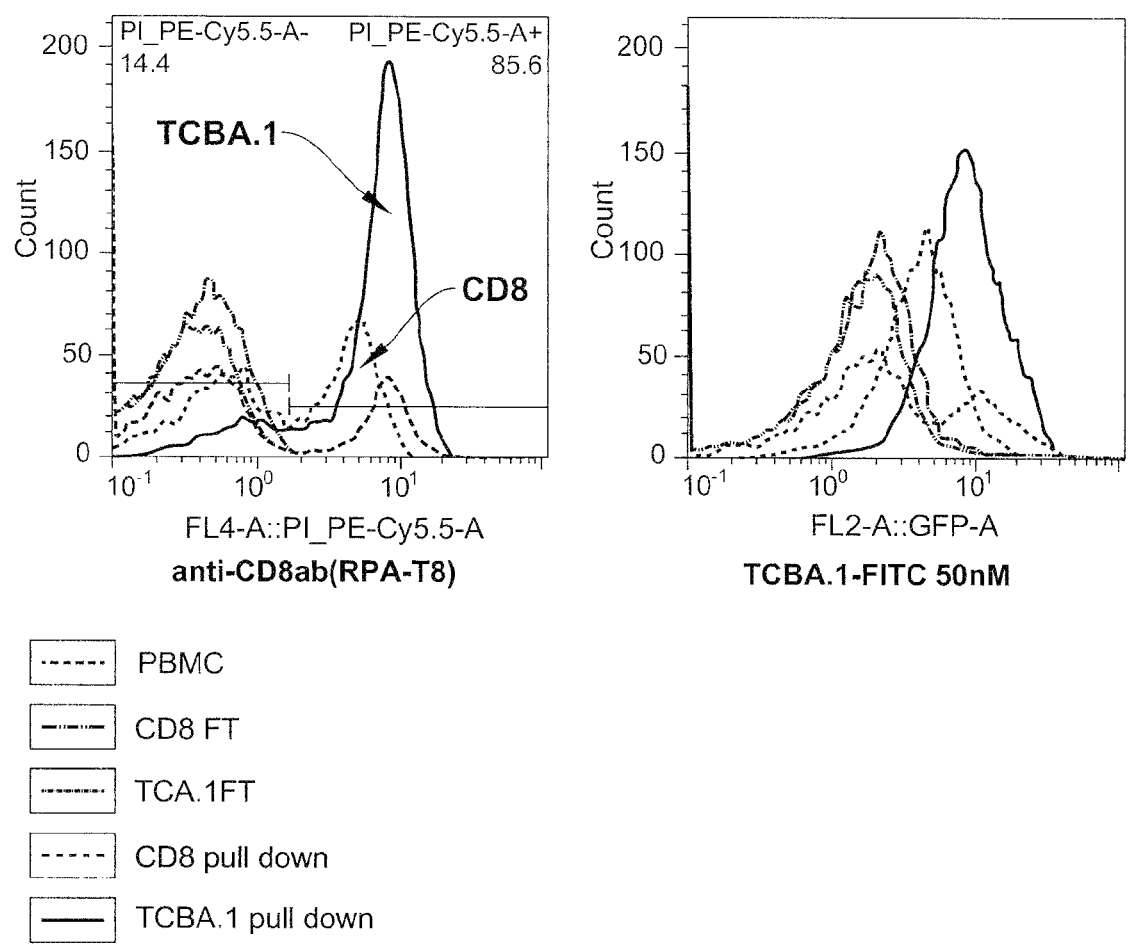
FIG. 32 shows the comparison of anti-CD8 antibody vs. TCBA. 1 aptamer PBMC separation. PBMCs were incubated with anti-CD8-biotin antibody (REA734) or TCBA.1-biotin and anti-biotin magnetic beads, after that applied on MS column. Flow through (FT) and pulldown (PD) cells were analyzed by flow cytometry for binding CD8 antibody and TCBA. 1 aptamer. TCBA.1 pulldown shows higher purity of CD8+ cells than anti-CD8 Ab pulldown 85% cells pulled down with TCBA.1 are CD8 positive.

The anti-CD8 and TCBA. 1 aptamer were compared for PBMC separation of CD8+ T cells (FIG. 32). PBMCs were incubated with anti-CD8-biotin antibody (REA734) or TCBA. 1-biotin and anti-biotin magnetic beads, after that applied on MS column. Flow through (FT) and pulldown (PD) cells were analyzed by flow cytometry for binding CD8 antibody and TCBA.1 aptamer. IT was observed that 85% cells pulled down with TCBA.1 are CD8 positive. Therefore, both TCBA.1 and CD8 pulldown cells show high TCBA. 1 binding.

Figure 33:
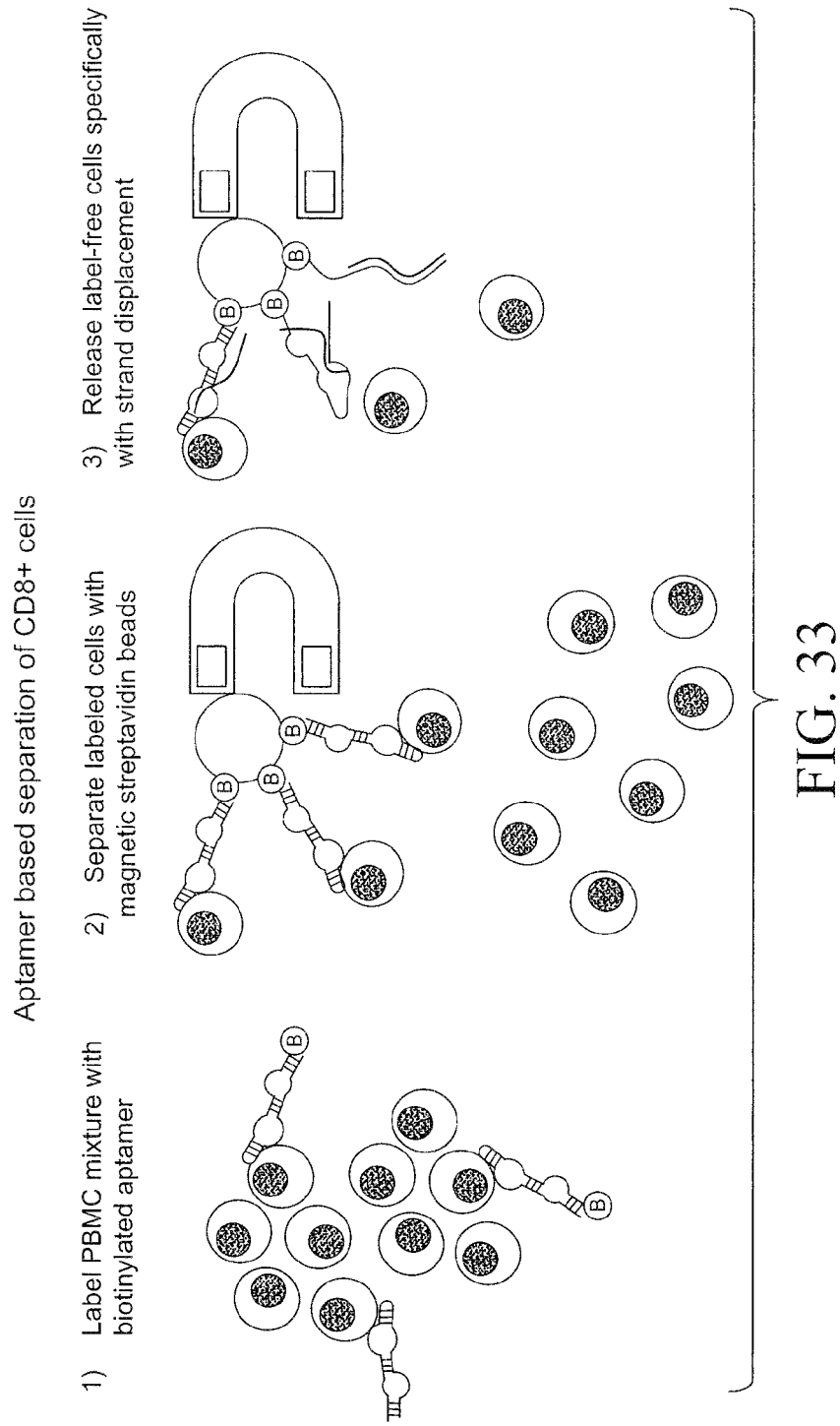
FIG. 33 shows a schematic of aptamer based separation of CD8+ cells. The steps are as follows: 1) label PBMC mixture with biotinylated aptamer, 2) separate labeled cells with magnetic streptavidin beads, and 3) release label-free cells specifically.

A method of separating CD8+ cells with the TCBA.1 aptamer was determined as detailed in FIG. 33. PBMCs were labeled with biotinylated aptamers. These cells were then labeled with magnetic streptavidin beads. Following the labeling step, label free cells were released specifically with strand displacement. The advantages to this approach include, no contamination of cells with separation agent and serial selection methods.

Figure 34:
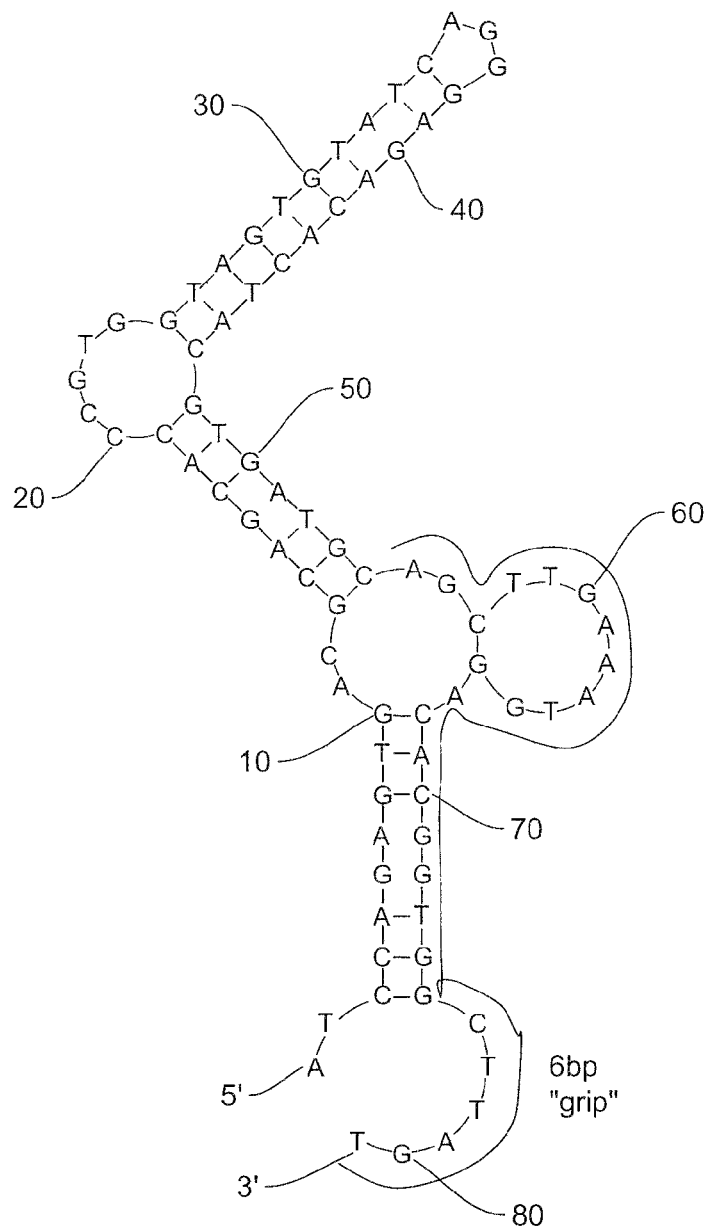
FIG. 34 represents the use of complementary DNA strand to reverse aptamer binding. A secondary structure prediction of the antidote is shown (left) along with the sequence (top). CD8+ T cells were incubated with TCBA.1 at 10 and 25 nM at 3 different temperatures with or without antidote added. Co-incubation with antidote reduces binding up to 90%, more so at higher temperatures. Up to a 60% reduction in binding was achieved at 37° C.
Figure 34:
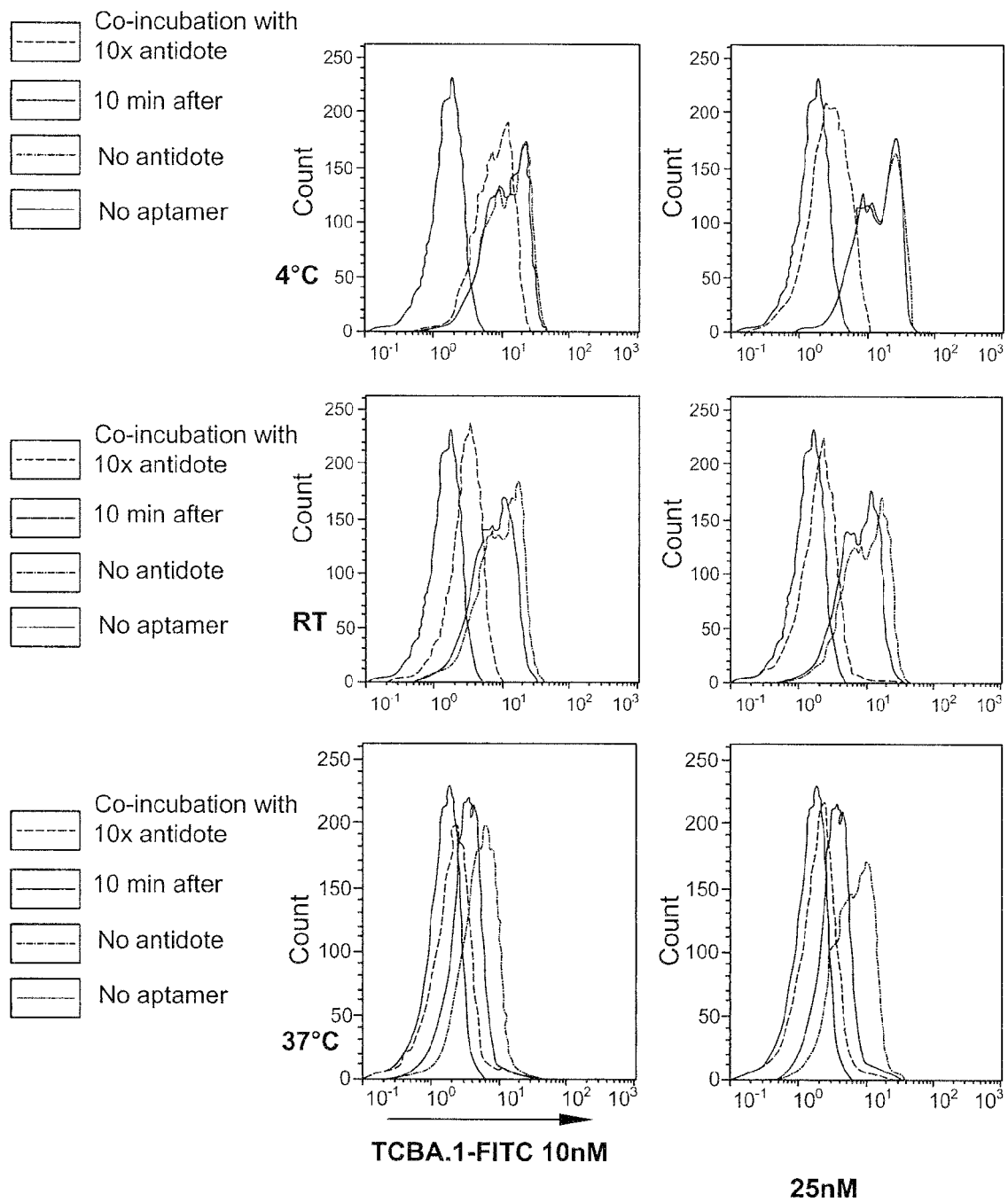

Using complementary DNA strands to reverse aptamer binding was explored with an antidote described in FIG. 34. A secondary structure of the antidote (FIG. 34) and sequence (FIG. 34, top) are also shown in FIG. 34. CD8+ T cells were incubated with TCBA.1 at 10 and 25 nM at 3 different temperatures with or without antidote added. Reduction in aptamer binding was observed with increasing temperature. Co-incubation with antidote reduces binding up to 90%, more so at higher temperatures. Up to 60% reduction in binding achieved at 37° C., which is likely a result of a combination of lower binding, less stable aptamer structure. Future changes to the secondary structure will include increasing the grip region of the antidote for the toehold and binding the aptamer at various temperatures (e.g., 4° C. or >37° C.).

Example 5: Isolation of LO and HI CD8 T Cells and Isolation with Two Aptamers

Figure 35:
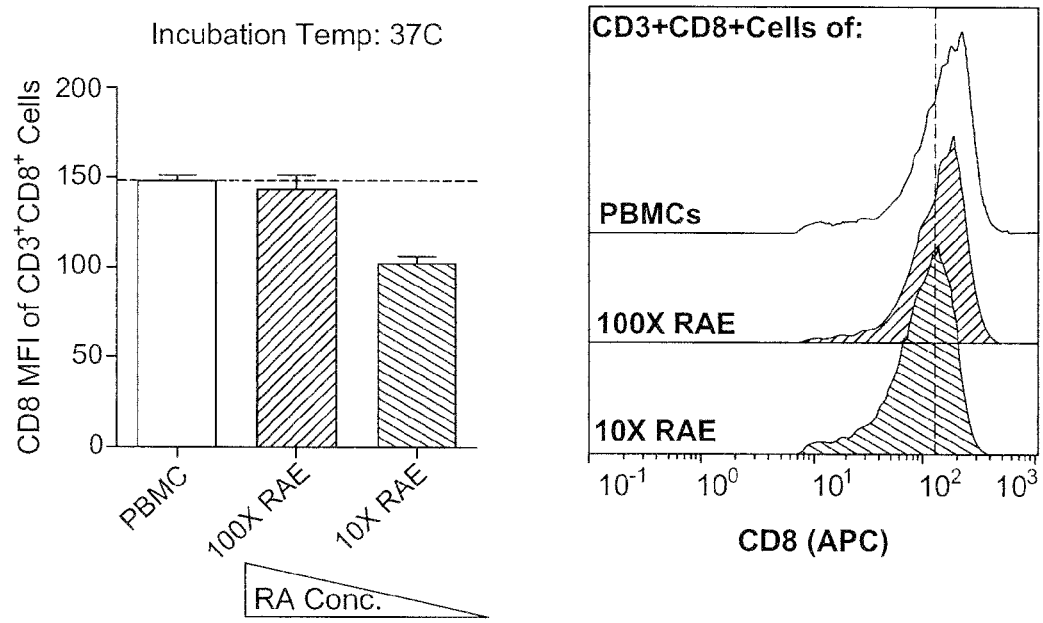
FIG. 35 shows an example of elution of CD8 low ($CD8^{lo}$) versus CD81 and CD8 high ($CD8^{hi}$) cells with 10× reversal agent for A3t aptamer selection.

The elution of low and high CD8 markers were determined to isolate gradients of expression of T cells of interest (FIG. 35). Elution of CD8 expressing cells is dependent on aptamer concentration, time, and temperature of the reversal agent (RA) incubation. The plots in FIG. 35 represent varied reversal agent excess at 37C during selection with 5 nM of A3t aptamer. To obtain lower CD8 expressers (CD8$^{lo}$), concentrations of reversal agent need to be below 10× excess. The result presented in FIG. 35 allow for isolation of low CD8 expressing T cells (CD8$^{lo}$) and high CD8 expressing (CD8$^{hi}$) T cells.

Figure 36:
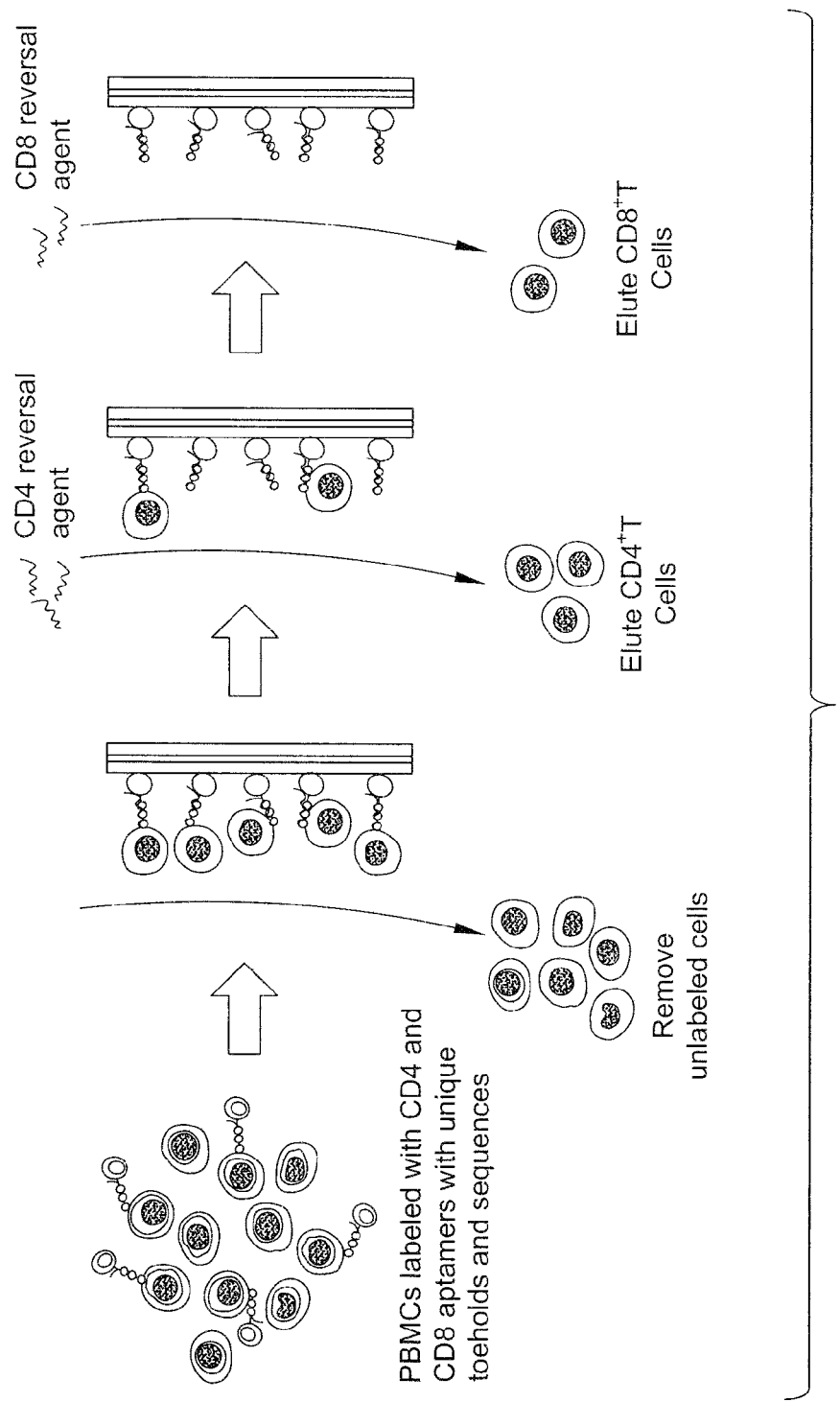
FIG. 36 is a schematic to further illustrate a method of serial elution with two aptamers and reversal agents for isolation of two classes of T cells (e.g., CD4+ and CD8+).

A schematic representation of how serial elution with two aptamers can be achieved is shown in FIG. 36. PBMCs labeled with CD4 and CD8 aptamers with unique toeholds and sequences will be separated from aptamer-unbound cells by elution with the CD4 reversal agent to obtain only CD4 positive T cells. The sequential elution with CD8 reversal agents identified in the previous figures would allow for separation of CD8 positive T cells. This method of cell isolation has several advantages over other T cell isolation

Example 6: Characterization of a Jurkat-Binding DNA Aptamer

Single-stranded DNA aptamers could be a viable alternative to antibodies in a variety of biological applications due to their ease of synthesis, uniform activity, and relatively small size. Taken together, these characteristics not only contribute to a lower cost of production, but also improved tissue penetration. Here, a single-stranded DNA aptamer was identified that preferentially binds the T cell leukemia Jurkat cell line. A subtractive cell-SELEX approach was employed using wild-type Jurkat cells for positive selection, and a derivative mutant J.RT3-T3.5 cell line (negative for CD3, CD28, and the T cell receptor alpha/beta heterodimer) for counter selection. After 8 rounds of selection, selective binding to Jurkat cells were observed over the counter selection cell line. Contents of aptamer pools in all rounds were determined by next-generation Illumina sequencing. Phylogenetic tree analysis was performed and identified potential consensus binding sites. The most prevalent aptamer in round 8, which denote that JBA8.1, has a sub-100 nM binding affinity. Using a secondary structure prediction algorithm, this created a truncated version of this aptamer that maintains a similar binding affinity. This aptamer also binds H9 and Raji cell lines, which are derived from T and B cell lymphomas, respectively, as well as activated human T cells. Current work includes receptor identification and assessment of therapeutic cargos for tumor delivery.

Example 7: Traceless Isolation of CD8+ T Cells by Reversible, Aptamer-Based Selection for CAR T Cell Therapy The increasing number of CAR T cell therapy clinical trials utilizing defined product compositions underscores the need for continued development of robust and cost-efficient methods for selection of specific T cell subsets. Using a modified method of cell-SELEX new DNA aptamers were identified, that preferentially bind human cytotoxic T cell marker CD8. One of those aptamers were applied to a traceless cell isolation strategy with a complementary oligonucleotide reversal agent that undergoes toehold-mediated strand displacement with the aptamer and thereby disrupts its secondary structure for label-free elution of captured cells. It was observed that this approach gives high yields of CD8+ T cells and that CAR T cells manufactured from these cells are comparable to antibody-isolated CAR T cells in proliferation, phenotype, effector function, and anti-tumor activity in vivo. These findings represent an important technology advance towards a fully synthetic system for T cell selection.

REFERENCES

1. Brentjens, R. J. et al. CD19-targeted T cells rapidly induce molecular remissions in adults with chemotherapy-refractory acute lymphoblastic leukemia. Sci. Transl. Med. 5, 177ra138 (2013).
2. Davila, M. L. et al. Efficacy and toxicity management of 19-28z CAR T cell therapy in B cell acute lymphoblastic leukemia. Sci. Transl. Med. 6, 224ra225 (2014).
3. Lee, D. W. et al. T cells expressing CD19 chimeric antigen receptors for acute lymphoblastic leukaemia in children and young adults: a phase 1 dose-escalation trial. Lancet 385, 517-528 (2015).
4. Mirzaei, H. R., Rodriguez, A., Shepphird, J., Brown, C. E. & Badie, B. Chimeric Antigen Receptors T Cell Therapy in Solid Tumor: Challenges and Clinical Applications. Front. Immuno!. 8, 1850 (2017).
5. Hale, M. et al. Engineering HIV-Resistant, Anti-HIV Chimeric Antigen Receptor T Cells. Mo!. Ther. 25, 570-579 (2017).
6. Scholler, J. et al. Decade-long safety and function of retroviral-modified chimeric antigen receptor T cells. Sci. Transl. Med. 4, 132ra153 (2012).
7. Sommermeyer, D. et al. Chimeric antigen receptor-modified T cells derived from defined CD8+ and CD4+ subsets confer superior antitumor reactivity in vivo. Leukemia 30, 492-500 (2016).
8. Turtle, C. J. et al. CD19 CAR-T cells of defined CD4+: CD8+ composition in adult B cell ALL patients. J. Clin. Invest. 126, 2123 (2016).
9. Gardner, R. A. et al. Intent-to-treat leukemia remission by CD19 CAR T cells of defined formulation and dose in children and young adults. Blood 129, 3322-3331 (2017).
10. Aijaz, A. et al. Biomanufacturing for clinically advanced cell therapies. Nat. Biomed. Eng. 2, 362-376 (2018).
11. Terakura, S. et al. Generation of CD19-chimeric antigen receptor modified CD8+ T cells derived from virus-specific central memory T cells. Blood 119, 72-82 (2012).
12. Wang, X. et al. Phenotypic and functional attributes of lentivirus-modified CD19-specific human CD8+ central memory T cells manufactured at clinical scale. J. Immunother. 35, 689-701 (2012).
13. Voss, S. & Skerra, A. Mutagenesis of a flexible loop in streptavidin leads to higher affinity for the Strep-tag II peptide and improved performance in recombinant protein purification. Protein Eng. 10, 975-982 (1997).
14. Knabel, M. et al. Reversible MHC multimer staining for functional isolation of T-cell populations and effective adoptive transfer. Nat. Med. 8, 631-637 (2002).
15. Schmitt, A. et al. Adoptive transfer and selective reconstitution of streptamer-selected cytomegalovirus-specific CD8+ T cells leads to virus clearance in patients after allogeneic peripheral blood stem cell transplantation. Transfusion 51, 591-599 (2011).
16. Stemberger, C. et al. Novel serial positive enrichment technology enables clinical multiparameter cell sorting. PLOS One 7, e35798 (2012).
17. Sabatino, M. et al. Generation of clinical-grade CD19-specific CAR-modified CD8+ memory stem cells for the treatment of human B-cell malignancies. Blood 128, 519-528 (2016).
18. Ellington, A. D. & Szostak, J. W. In vitro selection of RNA molecules that bind specific ligands. Nature 346, 818 (1990).
19. Tuerk, C. & Gold, L. Systematic evolution of ligands by exponential enrichment: RNA ligands to bacteriophage T4 DNA polymerase. Science 249, 505-510 (1990).
20. Robertson, D. L. & Joyce, G. F. Selection in vitro of an RNA enzyme that specifically cleaves single-stranded DNA. Nature 344, 467 (1990).
21. Bunka, D. H. & Stockley, P. G. Aptamers come of age—at last. Nat. Rev. Microbiol. 4, 588-596 (2006).
22. Hernandez, L. I., Machado, I., Schafer, T. & Hernandez, F. J. Aptamers overview: selection, features and applications. Curr. Top. Med. Chem. 15, 1066-1081 (2015).

23. Zhou, J. & Rossi, J. Aptamers as targeted therapeutics: current potential and challenges. Nat. Rev. Drug Discov. 16, 181-202 (2017).
24. Dunn, M. R., Jimenez, R. M. & Chaput, J. C. Analysis of aptamer discovery and technology. Nat. Rev. Chem. 1, 0076 (2017).
25. Daniels, D. A., Chen, H., Hicke, B. J., Swiderek, K. M. & Gold, L. A tenascin-C aptamer identified by tumor cell SELEX: systematic evolution of ligands by exponential enrichment. Proc. Natl. Acad. Sci. U.S.A 100, 15416-15421 (2003).
26. Shangguan, D. et al. Aptamers evolved from live cells as effective molecular probes for cancer study. Proc. Natl. Acad. Sci. U.S.A 103, 11838-11843 (2006).
27. Ogasawara, D., Hasegawa, H., Kaneko, K., Sode, K. & Ikebukuro, K. Screening of DNA aptamer against mouse prion protein by competitive selection. Prion 1, 248-254 (2007).
28. Sefah, K., Shangguan, D., Xiong, X., O'Donoghue, M. B. & Tan, W. Development of DNA aptamers using Cell-SELEX. Nat. Protoc. 5, 1169-1185 (2010).
29. Alam, K. K., Chang, J. L. & Burke, D. H. FASTAptamer: A Bioinformatic Toolkit for High-throughput Sequence Analysis of Combinatorial Selections. Mol. Ther. Nucleic Acids 4, e230 (2015).
30. Caroli, J., Taccioli, C., De La Fuente, A., Serafini, P. & Bicciato, S. APTANI: a computational tool to select aptamers through sequence-structure motif analysis of HT-SELEX data. Bioinformatics 32, 161-164 (2015).
31. Bailey, T. L. et al. MEME SUITE: tools for motif discovery and searching. Nucleic Acids Res. 37, W202-208 (2009).
32. Chen, L. et al. Aptamer-mediated efficient capture and release of T lymphocytes on nanostructured surfaces. Adv. Mater. 23, 4376-4380 (2011).
33. Li, S., Chen, N., Zhang, Z. & Wang, Y. Endonuclease-responsive aptamer-functionalized hydrogel coating for sequential catch and release of cancer cells. Biomaterials 34, 460-469 (2013).
34. Xu, Y. et al. Aptamer-based microfluidic device for enrichment, sorting, and detection of multiple cancer cells. Anal. Chem. 81, 7436-7442 (2009).
35. Yoon, J. W. et al. Isolation of Foreign Material-Free Endothelial Progenitor Cells Using CD31 Aptamer and Therapeutic Application for Ischemic Injury. PLOS One 10, e0131785 (2015).
36. Zhu, J., Nguyen, T., Pei, R., Stojanovic, M. & Lin, Q. Specific capture and temperature-mediated release of cells in an aptamer-based microfluidic device. Lab Chip 12, 3504-3513 (2012).
37. Labib, M. et al. Aptamer and Antisense-Mediated Two-Dimensional Isolation of Specific Cancer Cell Subpopulations. J. Am. Chem. Soc. 138, 2476-2479 (2016).
38. Sun, N. et al. Chitosan Nanofibers for Specific Capture and Nondestructive Release of CTCs Assisted by pCBMA Brushes. Small 12, 5090-5097 (2016).
39. Wan, Y. et al. Capture, isolation and release of cancer cells with aptamer-functionalized glass bead array. Lab Chip 12, 4693-4701 (2012).
40. Zhang, Z., Chen, N., Li, S., Battig, M. R. & Wang, Y. Programmable hydrogels for controlled cell catch and release using hybridized aptamers and complementary sequences. J. Am. Chem. Soc. 134, 15716-15719 (2012).
41. Nozari, A. & Berezovski, M. V. Aptamers for CD Antigens: From Cell Profiling to Activity Modulation. Mol. Ther. Nucleic Acids 6, 29-44 (2017).
42. Wang, C.-W. et al. A new nucleic acid-based agent inhibits cytotoxic T lymphocyte-mediated immune disorders. J. Allergy Clin. Immunol. 132, 713-722. e711 (2013).
43. Seelig, G., Soloveichik, D., Zhang, D. Y. & Winfree, E. Enzyme-free nucleic acid logic circuits. Science 314, 1585-1588 (2006).
44. Yurke, B. & Mills, A. P. Using DNA to power nanostructures. Genet Program Evol M 4, 111-122 (2003).
45. Yurke, B., Turberfield, A. J., Mills, A. P., Jr., Simmel, F. C. & Neumann, J. L. A DNA-fueled molecular machine made of DNA. Nature 406, 605-608 (2000).
46. Zhang, D. Y. & Seelig, G. Dynamic DNA nanotechnology using strand-displacement reactions. Nat. Chem. 3, 103-113 (2011).
47. Zhang, D. Y. & Winfree, E. Control of DNA strand displacement kinetics using toehold exchange. J. Am. Chem. Soc. 131, 17303-17314 (2009).
48. Ruella, M. et al. Induction of resistance to chimeric antigen receptor T cell therapy by transduction of a single leukemic B cell. Nat. Med. 24, 1499-1503 (2018).
49. Heczey, A. et al. Invariant NKT cells with chimeric antigen receptor provide a novel platform for safe and effective cancer immunotherapy. Blood 124, 2824-2833 (2014).
50. Eyquem, J. et al. Targeting a CAR to the TRAC locus with CRISPR/Cas9 enhances tumour rejection. Nature 543, 113-117 (2017).
51. Zhao, Z. et al. Structural Design of Engineered Costimulation Determines Tumor Rejection Kinetics and Persistence of CAR T Cells. Cancer Cell 28, 415-428 (2015).
52. Brentjens, R. J. et al. Eradication of systemic B-cell tumors by genetically targeted human T lymphocytes co-stimulated by CD80 and interleukin-15. Nat. Med. 9, 279-286 (2003).
53. Dahotre, S. N., Chang, Y. M., Wieland, A., Stammen, S. R. & Kwong, G. A. Individually addressable and dynamic DNA gates for multiplexed cell sorting. Proc. Natl. Acad. Sci. U.S.A 115, 4357-4362 (2018).
54. Probst, C. E., Zrazhevskiy, P. & Gao, X. Rapid multi-target immunomagnetic separation through programmable DNA linker displacement. J. Am. Chem. Soc. 133, 17126-17129 (2011).
55. Gawande, B. N. et al. Selection of DNA aptamers with two modified bases. Proc. Natl. Acad. Sci. U.S.A 114, 2898-2903 (2017).
56. Ni, S. et al. Chemical Modifications of Nucleic Acid Aptamers for Therapeutic Purposes. Int. J. Mol. Sci. 18, 1683 (2017).
57. Pelloquin, F., Lamelin, J. & Lenoir, G. Human blymphocytes immortalization by epstein-barr virus in the presence of cyclosporin a. In Vitro Cell. Dev. Biol. 22, 689-694 (1986).
58. Zadeh, J. N. et al. NUPACK: Analysis and design of nucleic acid systems. J. Comput. Chem. 32, 170-173 (2011).
59. Tsai, H. H. et al. Regional astrocyte allocation regulates CNS synaptogenesis and repair. Science 337, 358-362 (2012).
60. Madugula, V. & Lu, L. A ternary complex comprising transportin1, Rab8 and the ciliary targeting signal directs proteins to ciliary membranes. J. Cell Sci. 129, 3922-3934 (2016).
61. Wang, J. et al. Optimizing adoptive polyclonal T cell immunotherapy of lymphomas, using a chimeric T cell receptor possessing CD28 and CD137 costimulatory domains. Hum. Gene Ther. 18, 712-725 (2007).

SEQUENCES

SEQ ID NO: 1
5'ATCCAGAGTGACGCAGCACGCAGCACCCGTGGTAGTGTATCAGGGAGACACTACGTGATG CAGCTTGAAATGGACACGGTGGCTTAGT- 3'

SEQ ID NO: 2
5'-ATCCAGAGTGACGCAGCACGCAGCAAGGTGGCTGTGGGCGGATGGTGGGCTCGCGTGGG CGGCCACCTGATGGACACGGTGGCTTAGT- 3'

SEQ ID NO: 3
5'-ATCCAGAGTGACGCAGCAACAGAGGTGTAGAAGTACACGTGAACAAGCTTGAAATTGTC TC TGACAGAGGTGGACACGGTGGCTTAGT- 3'

SEQ ID NO: 4
ATCCAGAGTGACGCAGCATTAGGAGGTGGGCTCGCGTGCACCAATCCATGGTCGGCGGG A ATTTTAAGGGTGGACACGGTGGCTTAGT- 3'

SEQ ID NO: 5
5'-ATCCAGAGTGACGCAGCAGCTCGATCGTATAGCCGTGACGCAGCTTGAAATGGGATCGC G TCCACAGTTTTGGACACGGTGGCTTAGT- 3'

SEQ ID NO: 6
5'-CCAGAGTGACGCAGCAACAGAGGTGTAGAAGTACACGTGAACAAGCTTGAAATTGTC TCTGACAGAGGTGGACACGGTGGCTTTTAGT- 3'

SEQ ID NO: 7
5'-ACTAAAAGCCACCGTGTCCACCTCTGTCAGAGACAA- 3'

SEQ ID NO: 8
5'-ACTAAGCCACCGTGTCCATTTCAAGCT-3'

SEQ ID NO: 9
5'-ATCCAGAGTGACGCAGCACGCAGCACCCGTGGTAGTGTATCAGGGAGACACTACGTGAT G CAGCTTGAAATGGACACGGTGGCTTAGT- 3'

SEQ ID NO: 10
5'-TAGGTCTCACTGCGTCGTGCGTCGTGGGCACCATCACATAGTCCCTCTGTGATGCACTAC GTCGAACTTTACCTGTGCCACCGAATCA- 3'

SEQ ID NO: 11
5'-TAGGTCTCACTGCGTCGTTGTCTCCACATCTTCATGTGCACTTGTTCGAACTTTAACAGAG ACTGTCTCCACCTGTGCCACCGAATCA- 3'

SEQ ID NO: 12
5'-TAGGTCTCACTGCGTCGTAATCCTCCACCCGAGCGCACGTGGTTAGGTACCAGCCGCCCT TAAAATTCCCACCTGTGCCACCGAATCA- 3'

SEQ ID NO: 13
5'-TAGGTCTCACTGCGTCGTCGAGCTAGCATATCGGCACTGCGTCGAACTTTACCCTAGCGC AGGTGTCAAAACCTGTGCCACCGAATCA- 3'

SEQ ID NO: 14
5'-GGTCTCACTGCGTCGTTGTCTCCACATCTTCATGTGCACTTGTTCGAACTTTAACAG AGACTGTCTCCACCTGTGCCACCGAAAATCA- 3'

SEQ ID NO: 15
5'-TGATTTTCGGTGGCACAGGTGGAGACAGTCTCTGTT- 3'

SEQ ID NO: 16
5'-TGATTCGGTGGCACAGGTAAAGTTCGA-3'

SEQ ID NO: 17
5'-TGATTCGGTGGCACAGGTAAAGTTCGAC GTAGTGCATCACAGAGGGACTATGTGATGGTGCCCACGACGCACGACGCAGTGAGACCT A-3'

-continued

SEQ ID NO: 18
5'-TGATTCGGTGGCACAGGTAGTCCACCGGC
GGGTGCGCTCGGGTGGTAGGCGGGTGTCGGTGGAACGACGCACGACGCAGTGAGACCTA-3'

SEQ ID NO: 19
5'-TGATTCGGTGGCACAGGTGGAGACAGT
CTCTGTTAAAGTTCGAACAAGTGCACATGAAGATGTGGAGACAACGACGCAGTGAGACCTA-3'

SEQ ID NO: 20
5'-TGATTCGGTGGCACAGGTGGGAATTTTA
AGGGCGGCTGGTACCTAACCACGTGCGCTCGGGTGGAGGATTACGACGCAGTGAGACCTA-3'

SEQ ID NO: 21
5'-TGATTCGGTGGCACAGGTAAAGTTCGAC
GTAGTGCATCACAGAGGGACTATGTGATGGTGCCCACGACGCACGACGCAGTGAGACCTA-3'

SEQ ID NO: 22
5'-TGATTTTCGGTGGCACAGGTGGAGACAGTCT
CTGTTAAAGTTCGAACAAGTGCACATGAAGATGTGGAGACAACGACGCAGTGAGACC-3'

SEQ ID NO: 23
5'-AACAGAGACTGTCTCCACCTGTGCCACCGAAAATCA-3'

SEQ ID NO: 24
5'-TCGAACTTTACCTGTGCCACCGAATCA-3'

SEQ ID NO: 25
5'-ACTAAGCCACCGTGTCCATTTCAAGCTG
CATCACGTAGTGTCTCCCTGATACACTACCACGGGTGCTGCGTGCTGCGTCACTCTGGAT-3'

SEQ ID NO: 26
5'-ACTAAGCCACCGTGTCCATCAGGTGGCCG
CCCACGCGAGCCCACCATCCGCCCACAGCCACCTTGCTGCGTGCTGCGTCACTCTGGAT-3'

SEQ ID NO: 27
5'-ACTAAGCCACCGTGTCCACCTCTGTCA
GAGACAATTTCAAGCTTGTTCACGTGTACTTCTACACCTCTGTTGCTGCGTCACTCTGGAT-3'

SEQ ID NO: 28
5'-ACTAAGCCACCGTGTCCACCCTTAAAAT
TCCCGCCGACCATGGATTGGTGCACGCGAGCCCACCTCCTAATGCTGCGTCACTCTGGAT-3'

SEQ ID NO: 29
5'-ACTAAGCCACCGTGTCCATTTCAAGCTG
CATCACGTAGTGTCTCCCTGATACACTACCACGGGTGCTGCGTGCTGCGTCACTCTGGAT-3'

SEQ ID NO: 30
5'-ACTAAAAGCCACCGTGTCCACCTCTGTCAGA
GACAATTTCAAGCTTGTTCACGTGTACTTCTACACCTCTGTTGCTGCGTCACTCTGG-3'

SEQ ID NO: 31
5'-TTGTCTCTGACAGAGGTGGACACGGTGGCTTTTAGT-3'

SEQ ID NO: 32
5'-AGCTTGAAATGGACACGGTGGCTTAGT-3'

SEQ ID NO: 33
5'-ATCCAGAGTGACGCAGCACGCAGCACCCGTGGTAGTGTATCAGGGAGACACTACGTGATG CAGCTTGAAATGGACACGGTGG-3'

SEQ ID NO: 34
5'-ATCCAGAGTGACGCAGCACGCAGCAAGGTGGCTGTGGGCGGATGGTGGGCTCGCGTGGG CGGCCACCTGATGGACACGGTGG-3'

SEQ ID NO: 35
5'-
CCAGAGTGACGCAGCAACAGAGGTGTAGAAGTACACGTGAACAAGCTTGAAATTGTCTC
TGACAGAGGTGGACACGGTGG-3'

SEQ ID NO: 36
5'-
ATCCAGAGTGACGCAGCATTAGGAGGTGGGCTCGCGTGCACCAATCCATGGTCGGCGGG
A ATTTTAAGGGTGGACACGGTGG-3'

SEQ ID NO: 37
5'-
ATCCAGAGTGACGCAGCAGCTCGATCGTATAGCCGTGACGCAGCTTGAAATGGGATCGC
G TCCACAGTTTTGGACACGGTGGC-3'

SEQ ID NO: 38
5'-CCAGAGTGACGCAGCAACAGAGGTGTAGAAGTACACGTGAACAAGCTTGAAATTGTC
TCTGACAGAGGTGGACACGGTGG-3'

SEQ ID NO: 39
5'ATCCAGAGTGACGCAGCACGCAGCACCCGTGGTAGTGTATCAGGGAGACACTACGTGA
TG CAGCTTGAAATGGACACGGTGGCTTTTAGT- 3'

SEQ ID NO: 40
5'-
ATCCAGAGTGACGCAGCACGCAGCAAGGTGGCTGTGGGCGGATGGTGGGCTCGCGTGGG
CGGCCACCTGATGGACACGGTGGCTTTTAGT- 3'

SEQ ID NO: 41
5'-
ATCCAGAGTGACGCAGCATTAGGAGGTGGGCTCGCGTGCACCAATCCATGGTCGGCGGG
A ATTTTAAGGGTGGACACGGTGGCTTTTAGT- 3'

SEQ ID NO: 42
5'-
ATCCAGAGTGACGCAGCAGCTCGATCGTATAGCCGTGACGCAGCTTGAAATGGGATCGC
G TCCACAGTTTTGGACACGGTGGCTTAGT- 3'

SEQ ID NO: 43
5'-ATCCAGAGTGACCGTCGTGCGTCGTGGGCACCATCACATAGTCCCTCTGTGATG
GTGATG CAGCTTGAAATGGACACGGTGGCTTAGT-3'

SEQ ID NO: 44
5'-ATCCAGAGTGACCGTCGTGCGTCGTTCCAC CGACACCCGC CTACCACCCG AGCG
GTGGGCGGCCACCTGA TGGACACGGTGGCTTAGT-3'

SEQ ID NO: 45
5'-ATCCAGAGTGACCGTCGTTGTCTCCACATCTTCATGTGCACTTGTTCGAACTTT
TTGTCTCTGACAGAGGTGGACACGGTGGCTTAGT-3'

SEQ ID NO: 46
5'-ATCCAGAGTGACCGTCGTAA TCCTCCACCC GAGCGCACGTGGTTAGGTACCAGC
GCGGGAATTTTAAGGG TGGACACGGT GGCTTAGT-3'

SEQ ID NO: 47
5'-TAGGTCTCACTGCGTCGTCGAGCTAGCATATCGGCACTGCGTCGAACTTTACCC
TAGCGCAGGTGTCAAAACCTGTGCCACCGAATCA-3'

SEQ ID NO: 48
5'-CCAGAGTGACCGTCGTTGTCTCCACATCTTCATGTGCACTTGTTCGAACTTT
TTGTCTCTGACAGAGGTGGACACGGTGGCTTTTAGT-3'

SEQ ID NO: 49
5'-ACTAAGCCACCGTGTCCATTTCAAGCTGCATCACGTAGTG-3'

SEQ ID NO: 50
5'-ACTAAGCCACCGTGTCCACCTCTGTCAGAGACAATTTCAAGC-3'

SEQ ID NO: 51
5'-ACTAAGCCACCGTGTCCAAAACTGTGGACGCGATCCC-3'

SEQ ID NO: 52
5'-
CACAGTGACGCAGCAACAGAGGTGTAGAAGTACACGTGAACAAGCTTGAAATTGTCTCT
GACAGAGGTGGACACTGTGTCTTAGT-3'

SEQ ID NO: 53
5'-ACTAAGACACAGTGTCCACC-3'

SEQ ID NO: 54
5'-ACTAAGACACAGTGTCCACCTCTGTCAGAGACAAT-3'

-continued

```
                                             SEQ ID NO: 55
5'-ACTAAGACACAGTGTCCACCTCTGTCAGAGACAATTTCAAGCTTGTTCAC-3'

SEQ ID NO: 56
5'-ACTAAGACACAGTGTCCACCTCTGTCAGAGACAATTTCAAGCTTGTTCAC
GTGTACTTCTACACC-3'

SEQ ID NO: 57
5'-
ACTAAGACACAGTGTCCACCTCTGTCAGAGACAATTTCAAGCTTGTTCACGTGTACTTCT
ACACCTCTGTTGCTGCGTCACTGTG-3'

SEQ ID NO: 58
5'-ACTAAGACACAGTGTCCACCTCTGT-3'

SEQ ID NO: 59
5'-ACTAAGACACAGTGTCCACCTCTGTCAGAG-3'

SEQ ID NO: 60
5'-ACTAAGACACAGTGTCCACCTCTGTCAGAGACAAT-3'

SEQ ID NO: 61
5'-ACTAAGACACAGTGTCCACCTCTGTCAGAGACAATTTCAA-3'

SEQ ID NO: 62
5'-ACTAAGACACAGTGTCCACCTCTGTCAGAGACAATTTCAAGCTTG-3'

SEQ ID NO: 63
5'-ACTAAGACACAGTGTCCACCTCTGTCAGAGACAATTTCAAGCTTGTTCAC-3'

SEQ ID NO: 64
5'-
CCAGAGTGACGCAGCACCCGTGGTAGTGTATCAGGGAGACACTACGTGATGCAGCTTGA
AATGGACACGGTGGCTTTTAGT-3'

SEQ ID NO: 65
CCAGAGTGACGCAGCAACAGAGGTGTAGAAGTACACGTGAACAAGCTTGAAATTGTCTC
TGACAGAGGTGGACACGGTGGAAGGAAGG

SEQ ID NO: 66
5'-
CCAGAGTGACGCAGCAACAGAGGTGTAGAAGTACACGTGAACAAGCTTGAAATTGTCTC
TGACAGAGGTGGACACGGTGGGAGGGAGG-3'

SEQ ID NO: 67
5'-CCACCACCGTACAATTCGCTTTCTTTTTTCATTACCTACTCTGGC-3'

SEQ ID NO: 68
5'-CCACCAGTCAAATTTCATCGTCACTTTATTTCATTCGCACTCTGG-3'

SEQ ID NO: 69
5'-TCCCCGACCTTTTCTTTCTCTTTCGCA-3'

SEQ ID NO: 70
5'-CCACGCACCATCTATTTCCTTTTTCGCC-3'

SEQ ID NO: 71
5'-CCACCACACCTTCATCTTACTTCATTTCTATCGCGCTTCA-3'

SEQ ID NO: 72
5'-CCATCCCAACTCGTTATTCTCGCTCCA-3'

SEQ ID NO: 73
5'-CCACCCCGCTATTTCATCTTTCTCGCTCC-3'

SEQ ID NO: 74
5'-CCACCACTTTACCTTTTTATTTTGTCTACTCTCGGTACA-3'

SEQ ID NO: 75
5'-CCACCAGCGATTCATTTCAACATCTTCTACTTTTTATCCCTCCC-3'

SEQ ID NO: 76
5'-TCCACCCGAATCTTGTTATCCTTCCTTCGCC-3'

SEQ ID NO: 77
5'-CCACCACGTTTATTCTTTCGCTCCCTCC-3'

SEQ ID NO: 78
5'-
AATGATACGGCGACCACCGAGATCTACACCGAGGAGATACCACTAAGCCACCGTGTCCA-
```

-continued

SEQ ID NO: 79
5'-CAAGCAGAAGACGGCATACGAGATGCAATTCGACAGACCGTCGATCCAGAGTGACGCAGCA-3'

SEQ ID NO: 80
5'-CAAGCAGAAGACGGCATACGAGATCAAGAGGTACAGACCGTCGATCCAGAGTGACGCAGCA-3'

SEQ ID NO: 81
CAAGCAGAAGACGGCATACGAGATTCGATTAAACAGACCGTCGATCCAGAGTGACGCAGCA

SEQ ID NO: 82
5'-CAAGCAGAAGACGGCATACGAGATGAATGGACACAGACCGTCGATCCAGAGTGACGCAGCA- 3'

SEQ ID NO: 83
5'-CAAGCAGAAGACGGCATACGAGATAGAATCAGACAGACCGTCGATCCAGAGTGACGCAGCA-3'

SEQ ID NO: 84
5'-CAAGCAGAAGACGGCATACGAGATAACTGCCAACAGACCGTCGATCCAGAGTGACGCAGCA-3'

SEQ ID NO: 85
5'-CGCAGCACCCGTGGTAGTGTATCAGGGAGACACTACGTGATGCAGCTTGAAA-3'

SEQ ID NO: 86
5'-CGCAGCAAGGTGGCTGTGGGCGGATGGTGGGCTCGCGTGGGCGGCCACCTGA-3'

SEQ ID NO: 87
5'-ACAGAGGTGTAGAAGTACACGTGAACAAGCTTGAAATTGTCTCTGACAGAGG-3'

SEQ ID NO: 88
5'-CGCAGCACCCGTGGTAGTGTATCATGGAGACACTACGTGATGCAGCTTGAAA-3'

SEQ ID NO: 89
5'-CGCAGCACCCGTGGTAGTGTATCAGGGATACACTACGTGATGCAGCTTGAAA-3'

SEQ ID NO: 90
5'-CGCAGCACCCGTGGTAGTGTATCAGAGAGACACTACGTGATGCAGCTTGAAA-3'

SEQ ID NO: 91
5'-TTAGGAGGTGGGCTCGCGTGCACCAATCCATGGTCGGCGGGAATTTTAAGGG-3'

SEQ ID NO: 92
5'-GCTCGATCGTATAGCCGTGACGCAGCTTGAAATGGGATCGCGTCCACAGTTT-3'

SEQ ID NO: 93
5'-CGCAGCGCCCGTGGTAGTGTATCAGGGAGACACTACGTGATGCAGCTTGAAA-3'

SEQ ID NO: 94
5'-CGGCCGAACCTCCACCCTTCCGCAGCGTAGGCAGACTCGGATCATGATAATC-3'

SEQ ID NO: 95
5'-CGCAGCAGCCGTGGTAGTGTATCAGGGAGACACTACGTGATGCAGCTTGAAA-3'

SEQ ID NO: 96
5'-CGCAGCAACCGTGGTAGTGTATCAGGGAGACACTACGTGATGCAGCTTGAAA-3'

SEQ ID NO: 97
5'-CGCAGCACCCGTGGTAGTGTATCGGGGAGACACTACGTGATGCAGCTTGAAA-3'

SEQ ID NO: 98
5'-CGCAGCAACGTTATCCCCTTTACGGGGTCCTAGAGCCCCGTGAGTGCTCACG-3'

SEQ ID NO: 99
5'-CGCAGCTCCCGTGGTAGTGTATCAGGGAGACACTACGTGATGCAGCTTGAAA-3'

SEQ ID NO: 100
5'-CGCATCACCCGTGGTAGTGTATCAGGGAGACACTACGTGATGCAGCTTGAAA-3'

SEQ ID NO: 101
5'-CGCAGCACCCGTGGTAGTGTATCAGTGAGACACTACGTGATGCAGCTTGAAA-3'

```
                                                     SEQ ID NO: 102
5'-CGCAGCCCCCGTGGTAGTGTATCAGGGAGACACTACGTGATGCAGCTTGAAA-3'

SEQ ID NO: 103
5'-ACGCAGCACCCGTGGTAGTGTATCAGGAGACACTACGTGATGCAGCTTGAAA-3'

SEQ ID NO: 104
5'-CGCAGCACCCGTGGTAGTGTATCAGGGAGACACTACGTGATGCAGCTTAAAA-3'

SEQ ID NO: 105
5'-/56-FAM/ATCCAGAGTGACGCAGCA-3'

SEQ ID NO: 106
5'-/5BiosG/ACTAAGCCACCGTGTCCA-3'

SEQ ID NO: 107
rCrGrArGrArGrGrUrArArUrGrArArUrUrArArArGrArAGA

SEQ ID NO: 108
rUrCrUrUrCrUrUrUrArArUrUrCrArUrArCrCrUrCrCrUrCrGrArG

SEQ ID NO: 109
rCrUrGrCrUrUrArArGrGrUrArUrGrGrUrArCrArArGrCAA

SEQ ID NO: 110
rUrUrGrCrUrGrUrArCrCrArUrArCrCrUrUrArArGrCrArArGrGrA

SEQ ID NO: 111
5'-CTACAGCTTGCTATGCTCCCCTTGGGGTA/iSp18//3Bio/-3'
```

---

What is claimed:

1. A method for isolating a cell of interest from a biological sample comprising a plurality of cell types, the method comprising:
   a) contacting the biological sample with an aptamer that specifically binds a cell surface marker that is specific for the cell of interest under conditions that permit forming aptamer-bound cells, wherein the aptamer comprises:
      i) the sequence of one of SEQ ID NOs: 1-6, 10-14, 17-22, 27-30, 33-48, 52-66, 112-114, or 118, or nucleotides 3-75 of SEQ ID NO: 118, that selectively binds to human CD8 polypeptide; or
      ii) the sequence of one of SEQ ID NOs: 67-77 that selectively binds to human CD4 polypeptide;
   b) separating the aptamer-bound cells from cells not bound to the aptamer; and
   c) recovering the cell of interest by disrupting binding of the aptamer to the cell surface marker with a reversal agent,
   whereby the cell of interest is isolated from the biological sample.

2. The method of claim 1, wherein the cell of interest is viable.

3. The method of claim 1, wherein the cell of interest is selected from the group consisting of: a leukocyte, a lymphocyte, a monocyte, and a T cell.

4. The method of claim 1, wherein the cell of interest is a CD3+ cell, a CD4+ cell, or a CD8+ cell.

5. The method of claim 1, wherein the aptamer comprises a label.

6. The method of claim 1, wherein separating step (b) comprises the use of a first solid support or a phase-changing agent.

7. The method of claim 1, wherein the aptamer is (i) conjugated or immobilized to a first solid support, and/or (ii) labeled with a first member of an affinity pair.

8. The method of claim 1, wherein the separating step (b) comprises either (i) removing from the biological sample aptamer-bound cells bound to the first solid support via the aptamer, or (ii) adding a second solid support bearing a second member of the affinity pair, to permit physical association of the aptamer to the second solid support via the interaction of the first and second members of the affinity pair, and removing from the biological sample aptamer-bound cells.

9. The method of claim 8, wherein the first and/or second solid support comprises a magnetoresponsive bead.

10. The method of claim 8, wherein the first and/or second solid support comprises a polymer, metal, ceramic, glass, hydrogel, or resin.

11. The method of claim 9, wherein the separating step comprises subjecting the sample to a magnetic field, whereby the first and/or second solid support comprising aptamer-bound cells is separated from the biological sample.

12. The method of claim 1, wherein the reversal agent comprises a polyanion, a small molecule, or an oligonucleotide or oligonucleotide mimic comprising a sequence sufficiently complementary to a sequence of the aptamer to hybridize to the aptamer and thereby disrupt binding of the aptamer to the cell surface marker.

13. The method of claim 1, wherein the aptamer-bound cells comprise cells double-positive for a selected pair of markers including the marker bound by the aptamer, wherein the selected pair of markers is CD3 and CD4 or the selected pair of markers is CD3 and CD8.

14. The method of claim 1, wherein the isolated cell of interest is double-positive for a selected pair of markers including the marker bound by the aptamer, wherein the selected pair of markers is CD3 and CD4 or the selected pair of markers is CD3 and CD8.

15. The method of claim 14, wherein the cell is a CD3+ T cell, CD8+ T cell, CD4+ T cell, CD3+CD4+ T cell, or CD3+CD8+ T cell.

* * * * *